United States Patent
Choi et al.

(10) Patent No.: US 9,876,553 B2
(45) Date of Patent: Jan. 23, 2018

(54) MULTIPLE INPUT MULTIPLE OUTPUT COMMUNICATION SYSTEM USING CODEBOOK CORRESPONDING TO EACH REPORTING MODE

(75) Inventors: Joon-Il Choi, Seoul (KR); Bruno Clerckx, Yongin-si (KR); Ki Il Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 13/097,719

(22) Filed: Apr. 29, 2011

(65) Prior Publication Data

US 2011/0268207 A1    Nov. 3, 2011

Related U.S. Application Data

(60) Provisional application No. 61/329,634, filed on Apr. 30, 2010, provisional application No. 61/355,681, (Continued)

(30) Foreign Application Priority Data

Apr. 5, 2011  (KR) ......................... 10-2011-0031200

(51) Int. Cl.
*H04B 7/02* (2017.01)
*H04L 1/02* (2006.01)
(Continued)

(52) U.S. Cl.
CPC ......... *H04B 7/0639* (2013.01); *H04B 7/0456* (2013.01); *H04B 7/0478* (2013.01)

(58) Field of Classification Search
CPC ... H04W 72/042; H04L 5/0053; H04L 5/0048
See application file for complete search history.

(56) References Cited

U.S. PATENT DOCUMENTS

2007/0280373 A1*  12/2007  Lee et al. ................... 375/267
2008/0094281 A1    4/2008  Teng et al.
(Continued)

FOREIGN PATENT DOCUMENTS

KR    10-2008-0084502 A    9/2008
KR    10-2009-0016374 A    2/2009
(Continued)

OTHER PUBLICATIONS

Huawei, Downlink 8TX Codebook Considerations (Online), 3GPP TSG-RAN WG1#59b R1-100256, Internet link <URL:http://www.3gpp.org/ftp/tsg_ran/WG1_RL1/TSGR1_59b/Docs/R1-100256.zip>, Jan. 12, 2010.
(Continued)

*Primary Examiner* — Shuwang Liu
*Assistant Examiner* — Gina McKie
(74) *Attorney, Agent, or Firm* — Jefferson IP Law, LLP

(57) ABSTRACT

A multiple input multiple output (MIMO) communication system using a first codebook and a second codebook is provided. The first codebook and the second codebook may independently exist, or may exist in a form of an overall codebook in which the first codebook and the second codebook are integrated with each other. A receiver may extract a first precoding matrix indicator from the first codebook, and may extract a second precoding matrix indicator from the second codebook. The receiver may also extract the first precoding matrix indicator and the second precoding matrix indicator from the overall codebook. The first precoding matrix indicator and the second precoding matrix indicator may be fed back to a transmitter. The transmitter may determine a precoding matrix based on the first precoding matrix indicator and the second precoding matrix indicator.

11 Claims, 6 Drawing Sheets

Related U.S. Application Data filed on Jun. 17, 2010, provisional application No. 61/356,768, filed on Jun. 21, 2010, provisional application No. 61/373,942, filed on Aug. 16, 2010, provisional application No. 61/388,736, filed on Oct. 1, 2010, provisional application No. 61/428,348, filed on Dec. 30, 2010.

(51) Int. Cl.
*H04B 7/06* (2006.01)
*H04B 7/0456* (2017.01)
*H04B 7/04* (2017.01)

(56) References Cited

U.S. PATENT DOCUMENTS

| | | | |
|---|---|---|---|
| 2008/0219370 A1* | 9/2008 | Onggosanusi et al. | 375/260 |
| 2009/0006925 A1 | 1/2009 | Pan | |
| 2009/0046801 A1 | 2/2009 | Pan et al. | |
| 2009/0046805 A1* | 2/2009 | Kim et al. | 375/295 |
| 2009/0122857 A1 | 5/2009 | Li et al. | |
| 2009/0181708 A1* | 7/2009 | Kim et al. | 455/501 |
| 2009/0189812 A1 | 7/2009 | Xia et al. | |
| 2009/0199055 A1* | 8/2009 | Chen | H03M 13/356 714/701 |
| 2009/0262695 A1 | 10/2009 | Chen et al. | |
| 2010/0039928 A1* | 2/2010 | Noh et al. | 370/210 |
| 2010/0074353 A1 | 3/2010 | Zhou et al. | |
| 2010/0310000 A1* | 12/2010 | Ko et al. | 375/260 |
| 2011/0249637 A1* | 10/2011 | Hammarwall | H04B 7/0634 370/329 |
| 2014/0328422 A1* | 11/2014 | Chen | H04B 7/0417 375/267 |
| 2014/0355705 A1* | 12/2014 | Chen | H04B 7/0456 375/267 |
| 2015/0288433 A1* | 10/2015 | Onggosanusi | H04L 1/0031 370/329 |
| 2016/0006493 A1* | 1/2016 | Chen | H04B 7/0456 375/267 |

FOREIGN PATENT DOCUMENTS

| | | |
|---|---|---|
| KR | 10-2009-0016386 A | 2/2009 |
| KR | 10-2009-0083834 A | 8/2009 |
| KR | 10-2009-0101804 A | 9/2009 |
| KR | 10-2010-0005649 A | 1/2010 |
| KR | 10-2010-0066298 A | 6/2010 |
| KR | 10-2010-0082894 A | 7/2010 |
| KR | 10-2010-0092860 A | 8/2010 |
| WO | 2006/117665 A1 | 11/2006 |
| WO | 2009-096708 A1 | 8/2009 |
| WO | 2010/024582 A2 | 3/2010 |
| WO | 2012-039589 A2 | 3/2012 |

OTHER PUBLICATIONS

Down-sampling C1 and/or C2 for PUCCH Mode 1-1 in Rel.10, 3GPP TSG RAN WG1 #62bis R1-105249, Oct. 11-15, 2010.
Remaining Details on PUCCH Reporting Mode, 3GPP TSG RAN WG1 Meeting #62bis R1-105382, Oct. 11-15, 2010.
3GPP TS 36.211, V10.1.0, pp. 60-64, Mar. 2011.
Huawei, "Downlink 8TX codebook", 3GPP TSG RAN WG1#60, R1-101066, Feb. 22-26, 2010, San Francisco, USA.
Texas Instruments, " Possible Refinement on 8Tx Codebook Design", 3GPP TSG RAN WG1 60bis, R1-102104, pp. 1-7, Apr. 12-16, 2010, Beijing, China.
Ericsson, Introduction of Rel-10 LTE-Advanced features in 36.211, 3GPP TSG-RAN Meeting #62, R1-105096, Aug. 27, 2010, pp. 1-96.
Panasonic, 8Tx Codebook Subsampling, 3GPP TSG-RAN WG1#62 R1-104901, Aug. 17, 2010, pp. 1-6.
Huawei et al., Down-sampling C1 and/or C2 for PUCCH Mode 1-1 in Rel.10, 3GPP TSG-RAN WG1#62b R1-105249, Oct. 5, 2010.
Catt, Codebook design for 8Tx DL MiMO, 3GPP TSG RAN WG1 Meeting #60, R1-100890, Feb. 22-26, 2010, pp. 1-10, San Francisco, USA.
Fujitsu, 8 Tx Codebook for LET-Advanced, 3GPP TSG-RAN1 #59b, R1-101024, Feb. 22-26, 2010, pp. 1-6, San Francisco, USA.

* cited by examiner

PUCCH 2-1 SUB-MODE 1,2

MULTIPLE INPUT MULTIPLE OUTPUT COMMUNICATION SYSTEM USING CODEBOOK CORRESPONDING TO EACH REPORTING MODE

CROSS-REFERENCE TO RELATED APPLICATION(S)

This application claims the benefit under 35 U.S.C. § 119(e) of U.S. Provisional Application No. 61/329,634, filed on Apr. 30, 2010, U.S. Provisional Application No. 61/355,681, filed on Jun. 17, 2010, U.S. Provisional Application No. 61/356,768, filed on Jun. 21, 2010, U.S. Provisional Application No. 61/373,942, filed on Aug. 16, 2010, U.S. Provisional Application No. 61/388,736, filed on Oct. 1, 2010, and U.S. Provisional Application No. 61/428,348, filed on Dec. 30, 2010, all of which were filed in the United States Patent and Trademark Office, and claims the benefit under 35 U.S.C. §119(a) of Korean Patent Application No. 10-2011-0031200, filed on Apr. 5, 2011, in the Korean Intellectual Property Office, the entire disclosures of which are incorporated herein by reference for all purposes.

BACKGROUND OF THE INVENTION

1. Field of the Invention

The following description relates to a multiple input multiple output (MIMO) communication system using a codebook, and more particularly, to codebooks corresponding to respective reporting modes used by a transmitter and a receiver included in a MIMO communication system.

2. Description of the Related Art

A multiple input multiple output (MIMO) communication system may include a transmitter and at least one receiver. For example, the MIMO communication system may include a base station and at least one terminal. In a downlink, the base station may perform a functionality as the transmitter, and each of the at least one terminal may perform a functionality as the receiver.

The transmitter or the receiver operating in the MIMO communication system may include a plurality of antennas, and may transmit and receive data using the plurality of antennas. A wireless channel may be formed between each transmit antenna of the transmitter and each receive antenna of the receiver. The transmitter and the receiver may share information associated with the wireless channel, thereby achieving a high data rate.

In a closed-loop MIMO communication system, feedback information to be shared between the transmitter and the receiver may include a rank indicator indicating a preferred rank of the receiver, a precoding matrix indicator indicating a preferred precoding matrix, channel quality information indicating a quality of a wireless channel, and the like. The receiver may select one of matrices or vectors included in a codebook using a predefined codebook, and may feed back an index of the selected matrix or vector as the precoding matrix indicator.

SUMMARY OF THE INVENTION

In one general aspect, there is provided a communication method of a receiver in a multiple input multiple output (MIMO) communication system including a transmitter having eight transmit antennas and the receiver, the communication method including extracting a first precoding matrix indicator corresponding to a first codeword included in a first codebook and a second precoding matrix indicator corresponding to a second codeword included in a second codebook, and transmitting, to the transmitter, the first precoding matrix indicator and the second precoding matrix indicator.

In another general aspect, there is provided a communication method of a receiver in a MIMO communication system including a transmitter having eight transmit antennas and the receiver, the communication method including feeding back, to the transmitter, a first precoding matrix indicator corresponding to a first codeword included in a first codebook in order to indicate a recommended precoding matrix at a first reporting point in time, and feeding back, to the transmitter, a second precoding matrix indicator corresponding to a second codeword included in a second codebook in order to indicate a recommended precoding matrix at a second reporting point in time.

In still another general aspect, there is provided a communication method of a transmitter in a MIMO communication system including the transmitter having eight transmit antennas and a receiver, the communication method including receiving, from the receiver, a first precoding matrix indicator corresponding to a first codeword included in a first codebook and a second precoding matrix indicator corresponding to a second codeword included in a second codebook, accessing a memory that stores the first codebook and the second codebook, and generating a precoding matrix using the first precoding matrix indicator and the second precoding matrix indicator.

In yet another general aspect, there is provided a communication method of a transmitter in a MIMO communication system including the transmitter having eight transmit antennas and a receiver, the communication method including receiving, from the receiver, a first precoding matrix indicator corresponding to a first codeword included in a first codebook, the first precoding matrix indicator indicating a recommended precoding matrix at a first reporting point in time, receiving, from the receiver, a second precoding matrix indicator corresponding to a second codeword included in a second codebook, the second precoding matrix indicator indicating a recommended precoding matrix at a second reporting point in time, accessing a memory that stores the second codebook, and generating the recommended precoding matrix at the second reporting point in time using the second precoding matrix indicator received at the second reporting point in time.

Other features and aspects may be apparent from the following detailed description, the drawings, and the claims.

Figure 1:
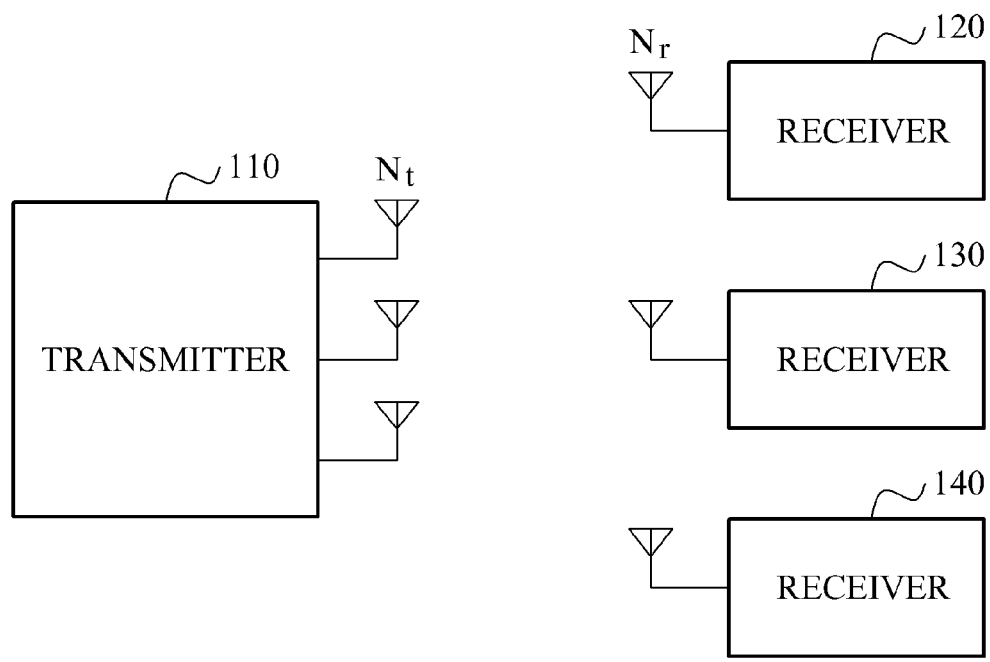
FIG. 1 is a diagram illustrating an example of a multiple input multiple output (MIMO) communication system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION OF THE EXEMPLARY EMBODIMENTS

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Hereinafter, embodiments will be described in detail with reference to the accompanying drawings.

FIG. 1 illustrates an example of a multiple input multiple output (MIMO) communication system.

Referring to FIG. 1, the MIMO communication system may include a transmitter 110 and a plurality of receivers 120, 130, and 140.

$N_t$ transmit antennas may be installed in the transmitter 110. The transmitter 110 may function as a base station in a downlink, and may function as a terminal in an uplink. $N_r$ receive antennas may be installed in the receivers 120, 130, and 140. Each of the receivers 120, 130, and 140 may function as a terminal in the downlink, and may function as a base station in the uplink. Hereinafter, embodiments will be described based on an operation of the transmitter 110 and the receivers 120, 130, and 140 in the downlink. The embodiments may be applicable to the uplink.

Channels may be formed between the transmitter 110 and the receivers 120, 130, and 140. Data may be transmitted from the transmitter 110 to the receivers 120, 130, and 140 via the channels. The transmitter 110 may precode at least one data stream using a precoding matrix, enhancing a performance of the MIMO communication system. A data stream may also be referred to as data.

The transmitter 110 may generate or determine a more accurate precoding matrix by verifying information associated with channel direction and information associated with channel quality. Information associated with the channel direction and information associated with the channel quality may be one example of channel information. Information associated with the channel direction may include a precoding matrix indicator.

For example, the transmitter 110 and the receivers 120, 130, and 140 may share the precoding matrix indicator using a codebook. The codebook may include a plurality of codewords. Each of the plurality of codewords may correspond to a vector or a matrix. A size of the codebook may correspond to a number of codewords. For example, a 3-bit codebook may include eight codewords, and a 4-bit codebook may include 16 codewords.

Each of the receivers 120, 130, and 140 may select a single codeword from the plurality of codewords, and may generate an indicator of the selected codeword as a precoding matrix indicator. The precoding matrix indicator may be fed back to the transmitter 110. The transmitter 110 may verify a codeword indicated by the precoding matrix indicator, using the codebook. The transmitter 110 may generate or determine an optimal precoding matrix based on the codeword corresponding to the precoding matrix indicator.

A dimension of a precoding matrix may be dependent on a rank of the transmitter 110. The rank of the transmitter 110 may correspond to a number of data streams desired to be transmitted or a number of layers of the transmitter 110.

Figure 2:
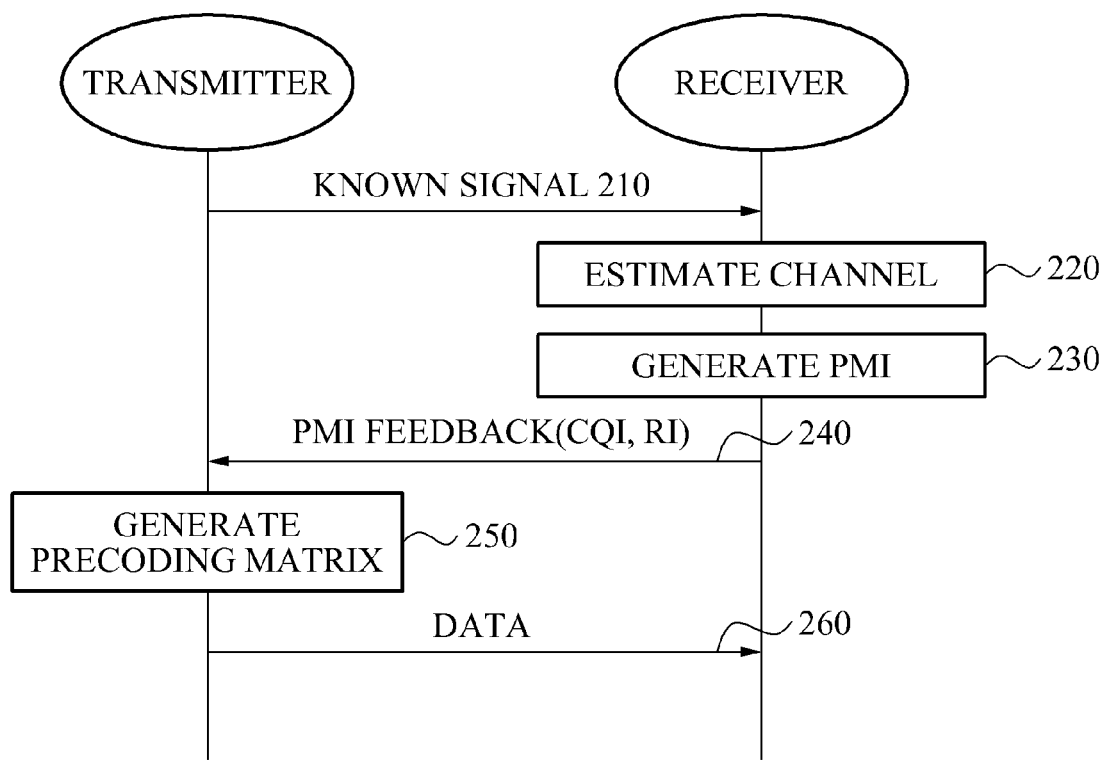
FIG. 2 is a diagram illustrating an example of a communication method of a receiver and a transmitter that share channel information using a single codebook.

FIG. 2 illustrates an example of a communication method of a receiver and a transmitter that share channel information using a single codebook.

Referring to FIG. 2, at 210, the transmitter may transmit a well-known signal to the receiver. The well-known signal may be a pilot signal.

At 220, the receiver may estimate a channel formed from the transmitter to the receiver based on the well-known signal.

At 230, the receiver may select, from a codebook, a codeword suitable for the estimated channel and generate a precoding matrix indicator including an index of the selected codeword. In this example, the same codebook may be stored in both the transmitter and the receiver.

At 240, the receiver may feed back a precoding matrix indicator to the transmitter. The receiver may also feed back channel quality information and a rank indicator.

At 250, the transmitter may generate or determine an optimal precoding matrix based on the fed back precoding matrix indicator. At 260, the transmitter may transmit data using the precoding matrix.

The communication method of the transmitter and the receiver when the transmitter and the receiver use the same single codebook is described above with reference to FIG. 2. According to embodiments, two codebooks may be used for the receiver and the transmitter to share two precoding matrix indicators.

Hereinafter, it is assumed that a first codebook $C_1$ and a second codebook $C_2$ are present, and two codebooks are stored in the receiver and the transmitter, respectively. It is also assumed that a precoding matrix W is finally recommended by the receiver and is used by the transmitter.

Figure 3:
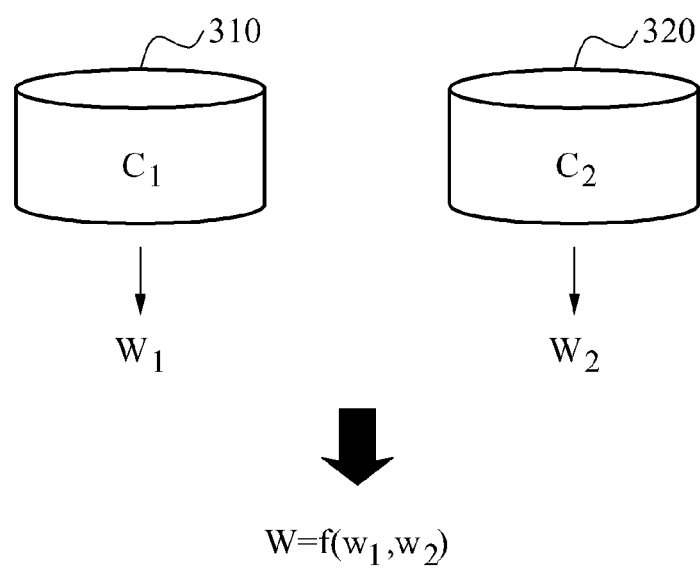
FIG. 3 is a diagram illustrating an example of a relationship between two codebooks and a precoding matrix.

FIG. 3 illustrates an example of a relationship between two codebooks and a precoding matrix.

Referring to FIG. 3, both a transmitter and a receiver may store a first codebook $C_1$ 310 and a second codebook $C_2$ 320. The receiver may select a preferred first codeword $W_1$ from the first codebook $C_1$ 310, and may select a preferred second codeword $W_2$ from the second codebook $C_2$ 320. A first precoding matrix indicator may be fed back to the transmitter as an index of the preferred first codeword $W_1$, and a second precoding matrix indicator may be fed back to the transmitter as an index of the preferred second codeword $W_2$.

Based on the first precoding matrix indicator and the second precoding matrix indicator, the transmitter may find the preferred first codeword $W_1$ from the first codebook $C_1$ 310, and may find the preferred second codeword $W_2$ from the second codebook $C_2$ 320. The transmitter may determine a precoding matrix $W=f(W_1, W_2)$ based on the preferred first codeword $W_1$ and the preferred second codeword $W_2$.

In $W=f(W_1, W_2)$, a function f may be variously defined. For example, $W=f(W_1, W_2)=W_2W_1$ or $W=f(W_1, W_2)=W_1W_2$ may be defined.

$W_1$ corresponds to the preferred first codeword of the receiver corresponding to the first precoding matrix indicator selected by the receiver from the first codebook $C_1$. $W_2$ corresponds to the preferred second codeword of the receiver corresponding to the second precoding matrix indicator of the receiver selected from the second codebook $C_2$. The first codebook $C_1$ or the first precoding matrix indicator may be used to indicate a property of a channel in a wideband including a plurality of subbands, or to indicate a long-term property of the channel. The second codebook $C_2$ or the second precoding matrix indicator may be used to indicate a property of a channel in a subband or to indicate a short-term property of the channel.

In $W=f(W_1, W_2)=W_2W_1$, $W$ may have a dimension of $N_t \times R$ and $W_1$ may have a dimension of $N_t \times R$. $W2$ may have a dimension of $N_t \times N_t$. In $W=f(W_1, W_2)=W_1W_2$, $W$ may have a dimension of $N_t \times R$ and $W_1$ and $W_2$ may have a variety of dimensions based on R. Here, R corresponds to a rank and indicates a number of data streams or a number of layers.

Hereinafter, the first codebook $C_1$ including candidates of $W_1$ and the second codebook $C_2$ including candidates of $W_2$ when the transmitter includes eight transmit antennas will be defined with respect to each of various ranks. Since $W_1$ is indicated by a combination of $W_1$ and $W_2$, to define the candidates of $W_1$ and the candidates of $W_2$ may be equivalent to define candidates of $W$. In addition to the first codebook $C_1$ and the second codebook $C_2$, the candidates of $W$ may also be defined.

Design of rank 1 codebook when the transmitter includes eight transmit antennas:

In dual polarized channels, a precoding matrix in one subband may be expressed by, $$W = \frac{\sqrt{2}}{2} \begin{bmatrix} \sqrt{2-|\alpha|^2}\, A \\ \alpha B \end{bmatrix}$$

A and B may correspond to unit norm vectors having a dimension of $N_t/2 \times 1$ and may independently perform beamforming in each polarization. Each polarization may appear as an effectively single antenna after beamforming is performed in each polarization using A and B. To design codebooks with respect to A and B may be dependent on statistical properties of a channel in each polarization. Without further assumption with respect to properties, A and B may account for subband/short-term information and wideband/long-term information.

Beamforming of polarizations may be performed by vector $$\begin{bmatrix} \sqrt{2-|\alpha|^2} \\ \alpha \end{bmatrix}.$$

Here, $\alpha$ corresponds to a complex scalar and may account for a phase difference and a magnitude difference. The phase difference between the polarizations may typically correspond to a short-term property and the magnitude difference may correspond to a function of the subband/short-term property and wideband/long-term property. A cross-polarization discrimination factor is generally referred to as XPD of a channel. XPD indicates a wideband/long-term property of a dual polarization channel and a mean value with respect to $\alpha$ may vary.

In general, A and B may be selected to be different from each other. However, when an interval between antennas is relatively close and each angle spread is relatively low, a beamforming vector with respect to a first polarization and a beamforming vector with respect to a second polarization may be regarded to be identical to each other. Since beamforming is invariant over a phase shift, $B=e^{j\varphi}A$ may be established. Here, a selection of $\varphi$ may not affect the performance of the dual polarization channel. When the interval between antennas is close, A, B, and $\varphi$ may be associated with wideband/long-term properties of a channel. Accordingly, a precoding matrix in a subband may be expressed by, $$W = \frac{\sqrt{2}}{2} \begin{bmatrix} \sqrt{2-|\alpha|^2}\, A \\ \alpha e^{j\phi} A \end{bmatrix} = \frac{\sqrt{2}}{2} \begin{bmatrix} \sqrt{2-|\alpha|^2}\, I_{n_t/2} \\ \alpha I_{n_t/2} \end{bmatrix} \begin{bmatrix} A \\ e^{j\phi} A \end{bmatrix}$$

For an appropriate design of A, discrete Fourier transformation (DFT) vectors may be used. In the above equation, a last equal mark may remind a structure of $W_2W_1$. A subband/short-term matrix may be expressed by $$W_2 = \begin{bmatrix} \sqrt{2-|\alpha|^2}\, I_{n_t/2} \\ \alpha I_{n_t/2} \end{bmatrix}$$

A wideband/long-term matrix may be expressed by $$W_1 = \frac{\sqrt{2}}{2} \begin{bmatrix} A \\ e^{j\phi} A \end{bmatrix}$$

In a special case where $e^{j\varphi}=1$:

$$W \stackrel{(a)}{=} \frac{\sqrt{2}}{2} \begin{bmatrix} \sqrt{2-|\alpha|^2}\, I_{n_t/2} \\ \alpha I_{n_t/2} \end{bmatrix} \begin{bmatrix} A \\ A \end{bmatrix}$$

$$\stackrel{(b)}{=} \frac{\sqrt{2}}{2} \begin{bmatrix} \sqrt{2-|\alpha|^2} \\ \alpha \end{bmatrix} \otimes A$$

$$\stackrel{(c)}{=} \frac{\sqrt{2}}{2} \begin{bmatrix} A \\ & A \end{bmatrix} \begin{bmatrix} \sqrt{2-|\alpha|^2} \\ \alpha \end{bmatrix}$$

As shown in the above equation, in the special case where $e^{j\varphi}=1$, many equivalent methods may be used to express the same precoding matrix. For example, in the above equation, (a) corresponds to a method of using the structure of $W_2W_1$, (b) corresponds to a method of using Kronecker product, and (c) corresponds to a method of using a structure of $W_1W_2$.

When the interval between antennas is close, the precoding matrix may be expressed using the aforementioned equations in a single polarization channel. In this example, $\alpha=1$, a value of $\varphi$ may be A-dependent and be selected to obtain DFT vectors for eight transmit antennas. For example, $W_2$ may correspond to an identity matrix and $W_1$ may provide a wideband precoding matrix of DFT vectors. Contrast to dual polarization channels, the selection of $\varphi$ may affect the performance of single polarization channels.

According to the structure of $W_2W_1$ shown in $$W = \frac{\sqrt{2}}{2} \begin{bmatrix} \sqrt{2-|\alpha|^2}\, A \\ \alpha e^{j\phi} A \end{bmatrix} = \frac{\sqrt{2}}{2} \begin{bmatrix} \sqrt{2-|\alpha|^2}\, I_{n_t/2} \\ \alpha I_{n_t/2} \end{bmatrix} \begin{bmatrix} A \\ e^{j\phi} A \end{bmatrix},$$

the wideband/long-term matrix $$\begin{bmatrix} A \\ e^{j\phi}A \end{bmatrix}$$

may have a significantly robust physical meaning That is, in its given $N_t \times 1$ dimension, the wideband/long-term matrix may be equivalent to a rank and thus, may provide a direct insight to a rank 1 wideband PMI structure. Also, in the aforementioned $W_2W_1$ structure, a structure $$\begin{bmatrix} A & \\ & A \end{bmatrix}$$

may not be associated with the rank and may not provide any information associated with a wideband PMI structure.

A full utilization of power amplifiers may be used as an important design criterion. When only a phase shift keying (PSK) is used to decrease the complexity of PMI search, there is a need to constrain a precoding matrix. It may be assumed that the precoding matrix becomes constant modulus and $|\alpha|=1$. In this scenario, $\alpha$ may use a subband/long-term property with respect to a phase shift between polarizations.

Design of rank 2 codebook when the transmitter includes eight transmit antennas:

A rank 2 precoding matrix may include two orthogonal columns, which may be expressed by $$W^{(1)} = \frac{\sqrt{2}}{2}\begin{bmatrix} \sqrt{2-|\alpha_1|^2}\, I_{n_t/2} & \\ & \alpha_1 I_{n_t/2} \end{bmatrix}\begin{bmatrix} A_1 \\ B_1 \end{bmatrix}$$

$$W^{(2)} = \frac{\sqrt{2}}{2}\begin{bmatrix} \sqrt{2-|\alpha_2|^2}\, I_{n_t/2} & \\ & \alpha_2 I_{n_t/2} \end{bmatrix}\begin{bmatrix} A_2 \\ B_2 \end{bmatrix}$$

The full utilization of power in each antenna may force $|\alpha_1|^2+|\alpha_2|^2=2$, and may establish $\alpha_2=\sqrt{2-|\alpha|^2}e^{j\delta}$ with $\alpha_1=\alpha$. In this example, the following equations may be expressed.

$$W^{(1)} = \frac{\sqrt{2}}{2}\begin{bmatrix} \sqrt{2-|\alpha|^2}\, I_{n_t/2} & \\ & \alpha I_{n_t/2} \end{bmatrix}\begin{bmatrix} A_1 \\ B_1 \end{bmatrix}$$

$$W^{(2)} = \frac{\sqrt{2}}{2}\begin{bmatrix} |\alpha| I_{n_t/2} & \\ & \sqrt{2-|\alpha|^2}\, e^{j\delta} I_{n_t/2} \end{bmatrix}\begin{bmatrix} A_2 \\ B_2 \end{bmatrix}$$

To obtain mutually orthogonal columns, $A_1^H A_2=0$ and $B_1^H B_2=0$ may be sufficient. $A_1$, $A_2$, $B_1$, and $B_2$ may be approximated by two dominant eigenvectors of $N_t \times N_t$ covariance matrix. Many combinations may be used for design of the precoding matrix, which may cause great overhead. In a scenario with a narrow interval between antennas, $A_1=A$, $A2=A$, $B_1=e^{j\varphi_1}A$, and $B_2=e^{j\varphi_2}A$. A cross-polarized setup may help achievement of rank 2 transmission in a configuration where the interval between antennas is narrow.

Parameters $\varphi_1$ and $\varphi_2$ may be selected to guarantee so that $W^{(1)}$ and $W^{(2)}$ may be orthogonal with respect to each other. In this example, $\varphi_1=\varphi$, and $\varphi_2=\varphi+\pi$. The rank 2 precoding matrix may be expressed by $$W = \frac{1}{\sqrt{2}}[\, W^{(1)} \quad W^{(2)}\,]$$

$$= \frac{1}{\sqrt{2}}\begin{bmatrix} \sqrt{2-|\alpha|^2}\, A & |\alpha| A \\ \alpha e^{j\phi} A & -\sqrt{2-|\alpha|^2}\, e^{j\delta} e^{j\phi} A \end{bmatrix}$$

The precoding matrix may be expressed using the $W_2W_1$ structure, as follows:

$$W = \frac{1}{\sqrt{2}}[\, W^{(1)} \quad W^{(2)}\,]$$

$$= \frac{1}{\sqrt{2}}\begin{bmatrix} \sqrt{2-|\alpha|^2}\, A & |\alpha| A \\ \alpha e^{j\phi} A & -\sqrt{2-|\alpha|^2}\, e^{j\delta} e^{j\phi} A \end{bmatrix}$$

$$= \frac{1}{2}\begin{bmatrix} A & \\ & e^{j\phi} A \end{bmatrix}\begin{bmatrix} \sqrt{2-|\alpha|^2} & |\alpha| \\ \alpha & -\sqrt{2-|\alpha|^2}\, e^{j\delta} \end{bmatrix}$$

In this equation, $$W_1 = \begin{bmatrix} A & \\ & e^{j\phi} A \end{bmatrix}$$

and $$W_2 = \frac{1}{2}\begin{bmatrix} \sqrt{2-|\alpha|^2} & |\alpha| \\ \alpha & -\sqrt{2-|\alpha|^2}\, e^{j\delta} \end{bmatrix}.$$

The precoding matrix may be expressed using a variety of methods. For example, the precoding matrix may be expressed by $$W = \frac{1}{\sqrt{2}}[\, W^{(1)} \quad W^{(2)}\,]$$

$$= \frac{1}{2}\begin{bmatrix} \sqrt{2-|\alpha|^2}\, A & |\alpha| A \\ \alpha e^{j\phi} A & -\sqrt{2-|\alpha|^2}\, e^{j\delta} e^{j\phi} A \end{bmatrix}$$

$$= \begin{bmatrix} \sqrt{2-|\alpha|^2} & |\alpha| \\ \alpha & -\sqrt{2-|\alpha|^2}\, e^{j\delta} \end{bmatrix} \circ \begin{bmatrix} \frac{1}{2}\begin{bmatrix} A & A \\ e^{j\phi} A & -e^{j\phi} A \end{bmatrix} \end{bmatrix}$$

In this equation, $\circ$ corresponds to Hardmard product, and $$W_1 = \frac{1}{2}\begin{bmatrix} A & A \\ e^{j\phi} A & -e^{j\phi} A \end{bmatrix},$$

and $$W_2 = \frac{1}{2}\begin{bmatrix} \sqrt{2-|\alpha|^2} & |\alpha| \\ \alpha & -\sqrt{2-|\alpha|^2}\, e^{j\delta} \end{bmatrix}.$$

When $|\alpha|=1$ is assumed to maintain the precoding matrix as constant modulus, and to maintain a PSK alphabet, the rank 2 precoding matrix may include two orthogonal columns $W^{(1)}$ and $W^{(2)}$. Each column may satisfy the structure of the rank 1 precoding matrix, for example, as follows:

$$W^{(1)} = \frac{\sqrt{2}}{2} \begin{bmatrix} \sqrt{2-|\alpha_1|^2} I_{n_t/2} & \\ & \alpha I_{n_t/2} \end{bmatrix} \begin{bmatrix} A \\ e^{j\phi_1} A \end{bmatrix}$$

$$W^{(2)} = \frac{\sqrt{2}}{2} \begin{bmatrix} \sqrt{2-|\alpha_2|^2} I_{n_t/2} & \\ & \alpha I_{n_t/2} \end{bmatrix} \begin{bmatrix} A \\ e^{j\phi_2} A \end{bmatrix}$$

Two rank 1 precoding matrices may be differentiated using only the parameter φ. The parameters $\varphi_1$ and $\varphi_2$ may be selected to guarantee that $W^{(1)}$ and $W^{(2)}$ are orthogonal to each other. When $\varphi_1 = \varphi$ and $\varphi_2 = \varphi + \pi$, the rank 2 precoding matrix may be expressed by $$W = \frac{1}{\sqrt{2}} [W^{(1)} \ W^{(2)}]$$

$$= \frac{1}{2} \begin{bmatrix} \sqrt{2-|\alpha|^2} I_{n_t/2} & \\ & \alpha I_{n_t/2} \end{bmatrix} \begin{bmatrix} A & A \\ e^{j\phi} A & -e^{j\phi} A \end{bmatrix}.$$

Wideband/long-term matrix $W_1$ may correspond to a wideband precoding matrix and may be given as $$W_1 = \frac{1}{2} \begin{bmatrix} A & A \\ e^{j\phi} A & -e^{j\phi} A \end{bmatrix}.$$

A subband matrix $W_2$ may be expressed by $$W_2 = \begin{bmatrix} \sqrt{2-|\alpha|^2} I_{n_t/2} & \\ & \alpha I_{n_t/2} \end{bmatrix}.$$

The selection of φ may not affect the performance of the wideband precoding matrix $W_1$ in dual polarization channels, however, may have a strong influence in single polarization channels. The parameter φ may be selected so that $W_1$ may have excellent performance even in single polarization channels.

In a special case where $e^{j\varphi}=1$:

$$W \stackrel{(a)}{=} \frac{1}{2} \begin{bmatrix} \sqrt{2-|\alpha|^2} I_{n_t/2} & \\ & \alpha I_{n_t/2} \end{bmatrix} \begin{bmatrix} A & A \\ A & -A \end{bmatrix}$$

$$\stackrel{(b)}{=} \frac{\sqrt{2}}{2} \begin{bmatrix} \sqrt{2-|\alpha|^2} I_{n_t/2} & \\ & \alpha I_{n_t/2} \end{bmatrix} U_{rot} \begin{bmatrix} A & 0 \\ 0 & A \end{bmatrix}$$

$$\stackrel{(c)}{=} \frac{1}{2} \begin{bmatrix} \sqrt{2-|\alpha|^2} & \sqrt{2-|\alpha|^2} \\ \alpha & -\alpha \end{bmatrix} \otimes A$$

$$\stackrel{(d)}{=} \frac{1}{2} \begin{bmatrix} A & \\ & A \end{bmatrix} \begin{bmatrix} \sqrt{2-|\alpha|^2} & \sqrt{2-|\alpha|^2} \\ \alpha & -\alpha \end{bmatrix}.$$

In the special case where $e^{j\varphi}=1$, many equivalent methods may be used to express the same precoding matrix. For example, in the above equation, (a) corresponds to a method of using the structure of $W_2W_1$, (b) corresponds to a method of using a rotated block diagonal structure, (c) corresponds to a method of using Kronecker product, and (d) corresponds to a method of using the structure of $W_1W_2$.

Design of Rank 3 Codebook When the Transmitter Includes Eight Transmit Antennas:

A rank 3 precoding matrix may be obtained by simply extending a structure induced with respect to the rank 1 precoding matrix and the rank 2 precoding matrix. By adding, to the rank 2 precoding matrix, a column orthogonal to the rank 2 precoding matrix, the rank 3 precoding matrix may be obtained as follows:

$$W = \frac{1}{\sqrt{3}} [W^{(1)} \ W^{(2)} \ W^{(3)}]$$

$$= \frac{1}{\sqrt{3}\sqrt{2}} \begin{bmatrix} \sqrt{2-|\alpha|^2} I_{n_t/2} & \\ & \alpha I_{n_t/2} \end{bmatrix} \begin{bmatrix} A & A & B \\ e^{j\varphi} A & -e^{j\varphi} A & e^{j\varphi} B \end{bmatrix}$$

or $$W = \frac{1}{\sqrt{3}} [W^{(1)} \ W^{(2)} \ W^{(3)}]$$

$$= \frac{1}{\sqrt{3}\sqrt{2}} \begin{bmatrix} \sqrt{2-|\alpha|^2} I_{n_t/2} & \\ & \alpha I_{n_t/2} \end{bmatrix} \begin{bmatrix} A & A & B \\ e^{j\varphi} A & -e^{j\varphi} A & -e^{j\varphi} B \end{bmatrix}$$

In this example, A and B may be orthogonal to each other.

Design of Rank 4 Codebook When the Transmitter Includes Eight Transmit Antennas:

Similarly with respect to rank 4, a rank 4 precoding matrix may be expressed using two rank 2 precoding matrices as follows:

$$W = \frac{1}{\sqrt{4}} [W^{(1)} \ W^{(2)} \ W^{(3)} \ W^{(4)}]$$

$$= \frac{1}{\sqrt{4}\sqrt{2}} \begin{bmatrix} \sqrt{2-|\alpha|^2} I_{n_t/2} & \\ & \alpha I_{n_t/2} \end{bmatrix}$$

$$\begin{bmatrix} A & A & B & B \\ e^{j\varphi} A & -e^{j\varphi} A & e^{j\varphi} B & -e^{j\varphi} B \end{bmatrix}$$

In this example, A and B may be orthogonal to each other.

Design of Rank r Codebook When the Transmitter Includes Eight Transmit Antennas:

With respect to rank r codebook, the precoding matrix may be expressed as follows:

When r is an odd number, $$W = \frac{1}{\sqrt{r}} [W^{(1)} \ W^{(2)} \ \ldots \ W^{(r)}]$$

$$= \frac{1}{\sqrt{r}\sqrt{2}} \begin{bmatrix} \sqrt{2-|\alpha|^2} I_{n_t/2} & \\ & \alpha I_{n_t/2} \end{bmatrix}$$

$$\begin{bmatrix} A & A & \ldots & C \\ e^{j\varphi} A & -e^{j\varphi} A & \ldots & e^{j\varphi} C \end{bmatrix}$$

-continued or $$W = \frac{1}{\sqrt{r}}[\,W^{(1)}\ \ W^{(2)}\ \ \ldots\ \ W^{(r)}\,]$$

$$= \frac{1}{\sqrt{r}\sqrt{2}}\begin{bmatrix}\sqrt{2-|\alpha|^2}\,I_{n_t/2} \\ & \alpha I_{n_t/2}\end{bmatrix}$$

$$\begin{bmatrix} A & A & \ldots & C \\ e^{j\varphi}A & -e^{j\varphi}A & \ldots & -e^{j\varphi}C \end{bmatrix}$$

When r is an even number, $$W = \frac{1}{\sqrt{r}}[\,W^{(1)}\ \ W^{(2)}\ \ \ldots\ \ W^{(r-1)}\ \ W^{(r)}\,]$$

$$= \frac{1}{\sqrt{r}\sqrt{2}}\begin{bmatrix}\sqrt{2-|\alpha|^2}\,I_{n_t/2} \\ & \alpha I_{n_t/2}\end{bmatrix}$$

$$\begin{bmatrix} A & A & \ldots & C & C \\ e^{j\varphi}A & -e^{j\varphi} & \ldots & e^{j\varphi}C & -e^{j\varphi}C \end{bmatrix}$$

In this example, A, B, . . . , C may be orthogonal to each other.

Observation

The following collusion may be made. That is, the minimum requirement for achieving the excellent performance of a recommended precoding matrix may follow as:

$$W=W_2W_1$$

Here, an outer matrix $W_1$ corresponds to a unitary pre-coding matrix that is an element of a first codebook $C_1$ and has a dimension of $N_t \times R$. For each rank, $W_1$ may be expressed as follows:

Rank 1: $W_1 = \frac{\sqrt{2}}{2}\begin{bmatrix} A \\ e^{j\varphi}A \end{bmatrix}$ Rank 2: $W_1 = \frac{1}{2}\begin{bmatrix} A & A \\ e^{j\varphi}A & -e^{j\phi}A \end{bmatrix}$ Rank r:
when r is an odd number:

$$W_1 = \frac{1}{\sqrt{r}\sqrt{2}}\begin{bmatrix} A & A & \ldots & C \\ e^{j\phi}A & -e^{j\phi}A & \ldots & e^{j\phi}C \end{bmatrix}$$

or $$W_1 = \frac{1}{\sqrt{r}\sqrt{2}}\begin{bmatrix} A & A & \ldots & C \\ e^{j\phi}A & -e^{j\phi}A & \ldots & -e^{j\phi}C \end{bmatrix}$$

when r is an even number:

$$W_1 = \frac{1}{\sqrt{r}\sqrt{2}}\begin{bmatrix} A & A & \ldots & C & C \\ e^{j\phi}A & -e^{j\phi}A & \ldots & e^{j\phi}C & -e^{j\phi}C \end{bmatrix}$$

A, B, . . . , C may be orthogonal to each other, or may be DFT vectors.

An inner matrix $W_2$ may correspond to a diagonal matrix that is an element of a second codebook $C_2$ and has a dimension of $N_t \times N_t$. For example, $$W_2 = \begin{bmatrix} \sqrt{2-|\alpha|^2}\,I_{n_t/2} \\ & \alpha I_{n_t/2} \end{bmatrix}\ \text{with } |\alpha|=1.$$

Extension

In the aforementioned observation, highly correlated channels may be assumed. Feedback overhead required for reporting $W_2$ and $W_1$ with a sufficient accuracy may not be used. To provide some design flexibilities, and to provide balanced feedback overheard and high feedback accuracy with respect to $W_2$ and $W_1$, a previous observation may be extended as follows:

$$W=W_2W_1$$

In this example, an outer matrix $W_1$ corresponds to a unitary precoding matrix that is an element of a first codebook $C_1$ and has a dimension of $N_t \times R$. For each rank, $W_1$ may be expressed as follows:

Rank 1: $W_1 = \frac{\sqrt{2}}{2}\begin{bmatrix} A \\ e^{j\phi}A \end{bmatrix}$

Rank 2: $W_1 = \frac{1}{2}\begin{bmatrix} A & A \\ e^{j\phi}A & -e^{j\phi}A \end{bmatrix}$ Rank r:
when r is an odd number:

$$W_1 = \frac{1}{\sqrt{r}\sqrt{2}}\begin{bmatrix} A & A & \ldots & C \\ e^{j\phi}A & -e^{j\phi}A & \ldots & e^{j\phi}C \end{bmatrix}$$

or $$W_1 = \frac{1}{\sqrt{r}\sqrt{2}}\begin{bmatrix} A & A & \ldots & C \\ e^{j\phi}A & -e^{j\phi}A & \ldots & -e^{j\phi}C \end{bmatrix}$$

when r is an even number:

$$W_1 = \frac{1}{\sqrt{r}\sqrt{2}}\begin{bmatrix} A & A & \ldots & C & C \\ e^{j\phi}A & -e^{j\phi}A & \ldots & e^{j\phi}C & -e^{j\phi}C \end{bmatrix}$$

A, B, . . . , C may be orthogonal to each other, or may be DFT vectors.

An inner matrix $W_2$ may correspond to a diagonal matrix that is an element of a second codebook $C_2$ and has a dimension of $N_t \times N_t$. For example, $$W_2 = \begin{bmatrix} \sqrt{2-|\alpha|^2}\,\Theta & 0_{4\times 4} \\ 0_{4\times 4} & \alpha\Theta \end{bmatrix}\ \text{with } |\alpha|=1.$$

In $W_2$, $\Theta$ corresponds to a 4×4 matrix, and may be defined as $\Theta=\text{diag}\{1, e^{j\pi\theta}, e^{j2\pi\theta}, e^{j3\pi\theta}\}$. diag(a, b, c, d) corresponds to a diagonal matrix that includes a, b, c, and d as diagonal elements. $\Theta$ enables tracking of a spatial correlation structure, for example, a DFT structure in a subband level above antennas 0 through 3, and above antennas 4 through 7. In this example, in a dual polarization case, the antennas 0 through 3 may generate one polarization, and the antennas 4 through 7 may generate another polarization. In a single polarization case, all the antennas may generate the same polarization.

α corresponds to a complex scalar and may process dual polarization or single polarization based on a small antennal interval. α may be selected within a subband level, for example, within a set of 1, j, $e^{j4\pi\theta}$. For example, in a single polarization case, $W_2$ may have a structure of $W_2$=diag{1, $e^{j\pi\theta}, e^{j2\pi\theta}, e^{j3\pi\theta}, e^{j4\pi\theta}, e^{j5\pi\theta}, e^{j6\pi\theta}, e^{j7\pi\theta}$}. In a dual polarization case, α may be selected as 1 or j.

Codebook Suggestions

Prior to suggesting codebooks, 4×r DFT matrices may be defined as follows:

$$DFT_1 = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix},$$

$$DFT_2 = \text{diag}\{1, e^{j\pi/4}, j, e^{j3\pi/4}\}DFT_1,$$

$$DFT_3 = \text{diag}\{1, e^{j\pi/8}, e^{j2\pi/8}, e^{j3\pi/8}\}DFT_1,$$

$$DFT_4 = \text{diag}\{1, e^{j3\pi/8}, e^{j6\pi/8}, e^{j9\pi/8}\}DFT_1,$$

Suggestion 1: 4-Bit Codebook for Each Rank for $W_1$

In suggestion 1, the first codebook $C_1$ for rank r where r=1, . . . , 6 may include 16 4-bit elements or codewords. The first codebook $C_1$ for rank r where r=7, 8 may include four elements.

Codebook $C_1$

The first codebook $C_1$ for rank r may be expressed as $C_{1,r}$.

A first codebook $C_{1,1}$ for rank 1 may be obtained by employing columns 1 through 16 of the following matrix:

$$V_1 = \frac{\sqrt{2}}{2}\begin{bmatrix} DFT_1 & DFT_2 & DFT_3 & DFT_4 \\ DFT_1 & -DFT_2 & jDFT_3 & -jDFT_4 \end{bmatrix}$$

The 16 column vectors may correspond to DFT vectors for eight transmit antennas.

A first codebook $C_{1,2}$ for rank 2 may include the following 16 matrices:

$$C_{1,2} = \left\{ \frac{1}{2}\begin{bmatrix} D_{1,k} & D_{1,k} \\ D_{1,k} & -D_{1,k} \end{bmatrix}, \frac{1}{2}\begin{bmatrix} D_{2,k} & D_{2,k} \\ D_{2,k} & -D_{2,k} \end{bmatrix}, \frac{1}{2}\begin{bmatrix} D_{3,k} & D_{3,k} \\ jD_{3,k} & -jD_{3,k} \end{bmatrix}, \frac{1}{2}\begin{bmatrix} D_{4,k} & D_{4,k} \\ jD_{4,k} & -jD_{4,k} \end{bmatrix} \right\}$$
$$k = 1, \ldots, 4$$

In this example, $D_{m,k}$ corresponds to a $k^{th}$ column of $DFT_m$. For example, $D_{1,k}$ corresponds to a $k^{th}$ column of $DFT_1$, $D_{2,k}$ corresponds to a $k^{th}$ column of $DFT_2$, $D_{3,k}$ corresponds to a $k^{th}$ column of $DFT_3$, and $D_{4,k}$ corresponds to a $k^{th}$ column of $DFT_4$.

The first codebook $C_{1,2}$ may be obtained by using a first codebook for rank 1 and by adding up orthogonal columns based on $$W_1 = \frac{1}{2}\begin{bmatrix} A & A \\ e^{j\phi}A & -e^{j\phi}A \end{bmatrix}.$$

A first codebook $C_{1,3}$ for rank 3 may include the following 16 matrices:

Example 1)

$$C_{1,3} = \left\{ \frac{1}{\sqrt{3}\sqrt{2}}\begin{bmatrix} D_{1,k} & D_{1,k} & D_{1,m} \\ D_{1,k} & -D_{1,k} & D_{1,m} \end{bmatrix}, \frac{1}{\sqrt{3}\sqrt{2}}\begin{bmatrix} D_{2,k} & D_{2,k} & D_{2,m} \\ D_{2,k} & -D_{2,k} & D_{2,m} \end{bmatrix}, \frac{1}{\sqrt{3}\sqrt{2}}\begin{bmatrix} D_{3,k} & D_{3,k} & D_{3,m} \\ jD_{3,k} & -jD_{3,k} & jD_{3,m} \end{bmatrix}, \frac{1}{\sqrt{3}\sqrt{2}}\begin{bmatrix} D_{4,k} & D_{4,k} & D_{4,m} \\ jD_{4,k} & -jD_{4,k} & jD_{4,m} \end{bmatrix} \right\}$$

In this example, k=1, . . . 4 and m=k mod 4+1.

Example 2)

$$C_{1,3} = \left\{ \frac{1}{\sqrt{3}\sqrt{2}}\begin{bmatrix} D_{1,k} & D_{1,k} & D_{1,m} \\ D_{1,k} & -D_{1,k} & -D_{1,m} \end{bmatrix}, \frac{1}{\sqrt{3}\sqrt{2}}\begin{bmatrix} D_{2,k} & D_{2,k} & D_{2,m} \\ D_{2,k} & -D_{2,k} & -D_{2,m} \end{bmatrix}, \frac{1}{\sqrt{3}\sqrt{2}}\begin{bmatrix} D_{3,k} & D_{3,k} & D_{3,m} \\ jD_{3,k} & -jD_{3,k} & -jD_{3,m} \end{bmatrix}, \frac{1}{\sqrt{3}\sqrt{2}}\begin{bmatrix} D_{4,k} & D_{4,k} & D_{4,m} \\ jD_{4,k} & -jD_{4,k} & -jD_{4,m} \end{bmatrix} \right\}$$

In this example, k=1, . . . 4 and m=k mod 4+1.

Other examples may also be used. For example, m may be given to be different from above, and k may also be given to be different from above. For example, various combinations of k and m may be given as (k,m)={(1,2),(1,3),(1,4),(2,3)}.

A first codebook $C_{1,4}$ for rank 4 may include the following 16 matrices:

Example 1)

$$C_{1,4} = \left\{ \frac{1}{\sqrt{4}\sqrt{2}}\begin{bmatrix} D_{1,k} & D_{1,k} & D_{1,m} & D_{1,m} \\ D_{1,k} & -D_{1,k} & D_{1,m} & -D_{1,m} \end{bmatrix}, \frac{1}{\sqrt{4}\sqrt{2}}\begin{bmatrix} D_{2,k} & D_{2,k} & D_{2,m} & D_{2,m} \\ D_{2,k} & -D_{2,k} & D_{2,m} & -D_{2,m} \end{bmatrix}, \frac{1}{\sqrt{4}\sqrt{2}}\begin{bmatrix} D_{3,k} & D_{3,k} & D_{3,m} & D_{3,m} \\ jD_{3,k} & -jD_{3,k} & jD_{3,m} & -jD_{3,m} \end{bmatrix}, \frac{1}{\sqrt{4}\sqrt{2}}\begin{bmatrix} D_{4,k} & D_{4,k} & D_{4,m} & D_{4,m} \\ jD_{4,k} & -jD_{4,k} & jD_{4,m} & -jD_{4,m} \end{bmatrix} \right\}$$

In this example, k=1, ... 4 and m=k mod 4+1.

Example 2) m may be given to be different from above, and k may also be given to be different from above. For example, various combinations of k and m may be given as (k,m)={(1,2),(1,3),(1,4),(2,3)}. Other examples may also be used.

A first codebook $C_{1,5}$ for rank 5 may include the following 16 matrices:

Example 1)

$$C_{1,5} = \left\{ \begin{array}{l} \frac{1}{\sqrt{5}\sqrt{2}} \begin{bmatrix} D_{1,k} & D_{1,k} & D_{1,m} & D_{1,m} & D_{1,n} \\ D_{1,k} & -D_{1,k} & D_{1,m} & -D_{1,m} & D_{1,n} \end{bmatrix}, \\ \frac{1}{\sqrt{5}\sqrt{2}} \begin{bmatrix} D_{2,k} & D_{2,k} & D_{2,m} & D_{2,m} & D_{2,n} \\ D_{2,k} & -D_{2,k} & D_{2,m} & -D_{2,m} & D_{2,n} \end{bmatrix}, \\ \frac{1}{\sqrt{5}\sqrt{2}} \begin{bmatrix} D_{3,k} & D_{3,k} & D_{3,m} & D_{3,m} & D_{3,n} \\ jD_{3,k} & -jD_{3,k} & jD_{3,m} & -jD_{3,m} & jD_{3,n} \end{bmatrix}, \\ \frac{1}{\sqrt{5}\sqrt{2}} \begin{bmatrix} D_{4,k} & D_{4,k} & D_{4,m} & D_{4,m} & D_{4,n} \\ jD_{4,k} & -jD_{4,k} & jD_{4,m} & -jD_{4,m} & jD_{4,n} \end{bmatrix} \end{array} \right\}$$

A combination of k,m, and n may be selected from {(1,2,3),(1,2,4),(1,3,4),(2,3,4)}.

Example 2)

$$C_{1,5} = \left\{ \begin{array}{l} \frac{1}{\sqrt{5}\sqrt{2}} \begin{bmatrix} D_{1,k} & D_{1,k} & D_{1,m} & D_{1,m} & D_{1,n} \\ D_{1,k} & -D_{1,k} & D_{1,m} & -D_{1,m} & -D_{1,n} \end{bmatrix}, \\ \frac{1}{\sqrt{5}\sqrt{2}} \begin{bmatrix} D_{2,k} & D_{2,k} & D_{2,m} & D_{2,m} & D_{2,n} \\ D_{2,k} & -D_{2,k} & D_{2,m} & -D_{2,m} & -D_{2,n} \end{bmatrix}, \\ \frac{1}{\sqrt{5}\sqrt{2}} \begin{bmatrix} D_{3,k} & D_{3,k} & D_{3,m} & D_{3,m} & D_{3,n} \\ jD_{3,k} & -jD_{3,k} & jD_{3,m} & -jD_{3,m} & -jD_{3,n} \end{bmatrix}, \\ \frac{1}{\sqrt{5}\sqrt{2}} \begin{bmatrix} D_{4,k} & D_{4,k} & D_{4,m} & D_{4,m} & D_{4,n} \\ jD_{4,k} & -jD_{4,k} & jD_{4,m} & -jD_{4,m} & -jD_{4,n} \end{bmatrix} \end{array} \right\}$$

A combination of k,m, and n may be selected from {(1,2,3),(1,2,4),(1,3,4),(2,3,4)}.

A first codebook $C_{1,6}$ for rank 6 may include the following 16 matrices:

$$C_{1,6} = \left\{ \begin{array}{l} \frac{1}{\sqrt{6}\sqrt{2}} \begin{bmatrix} D_{1,k} & D_{1,k} & D_{1,m} & D_{1,m} & D_{1,n} & D_{1,n} \\ D_{1,k} & -D_{1,k} & D_{1,m} & -D_{1,m} & D_{1,n} & -D_{1,n} \end{bmatrix}, \\ \frac{1}{\sqrt{6}\sqrt{2}} \begin{bmatrix} D_{2,k} & D_{2,k} & D_{2,m} & D_{2,m} & D_{2,n} & D_{2,n} \\ D_{2,k} & -D_{2,k} & D_{2,m} & -D_{2,m} & D_{2,n} & -D_{2,n} \end{bmatrix}, \\ \frac{1}{\sqrt{6}\sqrt{2}} \begin{bmatrix} D_{3,k} & D_{3,k} & D_{3,m} & D_{3,m} & D_{3,n} & D_{3,n} \\ jD_{3,k} & -jD_{3,k} & jD_{3,m} & -jD_{3,m} & jD_{3,n} & -jD_{3,n} \end{bmatrix}, \\ \frac{1}{\sqrt{6}\sqrt{2}} \begin{bmatrix} D_{4,k} & D_{4,k} & D_{4,m} & D_{4,m} & D_{4,n} & D_{4,n} \\ jD_{4,k} & -jD_{4,k} & jD_{4,m} & -jD_{4,m} & jD_{4,n} & -jD_{4,n} \end{bmatrix} \end{array} \right\}$$

A combination of k,m, and n may be selected from {(1,2,3),(1,2,4),(1,3,4),(2,3,4)}.

A first codebook $C_{1,7}$ for rank 7 may include the following four matrices:

Example 1)

$$C_{1,7} = \left\{ \begin{array}{l} \frac{1}{\sqrt{7}\sqrt{2}} \begin{bmatrix} D_{1,k} & D_{1,k} & D_{1,m} & D_{1,m} & D_{1,n} & D_{1,n} & D_{1,p} \\ D_{1,k} & -D_{1,k} & D_{1,m} & -D_{1,m} & D_{1,n} & -D_{1,n} & D_{1,p} \end{bmatrix}, \\ \frac{1}{\sqrt{7}\sqrt{2}} \begin{bmatrix} D_{2,k} & D_{2,k} & D_{2,m} & D_{2,m} & D_{2,n} & D_{2,n} & D_{2,p} \\ D_{2,k} & -D_{2,k} & D_{2,m} & -D_{2,m} & D_{2,n} & -D_{2,n} & D_{2,p} \end{bmatrix}, \\ \frac{1}{\sqrt{7}\sqrt{2}} \begin{bmatrix} D_{3,k} & D_{3,k} & D_{3,m} & D_{3,m} & D_{3,n} & D_{3,n} & D_{3,p} \\ jD_{3,k} & -jD_{3,k} & jD_{3,m} & -jD_{3,m} & jD_{3,n} & -jD_{3,n} & jD_{3,p} \end{bmatrix}, \\ \frac{1}{\sqrt{7}\sqrt{2}} \begin{bmatrix} D_{4,k} & D_{4,k} & D_{4,m} & D_{4,m} & D_{4,n} & D_{4,n} & D_{4,p} \\ jD_{4,k} & -jD_{4,k} & jD_{4,m} & -jD_{4,m} & jD_{4,n} & -jD_{4,n} & jD_{4,p} \end{bmatrix} \end{array} \right\}$$

$(k, m, n, p) = (1, 2, 3, 4)$.

Example 2)

$$C_{1,7} = \left\{ \begin{array}{l} \frac{1}{\sqrt{7}\sqrt{2}} \begin{bmatrix} D_{1,k} & D_{1,k} & D_{1,m} & D_{1,m} & D_{1,n} & D_{1,n} & D_{1,p} \\ D_{1,k} & -D_{1,k} & D_{1,m} & -D_{1,m} & D_{1,n} & -D_{1,n} & -D_{1,p} \end{bmatrix}, \\ \frac{1}{\sqrt{7}\sqrt{2}} \begin{bmatrix} D_{2,k} & D_{2,k} & D_{2,m} & D_{2,m} & D_{2,n} & D_{2,n} & D_{2,p} \\ D_{2,k} & -D_{2,k} & D_{2,m} & -D_{2,m} & D_{2,n} & -D_{2,n} & -D_{2,p} \end{bmatrix}, \\ \frac{1}{\sqrt{7}\sqrt{2}} \begin{bmatrix} D_{3,k} & D_{3,k} & D_{3,m} & D_{3,m} & D_{3,n} & D_{3,n} & D_{3,p} \\ jD_{3,k} & -jD_{3,k} & jD_{3,m} & -jD_{3,m} & jD_{3,n} & -jD_{3,n} & -jD_{3,p} \end{bmatrix}, \\ \frac{1}{\sqrt{7}\sqrt{2}} \begin{bmatrix} D_{4,k} & D_{4,k} & D_{4,m} & D_{4,m} & D_{4,n} & D_{4,n} & D_{4,p} \\ jD_{4,k} & -jD_{4,k} & jD_{4,m} & -jD_{4,m} & jD_{4,n} & -jD_{4,n} & -jD_{4,p} \end{bmatrix} \end{array} \right\}$$

$(k, m, n, p) = (1, 2, 3, 4)$.

A first codebook $C_{1,8}$ for rank 8 may include the following four matrices:

$$C_{1,8} = \left\{ \frac{1}{\sqrt{8}\sqrt{2}} \begin{bmatrix} D_1 & D_1 \\ D_1 & -D_1 \end{bmatrix}, \frac{1}{\sqrt{8}\sqrt{2}} \begin{bmatrix} D_2 & D_2 \\ D_2 & -D_2 \end{bmatrix}, \right.$$
$$\left. \frac{1}{\sqrt{8}\sqrt{2}} \begin{bmatrix} D_3 & D_3 \\ jD_3 & -jD_3 \end{bmatrix}, \frac{1}{\sqrt{8}\sqrt{2}} \begin{bmatrix} D_4 & D_4 \\ jD_4 & -jD_4 \end{bmatrix} \right\}$$

Codebook $C_2$

A number of codewords to be assigned to $\Theta$ and $\alpha$ may need to be carefully investigated.

Example 1) For example, when a single bit is assigned to $\Theta$ and $\alpha$, the second codebook $C_2$ may be expressed as follows:

For rank 2:

With respect to $\alpha \in \{e^{j4\pi\theta_i}\}$ and $\Theta_i$ where i=1,2, when a second codebook for rank 1 including a first codeword and a second codeword is assumed as $C_{2,1\ldots 2}$, $$C_{2,1\ldots 2} = \left\{ \begin{bmatrix} \Theta_1 & 0_{4\times 4} \\ 0_{4\times 4} & e^{j4\pi\theta_1}\Theta_1 \end{bmatrix}, \begin{bmatrix} \Theta_2 & 0_{4\times 4} \\ 0_{4\times 4} & e^{j4\pi\theta_2}\Theta_2 \end{bmatrix} \right\}$$

In this example, $$\theta_1 = \frac{1}{16}, \theta_2 = \frac{-1}{16}.$$

With respect to $\alpha \in \{1,-1\}$ and $\Theta=I$, when the second codebook for rank 1 including a third codeword and a fourth codeword is assumed as $C_{2,3\ldots 4}$, $$C_{2,3\ldots 4} = \left\{ \begin{bmatrix} I_4 & 0_{4\times 4} \\ 0_{4\times 4} & I_4 \end{bmatrix}, \begin{bmatrix} I_4 & 0_{4\times 4} \\ 0_{4\times 4} & -I_4 \end{bmatrix} \right\}$$

For ranks 2, 3, and 4:

With respect to $\alpha \in \{1\}$ and $\Theta_i$ where i=1, 2, when a second codebook for ranks 2, 3, and 4 including a first codeword and a second codeword is assumed as $C_{2,1\ldots 2}$, $$C_{2,1\ldots 2} = \left\{ \begin{bmatrix} \Theta_1 & 0_{4\times 4} \\ 0_{4\times 4} & \Theta_1 \end{bmatrix}, \begin{bmatrix} \Theta_2 & 0_{4\times 4} \\ 0_{4\times 4} & \Theta_2 \end{bmatrix} \right\}$$

Example 2) A size of the second codebook may be extended to three bits by extending the aforementioned example 1).

For rank 1:

With respect to $\alpha \in \{1,e^{j4\pi\theta_i}\}$ and $\Theta_i$ where i=1,2, when the second codebook for rank 1 including four codewords is assumed as $C_{2,1\ldots 4}$, $$C_{2,1\ldots 4} = \left\{ \begin{bmatrix} \Theta_1 & 0_{4\times 4} \\ 0_{4\times 4} & e^{j4\pi\theta_1}\Theta_1 \end{bmatrix}, \begin{bmatrix} \Theta_2 & 0_{4\times 4} \\ 0_{4\times 4} & e^{j4\pi\theta_2}\Theta_2 \end{bmatrix}, \begin{bmatrix} \Theta_1 & 0_{4\times 4} \\ 0_{4\times 4} & \Theta_1 \end{bmatrix}, \begin{bmatrix} \Theta_2 & 0_{4\times 4} \\ 0_{4\times 4} & \Theta_2 \end{bmatrix} \right\}$$

For ranks 2, 3, and 4:

With respect to $\alpha \in \{1\}$ and $\Theta_i$ where i=1,2, when the second codebook for ranks 2, 3, and 4 including first through fourth codewords is assumed as $C_{2,1\ldots 4}$, $$C_{2,1\ldots 4} = \left\{ \begin{bmatrix} \Theta_1 & 0_{4\times 4} \\ 0_{4\times 4} & \Theta_1 \end{bmatrix}, \begin{bmatrix} \Theta_2 & 0_{4\times 4} \\ 0_{4\times 4} & \Theta_2 \end{bmatrix}, \begin{bmatrix} \Theta_3 & 0_{4\times 4} \\ 0_{4\times 4} & \Theta_3 \end{bmatrix}, \begin{bmatrix} \Theta_4 & 0_{4\times 4} \\ 0_{4\times 4} & \Theta_4 \end{bmatrix} \right\}$$

In this example, $$\theta_1 = \frac{1}{16}, \theta_2 = \frac{-1}{16}, \theta_3 \frac{1}{8}, \theta_4 = \frac{-1}{8}.$$

With respect to $\alpha \in \{1,j\}$ and $\Theta=I$, when the second codebook for ranks 2, 3, and 4 including fifth through sixth codewords is assumed as $C_{2,5\ldots 6}$, $$C_{2,5\ldots 6} = \left\{ \begin{bmatrix} I & 0_{4\times 4} \\ 0_{4\times 4} & I \end{bmatrix}, \begin{bmatrix} I & 0_{4\times 4} \\ 0_{4\times 4} & jI \end{bmatrix} \right\}$$

With respect to $$\theta_3 = \frac{1}{8}, \theta_4 = \frac{-1}{8}$$

with $\alpha \in \{j\}$, when the second codebook for ranks 2, 3, and 4 including seventh through eighth codewords is assumed as $$C_{2,7\ldots 8}, C_{2,7\ldots 8} = \left\{ \begin{bmatrix} \Theta_3 & 0_{4\times 4} \\ 0_{4\times 4} & j\Theta_3 \end{bmatrix}, \begin{bmatrix} \Theta_4 & 0_{4\times 4} \\ 0_{4\times 4} & j\Theta_4 \end{bmatrix} \right\}$$

Suggestion 2: Maximum 4-Bit Codebook for Each Rank for $W_1$

In suggestion 2, the first codebook for rank r where r=1, . . . 2 may include 16 elements, the first codebook for rank r where r=3, 4 may include eight elements, and the first codebook for rank r where r=5, 6, 7, 8 may include four elements.

The above 64 entries may be divided into four subsets each including 16 entries. To indicate one of the subsets, two bits may be used. The two bits may indicate a rank corresponding to the selected subset among rank 1, rank 2, rank 3-4, and rank 5-8.

Codebook $C_1$

A first codebook $C_1$ for rank r may be indicated as $C_{1,r}$.

A rank 1 first codebook $C_{1,1}$ may be obtained by employing columns 1 through 16 of the following matrix:

$$V_1 = \frac{\sqrt{2}}{2} \begin{bmatrix} DFT_1 & DFT_2 & DFT_3 & DFT_4 \\ DFT_1 & -DFT_2 & jDFT_3 & -jDFT_4 \end{bmatrix}$$

The column vectors 1 through 16 may correspond to DFT vectors for eight transmit antennas.

A rank 2 first codebook $C_{1,2}$ may include the following 16 matrices:

$$C_{1,2} = \left\{ \frac{1}{2}\begin{bmatrix} D_{1,k} & D_{1,k} \\ D_{1,k} & -D_{1,k} \end{bmatrix}, \frac{1}{2}\begin{bmatrix} D_{2,k} & D_{2,k} \\ D_{2,k} & -D_{2,k} \end{bmatrix}, \frac{1}{2}\begin{bmatrix} D_{3,k} & D_{3,k} \\ jD_{3,k} & -jD_{3,k} \end{bmatrix}, \frac{1}{2}\begin{bmatrix} D_{4,k} & D_{4,k} \\ jD_{4,k} & -jD_{4,k} \end{bmatrix}, \\ k=1,\ldots,4 \right\}$$

In this example, $D_{m,k}$ corresponds to a $k^{th}$ column of $DFT_m$. For example, $D_{1,k}$ corresponds to a $k^{th}$ column of $DFT_1$, $D_{2,k}$ corresponds to a $k^{th}$ column of $DFT_2$, $D_{3,k}$ corresponds to a $k^{th}$ column of $DFT_3$, and $D_{4,k}$ corresponds to a $k^{th}$ column of $DFT_4$.

The rank 2 first codebook $C_{1,2}$ may be obtained by using the rank 1 first codebook and adding orthogonal columns based on $$W_1 = \frac{1}{2}\begin{bmatrix} A & A \\ e^{j\phi} & -e^{j\phi}A \end{bmatrix}.$$

A rank 3 first codebook $C_{1,3}$ may include the following eight matrices:

Example 1)

$$C_{1,3} = \left\{ \begin{array}{l} \frac{1}{\sqrt{3}\sqrt{2}}\begin{bmatrix} D_{1,k} & D_{1,k} & D_{1,m} \\ D_{1,k} & -D_{1,k} & D_{1,m} \end{bmatrix}, \\ \frac{1}{\sqrt{3}\sqrt{2}}\begin{bmatrix} D_{2,k} & D_{2,k} & D_{2,m} \\ D_{2,k} & -D_{2,k} & D_{2,m} \end{bmatrix}, \\ \frac{1}{\sqrt{3}\sqrt{2}}\begin{bmatrix} D_{3,k} & D_{3,k} & D_{3,m} \\ jD_{3,k} & -jD_{3,k} & jD_{3,m} \end{bmatrix}, \\ \frac{1}{\sqrt{3}\sqrt{2}}\begin{bmatrix} D_{4,k} & D_{4,k} & D_{4,m} \\ jD_{4,k} & -jD_{4,k} & jD_{4,m} \end{bmatrix} \end{array} \right\}$$

In this example, k=1, 2 and m=k+2.

Example 2)

$$C_{1,3} = \left\{ \begin{array}{l} \frac{1}{\sqrt{3}\sqrt{2}}\begin{bmatrix} D_{1,k} & D_{1,k} & D_{1,m} \\ D_{1,k} & -D_{1,k} & -D_{1,m} \end{bmatrix}, \\ \frac{1}{\sqrt{3}\sqrt{2}}\begin{bmatrix} D_{2,k} & D_{2,k} & D_{2,m} \\ D_{2,k} & -D_{2,k} & -D_{2,m} \end{bmatrix}, \\ \frac{1}{\sqrt{3}\sqrt{2}}\begin{bmatrix} D_{3,k} & D_{3,k} & D_{3,m} \\ jD_{3,k} & -jD_{3,k} & -jD_{3,m} \end{bmatrix}, \\ \frac{1}{\sqrt{3}\sqrt{2}}\begin{bmatrix} D_{4,k} & D_{4,k} & D_{4,m} \\ jD_{4,k} & -jD_{4,k} & -jD_{4,m} \end{bmatrix} \end{array} \right\}$$

In this example, k=1, 2 and m=k+2.

Example 3)

$$C_{1,3} = \left\{ \frac{1}{\sqrt{3}\sqrt{2}}\begin{bmatrix} D_{1,k} & D_{1,k} & D_{1,m} \\ D_{1,k} & -D_{1,k} & D_{1,m} \end{bmatrix}, \frac{1}{\sqrt{3}\sqrt{2}}\begin{bmatrix} D_{2,k} & D_{2,k} & D_{2,m} \\ D_{2,k} & -D_{2,k} & D_{2,m} \end{bmatrix} \right\}$$

or $$C_{1,3} = \left\{ \frac{1}{\sqrt{3}\sqrt{2}}\begin{bmatrix} D_{1,k} & D_{1,k} & D_{1,m} \\ D_{1,k} & -D_{1,k} & -D_{1,m} \end{bmatrix}, \frac{1}{\sqrt{3}\sqrt{2}}\begin{bmatrix} D_{2,k} & D_{2,k} & D_{2,m} \\ D_{2,k} & -D_{2,k} & -D_{2,m} \end{bmatrix} \right\}$$

In this example, k=1, . . . , 4 and m=k mod 4+1.

Example 4)

$$C_{1,3} = \left\{ \frac{1}{\sqrt{3}\sqrt{2}}\begin{bmatrix} D_{1,k} & D_{1,k} & D_{1,m} \\ D_{1,k} & -D_{1,k} & D_{1,m} \end{bmatrix}, \frac{1}{\sqrt{3}\sqrt{2}}\begin{bmatrix} D_{2,k} & D_{2,k} & D_{2,m} \\ D_{2,k} & -D_{2,k} & D_{2,m} \end{bmatrix} \right\}$$

or $$C_{1,3} = \left\{ \frac{1}{\sqrt{3}\sqrt{2}}\begin{bmatrix} D_{1,k} & D_{1,k} & D_{1,m} \\ D_{1,k} & -D_{1,k} & -D_{1,m} \end{bmatrix}, \frac{1}{\sqrt{3}\sqrt{2}}\begin{bmatrix} D_{2,k} & D_{2,k} & D_{2,m} \\ D_{2,k} & -D_{2,k} & -D_{2,m} \end{bmatrix} \right\}$$

In this example, (k,m)={(1,2),(1,3),(1,4),(2,3)}.

In addition to examples 1) through 4), other examples may also be employed.

A rank 4 first codebook $C_{1,4}$ may include the following eight matrices:

Example 1)

$$C_{1,4} = \left\{ \begin{array}{l} \frac{1}{\sqrt{4}\sqrt{2}}\begin{bmatrix} D_{1,k} & D_{1,k} & D_{1,m} & D_{1,m} \\ D_{1,k} & -D_{1,k} & D_{1,m} & -D_{1,m} \end{bmatrix}, \\ \frac{1}{\sqrt{4}\sqrt{2}}\begin{bmatrix} D_{2,k} & D_{2,k} & D_{2,m} & D_{2,m} \\ D_{2,m} & -D_{2,k} & D_{2,m} & -D_{2,m} \end{bmatrix}, \\ \frac{1}{\sqrt{4}\sqrt{2}}\begin{bmatrix} D_{3,k} & D_{3,k} & D_{3,m} & D_{3,m} \\ jD_{3,k} & -jD_{3,k} & jD_{3,m} & -jD_{3,m} \end{bmatrix}, \\ \frac{1}{\sqrt{4}\sqrt{2}}\begin{bmatrix} D_{4,k} & D_{4,k} & D_{4,m} & D_{4,m} \\ jD_{4,k} & -jD_{4,k} & jD_{4,m} & -jD_{4,m} \end{bmatrix} \end{array} \right\}$$

In this example, k=1, 2 and m=k+2.

Example 2)

$$C_{1,4} = \left\{ \begin{array}{l} \frac{1}{\sqrt{4}\sqrt{2}}\begin{bmatrix} D_{1,k} & D_{1,k} & D_{1,m} & D_{1,m} \\ D_{1,k} & -D_{1,k} & D_{1,m} & -D_{1,m} \end{bmatrix}, \\ \frac{1}{\sqrt{4}\sqrt{2}}\begin{bmatrix} D_{2,k} & D_{2,k} & D_{2,m} & D_{2,m} \\ D_{2,m} & -D_{2,k} & D_{2,m} & -D_{2,m} \end{bmatrix}, \\ \frac{1}{\sqrt{4}\sqrt{2}}\begin{bmatrix} D_{3,k} & D_{3,k} & D_{3,m} & D_{3,m} \\ jD_{3,k} & -jD_{3,k} & jD_{3,m} & -jD_{3,m} \end{bmatrix}, \\ \frac{1}{\sqrt{4}\sqrt{2}}\begin{bmatrix} D_{4,k} & D_{4,k} & D_{4,m} & D_{4,m} \\ jD_{4,k} & -jD_{4,k} & jD_{4,m} & -jD_{4,m} \end{bmatrix} \end{array} \right\}$$

In this example, (k,m)={(1,2),(1,3)}.

Example 3)

$$C_{1,4} = \left\{ \begin{array}{l} \frac{1}{\sqrt{4}\sqrt{2}}\begin{bmatrix} D_{1,k} & D_{1,k} & D_{1,m} & D_{1,m} \\ D_{1,k} & -D_{1,k} & D_{1,m} & -D_{1,m} \end{bmatrix}, \\ \frac{1}{\sqrt{4}\sqrt{2}}\begin{bmatrix} D_{2,k} & D_{2,k} & D_{2,m} & D_{2,m} \\ D_{2,m} & -D_{2,k} & D_{2,m} & -D_{2,m} \end{bmatrix} \end{array} \right\}$$

In this example, (k,m)={(1,2),(1,3),(1,4),(2,3)}.

In addition to examples 1) through 4), other examples may also be employed.

The rank 5 first codebook $C_{1,5}$ may include the following four matrices:

Example 1)

$$C_{1,5} = \left\{ \frac{1}{\sqrt{5}\sqrt{2}} \begin{bmatrix} D_{1,k} & D_{1,k} & D_{1,m} & D_{1,m} & D_{1,n} \\ D_{1,k} & -D_{1,k} & D_{1,m} & -D_{1,m} & D_{1,n} \end{bmatrix} \right\}$$

In this example, $(k,m,n)=\{(1,2,3),(1,2,4),(1,3,4),(2,3,4)\}$.

Example 2)

$$C_{1,5} = \left\{ \frac{1}{\sqrt{5}\sqrt{2}} \begin{bmatrix} D_{1,k} & D_{1,k} & D_{1,m} & D_{1,m} & D_{1,n} \\ D_{1,k} & -D_{1,k} & D_{1,m} & -D_{1,m} & D_{1,n} \end{bmatrix} \right\}$$

In this example, $(k,m,n)=\{(1,2,3),(1,2,4),(1,3,4),(2,3,4)\}$.

Example 3)

$$C_{1,5} = \left\{ \begin{array}{l} \frac{1}{\sqrt{5}\sqrt{2}} \begin{bmatrix} D_{1,k} & D_{1,k} & D_{1,m} & D_{1,m} & D_{1,n} \\ D_{1,k} & -D_{1,k} & D_{1,m} & -D_{1,m} & D_{1,n} \end{bmatrix} \\ \frac{1}{\sqrt{5}\sqrt{2}} \begin{bmatrix} D_{2,k} & D_{2,k} & D_{2,m} & D_{2,m} & D_{2,n} \\ D_{2,k} & -D_{2,k} & D_{2,m} & -D_{2,m} & D_{2,n} \end{bmatrix} \end{array} \right\}$$

In this example, $(k,m,n)=\{(1,2,3),(1,2,4)\}$.

Example 4)

$$C_{1,5} = \left\{ \begin{array}{l} \frac{1}{\sqrt{5}\sqrt{2}} \begin{bmatrix} D_{1,k} & D_{1,k} & D_{1,m} & D_{1,m} & D_{1,n} \\ D_{1,k} & -D_{1,k} & D_{1,m} & -D_{1,m} & D_{1,n} \end{bmatrix}, \\ \frac{1}{\sqrt{5}\sqrt{2}} \begin{bmatrix} D_{2,k} & D_{2,k} & D_{2,m} & D_{2,m} & D_{2,n} \\ D_{2,k} & -D_{2,k} & D_{2,m} & -D_{2,m} & D_{2,n} \end{bmatrix}, \\ \frac{1}{\sqrt{5}\sqrt{2}} \begin{bmatrix} D_{3,k} & D_{3,k} & D_{3,m} & D_{3,m} & D_{3,n} \\ jD_{3,k} & -jD_{3,k} & jD_{3,m} & -jD_{3,m} & jD_{3,n} \end{bmatrix}, \\ \frac{1}{\sqrt{5}\sqrt{2}} \begin{bmatrix} D_{4,k} & D_{4,k} & D_{4,m} & D_{4,m} & D_{4,n} \\ jD_{4,k} & -jD_{4,k} & jD_{4,m} & -jD_{4,m} & jD_{4,n} \end{bmatrix} \end{array} \right\}$$

In this example, $(k,m,n)=\{(1,2,3)\}$.

A rank 6 first codebook $C_{1,6}$ may include the following four matrices:

Example 1)

$$C_{1,6} = \left\{ \frac{1}{\sqrt{6}\sqrt{2}} \begin{bmatrix} D_{1,k} & D_{1,k} & D_{1,m} & D_{1,m} & D_{1,n} & D_{1,n} \\ D_{1,k} & -D_{1,k} & D_{1,m} & -D_{1,m} & D_{1,n} & -D_{1,n} \end{bmatrix} \right\}$$

In this example, $(k,m,n)=\{(1,2,3),(1,2,4),(1,3,4),(2,3,4)\}$.

Example 2)

$$C_{1,6} = \left\{ \begin{array}{l} \frac{1}{\sqrt{6}\sqrt{2}} \begin{bmatrix} D_{1,k} & D_{1,k} & D_{1,m} & D_{1,m} & D_{1,n} & D_{1,n} \\ D_{1,k} & -D_{1,k} & D_{1,m} & -D_{1,m} & D_{1,n} & -D_{1,n} \end{bmatrix}, \\ \frac{1}{\sqrt{6}\sqrt{2}} \begin{bmatrix} D_{2,k} & D_{2,k} & D_{2,m} & D_{2,m} & D_{2,n} & D_{2,n} \\ D_{2,k} & -D_{2,k} & D_{2,m} & -D_{2,m} & D_{2,n} & -D_{2,n} \end{bmatrix} \end{array} \right\}$$

In this example, $(k,m,n)=\{(1,2,3),(1,2,4)\}$.

Example 3)

$$C_{1,6} = \left\{ \begin{array}{l} \frac{1}{\sqrt{6}\sqrt{2}} \begin{bmatrix} D_{1,k} & D_{1,k} & D_{1,m} & D_{1,m} & D_{1,n} & D_{1,n} \\ D_{1,k} & -D_{1,k} & D_{1,m} & -D_{1,m} & D_{1,n} & -D_{1,n} \end{bmatrix}, \\ \frac{1}{\sqrt{6}\sqrt{2}} \begin{bmatrix} D_{2,k} & D_{2,k} & D_{2,m} & D_{2,m} & D_{2,n} & D_{2,n} \\ D_{2,k} & -D_{2,k} & D_{2,m} & -D_{2,m} & D_{2,n} & -D_{2,n} \end{bmatrix}, \\ \frac{1}{\sqrt{6}\sqrt{2}} \begin{bmatrix} D_{3,k} & D_{3,k} & D_{3,m} & D_{3,m} & D_{3,n} & D_{3,n} \\ jD_{3,k} & -jD_{3,k} & jD_{3,m} & -jD_{3,m} & jD_{3,n} & -jD_{3,n} \end{bmatrix}, \\ \frac{1}{\sqrt{6}\sqrt{2}} \begin{bmatrix} D_{4,k} & D_{4,k} & D_{4,m} & D_{4,m} & D_{4,n} & D_{4,n} \\ jD_{4,k} & -jD_{4,k} & jD_{4,m} & -jD_{4,m} & jD_{4,n} & -jD_{4,n} \end{bmatrix} \end{array} \right\}$$

In this example, $(k,m,n)=\{(1,2,3)\}$.

A rank 7 first codebook $C_{1,7}$ may include the following four matrices:

Example 1)

$$C_{1,7} = \left\{ \begin{array}{l} \frac{1}{\sqrt{7}\sqrt{2}} \begin{bmatrix} D_{1,k} & D_{1,k} & D_{1,m} & D_{1,m} & D_{1,n} & D_{1,n} & D_{1,p} \\ D_{1,k} & -D_{1,k} & D_{1,m} & -D_{1,m} & D_{1,n} & -D_{1,n} & D_{1,p} \end{bmatrix}, \\ \frac{1}{\sqrt{7}\sqrt{2}} \begin{bmatrix} D_{2,k} & D_{2,k} & D_{2,m} & D_{2,m} & D_{2,n} & D_{2,n} & D_{2,p} \\ D_{2,k} & -D_{2,k} & D_{2,m} & -D_{2,m} & D_{2,n} & -D_{2,n} & D_{2,p} \end{bmatrix}, \\ \frac{1}{\sqrt{7}\sqrt{2}} \begin{bmatrix} D_{3,k} & D_{3,k} & D_{3,m} & D_{3,m} & D_{3,n} & D_{3,n} & D_{3,p} \\ jD_{3,k} & -jD_{3,k} & jD_{3,m} & -jD_{3,m} & jD_{3,n} & -jD_{3,n} & jD_{3,p} \end{bmatrix}, \\ \frac{1}{\sqrt{7}\sqrt{2}} \begin{bmatrix} D_{4,k} & D_{4,k} & D_{4,m} & D_{4,m} & D_{4,n} & D_{4,n} & D_{4,p} \\ jD_{4,k} & -jD_{4,k} & jD_{4,m} & -jD_{4,m} & jD_{4,n} & -jD_{4,n} & jD_{4,p} \end{bmatrix} \end{array} \right\}$$

In this example, $(k,m,n,p)=\{(1,2,3,4)\}$.

Example 2)

$$C_{1,7} = \left\{ \begin{array}{l} \frac{1}{\sqrt{7}\sqrt{2}} \begin{bmatrix} D_{1,k} & D_{1,k} & D_{1,m} & D_{1,m} & D_{1,n} & D_{1,n} & D_{1,p} \\ D_{1,k} & -D_{1,k} & D_{1,m} & -D_{1,m} & D_{1,n} & -D_{1,n} & -D_{1,p} \end{bmatrix}, \\ \frac{1}{\sqrt{7}\sqrt{2}} \begin{bmatrix} D_{2,k} & D_{2,k} & D_{2,m} & D_{2,m} & D_{2,n} & D_{2,n} & D_{2,p} \\ D_{2,k} & -D_{2,k} & D_{2,m} & -D_{2,m} & D_{2,n} & -D_{2,n} & -D_{2,p} \end{bmatrix}, \\ \frac{1}{\sqrt{7}\sqrt{2}} \begin{bmatrix} D_{3,k} & D_{3,k} & D_{3,m} & D_{3,m} & D_{3,n} & D_{3,n} & D_{3,p} \\ jD_{3,k} & -jD_{3,k} & jD_{3,m} & -jD_{3,m} & jD_{3,n} & -jD_{3,n} & -jD_{3,p} \end{bmatrix}, \\ \frac{1}{\sqrt{7}\sqrt{2}} \begin{bmatrix} D_{4,k} & D_{4,k} & D_{4,m} & D_{4,m} & D_{4,n} & D_{4,n} & D_{4,p} \\ jD_{4,k} & -jD_{4,k} & jD_{4,m} & -jD_{4,m} & jD_{4,n} & -jD_{4,n} & -jD_{4,p} \end{bmatrix} \end{array} \right\}$$

In this example, $(k,m,n,p)=(1,2,3,4)$.

A rank 8 first codebook $C_{1,8}$ may include the following four matrices:

$$C_{1,8} = \left\{ \begin{array}{l} \frac{1}{\sqrt{8}\sqrt{2}} \begin{bmatrix} D_1 & D_1 \\ D_1 & -D_1 \end{bmatrix}, \quad \frac{1}{\sqrt{8}\sqrt{2}} \begin{bmatrix} D_2 & D_2 \\ D_2 & -D_2 \end{bmatrix}, \\ \frac{1}{\sqrt{8}\sqrt{2}} \begin{bmatrix} D_3 & D_3 \\ jD_3 & -jD_3 \end{bmatrix}, \quad \frac{1}{\sqrt{8}\sqrt{2}} \begin{bmatrix} D_4 & D_4 \\ jD_4 & -jD_4 \end{bmatrix} \end{array} \right\}$$

Codebook $C_2$

The second codebook $C_2$ may be the same as in suggestion 1.

Suggestion 3: Maximum 4-Bit Codebook for Each Rank for $W_1$

Suggestion 3 relates to the structure of $W_1W_2$. In suggestion 3, the first codebook $C_1$ for rank r where r=1, 2 may include 16 elements, the first codebook $C_1$ for rank r where r=3, 4 may include eight elements, and the first codebook $C_1$ for rank r where r=5, 6, 7, 8 may include four elements.

The above 64 entries may be divided into four subsets each including 16 entries. To indicate one of the subsets, two bits may be used. The two bits may indicate a rank corresponding to the selected subset among rank 1, rank 2, rank 3-4, and rank 5-8.

Codebook $C_1$

The first codebook $C_1$ for rank r may be indicated as $C_{1,r}$.

A first codebook $C_{1,(1,2)}$ for ranks 1 and 2 may be obtained by the following matrices:

$$B = [b_0 \quad b_1 \quad \ldots \quad b_{31}],$$

$$[B]_{1+m,1+n} = e^{j\frac{2\pi mn}{32}},$$

$$m = 0, 1, 2, 3, n = 0, 1, \ldots 31$$

$$X^{(k)} \in \left\{ \frac{1}{2}[b_{2k \bmod 32} \quad b_{(2k+1) \bmod 32} \quad b_{(2k+2) \bmod 32} \quad b_{(2k+3) \bmod 32}] : k = 0, 1, \ldots, 15 \right\}$$

$$W_1^{(k)} = \begin{bmatrix} X^{(k)} & 0 \\ 0 & X^{(k)} \end{bmatrix}$$

$$C_{1,(1,2)} = \{W_1^{(0)}, W_1^{(1)}, W_1^{(2)}, \ldots, W_1^{(15)}\}$$

In this example, $[B]_{1+m,1+n}$ indicates an element present in an $(1+m)^{th}$ row and an $(1+n)^{th}$ column among elements belonging to B, and $b_z(z=0, 1, 2, \ldots, 31)$ corresponds to a $z^{th}$ column vector of the matrix B, and a mod b denotes a remainder when a is divided by b.

A first codebook $C_{1,(3,4)}$ for ranks 3 and 4 may be obtained by the following matrices:

$$B = [b_0 \quad b_1 \quad \ldots \quad b_{31}],$$

$$[B]_{1+m,1+n} = e^{j\frac{2\pi mn}{32}},$$

$$m = 0, 1, 2, 3, n = 0, 1, \ldots 31$$

$$X^{(k)} \in \left\{ \frac{1}{2}[b_{4k \bmod 32} \quad b_{(4k+1) \bmod 32} \quad \ldots \quad b_{(4k+7) \bmod 32}] : k = 0, 1, 2, 3, 4, 5, 6, 7 \right\}$$

$$W_1^{(k)} = \begin{bmatrix} X^{(k)} & 0 \\ 0 & X^{(k)} \end{bmatrix}$$

$$C_{1,(3,4)} = \{W_1^{(0)}, W_1^{(1)}, W_1^{(2)}, \ldots, W_1^{(7)}\}$$

A first codebook $C_{1,(5,6,7,8)}$ for ranks 5, 6, 7, and 8 may be obtained by the following matrices:

$$X^{(0)} = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix},$$

$$X^{(1)} = \text{diag}\{1, e^{j\pi/4}, j, e^{j3\pi/4}\}X^{(0)},$$

$$X^{(2)} = \text{diag}\{1, e^{j\pi/8}, e^{j2\pi/8}, e^{j3\pi/8}\}X^{(0)},$$

$$X^{(3)} = \text{diag}\{1, e^{j3\pi/8}, e^{j6\pi/8}, e^{j9\pi/8}\}X^{(0)}$$

-continued $$W_1^{(k)} = \left\{ \begin{bmatrix} X^{(k)} & 0 \\ 0 & X^{(k)} \end{bmatrix} \right\}, k = 0, 1, 2, 3$$

$$C_{1,(5,6,7,8)} = \{W_1^{(0)}, W_1^{(1)}, W_1^{(2)}, \ldots, W_1^{(3)}\}$$

Codebook $C_2$

The second codebook $C_2$ for rank r may be indicated as $C_{2,r}$.

A second codebook $C_{2,1}$ for rank 1 may be expressed by:

$$C_{2,1} = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\}$$

$$Y \in \{\tilde{e}_1, \tilde{e}_2, \tilde{e}_3, \tilde{e}_4\}$$

A second codebook $C_{2,2}$ for rank 2 may be expressed by:

$$C_{2,2} = \left\{ \frac{1}{\sqrt{2}\sqrt{2}}\begin{bmatrix} Y_1 & Y_2 \\ Y_1 & -Y_2 \end{bmatrix}, \frac{1}{\sqrt{2}\sqrt{2}}\begin{bmatrix} Y_1 & Y_2 \\ jY_1 & -jY_2 \end{bmatrix} \right\}$$

$$(Y_1, Y_2) \in \left\{ \begin{array}{l} (\tilde{e}_1, \tilde{e}_1), (\tilde{e}_2, \tilde{e}_2), (\tilde{e}_3, \tilde{e}_3), (\tilde{e}_4, \tilde{e}_4), \\ (\tilde{e}_1, \tilde{e}_2), (\tilde{e}_2, \tilde{e}_3), (\tilde{e}_1, \tilde{e}_4), (\tilde{e}_2, \tilde{e}_4) \end{array} \right\}$$

In this example, $\tilde{e}_n$ corresponds to a selection vectors. An $n^{th}$ element of $\tilde{e}_n$ may have a value of 1 with respect to ranks 1 and 2 and all of remaining elements may have a value of zero.

A second codebook $C_{2,3}$ for rank 3 may be expressed by $$C_{2,3} = \left\{ \frac{1}{\sqrt{3}\sqrt{2}}\begin{bmatrix} Y_1 & Y_2 \\ Y_1 & -Y_2 \end{bmatrix}, \frac{1}{\sqrt{3}\sqrt{2}}\begin{bmatrix} Y_1 & Y_2 \\ jY_1 & -jY_2 \end{bmatrix} \right\}$$

$$(Y_1, Y_2) \in \left\{ \begin{array}{l} (e_1, [e_1 \quad e_5]), (e_2, [e_2 \quad e_6]), \\ (e_3, [e_3 \quad e_7]), (e_4, [e_4 \quad e_8]), \\ (e_5, [e_1 \quad e_5]), (e_6, [e_2 \quad e_6]), \\ (e_7, [e_3 \quad e_7]), (e_8, [e_4 \quad e_8]) \end{array} \right\}$$

A second codebook $C_{2,4}$ for rank 4 may be expressed by $$C_{2,4} = \left\{ \frac{1}{\sqrt{4}\sqrt{2}}\begin{bmatrix} Y & Y \\ Y & -Y \end{bmatrix}, \frac{1}{\sqrt{4}\sqrt{2}}\begin{bmatrix} Y & Y \\ jY & -jY \end{bmatrix} \right\}$$

$$Y \in \{[e_1 \quad e_5], [e_2 \quad e_6], [e_3 \quad e_7], [e_4 \quad e_8]\}$$

In this example, $e_n$ corresponds to a 8×1 selection vectors. An $n^{th}$ element of $e_n$ may have a value of 1 with respect to ranks 3 and 4, and all of remaining elements may have a value of zero.

A second codebook $C_{2,(5,6,7,8)}$ for ranks 5,6,7, and 8 may be obtained by the following matrices:

$$C_{2,5} = \frac{1}{\sqrt{5}\sqrt{2}}\begin{bmatrix} \tilde{e}_1 & \tilde{e}_1 & \tilde{e}_2 & \tilde{e}_2 & \tilde{e}_3 \\ \tilde{e}_1 & -\tilde{e}_1 & \tilde{e}_2 & -\tilde{e}_2 & -\tilde{e}_3 \end{bmatrix}$$

$$C_{2,6} = \frac{1}{\sqrt{6}\sqrt{2}}\begin{bmatrix} \tilde{e}_1 & \tilde{e}_1 & \tilde{e}_2 & \tilde{e}_2 & \tilde{e}_3 & \tilde{e}_3 \\ \tilde{e}_1 & -\tilde{e}_1 & \tilde{e}_2 & -\tilde{e}_2 & \tilde{e}_3 & -\tilde{e}_3 \end{bmatrix}$$

-continued $$C_{2,7} = \frac{1}{\sqrt{7}\sqrt{2}} \begin{bmatrix} \tilde{e}_1 & \tilde{e}_1 & \tilde{e}_2 & \tilde{e}_2 & \tilde{e}_3 & \tilde{e}_3 & \tilde{e}_4 \\ \tilde{e}_1 & -\tilde{e}_1 & \tilde{e}_2 & -\tilde{e}_2 & \tilde{e}_3 & -\tilde{e}_3 & \tilde{e}_4 \end{bmatrix}$$

$$C_{2,8} = \frac{1}{\sqrt{8}\sqrt{2}} \begin{bmatrix} \tilde{e}_1 & \tilde{e}_1 & \tilde{e}_2 & \tilde{e}_2 & \tilde{e}_3 & \tilde{e}_3 & \tilde{e}_4 & \tilde{e}_4 \\ \tilde{e}_1 & -\tilde{e}_1 & \tilde{e}_2 & -\tilde{e}_2 & \tilde{e}_3 & -\tilde{e}_3 & \tilde{e}_4 & -\tilde{e}_4 \end{bmatrix}$$

In this example, $\tilde{e}_n$ corresponds to a 4×1 selection vectors. An $n^{th}$ element of $\tilde{e}_n$ may have a value of 1 with respect to ranks 5, 6, 7, and 8 and all of remaining elements may have a value of zero.

Hereinafter, digits of the first codebook $C_1$ for $W_1$ and the second codebook $C_2$ for $W_2$ will be described in detail. The overall codebook C for W that is defined by performing inner product between each of codewords of $C_1$ and each of codewords of $C_2$ will be described. That is, one of codewords belonging to the overall codebook C may be a precoding matrix W that is finally used by the transmitter.

Detailed Digits of First Codebook $C_1$

Hereinafter, ans(:,:,n) corresponds to an $n^{th}$ codeword in a first codebook corresponding to a corresponding transmission rank. Each of codewords may include a plurality of column vectors. For example, a first codeword ans(:,:,1) in the first codebook for ranks 1 and 2 may include eight column vectors.

| Rank 1 and 2 | | | |
|---|---|---|---|
| ans(:, :, 1) = | | | |
| columns 1-4 | | | |
| 0.5000 | 0.5000 | 0.5000 | 0.5000 |
| 0.5000 | 0.4904 + 0.0975i | 0.4619 + 0.1913i | 0.4157 + 0.2778i |
| 0.5000 | 0.4619 + 0.1913i | 0.3536 + 0.3536i | 0.1913 + 0.4619i |
| 0.5000 | 0.4157 + 0.2778i | 0.1913 + 0.4619i | −0.0975 + 0.4904i |
| 0 | 0 | 0 | 0 |
| 0 | 0 | 0 | 0 |
| 0 | 0 | 0 | 0 |
| 0 | 0 | 0 | 0 |
| columns 5-8 | | | |
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.5000 | 0.4904 + 0.0975i | 0.4619 + 0.1913i | 0.4157 + 0.2778i |
| 0.5000 | 0.4619 + 0.1913i | 0.3536 + 0.3536i | 0.1913 + 0.4619i |
| 0.5000 | 0.4157 + 0.2778i | 0.1913 + 0.4619i | −0.0975 + 0.4904i |
| ans(:, :, 2) = | | | |
| columns 1-4 | | | |
| 0.5000 | 0.5000 | 0.5000 | 0.5000 |
| 0.4619 + 0.1913i | 0.4157 + 0.2778i | 0.3536 + 0.3536i | 0.2778 + 0.4157i |
| 0.3536 + 0.3536i | 0.1913 + 0.4619i | 0.0000 + 0.5000i | −0.1913 + 0.4619i |
| 0.1913 + 0.4619i | −0.0975 + 0.4904i | −0.3536 + 0.3536i | −0.4904 + 0.0975i |
| 0 | 0 | 0 | 0 |
| 0 | 0 | 0 | 0 |
| 0 | 0 | 0 | 0 |
| 0 | 0 | 0 | 0x |
| columns 5-8 | | | |
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.4619 + 0.1913i | 0.4157 + 0.2778i | 0.3536 + 0.3536i | 0.2778 + 0.4157i |
| 0.3536 + 0.3536i | 0.1913 + 0.4619i | 0.0000 + 0.5000i | −0.1913 + 0.4619i |
| 0.3536 + 0.3536i | 0.1913 + 0.4619i | 0.0000 + 0.5000i | −0.1913 + 0.4619i |
| ans(:, :, 3) = | | | |
| columns 1-4 | | | |
| 0.5000 | 0.5000 | 0.5000 | 0.5000 |
| 0.3536 + 0.3536i | 0.2778 + 0.4157i | 0.1913 + 0.4619i | 0.0975 + 0.4904i |
| 0.0000 + 0.5000i | −0.1913 + 0.4619i | −0.3536 + 0.3536i | −0.4619 + 0.1913i |
| −0.3536 + 0.3536i | −0.4904 + 0.0975i | −0.4619 − 0.1913i | −0.2778 − 0.4157i |
| 0 | 0 | 0 | 0 |
| 0 | 0 | 0 | 0 |
| 0 | 0 | 0 | 0 |
| 0 | 0 | 0 | 0 |
| columns 5-8 | | | |
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.3536 + 0.3536i | 0.2778 + 0.4157i | 0.1913 + 0.4619i | 0.0975 + 0.4904i |

-continued

|              |                 |                 |                 |
|--------------|-----------------|-----------------|-----------------|
| 0.0000 + 0.5000i | −0.1913 + 0.4619i | −0.3536 + 0.3536i | −0.4619 + 0.1913i |
| −0.3536 + 0.3536i | −0.4904 + 0.0975i | −0.4619 − 0.1913i | −0.2778 − 0.4157i | ans(:, :, 4) =
columns 1-4

|              |                 |                 |                 |
|--------------|-----------------|-----------------|-----------------|
| 0.5000       | 0.5000          | 0.5000          | 0.5000          |
| 0.1913 + 0.4619i | 0.0975 + 0.4904i | 0.0000 + 0.5000i | −0.0975 + 0.4904i |
| −0.3536 + 0.3536i | −0.4619 + 0.1913i | −0.5000 + 0.0000i | −0.4619 − 0.1913i |
| −0.4619 − 0.1913i | −0.2778 − 0.4157i | −0.0000 − 0.5000i | 0.2778 − 0.4157i |
| 0 | 0 | 0 | 0 |
| 0 | 0 | 0 | 0 |
| 0 | 0 | 0 | 0 |
| 0 | 0 | 0 | 0 | columns 5-8

|              |                 |                 |                 |
|--------------|-----------------|-----------------|-----------------|
| 0 | 0 | 0 | 0 |
| 0 | 0 | 0 | 0 |
| 0 | 0 | 0 | 0 |
| 0 | 0 | 0 | 0 |
| 0.5000       | 0.5000          | 0.5000          | 0.5000          |
| 0.1913 + 0.4619i | 0.0975 + 0.4904i | 0.0000 + 0.5000i | −0.0975 + 0.4904i |
| −0.3536 + 0.3536i | −0.4619 + 0.1913i | −0.5000 + 0.0000i | −0.4619 − 0.1913i |
| −0.4619 − 0.1913i | −0.2778 − 0.4157i | −0.0000 − 0.5000i | 0.2778 − 0.4157i | ans(:, :, 5) =
columns 1-4

|              |                 |                 |                 |
|--------------|-----------------|-----------------|-----------------|
| 0.5000       | 0.5000          | 0.5000          | 0.5000          |
| 0.0000 + 0.5000i | −0.0975 + 0.4904i | −0.1913 + 0.4619i | −0.2778 + 0.4157i |
| −0.5000 + 0.0000i | −0.4619 − 0.1913i | −0.3536 − 0.3536i | −0.1913 − 0.4619i |
| −0.0000 − 0.5000i | 0.2778 − 0.4157i | 0.4619 − 0.1913i | 0.4904 + 0.0975i |
| 0 | 0 | 0 | 0 |
| 0 | 0 | 0 | 0 |
| 0 | 0 | 0 | 0 |
| 0 | 0 | 0 | 0 | columns 5-8

|              |                 |                 |                 |
|--------------|-----------------|-----------------|-----------------|
| 0 | 0 | 0 | 0 |
| 0 | 0 | 0 | 0 |
| 0 | 0 | 0 | 0 |
| 0 | 0 | 0 | 0 |
| 0.5000       | 0.5000          | 0.5000          | 0.5000          |
| 0.0000 + 0.5000i | −0.0975 + 0.4904i | −0.1913 + 0.4619i | −0.2778 + 0.4157i |
| −0.5000 + 0.0000i | −0.4619 − 0.1913i | −0.3536 − 0.3536i | −0.1913 − 0.4619i |
| −0.0000 − 0.5000i | 0.2778 − 0.4157i | 0.4619 − 0.1913i | 0.4904 + 0.0975i | ans(:, :, 6) =
columns 1-4

|              |                 |                 |                 |
|--------------|-----------------|-----------------|-----------------|
| 0.5000       | 0.5000          | 0.5000          | 0.5000          |
| −0.1913 + 0.4619i | −0.2778 + 0.4157i | −0.3536 + 0.3536i | −0.4157 + 0.2778i |
| −0.3536 − 0.3536i | −0.1913 − 0.4619i | −0.0000 − 0.5000i | 0.1913 − 0.4619i |
| 0.4619 − 0.1913i | 0.4904 + 0.0975i | 0.3536 + 0.3536i | 0.0975 + 0.4904i |
| 0 | 0 | 0 | 0 |
| 0 | 0 | 0 | 0 |
| 0 | 0 | 0 | 0 |
| 0 | 0 | 0 | 0 | columns 5-8

|              |                 |                 |                 |
|--------------|-----------------|-----------------|-----------------|
| 0 | 0 | 0 | 0 |
| 0 | 0 | 0 | 0 |
| 0 | 0 | 0 | 0 |
| 0 | 0 | 0 | 0 |
| 0.5000       | 0.5000          | 0.5000          | 0.5000          |
| −0.1913 + 0.4619i | −0.2778 + 0.4157i | −0.3536 + 0.3536i | −0.4157 + 0.2778i |
| −0.3536 − 0.3536i | −0.1913 − 0.4619i | −0.0000 − 0.5000i | 0.1913 − 0.4619i |
| 0.4619 − 0.1913i | 0.4904 + 0.0975i | 0.3536 + 0.3536i | 0.0975 + 0.4904i | ans(:, :, 7) =
columns 1-4

|              |                 |                 |                 |
|--------------|-----------------|-----------------|-----------------|
| 0.5000       | 0.5000          | 0.5000          | 0.5000          |
| −0.3536 + 0.3536i | −0.4157 + 0.2778i | −0.4619 + 0.1913i | −0.4904 + 0.0975i |
| −0.0000 − 0.5000i | 0.1913 − 0.4619i | 0.3536 − 0.3536i | 0.4619 − 0.1913i |
| 0.3536 + 0.3536i | 0.0975 + 0.4904i | −0.1913 + 0.4619i | −0.4157 + 0.2778i |
| 0 | 0 | 0 | 0 |
| 0 | 0 | 0 | 0 |
| 0 | 0 | 0 | 0 |
| 0 | 0 | 0 | 0 |

-continued

| columns 5-8 | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.3536 + 0.3536i | −0.4157 + 0.2778i | −0.4619 + 0.1913i | −0.4904 + 0.0975i |
| −0.0000 − 0.5000i | 0.1913 − 0.4619i | 0.3536 − 0.3536i | 0.4619 − 0.1913i |
| 0.3536 + 0.3536i | 0.0975 + 0.4904i | −0.1913 + 0.4619i | −0.4157 + 0.2778i | ans(:, :, 8) =
columns 1-4

| | | | |
|---|---|---|---|
| 0.5000 | 0.5000 | 0.5000 | 0.5000 |
| −0.4619 + 0.1913i | −0.4904 + 0.0975i | −0.5000 + 0.0000i | −0.4904 − 0.0975i |
| 0.3536 − 0.3536i | 0.4619 − 0.1913i | 0.5000 − 0.0000i | 0.4619 + 0.1913i |
| −0.1913 + 0.4619i | −0.4157 + 0.2778i | −0.5000 + 0.0000i | −0.4157 − 0.2778i |
| 0 | 0 | 0 | 0 |
| 0 | 0 | 0 | 0 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.4619 + 0.1913i | −0.4904 + 0.0975i | −0.5000 + 0.0000i | −0.4904 − 0.0975i |
| 0.3536 − 0.3536i | 0.4619 − 0.1913i | 0.5000 − 0.0000i | 0.4619 + 0.1913i |
| −0.1913 + 0.4619i | −0.4157 + 0.2778i | −0.5000 + 0.0000i | −0.4157 − 0.2778i | ans(:, :, 9) =
columns 1-4

| | | | |
|---|---|---|---|
| 0.5000 | 0.5000 | 0.5000 | 0.5000 |
| −0.5000 + 0.0000i | −0.4904 − 0.0975i | −0.4619 − 0.1913i | −0.4157 − 0.2778i |
| 0.5000 − 0.0000i | 0.4619 + 0.1913i | 0.3536 + 0.3536i | 0.1913 + 0.4619i |
| −0.5000 + 0.0000i | −0.4157 − 0.2778i | −0.1913 − 0.4619i | 0.0975 − 0.4904i |
| 0 | 0 | 0 | 0 |
| 0 | 0 | 0 | 0 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.5000 + 0.0000i | −0.4904 − 0.0975i | −0.4619 − 0.1913i | −0.4157 − 0.2778i |
| 0.5000 − 0.0000i | 0.4619 + 0.1913i | 0.3536 + 0.3536i | 0.1913 + 0.4619i |
| −0.5000 + 0.0000i | −0.4157 − 0.2778i | −0.1913 − 0.4619i | 0.0975 − 0.4904i | ans(:, :, 10) =
columns 1-4

| | | | |
|---|---|---|---|
| 0.5000 | 0.5000 | 0.5000 | 0.5000 |
| −0.4619 − 0.1913i | −0.4157 − 0.2778i | −0.3536 − 0.3536i | −0.2778 − 0.4157i |
| 0.3536 + 0.3536i | 0.1913 + 0.4619i | 0.0000 + 0.5000i | −0.1913 + 0.4619i |
| −0.1913 − 0.4619i | 0.0975 − 0.4904i | 0.3536 − 0.3536i | 0.4904 − 0.0975i |
| 0 | 0 | 0 | 0 |
| 0 | 0 | 0 | 0 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.4619 − 0.1913i | −0.4157 − 0.2778i | −0.3536 − 0.3536i | −0.2778 − 0.4157i |
| 0.3536 + 0.3536i | 0.1913 + 0.4619i | 0.0000 + 0.5000i | −0.1913 + 0.4619i |
| −0.1913 − 0.4619i | 0.0975 − 0.4904i | 0.3536 − 0.3536i | 0.4904 − 0.0975i | ans(:, :, 11) =
columns 1-4

| | | | |
|---|---|---|---|
| 0.5000 | 0.5000 | 0.5000 | 0.5000 |
| −0.3536 − 0.3536i | −0.2778 − 0.4157i | −0.1913 − 0.4619i | −0.0975 − 0.4904i |
| 0.0000 + 0.5000i | −0.1913 + 0.4619i | −0.3536 + 0.3536i | −0.4619 + 0.1913i |

-continued

| | | | |
|---|---|---|---|
| 0.3536 − 0.3536i | 0.4904 − 0.0975i | 0.4619 + 0.1913i | 0.2778 + 0.4157i |
| 0 | 0 | 0 | 0 |
| 0 | 0 | 0 | 0 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.3536 − 0.3536i | −0.2778 − 0.4157i | −0.1913 − 0.4619i | −0.0975 − 0.4904i |
| 0.0000 + 0.5000i | −0.1913 + 0.4619i | −0.3536 + 0.3536i | −0.4619 + 0.1913i |
| 0.3536 − 0.3536i | 0.4904 − 0.0975i | 0.4619 + 0.1913i | 0.2778 + 0.4157i | ans(:, :, 12) =
columns 1-4

| | | | |
|---|---|---|---|
| 0.5000 | 0.5000 | 0.5000 | 0.5000 |
| −0.1913 − 0.4619i | −0.0975 − 0.4904i | −0.0000 − 0.5000i | 0.0975 − 0.4904i |
| −0.3536 + 0.3536i | −0.4619 + 0.1913i | −0.5000 + 0.0000i | −0.4619 − 0.1913i |
| 0.4619 + 0.1913i | 0.2778 + 0.4157i | 0.0000 + 0.5000i | −0.2778 + 0.4157i |
| 0 | 0 | 0 | 0 |
| 0 | 0 | 0 | 0 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.1913 − 0.4619i | −0.0975 − 0.4904i | −0.0000 − 0.5000i | 0.0975 − 0.4904i |
| −0.3536 + 0.3536i | −0.4619 + 0.1913i | −0.5000 + 0.0000i | −0.4619 − 0.1913i |
| 0.4619 + 0.1913i | 0.2778 + 0.4157i | 0.0000 + 0.5000i | −0.2778 + 0.4157i | ans(:, :, 13) =
columns 1-4

| | | | |
|---|---|---|---|
| 0.5000 | 0.5000 | 0.5000 | 0.5000 |
| −0.0000 − 0.5000i | 0.0975 − 0.4904i | 0.1913 − 0.4619i | 0.2778 − 0.4157i |
| −0.5000 + 0.0000i | −0.4619 − 0.1913i | −0.3536 − 0.3536i | −0.1913 − 0.4619i |
| 0.0000 + 0.5000i | −0.2778 + 0.4157i | −0.4619 + 0.1913i | −0.4904 − 0.0975i |
| 0 | 0 | 0 | 0 |
| 0 | 0 | 0 | 0 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.0000 − 0.5000i | 0.0975 − 0.4904i | 0.1913 − 0.4619i | 0.2778 − 0.4157i |
| −0.5000 + 0.0000i | −0.4619 − 0.1913i | −0.3536 − 0.3536i | −0.1913 − 0.4619i |
| 0.0000 + 0.5000i | −0.2778 + 0.4157i | −0.4619 + 0.1913i | −0.4904 − 0.0975i | ans(:, :, 14) =
columns 1-4

| | | | |
|---|---|---|---|
| 0.5000 | 0.5000 | 0.5000 | 0.5000 |
| 0.1913 − 0.4619i | 0.2778 − 0.4157i | 0.3536 − 0.3536i | 0.4157 − 0.2778i |
| −0.3536 − 0.3536i | −0.1913 − 0.4619i | −0.0000 − 0.5000i | 0.1913 − 0.4619i |
| −0.4619 + 0.1913i | −0.4904 − 0.0975i | −0.3536 − 0.3536i | −0.0975 − 0.4904i |
| 0 | 0 | 0 | 0 |
| 0 | 0 | 0 | 0 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.1913 − 0.4619i | 0.2778 − 0.4157i | 0.3536 − 0.3536i | 0.4157 − 0.2778i |
| −0.3536 − 0.3536i | −0.1913 − 0.4619i | −0.0000 − 0.5000i | 0.1913 − 0.4619i |
| −0.4619 + 0.1913i | −0.4904 − 0.0975i | −0.3536 − 0.3536i | −0.0975 − 0.4904i |

-continued ans(:, :, 15) =
columns 1-4

| | | | |
|---|---|---|---|
| 0.5000 | 0.5000 | 0.5000 | 0.5000 |
| 0.3536 − 0.3536i | 0.4157 − 0.2778i | 0.4619 − 0.1913i | 0.4904 − 0.0975i |
| −0.0000 − 0.5000i | 0.1913 − 0.4619i | 0.3536 − 0.3536i | 0.4619 − 0.1913i |
| −0.3536 − 0.3536i | −0.0975 − 0.4904i | 0.1913 − 0.4619i | 0.4157 − 0.2778i |
| 0 | 0 | 0 | 0 |
| 0 | 0 | 0 | 0 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.3536 − 0.3536i | 0.4157 − 0.2778i | 0.4619 − 0.1913i | 0.4904 − 0.0975i |
| −0.0000 − 0.5000i | 0.1913 − 0.4619i | 0.3536 − 0.3536i | 0.4619 − 0.1913i |
| −0.3536 − 0.3536i | −0.0975 − 0.4904i | 0.1913 − 0.4619i | 0.4157 − 0.2778i | ans(:, :, 16) =
columns 1-4

| | | | |
|---|---|---|---|
| 0.5000 | 0.5000 | 0.5000 | 0.5000 |
| 0.4619 − 0.1913i | 0.4904 − 0.0975i | 0.5000 | 0.4904 + 0.0975i |
| 0.3536 − 0.3536i | 0.4619 − 0.1913i | 0.5000 | 0.4619 + 0.1913i |
| 0.1913 − 0.4619i | 0.4157 − 0.2778i | 0.5000 | 0.4157 + 0.2778i |
| 0 | 0 | 0 | 0 |
| 0 | 0 | 0 | 0 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.4619 − 0.1913i | 0.4904 − 0.0975i | 0.5000 | 0.4904 + 0.0975i |
| 0.3536 − 0.3536i | 0.4619 − 0.1913i | 0.5000 | 0.4619 + 0.1913i |
| 0.1913 − 0.4619i | 0.4157 − 0.2778i | 0.5000 | 0.4157 + 0.2778i |

Rank 3 and 4 ans(:, :, 1) =
Columns 1 through 4

| | | | |
|---|---|---|---|
| 0.5000 | 0.5000 | 0.5000 | 0.5000 |
| 0.5000 | 0.4904 + 0.0975i | 0.4619 + 0.1913i | 0.4157 + 0.2778i |
| 0.5000 | 0.4619 + 0.1913i | 0.3536 + 0.3536i | 0.1913 + 0.4619i |
| 0.5000 | 0.4157 + 0.2778i | 0.1913 + 0.4619i | −0.0975 + 0.4904i |
| 0 | 0 | 0 | 0 |
| 0 | 0 | 0 | 0 |
| 0 | 0 | 0 | 0 |
| 0 | 0 | 0 | 0 |

Columns 5 through 8

| | | | |
|---|---|---|---|
| 0.5000 | 0.5000 | 0.5000 | 0.5000 |
| 0.3536 + 0.3536i | 0.2778 + 0.4157i | 0.1913 + 0.4619i | 0.0975 + 0.4904i |
| 0.0000 + 0.5000i | −0.1913 + 0.4619i | −0.3536 + 0.3536i | −0.4619 + 0.1913i |
| −0.3536 + 0.3536i | −0.4904 + 0.0975i | −0.4619 − 0.1913i | −0.2778 − 0.4157i |
| 0 | 0 | 0 | 0 |
| 0 | 0 | 0 | 0 |
| 0 | 0 | 0 | 0 |
| 0 | 0 | 0 | 0 |

Columns 9 through 12

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.5000 | 0.4904 + 0.0975i | 0.4619 + 0.1913i | 0.4157 + 0.2778i |
| 0.5000 | 0.4619 + 0.1913i | 0.3536 + 0.3536i | 0.1913 + 0.4619i |
| 0.5000 | 0.4157 + 0.2778i | 0.1913 + 0.4619i | −0.0975 + 0.4904i |

-continued

| Columns 13 through 16 | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.3536 + 0.3536i | 0.2778 + 0.4157i | 0.1913 + 0.4619i | 0.0975 + 0.4904i |
| 0.0000 + 0.5000i | −0.1913 + 0.4619i | −0.3536 + 0.3536i | −0.4619 + 0.1913i |
| −0.3536 + 0.3536i | −0.4904 + 0.0975i | −0.4619 − 0.1913i | −0.2778 − 0.4157i | ans(:, :, 2) =

| Columns 1 through 4 | | | |
|---|---|---|---|
| 0.5000 | 0.5000 | 0.5000 | 0.5000 |
| 0.3536 + 0.3536i | 0.2778 + 0.4157i | 0.1913 + 0.4619i | 0.0975 + 0.4904i |
| 0.0000 + 0.5000i | −0.1913 + 0.4619i | −0.3536 + 0.3536i | −0.4619 + 0.1913i |
| −0.3536 + 0.3536i | −0.4904 + 0.0975i | −0.4619 − 0.1913i | −0.2778 − 0.4157i |
| 0 | 0 | 0 | 0 |
| 0 | 0 | 0 | 0 |
| 0 | 0 | 0 | 0 |
| 0 | 0 | 0 | 0 |

| Columns 5 through 8 | | | |
|---|---|---|---|
| 0.5000 | 0.5000 | 0.5000 | 0.5000 |
| 0.0000 + 0.5000i | −0.0975 + 0.4904i | −0.1913 + 0.4619i | −0.2778 + 0.4157i |
| −0.5000 + 0.0000i | −0.4619 − 0.1913i | −0.3536 − 0.3536i | −0.1913 − 0.4619i |
| −0.0000 − 0.5000i | 0.2778 − 0.4157i | 0.4619 − 0.1913i | 0.4904 + 0.0975i |
| 0 | 0 | 0 | 0 |
| 0 | 0 | 0 | 0 |
| 0 | 0 | 0 | 0 |
| 0 | 0 | 0 | 0 |

| Columns 9 through 12 | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.3536 + 0.3536i | 0.2778 + 0.4157i | 0.1913 + 0.4619i | 0.0975 + 0.4904i |
| 0.0000 + 0.5000i | −0.1913 + 0.4619i | −0.3536 + 0.3536i | −0.4619 + 0.1913i |
| −0.3536 + 0.3536i | −0.4904 + 0.0975i | −0.4619 − 0.1913i | −0.2778 − 0.4157i |

| Columns 13 through 16 | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.0000 + 0.5000i | −0.0975 + 0.4904i | −0.1913 + 0.4619i | −0.2778 + 0.4157i |
| −0.5000 + 0.0000i | −0.4619 − 0.1913i | −0.3536 − 0.3536i | −0.1913 − 0.4619i |
| −0.0000 − 0.5000i | 0.2778 − 0.4157i | 0.4619 − 0.1913i | 0.4904 + 0.0975i | ans(:, :, 3) =

| Columns 1 through 4 | | | |
|---|---|---|---|
| 0.5000 | 0.5000 | 0.5000 | 0.5000 |
| 0.0000 + 0.5000i | −0.0975 + 0.4904i | −0.1913 + 0.4619i | −0.2778 + 0.4157i |
| −0.5000 + 0.0000i | −0.4619 − 0.1913i | −0.3536 − 0.3536i | −0.1913 − 0.4619i |
| −0.0000 − 0.5000i | 0.2778 − 0.4157i | 0.4619 − 0.1913i | 0.4904 + 0.0975i |
| 0 | 0 | 0 | 0 |
| 0 | 0 | 0 | 0 |
| 0 | 0 | 0 | 0 |
| 0 | 0 | 0 | 0 |

| Columns 5 through 8 | | | |
|---|---|---|---|
| 0.5000 | 0.5000 | 0.5000 | 0.5000 |
| −0.3536 + 0.3536i | −0.4157 + 0.2778i | −0.4619 + 0.1913i | −0.4904 + 0.0975i |
| −0.0000 − 0.5000i | 0.1913 − 0.4619i | 0.3536 − 0.3536i | 0.4619 − 0.1913i |
| 0.3536 + 0.3536i | 0.0975 + 0.4904i | −0.1913 + 0.4619i | −0.4157 + 0.2778i |
| 0 | 0 | 0 | 0 |
| 0 | 0 | 0 | 0 |
| 0 | 0 | 0 | 0 |
| 0 | 0 | 0 | 0 |

| Columns 9 through 12 | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |

|                     |                     |                     |                     |
|---------------------|---------------------|---------------------|---------------------|
| 0.0000 + 0.5000i    | −0.0975 + 0.4904i   | −0.1913 + 0.4619i   | −0.2778 + 0.4157i   |
| −0.5000 + 0.0000i   | −0.4619 − 0.1913i   | −0.3536 − 0.3536i   | −0.1913 − 0.4619i   |
| −0.0000 − 0.5000i   | 0.2778 − 0.4157i    | 0.4619 − 0.1913i    | 0.4904 + 0.0975i    |

Columns 13 through 16

|                     |                     |                     |                     |
|---------------------|---------------------|---------------------|---------------------|
| 0                   | 0                   | 0                   | 0                   |
| 0                   | 0                   | 0                   | 0                   |
| 0                   | 0                   | 0                   | 0                   |
| 0                   | 0                   | 0                   | 0                   |
| 0.5000              | 0.5000              | 0.5000              | 0.5000              |
| −0.3536 + 0.3536i   | −0.4157 + 0.2778i   | −0.4619 + 0.1913i   | −0.4904 + 0.0975i   |
| −0.0000 − 0.5000i   | 0.1913 − 0.4619i    | 0.3536 − 0.3536i    | 0.4619 − 0.1913i    |
| 0.3536 + 0.3536i    | 0.0975 + 0.4904i    | −0.1913 + 0.4619i   | −0.4157 + 0.2778i   | ans(:, :, 4) =
Columns 1 through 4

|                     |                     |                     |                     |
|---------------------|---------------------|---------------------|---------------------|
| 0.5000              | 0.5000              | 0.5000              | 0.5000              |
| −0.3536 + 0.3536i   | −0.4157 + 0.2778i   | −0.4619 + 0.1913i   | −0.4904 + 0.0975i   |
| −0.0000 − 0.5000i   | 0.1913 − 0.4619i    | 0.3536 − 0.3536i    | 0.4619 − 0.1913i    |
| 0.3536 + 0.3536i    | 0.0975 + 0.4904i    | −0.1913 + 0.4619i   | −0.4157 + 0.2778i   |
| 0                   | 0                   | 0                   | 0                   |
| 0                   | 0                   | 0                   | 0                   |
| 0                   | 0                   | 0                   | 0                   |
| 0                   | 0                   | 0                   | 0                   |

Columns 5 through 8

|                     |                     |                     |                     |
|---------------------|---------------------|---------------------|---------------------|
| 0.5000              | 0.5000              | 0.5000              | 0.5000              |
| −0.5000 + 0.0000i   | −0.4904 − 0.0975i   | −0.4619 − 0.1913i   | −0.4157 − 0.2778i   |
| 0.5000 − 0.0000i    | 0.4619 + 0.1913i    | 0.3536 + 0.3536i    | 0.1913 + 0.4619i    |
| −0.5000 + 0.0000i   | −0.4157 − 0.2778i   | −0.1913 − 0.4619i   | 0.0975 − 0.4904i    |
| 0                   | 0                   | 0                   | 0                   |
| 0                   | 0                   | 0                   | 0                   |
| 0                   | 0                   | 0                   | 0                   |
| 0                   | 0                   | 0                   | 0                   |

Columns 9 through 12

|                     |                     |                     |                     |
|---------------------|---------------------|---------------------|---------------------|
| 0                   | 0                   | 0                   | 0                   |
| 0                   | 0                   | 0                   | 0                   |
| 0                   | 0                   | 0                   | 0                   |
| 0                   | 0                   | 0                   | 0                   |
| 0.5000              | 0.5000              | 0.5000              | 0.5000              |
| −0.3536 + 0.3536i   | −0.4157 + 0.2778i   | −0.4619 + 0.1913i   | −0.4904 + 0.0975i   |
| −0.0000 − 0.5000i   | 0.1913 − 0.4619i    | 0.3536 − 0.3536i    | 0.4619 − 0.1913i    |
| 0.3536 + 0.3536i    | 0.0975 + 0.4904i    | −0.1913 + 0.4619i   | −0.4157 + 0.2778i   |

Columns 13 through 16

|                     |                     |                     |                     |
|---------------------|---------------------|---------------------|---------------------|
| 0                   | 0                   | 0                   | 0                   |
| 0                   | 0                   | 0                   | 0                   |
| 0                   | 0                   | 0                   | 0                   |
| 0                   | 0                   | 0                   | 0                   |
| 0.5000              | 0.5000              | 0.5000              | 0.5000              |
| −0.5000 + 0.0000i   | −0.4904 − 0.0975i   | −0.4619 − 0.1913i   | −0.4157 − 0.2778i   |
| 0.5000 − 0.0000i    | 0.4619 + 0.1913i    | 0.3536 + 0.3536i    | 0.1913 + 0.4619i    |
| −0.5000 + 0.0000i   | −0.4157 − 0.2778i   | −0.1913 − 0.4619i   | 0.0975 − 0.4904i    | ans(:, :, 5) =
Columns 1 through 4

|                     |                     |                     |                     |
|---------------------|---------------------|---------------------|---------------------|
| 0.5000              | 0.5000              | 0.5000              | 0.5000              |
| −0.5000 + 0.0000i   | −0.4904 − 0.0975i   | −0.4619 − 0.1913i   | −0.4157 − 0.2778i   |
| 0.5000 − 0.0000i    | 0.4619 + 0.1913i    | 0.3536 + 0.3536i    | 0.1913 + 0.4619i    |
| −0.5000 + 0.0000i   | −0.4157 − 0.2778i   | −0.1913 − 0.4619i   | 0.0975 − 0.4904i    |
| 0                   | 0                   | 0                   | 0                   |
| 0                   | 0                   | 0                   | 0                   |
| 0                   | 0                   | 0                   | 0                   |
| 0                   | 0                   | 0                   | 0                   |

Columns 5 through 8

|                     |                     |                     |                     |
|---------------------|---------------------|---------------------|---------------------|
| 0.5000              | 0.5000              | 0.5000              | 0.5000              |
| −0.3536 − 0.3536i   | −0.2778 − 0.4157i   | −0.1913 − 0.4619i   | −0.0975 − 0.4904i   |
| 0.0000 + 0.5000i    | −0.1913 + 0.4619i   | −0.3536 + 0.3536i   | −0.4619 + 0.1913i   |
| 0.3536 − 0.3536i    | 0.4904 − 0.0975i    | 0.4619 + 0.1913i    | 0.2778 + 0.4157i    |
| 0                   | 0                   | 0                   | 0                   |
| 0                   | 0                   | 0                   | 0                   |
| 0                   | 0                   | 0                   | 0                   |
| 0                   | 0                   | 0                   | 0                   |

Columns 9 through 12

|                     |                     |                     |
|---------------------|---------------------|---------------------|
| 0                   | 0                   | 0                   |
| 0                   | 0                   | 0                   |

-continued

Columns 9 through 12

| | | |
|---|---|---|
| 0 | 0 | 0 |
| 0 | 0 | 0 |
| 0.5000 | 0.5000 | 0.5000 |
| −0.5000 + 0.0000i | −0.4904 − 0.0975i | −0.4619 − 0.1913i |
| 0.5000 − 0.0000i | 0.4619 + 0.1913i | 0.3536 + 0.3536i |
| −0.5000 + 0.0000i | −0.4157 − 0.2778i | −0.1913 − 0.4619i |

Columns 13 through 16

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.5000 | | | |
| −0.4157 − 0.2778i | −0.3536 − 0.3536i | −0.2778 − 0.4157i | −0.1913 − 0.4619i | −0.0975 − 0.4904i |
| 0.1913 + 0.4619i | 0.0000 + 0.5000i | −0.1913 + 0.4619i | −0.3536 + 0.3536i | −0.4619 + 0.1913i |
| 0.0975 − 0.4904i | 0.3536 − 0.3536i | 0.4904 − 0.0975i | 0.4619 + 0.1913i | 0.2778 + 0.4157i | ans(:, :, 6) =

Columns 1 through 4

| | | | |
|---|---|---|---|
| 0.5000 | 0.5000 | 0.5000 | 0.5000 |
| −0.3536 − 0.3536i | −0.2778 − 0.4157i | −0.1913 − 0.4619i | −0.0975 − 0.4904i |
| 0.0000 + 0.5000i | −0.1913 + 0.4619i | −0.3536 + 0.3536i | −0.4619 + 0.1913i |
| 0.3536 − 0.3536i | 0.4904 − 0.0975i | 0.4619 + 0.1913i | 0.2778 + 0.4157i |
| 0 | 0 | 0 | 0 |
| 0 | 0 | 0 | 0 |
| 0 | 0 | 0 | 0 |
| 0 | 0 | 0 | 0 |

Columns 5 through 8

| | | | |
|---|---|---|---|
| 0.5000 | 0.5000 | 0.5000 | 0.5000 |
| −0.0000 − 0.5000i | 0.0975 − 0.4904i | 0.1913 − 0.4619i | 0.2778 − 0.4157i |
| −0.5000 + 0.0000i | −0.4619 − 0.1913i | −0.3536 − 0.3536i | −0.1913 − 0.4619i |
| 0.0000 + 0.5000i | −0.2778 + 0.4157i | −0.4619 + 0.1913i | −0.4904 − 0.0975i |
| 0 | 0 | 0 | 0 |
| 0 | 0 | 0 | 0 |
| 0 | 0 | 0 | 0 |
| 0 | 0 | 0 | 0 |

Columns 9 through 12

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.3536 − 0.3536i | −0.2778 − 0.4157i | −0.1913 − 0.4619i | −0.0975 − 0.4904i |
| 0.0000 + 0.5000i | −0.1913 + 0.4619i | −0.3536 + 0.3536i | −0.4619 + 0.1913i |
| 0.3536 − 0.3536i | 0.4904 − 0.0975i | 0.4619 + 0.1913i | 0.2778 + 0.4157i |

Columns 13 through 16

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.0000 − 0.5000i | 0.0975 − 0.4904i | 0.1913 − 0.4619i | 0.2778 − 0.4157i |
| −0.5000 + 0.0000i | −0.4619 − 0.1913i | −0.3536 − 0.3536i | −0.1913 − 0.4619i |
| 0.0000 + 0.5000i | −0.2778 + 0.4157i | −0.4619 + 0.1913i | −0.4904 − 0.0975i | ans(:, :, 7) =

Columns 1 through 4

| | | | |
|---|---|---|---|
| 0.5000 | 0.5000 | 0.5000 | 0.5000 |
| −0.0000 − 0.5000i | 0.0975 − 0.4904i | 0.1913 − 0.4619i | 0.2778 − 0.4157i |
| −0.5000 + 0.0000i | −0.4619 − 0.1913i | −0.3536 − 0.3536i | −0.1913 − 0.4619i |
| 0.0000 + 0.5000i | −0.2778 + 0.4157i | −0.4619 + 0.1913i | −0.4904 − 0.0975i |
| 0 | 0 | 0 | 0 |
| 0 | 0 | 0 | 0 |
| 0 | 0 | 0 | 0 |
| 0 | 0 | 0 | 0 |

Columns 5 through 8

| | | | |
|---|---|---|---|
| 0.5000 | 0.5000 | 0.5000 | 0.5000 |
| 0.3536 − 0.3536i | 0.4157 − 0.2778i | 0.4619 − 0.1913i | 0.4904 − 0.0975i |
| −0.0000 − 0.5000i | 0.1913 − 0.4619i | 0.3536 − 0.3536i | 0.4619 − 0.1913i |
| −0.3536 − 0.3536i | −0.0975 − 0.4904i | 0.1913 − 0.4619i | 0.4157 − 0.2778i |
| 0 | 0 | 0 | 0 |
| 0 | 0 | 0 | 0 |
| 0 | 0 | 0 | 0 |
| 0 | 0 | 0 | 0 |

-continued

| Columns 9 through 12 | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.0000 − 0.5000i | 0.0975 − 0.4904i | 0.1913 − 0.4619i | 0.2778 − 0.4157i |
| −0.5000 + 0.0000i | −0.4619 − 0.1913i | −0.3536 − 0.3536i | −0.1913 − 0.4619i |
| 0.0000 + 0.5000i | −0.2778 + 0.4157i | −0.4619 + 0.1913i | −0.4904 − 0.0975i |

| Columns 13 through 16 | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.3536 − 0.3536i | 0.4157 − 0.2778i | 0.4619 − 0.1913i | 0.4904 − 0.0975i |
| −0.0000 − 0.5000i | 0.1913 − 0.4619i | 0.3536 − 0.3536i | 0.4619 − 0.1913i |
| −0.3536 − 0.3536i | −0.0975 − 0.4904i | 0.1913 − 0.4619i | 0.4157 − 0.2778i | ans(:, :, 8) =

| Columns 1 through 4 | | | |
|---|---|---|---|
| 0.5000 | 0.5000 | 0.5000 | 0.5000 |
| 0.3536 − 0.3536i | 0.4157 − 0.2778i | 0.4619 − 0.1913i | 0.4904 − 0.0975i |
| −0.0000 − 0.5000i | 0.1913 − 0.4619i | 0.3536 − 0.3536i | 0.4619 − 0.1913i |
| −0.3536 − 0.3536i | −0.0975 − 0.4904i | 0.1913 − 0.4619i | 0.4157 − 0.2778i |
| 0 | 0 | 0 | 0 |
| 0 | 0 | 0 | 0 |
| 0 | 0 | 0 | 0 |
| 0 | 0 | 0 | 0 |

| Columns 5 through 8 | | | |
|---|---|---|---|
| 0.5000 | 0.5000 | 0.5000 | 0.5000 |
| 0.5000 | 0.4904 + 0.0975i | 0.4619 + 0.1913i | 0.4157 + 0.2778i |
| 0.5000 | 0.4619 + 0.1913i | 0.3536 + 0.3536i | 0.1913 + 0.4619i |
| 0.5000 | 0.4157 + 0.2778i | 0.1913 + 0.4619i | −0.0975 + 0.4904i |
| 0 | 0 | 0 | 0 |
| 0 | 0 | 0 | 0 |
| 0 | 0 | 0 | 0 |
| 0 | 0 | 0 | 0 |

| Columns 9 through 12 | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.3536 − 0.3536i | 0.4157 − 0.2778i | 0.4619 − 0.1913i | 0.4904 − 0.0975i |
| −0.0000 − 0.5000i | 0.1913 − 0.4619i | 0.3536 − 0.3536i | 0.4619 − 0.1913i |
| −0.3536 − 0.3536i | −0.0975 − 0.4904i | 0.1913 − 0.4619i | 0.4157 − 0.2778i |

| Columns 13 through 16 | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.5000 | 0.4904 + 0.0975i | 0.4619 + 0.1913i | 0.4157 + 0.2778i |
| 0.5000 | 0.4619 + 0.1913i | 0.3536 + 0.3536i | 0.1913 + 0.4619i |
| 0.5000 | 0.4157 + 0.2778i | 0.1913 + 0.4619i | −0.0975 + 0.4904i |

Rank 5 and 6 and 7 and 8 ans(:, :, 1) =

| Columns 1 through 4 | | | |
|---|---|---|---|
| 0.5000 | 0.5000 | 0.5000 | 0.5000 |
| 0.5000 | 0 + 0.5000i | −0.5000 | 0 − 0.5000i |
| 0.5000 | −0.5000 | 0.5000 | −0.5000 |
| 0.5000 | 0 − 0.5000i | −0.5000 | 0 + 0.5000i |
| 0 | 0 | 0 | 0 |
| 0 | 0 | 0 | 0 |
| 0 | 0 | 0 | 0 |
| 0 | 0 | 0 | 0 |

| Columns 5 through 8 | | | |
|---|---|---|---|
| 0 | 0 | 0 | 0 |
| 0 | 0 | 0 | 0 |

-continued ans(:, :, 2) =
Columns 1 through 4

| | | | |
|---|---|---|---|
| 0 | 0 | 0 | 0 |
| 0 | 0 | 0 | 0 |
| 0.5000 | 0.5000 | 0.5000 | 0.5000 |
| 0.5000 | 0 + 0.5000i | −0.5000 | 0 − 0.5000i |
| 0.5000 | −0.5000 | 0.5000 | −0.5000 |
| 0.5000 | 0 − 0.5000i | −0.5000 | 0 + 0.5000i |

Columns 1 through 4

| | | | |
|---|---|---|---|
| 0.5000 | 0.5000 | 0.5000 | 0.5000 |
| 0.3536 + 0.3536i | −0.3536 + 0.3536i | −0.3536 − 0.3536i | 0.3536 − 0.3536i |
| 0.0000 + 0.5000i | −0.0000 − 0.5000i | 0.0000 + 0.5000i | −0.0000 − 0.5000i |
| −0.3536 + 0.3536i | 0.3536 + 0.3536i | 0.3536 − 0.3536i | −0.3536 − 0.3536i |
| 0 | 0 | 0 | 0 |
| 0 | 0 | 0 | 0 |
| 0 | 0 | 0 | 0 |
| 0 | 0 | 0 | 0 |

Columns 5 through 8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.3536 + 0.3536i | −0.3536 + 0.3536i | −0.3536 − 0.3536i | 0.3536 − 0.3536i |
| 0.0000 + 0.5000i | −0.0000 − 0.5000i | 0.0000 + 0.5000i | −0.0000 − 0.5000i |
| −0.3536 + 0.3536i | 0.3536 + 0.3536i | 0.3536 − 0.3536i | −0.3536 − 0.3536i | ans(:, :, 3) =
Columns 1 through 4

| | | | |
|---|---|---|---|
| 0.5000 | 0.5000 | 0.5000 | 0.5000 |
| 0.4619 + 0.1913i | −0.1913 + 0.4619i | −0.4619 − 0.1913i | 0.1913 − 0.4619i |
| 0.3536 + 0.3536i | −0.3536 − 0.3536i | 0.3536 + 0.3536i | −0.3536 − 0.3536i |
| 0.1913 + 0.4619i | 0.4619 − 0.1913i | −0.1913 − 0.4619i | −0.4619 + 0.1913i |
| 0 | 0 | 0 | 0 |
| 0 | 0 | 0 | 0 |
| 0 | 0 | 0 | 0 |
| 0 | 0 | 0 | 0 |

Columns 5 through 8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.4619 + 0.1913i | −0.1913 + 0.4619i | −0.4619 − 0.1913i | 0.1913 − 0.4619i |
| 0.3536 + 0.3536i | −0.3536 − 0.3536i | 0.3536 + 0.3536i | −0.3536 − 0.3536i |
| 0.1913 + 0.4619i | 0.4619 − 0.1913i | −0.1913 − 0.4619i | −0.4619 + 0.1913i | ans(:, :, 4) =
Columns 1 through 4

| | | | |
|---|---|---|---|
| 0.5000 | 0.5000 | 0.5000 | 0.5000 |
| 0.1913 + 0.4619i | −0.4619 + 0.1913i | −0.1913 − 0.4619i | 0.4619 − 0.1913i |
| −0.3536 + 0.3536i | 0.3536 − 0.3536i | −0.3536 + 0.3536i | 0.3536 − 0.3536i |
| −0.4619 − 0.1913i | −0.1913 + 0.4619i | 0.4619 + 0.1913i | 0.1913 − 0.4619i |
| 0 | 0 | 0 | 0 |
| 0 | 0 | 0 | 0 |
| 0 | 0 | 0 | 0 |
| 0 | 0 | 0 | 0 |

Columns 5 through 8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.1913 + 0.4619i | −0.4619 + 0.1913i | −0.1913 − 0.4619i | 0.4619 − 0.1913i |
| −0.3536 + 0.3536i | 0.3536 − 0.3536i | −0.3536 + 0.3536i | 0.3536 − 0.3536i |
| −0.4619 − 0.1913i | −0.1913 + 0.4619i | 0.4619 + 0.1913i | 0.1913 − 0.4619i |

Detailed Digits of Second Codebook $C_2$

Hereinafter, digits of codewords belonging to the second codebook $C_2$ for a variety of ranks will be described in detail. (:,:,n) corresponds to an $n^{th}$ codeword in a second codebook corresponding to a corresponding transmission rank. Each of codewords may include at least one column vector.

- Rank 1

(:, :, 1) =

0.7071
0

$$\begin{bmatrix} 0 \\ 0 \\ 0.7071 \\ 0 \\ 0 \\ 0 \end{bmatrix}$$

(:, :, 2) =

$$\begin{bmatrix} 0.7071 \\ 0 \\ 0 \\ 0 \\ 0 + 0.7071i \\ 0 \\ 0 \\ 0 \end{bmatrix}$$

(:, :, 3) =

$$\begin{bmatrix} 0.7071 \\ 0 \\ 0 \\ 0 \\ -0.7071 \\ 0 \\ 0 \\ 0 \end{bmatrix}$$

(:, :, 4) =

$$\begin{bmatrix} 0.7071 \\ 0 \\ 0 \\ 0 \\ 0 - 0.7071i \\ 0 \\ 0 \\ 0 \end{bmatrix}$$

(:, :, 5) =

$$\begin{bmatrix} 0 \\ 0.7071 \\ 0 \\ 0 \\ 0 \\ 0.7071 \\ 0 \\ 0 \end{bmatrix}$$

(:, :, 6) =

$$\begin{bmatrix} 0 \\ 0.7071 \\ 0 \\ 0 \\ 0 \\ 0 + 0.7071i \\ 0 \\ 0 \end{bmatrix}$$

(:, :, 7) =

$$\begin{bmatrix} 0 \\ 0.7071 \\ 0 \\ 0 \\ 0 \\ -0.7071 \\ 0 \\ 0 \end{bmatrix}$$

(:, :, 8) =

$$\begin{bmatrix} 0 \\ 0.7071 \\ 0 \\ 0 \\ 0 \\ 0 - 0.7071i \\ 0 \\ 0 \end{bmatrix}$$

(:, :, 9) =

$$\begin{bmatrix} 0 \\ 0 \\ 0.7071 \\ 0 \\ 0 \\ 0 \\ 0.7071 \\ 0 \end{bmatrix}$$

(:, :, 10) =

$$\begin{bmatrix} 0 \\ 0 \\ 0.7071 \\ 0 \\ 0 \\ 0 \\ 0 + 0.7071i \\ 0 \end{bmatrix}$$

(:, :, 11) =

$$\begin{bmatrix} 0 \\ 0 \\ 0.7071 \\ 0 \\ 0 \\ 0 \\ -0.7071 \\ 0 \end{bmatrix}$$

(:, :, 12) =

$$\begin{bmatrix} 0 \\ 0 \\ 0.7071 \\ 0 \\ 0 \\ 0 \\ 0 - 0.7071i \\ 0 \end{bmatrix}$$

(:, :, 13) =

$$\begin{bmatrix} 0 \\ 0 \\ 0 \\ 0.7071 \\ 0 \\ 0 \\ 0 \\ 0.7071 \end{bmatrix}$$

(:, :, 14) =

$$\begin{bmatrix} 0 \\ 0 \\ 0 \\ 0.7071 \\ 0 \\ 0 \\ 0 \\ 0 + 0.7071i \end{bmatrix}$$

(:, :, 15) =

$$\begin{bmatrix} 0 \\ 0 \\ 0 \\ 0.7071 \\ 0 \\ 0 \\ 0 \\ -0.7071 \end{bmatrix}$$

(:, :, 16) =

$$\begin{bmatrix} 0 \\ 0 \\ 0 \\ 0.7071 \\ 0 \\ 0 \\ 0 \\ 0 - 0.7071i \end{bmatrix}$$

-continued

- Rank 2

(:, :, 1) =

| 0.5000 | 0.5000 |
| 0 | 0 |
| 0 | 0 |
| 0 | 0 |
| 0.5000 | −0.5000 |
| 0 | 0 |
| 0 | 0 |
| 0 | 0 |

(:, :, 2) =

| 0.5000 | 0.5000 |
| 0 | 0 |
| 0 | 0 |
| 0 | 0 |
| 0 + 0.5000i | 0 − 0.5000i |
| 0 | 0 |
| 0 | 0 |
| 0 | 0 |

(:, :, 3) =

| 0 | 0 |
| 0.5000 | 0.5000 |
| 0 | 0 |
| 0 | 0 |
| 0 | 0 |
| 0.5000 | −0.5000 |
| 0 | 0 |
| 0 | 0 |

(:, :, 4) =

| 0 | 0 |
| 0.5000 | 0.5000 |
| 0 | 0 |
| 0 | 0 |
| 0 | 0 |
| 0 + 0.5000i | 0 − 0.5000i |
| 0 | 0 |
| 0 | 0 |

(:, :, 5) =

| 0 | 0 |
| 0 | 0 |
| 0.5000 | 0.5000 |
| 0 | 0 |
| 0 | 0 |
| 0 | 0 |
| 0.5000 | −0.5000 |
| 0 | 0 |

(:, :, 6) =

| 0 | 0 |
| 0 | 0 |
| 0.5000 | 0.5000 |
| 0 | 0 |
| 0 | 0 |
| 0 | 0 |
| 0 + 0.5000i | 0 − 0.5000i |
| 0 | 0 |

(:, :, 7) =

| 0 | 0 |
| 0 | 0 |
| 0 | 0 |
| 0.5000 | 0.5000 |
| 0 | 0 |
| 0 | 0 |
| 0 | 0 |
| 0.5000 | −0.5000 |

(:, :, 8) =

| 0 | 0 |
| 0 | 0 |
| 0 | 0 |
| 0.5000 | 0.5000 |
| 0 | 0 |
| 0 | 0 |
| 0 + 0.5000i | 0 − 0.5000i |
| 0 | 0 |

(:, :, 9) =

| 0.5000 | 0 |
| 0 | 0.5000 |
| 0 | 0 |
| 0 | 0 |
| 0.5000 | 0 |
| 0 | −0.5000 |
| 0 | 0 |
| 0 | 0 |

(:, :, 10) =

| 0.5000 | 0 |
| 0 | 0.5000 |
| 0 | 0 |
| 0 | 0 |
| 0 + 0.5000i | 0 |
| 0 | 0 − 0.5000i |
| 0 | 0 |
| 0 | 0 |

(:, :, 11) =

| 0 | 0 |
| 0.5000 | 0 |
| 0 | 0.5000 |
| 0 | 0 |
| 0 | 0 |
| 0.5000 | 0 |
| 0 | −0.5000 |
| 0 | 0 |

(:, :, 12) =

| 0 | 0 |
| 0.5000 | 0 |
| 0 | 0.5000 |
| 0 | 0 |
| 0 | 0 |
| 0 + 0.5000i | 0 |
| 0 | 0 − 0.5000i |
| 0 | 0 |

(:, :, 13) =

| 0.5000 | 0 |
| 0 | 0 |
| 0 | 0 |
| 0 | 0.5000 |
| 0.5000 | 0 |
| 0 | 0 |
| 0 | 0 |
| 0 | −0.5000 |

(:, :, 14) =

| 0.5000 | 0 |
| 0 | 0 |
| 0 | 0 |
| 0 | 0.5000 |
| 0 + 0.5000i | 0 |
| 0 | 0 |
| 0 | 0 |
| 0 | 0 − 0.5000i |

(:, :, 15) =

| 0 | 0 |
| 0.5000 | 0 |
| 0 | 0.5000 |
| 0 | 0 |
| 0.5000 | 0 |
| 0 | 0 |
| 0 | 0 |
| 0 | −0.5000 |

(:, :, 16) =

| 0 | 0 |
| 0.5000 | 0 |
| 0 | 0 |
| 0 | 0.5000 |

-continued

```
            0                    0
      0 + 0.5000i                0
            0                    0
            0              0 - 0.5000i
```

- Rank 3 -

(:, :, 1) =

```
0.4082    0.4082     0
0         0          0
0         0          0
0         0          0.4082
0         0          0
0         0          0
0.4082   -0.4082     0
0         0          0
0         0          0
0         0         -0.4082
0         0          0
0         0          0
0         0          0
```

(:, :, 2) =

```
0         0.4082     0
0         0          0
0         0          0
0         0          0
0.4082    0          0.4082
0         0          0
0         0          0
0        -0.4082     0
0         0          0
0         0          0
0.4082    0         -0.4082
0         0          0
0         0          0
```

(:, :, 3) =

```
0.4082    0          0
0         0          0
0         0          0
0         0          0
0         0.4082     0.4082
0         0          0
0         0          0
0.4082    0          0
0         0          0
0         0          0
0         0.4082    -0.4082
0         0          0
0         0          0
```

(:, :, 4) =

```
0         0.4082     0.4082
0         0          0
0         0          0
0         0          0
0.4082    0          0
0         0          0
0         0          0
0         0.4082    -0.4082
0         0          0
0         0          0
0.4082    0          0
0         0          0
0         0          0
```

(:, :, 5) =

```
0         0          0
0.4082    0.4082     0
0         0          0
0         0          0
0         0          0.4082
0         0          0
0         0          0
0.4082   -0.4082     0
0         0          0
0         0          0
0         0         -0.4082
0         0          0
0         0          0
```

(:, :, 6) =

```
0         0          0
0         0.4082     0
0         0          0
0         0          0
0.4082    0          0.4082
0         0          0
0         0          0
0        -0.4082     0
0         0          0
0         0          0
0.4082    0         -0.4082
0         0          0
0         0          0
```

(:, :, 7) =

```
0         0          0
0.4082    0          0
0         0          0
0         0          0
0         0.4082     0.4082
0         0          0
0         0          0
0.4082    0          0
0         0          0
0         0          0
0         0.4082    -0.4082
0         0          0
0         0          0
```

(:, :, 8) =

```
0         0          0
0         0.4082     0.4082
0         0          0
0         0          0
0.4082    0          0
0         0          0
0         0          0
0         0.4082    -0.4082
0         0          0
0         0          0
0.4082    0          0
0         0          0
0         0          0
```

(:, :, 9) =

```
0         0          0
0         0          0
0.4082    0.4082     0
0         0          0
0         0          0
```

| | | |
|---|---|---|
| 0 | 0 | 0 |
| 0 | 0 | 0.4082 |
| 0 | 0 | 0 |
| 0 | 0 | 0 |
| 0 | 0 | 0 |
| 0.4082 | −0.4082 | 0 |
| 0 | 0 | 0 |
| 0 | 0 | 0 |
| 0 | 0 | −0.4082 |
| 0 | 0 | 0 |

(:, :, 10) =

| | | |
|---|---|---|
| 0 | 0 | 0 |
| 0 | 0 | 0 |
| 0 | 0.4082 | 0 |
| 0 | 0 | 0 |
| 0 | 0 | 0 |
| 0.4082 | 0 | 0.4082 |
| 0 | 0 | 0 |
| 0 | 0 | 0 |
| 0 | −0.4082 | 0 |
| 0 | 0 | 0 |
| 0 | 0 | 0 |
| 0.4082 | 0 | −0.4082 |
| 0 | 0 | 0 |

(:, :, 11) =

| | | |
|---|---|---|
| 0 | 0 | 0 |
| 0 | 0 | 0 |
| 0.4082 | 0 | 0 |
| 0 | 0 | 0 |
| 0 | 0 | 0 |
| 0 | 0.4082 | 0.4082 |
| 0 | 0 | 0 |
| 0 | 0 | 0 |
| 0.4082 | 0 | 0 |
| 0 | 0 | 0 |
| 0 | 0 | 0 |
| 0 | 0.4082 | −0.4082 |
| 0 | 0 | 0 |

(:, :, 12) =

| | | |
|---|---|---|
| 0 | 0 | 0 |
| 0 | 0.4082 | 0.4082 |
| 0 | 0 | 0 |
| 0 | 0 | 0 |
| 0.4082 | 0 | 0 |
| 0 | 0 | 0 |
| 0 | 0 | 0 |
| 0 | 0.4082 | −0.4082 |
| 0 | 0 | 0 |
| 0 | 0 | 0 |
| 0.4082 | 0 | 0 |
| 0 | 0 | 0 |

(:, :, 13) =

| | | |
|---|---|---|
| 0 | 0 | 0 |
| 0 | 0 | 0 |
| 0 | 0 | 0 |
| 0.4082 | 0.4082 | 0 |
| 0 | 0 | 0 |
| 0 | 0 | 0 |
| 0 | 0 | 0.4082 |
| 0 | 0 | 0 |
| 0 | 0 | 0 |
| 0 | 0 | 0 |
| 0.4082 | −0.4082 | 0 |

| | | |
|---|---|---|
| 0 | 0 | 0 |
| 0 | 0 | 0 |
| 0 | 0 | 0 |
| 0 | 0 | −0.4082 |

(:, :, 14) =

| | | |
|---|---|---|
| 0 | 0 | 0 |
| 0 | 0 | 0 |
| 0 | 0 | 0 |
| 0 | 0.4082 | 0 |
| 0 | 0 | 0 |
| 0 | 0 | 0 |
| 0 | 0 | 0 |
| 0.4082 | 0 | 0.4082 |
| 0 | 0 | 0 |
| 0 | 0 | 0 |
| 0 | −0.4082 | 0 |
| 0 | 0 | 0 |
| 0 | 0 | 0 |
| 0.4082 | 0 | −0.4082 |

(:, :, 15) =

| | | |
|---|---|---|
| 0 | 0 | 0 |
| 0 | 0 | 0 |
| 0.4082 | 0 | 0 |
| 0 | 0 | 0 |
| 0 | 0 | 0 |
| 0 | 0.4082 | 0.4082 |
| 0 | 0 | 0 |
| 0 | 0 | 0 |
| 0.4082 | 0 | 0 |
| 0 | 0 | 0 |
| 0 | 0 | 0 |
| 0 | 0.4082 | −0.4082 |

(:, :, 16) =

| | | |
|---|---|---|
| 0 | 0 | 0 |
| 0 | 0 | 0 |
| 0 | 0.4082 | 0.4082 |
| 0 | 0 | 0 |
| 0 | 0 | 0 |
| 0.4082 | 0 | 0 |
| 0 | 0 | 0 |
| 0 | 0 | 0 |
| 0 | 0.4082 | −0.4082 |
| 0 | 0 | 0 |
| 0 | 0 | 0 |
| 0.4082 | 0 | 0 |

- Rank 4

(:, :, 1) =

| | | | |
|---|---|---|---|
| 0.3536 | 0 | 0.3536 | 0 |
| 0 | 0 | 0 | 0 |
| 0 | 0 | 0 | 0 |
| 0 | 0 | 0 | 0 |
| 0 | 0.3536 | 0 | 0.3536 |
| 0 | 0 | 0 | 0 |
| 0 | 0 | 0 | 0 |
| 0.3536 | 0 | −0.3536 | 0 |
| 0 | 0 | 0 | 0 |
| 0 | 0 | 0 | 0 |
| 0 | 0.3536 | 0 | −0.3536 |
| 0 | 0 | 0 | 0 |
| 0 | 0 | 0 | 0 |

(:, :, 2) =

| 0.3536 | 0 | 0.3536 | 0 |
| 0 | 0 | 0 | 0 |
| 0 | 0 | 0 | 0 |
| 0 | 0 | 0 | 0 |
| 0 | 0.3536 | 0 | 0.3536 |
| 0 | 0 | 0 | 0 |
| 0 | 0 | 0 | 0 |
| 0 | 0 | 0 | 0 |
| 0 + 0.3536i | 0 | 0 − 0.3536i | 0 |
| 0 | 0 | 0 | 0 |
| 0 | 0 | 0 | 0 |
| 0 | 0 | 0 | 0 |
| 0 | 0 + 0.3536i | 0 | 0 − 0.3536i |
| 0 | 0 | 0 | 0 |
| 0 | 0 | 0 | 0 |
| 0 | 0 | 0 | 0 |

(:, :, 3) =

| 0 | 0 | 0 | 0 |
| 0.3536 | 0 | 0.3536 | 0 |
| 0 | 0 | 0 | 0 |
| 0 | 0 | 0 | 0 |
| 0 | 0.3536 | 0 | 0.3536 |
| 0 | 0 | 0 | 0 |
| 0 | 0 | 0 | 0 |
| 0 | 0 | 0 | 0 |
| 0.3536 | 0 | −0.3536 | 0 |
| 0 | 0 | 0 | 0 |
| 0 | 0 | 0 | 0 |
| 0 | 0 | 0 | 0 |
| 0 | 0.3536 | 0 | −0.3536 |
| 0 | 0 | 0 | 0 |
| 0 | 0 | 0 | 0 |
| 0 | 0 | 0 | 0 |

(:, :, 4) =

| 0 | 0 | 0 | 0 |
| 0.3536 | 0 | 0.3536 | 0 |
| 0 | 0 | 0 | 0 |
| 0 | 0 | 0 | 0 |
| 0 | 0.3536 | 0 | 0.3536 |
| 0 | 0 | 0 | 0 |
| 0 | 0 | 0 | 0 |
| 0 | 0 | 0 | 0 |
| 0 + 0.3536i | 0 | 0 − 0.3536i | 0 |
| 0 | 0 | 0 | 0 |
| 0 | 0 | 0 | 0 |
| 0 | 0 | 0 | 0 |
| 0 | 0 + 0.3536i | 0 | 0 − 0.3536i |
| 0 | 0 | 0 | 0 |
| 0 | 0 | 0 | 0 |
| 0 | 0 | 0 | 0 |

(:, :, 5) =

| 0 | 0 | 0 | 0 |
| 0 | 0 | 0 | 0 |
| 0.3536 | 0 | 0.3536 | 0 |
| 0 | 0 | 0 | 0 |
| 0 | 0 | 0 | 0 |
| 0 | 0.3536 | 0 | 0.3536 |
| 0 | 0 | 0 | 0 |
| 0 | 0 | 0 | 0 |
| 0 | 0 | 0 | 0 |
| 0.3536 | 0 | −0.3536 | 0 |
| 0 | 0 | 0 | 0 |
| 0 | 0 | 0 | 0 |
| 0 | 0 | 0 | 0 |
| 0 | 0.3536 | 0 | −0.3536 |
| 0 | 0 | 0 | 0 |
| 0 | 0 | 0 | 0 |

(:, :, 6) =

| 0 | 0 | 0 | 0 |
| 0 | 0 | 0 | 0 |
| 0.3536 | 0 | 0.3536 | 0 |
| 0 | 0 | 0 | 0 |
| 0 | 0 | 0 | 0 |
| 0 | 0.3536 | 0 | 0.3536 |
| 0 | 0 | 0 | 0 |
| 0 | 0 | 0 | 0 |
| 0 | 0 | 0 | 0 |
| 0 + 0.3536i | 0 | 0 − 0.3536i | 0 |
| 0 | 0 | 0 | 0 |
| 0 | 0 | 0 | 0 |
| 0 | 0 | 0 | 0 |
| 0 | 0 + 0.3536i | 0 | 0 − 0.3536i |
| 0 | 0 | 0 | 0 |
| 0 | 0 | 0 | 0 |

(:, :, 7) =

| 0 | 0 | 0 | 0 |
| 0 | 0 | 0 | 0 |
| 0 | 0 | 0 | 0 |
| 0.3536 | 0 | 0.3536 | 0 |
| 0 | 0 | 0 | 0 |
| 0 | 0 | 0 | 0 |
| 0 | 0.3536 | 0 | 0.3536 |
| 0 | 0 | 0 | 0 |
| 0 | 0 | 0 | 0 |
| 0 | 0 | 0 | 0 |
| 0.3536 | 0 | −0.3536 | 0 |
| 0 | 0 | 0 | 0 |
| 0 | 0 | 0 | 0 |
| 0 | 0 | 0 | 0 |
| 0 | 0.3536 | 0 | −0.3536 |
| 0 | 0 | 0 | 0 |

(:, :, 8) =

| 0 | 0 | 0 | 0 |
| 0 | 0 | 0 | 0 |
| 0 | 0 | 0 | 0 |
| 0.3536 | 0 | 0.3536 | 0 |
| 0 | 0 | 0 | 0 |
| 0 | 0 | 0 | 0 |
| 0 | 0.3536 | 0 | 0.3536 |
| 0 | 0 | 0 | 0 |
| 0 | 0 | 0 | 0 |
| 0 | 0 | 0 | 0 |
| 0 + 0.3536i | 0 | 0 − 0.3536i | 0 |
| 0 | 0 | 0 | 0 |
| 0 | 0 | 0 | 0 |
| 0 | 0 | 0 | 0 |
| 0 | 0 + 0.3536i | 0 | 0 − 0.3536i |

- Rank 5

(:, :, 1) =

| 0.3162 | 0.3162 | 0 | 0 | 0 |
| 0 | 0 | 0.3162 | 0.3162 | 0 |
| 0 | 0 | 0 | 0 | 0.3162 |
| 0 | 0 | 0 | 0 | 0 |
| 0.3162 | −0.3162 | 0 | 0 | 0 |
| 0 | 0 | 0.3162 | −0.3162 | 0 |
| 0 | 0 | 0 | 0 | 0.3162 |
| 0 | 0 | 0 | 0 | 0 |

- Rank 6

(:, :, 1) =

| 0.2887 | 0.2887 | 0 | 0 | 0 | 0 |
| 0 | 0 | 0.2887 | 0.2887 | 0 | 0 |
| 0 | 0 | 0 | 0 | 0.2887 | 0.2887 |
| 0 | 0 | 0 | 0 | 0 | 0 |
| 0.2887 | −0.2887 | 0 | 0 | 0 | 0 |
| 0 | 0 | 0.2887 | −0.2887 | 0 | 0 |
| 0 | 0 | 0 | 0 | 0.2887 | −0.2887 |
| 0 | 0 | 0 | 0 | 0 | 0 |

- Rank 7

(:, :, 1) =
columns 1-4

-continued

| | | | |
|---|---|---|---|
| 0.2673 | 0.2673 | 0 | 0 |
| 0 | 0 | 0.2673 | 0.2673 |
| 0 | 0 | 0 | 0 |
| 0 | 0 | 0 | 0 |
| 0.2673 | −0.2673 | 0 | 0 |
| 0 | 0 | 0.2673 | −0.2673 |
| 0 | 0 | 0 | 0 |
| 0 | 0 | 0 | 0 | columns 5-7

| | | |
|---|---|---|
| 0 | 0 | 0 |
| 0 | 0 | 0 |
| 0.2673 | 0.2673 | 0 |
| 0 | 0 | 0.2673 |
| 0 | 0 | 0 |
| 0 | 0 | 0 |
| 0.2673 | −0.2673 | 0 |
| 0 | 0 | 0.2673 |

- Rank 8

(:, :, 1) =
columns 1-4

| | | | |
|---|---|---|---|
| 0.2500 | 0.2500 | 0 | 0 |
| 0 | 0 | 0.2500 | 0.2500 |
| 0 | 0 | 0 | 0 |
| 0 | 0 | 0 | 0 |
| 0.2500 | −0.2500 | 0 | 0 |
| 0 | 0 | 0.2500 | −0.2500 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0.2500 | 0.2500 | 0 | 0 |
| 0 | 0 | 0.2500 | 0.2500 |
| 0 | 0 | 0 | 0 |
| 0 | 0 | 0 | 0 |
| 0.2500 | −0.2500 | 0 | 0 |
| 0 | 0 | 0.2500 | −0.2500 |

Detailed Digits of Overall Codebook C

A final precoding matrix candidate may be induced by performing inner product with respect to one of codewords belonging to the first codebook $C_1$ and one of codewords belonging to the second codebook $C_2$. That is, the receiver may select a single codeword from the codewords belonging to the first codebook $C_1$ and may select a single codeword from the codewords belonging to the second codebook $C_2$. A combination of the selected two codewords may indicate one of codewords belonging to the overall codebook C, which is described below.

Hereinafter, ans(:,:;m,n) for rank r may indicate an inter product between ans(:,:;m) in the first codebook $C_1$ for rank r and (:,:,n) in the second codebook $C_2$ for rank r. That is, ans(:,:;m,n)=ans(:,:;m) (:,:,n).

For a variety of ranks, the detailed digits of the overall codebook C may be expressed as follows:

---

Rank 1 ans(:, :, 1, 1) =

0.3536
0.3536
0.3536
0.3536
0.3536
0.3536
0.3536
0.3536 ans(:, :, 2, 1) =

0.3536
0.3266 + 0.1353i
0.2500 + 0.2500i
0.1353 + 0.3266i
0.3536
0.3266 + 0.1353i
0.2500 + 0.2500i
0.1353 + 0.3266i ans(:, :, 3, 1) =

0.3536
0.2500 + 0.2500i
0.0000 + 0.3536i
−0.2500 + 0.2500i
0.3536
0.2500 + 0.2500i
0.0000 + 0.3536i
−0.2500 + 0.2500i ans(:, :, 4, 1) =

0.3536
0.1353 + 0.3266i
−0.2500 + 0.2500i
−0.3266 − 0.1353i
0.3536
0.1353 + 0.3266i
−0.2500 + 0.2500i
−0.3266 − 0.1353i

-continued ans(:, :, 5, 1) =

0.3536
0.0000 + 0.3536i
−0.3536 + 0.0000i
−0.0000 − 0.3536i
0.3536
0.0000 + 0.3536i
−0.3536 + 0.0000i
−0.0000 − 0.3536i ans(:, :, 6, 1) =

0.3536
−0.1353 + 0.3266i
−0.2500 − 0.2500i
0.3266 − 0.1353i
0.3536
−0.1353 + 0.3266i
−0.2500 − 0.2500i
0.3266 − 0.1353i ans(:, :, 7, 1) =

0.3536
−0.2500 + 0.2500i
−0.0000 − 0.3536i
0.2500 + 0.2500i
0.3536
−0.2500 + 0.2500i
−0.0000 − 0.3536i
0.2500 + 0.2500i ans(:, :, 8, 1) =

0.3536
−0.3266 + 0.1353i
0.2500 − 0.2500i
−0.1353 + 0.3266i
0.3536
−0.3266 + 0.1353i
0.2500 − 0.2500i
−0.1353 + 0.3266i ans(:, :, 9, 1) =

0.3536
−0.3536 + 0.0000i
0.3536 − 0.0000i
−0.3536 + 0.0000i
0.3536
−0.3536 + 0.0000i
0.3536 − 0.0000i
−0.3536 + 0.0000i ans(:, :, 10, 1) =

0.3536
−0.3266 − 0.1353i
0.2500 + 0.2500i
−0.1353 − 0.3266i
0.3536
−0.3266 − 0.1353i
0.2500 + 0.2500i
−0.1353 − 0.3266i ans(:, :, 11, 1) =

0.3536
−0.2500 − 0.2500i
0.0000 + 0.3536i
0.2500 − 0.2500i
0.3536
−0.2500 − 0.2500i
0.0000 + 0.3536i
0.2500 − 0.2500i ans(:, :, 12, 1) =

0.3536
−0.1353 − 0.3266i
−0.2500 + 0.2500i
0.3266 + 0.1353i
0.3536
−0.1353 − 0.3266i

-continued

−0.2500 + 0.2500i
0.3266 + 0.1353i
ans(:, :, 13, 1) =

0.3536
−0.0000 − 0.3536i
−0.3536 + 0.0000i
0.0000 + 0.3536i
0.3536
−0.0000 − 0.3536i
−0.3536 + 0.0000i
0.0000 + 0.3536i
ans(:, :, 14, 1) =

0.3536
0.1353 − 0.3266i
−0.2500 − 0.2500i
−0.3266 + 0.1353i
0.3536
0.1353 − 0.3266i
−0.2500 − 0.2500i
−0.3266 + 0.1353i
ans(:, :, 15, 1) =

0.3536
0.2500 − 0.2500i
−0.0000 − 0.3536i
−0.2500 − 0.2500i
0.3536
0.2500 − 0.2500i
−0.0000 − 0.3536i
−0.2500 − 0.2500i
ans(:, :, 16, 1) =

0.3536
0.3266 − 0.1353i
0.2500 − 0.2500i
0.1353 − 0.3266i
0.3536
0.3266 − 0.1353i
0.2500 − 0.2500i
0.1353 − 0.3266i
ans(:, :, 1, 2) =

0.3536
0.3536
0.3536
0.3536
0 + 0.3536i
0 + 0.3536i
0 + 0.3536i
0 + 0.3536i
ans(:, :, 2, 2) =

0.3536
0.3266 + 0.1353i
0.2500 + 0.2500i
0.1353 + 0.3266i
0 + 0.3536i
−0.1353 + 0.3266i
−0.2500 + 0.2500i
−0.3266 + 0.1353i
ans(:, :, 3, 2) =

0.3536
0.2500 + 0.2500i
0.0000 + 0.3536i
−0.2500 + 0.2500i
0 + 0.3536i
−0.2500 + 0.2500i
−0.3536 + 0.0000i
−0.2500 − 0.2500i
ans(:, :, 4, 2) =

0.3536
0.1353 + 0.3266i
−0.2500 + 0.2500i
−0.3266 − 0.1353i
0 + 0.3536i

-continued

−0.3266 + 0.1353i
−0.2500 − 0.2500i
0.1353 − 0.3266i
ans(:, :, 5, 2) =

0.3536
0.0000 + 0.3536i
−0.3536 + 0.0000i
−0.0000 − 0.3536i
0 + 0.3536i
−0.3536 + 0.0000i
−0.0000 − 0.3536i
0.3536 − 0.0000i
ans(:, :, 6, 2) =

0.3536
−0.1353 + 0.3266i
−0.2500 − 0.2500i
0.3266 − 0.1353i
0 + 0.3536i
−0.3266 − 0.1353i
0.2500 − 0.2500i
0.1353 + 0.3266i
ans(:, :, 7, 2) =

0.3536
−0.2500 + 0.2500i
−0.0000 − 0.3536i
0.2500 + 0.2500i
0 + 0.3536i
−0.2500 − 0.2500i
0.3536 − 0.0000i
−0.2500 + 0.2500i
ans(:, :, 8, 2) =

0.3536
−0.3266 + 0.1353i
0.2500 − 0.2500i
−0.1353 + 0.3266i
0 + 0.3536i
−0.1353 − 0.3266i
0.2500 + 0.2500i
−0.3266 − 0.1353i
ans(:, :, 9, 2) =

0.3536
−0.3536 + 0.0000i
0.3536 − 0.0000i
−0.3536 + 0.0000i
0 + 0.3536i
−0.0000 − 0.3536i
0.0000 + 0.3536i
−0.0000 − 0.3536i
ans(:, :, 10, 2) =

0.3536
−0.3266 − 0.1353i
0.2500 + 0.2500i
−0.1353 − 0.3266i
0 + 0.3536i
0.1353 − 0.3266i
−0.2500 + 0.2500i
0.3266 − 0.1353i
ans(:, :, 11, 2) =

0.3536
−0.2500 − 0.2500i
0.0000 + 0.3536i
0.2500 − 0.2500i
0 + 0.3536i
0.2500 − 0.2500i
−0.3536 + 0.0000i
0.2500 + 0.2500i
ans(:, :, 12, 2) =

0.3536
−0.1353 − 0.3266i
−0.2500 + 0.2500i
0.3266 + 0.1353i

-continued

```
          0 + 0.3536i
     0.3266 − 0.1353i
    −0.2500 − 0.2500i
    −0.1353 + 0.3266i
ans(:, :, 13, 2) =

0.3536
    −0.0000 − 0.3536i
    −0.3536 + 0.0000i
     0.0000 + 0.3536i
          0 + 0.3536i
     0.3536 − 0.0000i
    −0.0000 − 0.3536i
    −0.3536 + 0.0000i
ans(:, :, 14, 2) =

0.3536
     0.1353 − 0.3266i
    −0.2500 − 0.2500i
    −0.3266 + 0.1353i
          0 + 0.3536i
     0.3266 + 0.1353i
     0.2500 − 0.2500i
    −0.1353 − 0.3266i
ans(:, :, 15, 2) =

0.3536
     0.2500 − 0.2500i
    −0.0000 − 0.3536i
    −0.2500 − 0.2500i
          0 + 0.3536i
     0.2500 + 0.2500i
     0.3536 − 0.0000i
     0.2500 − 0.2500i
ans(:, :, 16, 2) =

0.3536
     0.3266 − 0.1353i
     0.2500 − 0.2500i
     0.1353 − 0.3266i
          0 + 0.3536i
     0.1353 + 0.3266i
     0.2500 + 0.2500i
     0.3266 + 0.1353i
ans(:, :, 1, 3) =

0.3536
          0.3536
          0.3536
          0.3536
         −0.3536
         −0.3536
         −0.3536
         −0.3536
ans(:, :, 2, 3) =

0.3536
     0.3266 + 0.1353i
     0.2500 + 0.2500i
     0.1353 + 0.3266i
         −0.3536
    −0.3266 − 0.1353i
    −0.2500 − 0.2500i
    −0.1353 − 0.3266i
ans(:, :, 3, 3) =

0.3536
     0.2500 + 0.2500i
     0.0000 + 0.3536i
    −0.2500 + 0.2500i
         −0.3536
    −0.2500 − 0.2500i
    −0.0000 − 0.3536i
     0.2500 − 0.2500i
ans(:, :, 4, 3) =

0.3536
     0.1353 + 0.3266i
    −0.2500 + 0.2500i
```

```
            −0.3266 − 0.1353i
               −0.3536
            −0.1353 − 0.3266i
             0.2500 − 0.2500i
             0.3266 + 0.1353i
             ans(:, :, 5, 3) =

0.3536
             0.0000 + 0.3536i
            −0.3536 + 0.0000i
            −0.0000 − 0.3536i
               −0.3536
            −0.0000 − 0.3536i
             0.3536 − 0.0000i
             0.0000 + 0.3536i
             ans(:, :, 6, 3) =

0.3536
            −0.1353 + 0.3266i
            −0.2500 − 0.2500i
             0.3266 − 0.1353i
               −0.3536
             0.1353 − 0.3266i
             0.2500 + 0.2500i
            −0.3266 + 0.1353i
             ans(:, :, 7, 3) =

0.3536
            −0.2500 + 0.2500i
            −0.0000 − 0.3536i
             0.2500 + 0.2500i
               −0.3536
             0.2500 − 0.2500i
             0.0000 + 0.3536i
            −0.2500 − 0.2500i
             ans(:, :, 8, 3) =

0.3536
            −0.3266 + 0.1353i
             0.2500 − 0.2500i
            −0.1353 + 0.3266i
               −0.3536
             0.3266 − 0.1353i
            −0.2500 + 0.2500i
             0.1353 − 0.3266i
             ans(:, :, 9, 3) =

0.3536
            −0.3536 + 0.0000i
             0.3536 − 0.0000i
            −0.3536 + 0.0000i
               −0.3536
             0.3536 − 0.0000i
            −0.3536 + 0.0000i
             0.3536 − 0.0000i
             ans(:, :, 10, 3) =

0.3536
            −0.3266 − 0.1353i
             0.2500 + 0.2500i
            −0.1353 − 0.3266i
               −0.3536
             0.3266 + 0.1353i
            −0.2500 − 0.2500i
             0.1353 + 0.3266i
             ans(:, :, 11, 3) =

0.3536
            −0.2500 − 0.2500i
             0.0000 + 0.3536i
             0.2500 − 0.2500i
               −0.3536
             0.2500 + 0.2500i
            −0.0000 − 0.3536i
            −0.2500 + 0.2500i
             ans(:, :, 12, 3) =

0.3536
            −0.1353 − 0.3266i
```

-continued

−0.2500 + 0.2500i
0.3266 + 0.1353i
−0.3536
0.1353 + 0.3266i
0.2500 − 0.2500i
−0.3266 − 0.1353i ans(:, :, 13, 3) =

0.3536
−0.0000 − 0.3536i
−0.3536 + 0.0000i
0.0000 + 0.3536i
−0.3536
0.0000 + 0.3536i
0.3536 − 0.0000i
−0.0000 − 0.3536i ans(:, :, 14, 3) =

0.3536
0.1353 − 0.3266i
−0.2500 − 0.2500i
−0.3266 + 0.1353i
−0.3536
−0.1353 + 0.3266i
0.2500 + 0.2500i
0.3266 − 0.1353i ans(:, :, 15, 3) =

0.3536
0.2500 − 0.2500i
−0.0000 − 0.3536i
−0.2500 − 0.2500i
−0.3536
−0.2500 + 0.2500i
0.0000 + 0.3536i
0.2500 + 0.2500i ans(:, :, 16, 3) =

0.3536
0.3266 − 0.1353i
0.2500 − 0.2500i
0.1353 − 0.3266i
−0.3536
−0.3266 + 0.1353i
−0.2500 + 0.2500i
−0.1353 + 0.3266i ans(:, :, 1, 4) =

0.3536
0.3536
0.3536
0.3536
0 − 0.3536i
0 − 0.3536i
0 − 0.3536i
0 − 0.3536i ans(:, :, 2, 4) =

0.3536
0.3266 + 0.1353i
0.2500 + 0.2500i
0.1353 + 0.3266i
0 − 0.3536i
0.1353 − 0.3266i
0.2500 − 0.2500i
0.3266 − 0.1353i ans(:, :, 3, 4) =

0.3536
0.2500 + 0.2500i
0.0000 + 0.3536i
−0.2500 + 0.2500i
0 − 0.3536i
0.2500 − 0.2500i
0.3536 − 0.0000i
0.2500 + 0.2500i

-continued ans(:, :, 4, 4) =

0.3536
0.1353 + 0.3266i
−0.2500 + 0.2500i
−0.3266 − 0.1353i
0 − 0.3536i
0.3266 − 0.1353i
0.2500 + 0.2500i
−0.1353 + 0.3266i ans(:, :, 5, 4) =

0.3536
0.0000 + 0.3536i
−0.3536 + 0.0000i
−0.0000 − 0.3536i
0 − 0.3536i
0.3536 − 0.0000i
0.0000 + 0.3536i
−0.3536 + 0.0000i ans(:, :, 6, 4) =

0.3536
−0.1353 + 0.3266i
−0.2500 − 0.2500i
0.3266 − 0.1353i
0 − 0.3536i
0.3266 + 0.1353i
−0.2500 + 0.2500i
−0.1353 − 0.3266i ans(:, :, 7, 4) =

0.3536
−0.2500 + 0.2500i
−0.0000 − 0.3536i
0.2500 + 0.2500i
0 − 0.3536i
0.2500 + 0.2500i
−0.3536 + 0.0000i
0.2500 − 0.2500i ans(:, :, 8, 4) =

0.3536
−0.3266 + 0.1353i
0.2500 − 0.2500i
−0.1353 + 0.3266i
0 − 0.3536i
0.1353 + 0.3266i
−0.2500 − 0.2500i
0.3266 + 0.1353i ans(:, :, 9, 4) =

0.3536
−0.3536 + 0.0000i
0.3536 − 0.0000i
−0.3536 + 0.0000i
0 − 0.3536i
0.0000 + 0.3536i
−0.0000 − 0.3536i
0.0000 + 0.3536i ans(:, :, 10, 4) =

0.3536
−0.3266 − 0.1353i
0.2500 + 0.2500i
−0.1353 − 0.3266i
0 − 0.3536i
−0.1353 + 0.3266i
0.2500 − 0.2500i
−0.3266 + 0.1353i ans(:, :, 11, 4) =

0.3536
−0.2500 − 0.2500i
0.0000 + 0.3536i
0.2500 − 0.2500i
0 − 0.3536i
−0.2500 + 0.2500i

-continued $$
\begin{array}{c}
0.3536 - 0.0000i \\
-0.2500 - 0.2500i \\
\text{ans}(:, :, 12, 4) =
\end{array}
$$

$$
\begin{array}{c}
0.3536 \\
-0.1353 - 0.3266i \\
-0.2500 + 0.2500i \\
0.3266 + 0.1353i \\
0 - 0.3536i \\
-0.3266 + 0.1353i \\
0.2500 + 0.2500i \\
0.1353 - 0.3266i \\
\text{ans}(:, :, 13, 4) =
\end{array}
$$

$$
\begin{array}{c}
0.3536 \\
-0.0000 - 0.3536i \\
-0.3536 + 0.0000i \\
0.0000 + 0.3536i \\
0 - 0.3536i \\
-0.3536 + 0.0000i \\
0.0000 + 0.3536i \\
0.3536 - 0.0000i \\
\text{ans}(:, :, 14, 4) =
\end{array}
$$

$$
\begin{array}{c}
0.3536 \\
0.1353 - 0.3266i \\
-0.2500 - 0.2500i \\
-0.3266 + 0.1353i \\
0 - 0.3536i \\
-0.3266 - 0.1353i \\
-0.2500 + 0.2500i \\
0.1353 + 0.3266i \\
\text{ans}(:, :, 15, 4) =
\end{array}
$$

$$
\begin{array}{c}
0.3536 \\
0.2500 - 0.2500i \\
-0.0000 - 0.3536i \\
-0.2500 - 0.2500i \\
0 - 0.3536i \\
-0.2500 - 0.2500i \\
-0.3536 + 0.0000i \\
-0.2500 + 0.2500i \\
\text{ans}(:, :, 16, 4) =
\end{array}
$$

$$
\begin{array}{c}
0.3536 \\
0.3266 - 0.1353i \\
0.2500 - 0.2500i \\
0.1353 - 0.3266i \\
0 - 0.3536i \\
-0.1353 - 0.3266i \\
-0.2500 - 0.2500i \\
-0.3266 - 0.1353i \\
\text{ans}(:, :, 1, 5) =
\end{array}
$$

$$
\begin{array}{c}
0.3536 \\
0.3468 + 0.0690i \\
0.3266 + 0.1353i \\
0.2940 + 0.1964i \\
0.3536 \\
0.3468 + 0.0690i \\
0.3266 + 0.1353i \\
0.2940 + 0.1964i \\
\text{ans}(:, :, 2, 5) =
\end{array}
$$

$$
\begin{array}{c}
0.3536 \\
0.2940 + 0.1964i \\
0.1353 + 0.3266i \\
-0.0690 + 0.3468i \\
0.3536 \\
0.2940 + 0.1964i \\
0.1353 + 0.3266i \\
-0.0690 + 0.3468i \\
\text{ans}(:, :, 3, 5) =
\end{array}
$$

$$
\begin{array}{c}
0.3536 \\
0.1964 + 0.2940i \\
-0.1353 + 0.3266i \\
-0.3468 + 0.0690i \\
0.3536
\end{array}
$$

0.1964 + 0.2940i
−0.1353 + 0.3266i
−0.3468 + 0.0690i
ans(:, :, 4, 5) =

0.3536
0.0690 + 0.3468i
−0.3266 + 0.1353i
−0.1964 − 0.2940i
0.3536
0.0690 + 0.3468i
−0.3266 + 0.1353i
−0.1964 − 0.2940i
ans(:, :, 5, 5) =

0.3536
−0.0690 + 0.3468i
−0.3266 − 0.1353i
0.1964 − 0.2940i
0.3536
−0.0690 + 0.3468i
−0.3266 − 0.1353i
0.1964 − 0.2940i
ans(:, :, 6, 5) =

0.3536
−0.1964 + 0.2940i
−0.1353 − 0.3266i
0.3468 + 0.0690i
0.3536
−0.1964 + 0.2940i
−0.1353 − 0.3266i
0.3468 + 0.0690i
ans(:, :, 7, 5) =

0.3536
−0.2940 + 0.1964i
0.1353 − 0.3266i
0.0690 + 0.3468i
0.3536
−0.2940 + 0.1964i
0.1353 − 0.3266i
0.0690 + 0.3468i
ans(:, :, 8, 5) =

0.3536
−0.3468 + 0.0690i
0.3266 − 0.1353i
−0.2940 + 0.1964i
0.3536
−0.3468 + 0.0690i
0.3266 − 0.1353i
−0.2940 + 0.1964i
ans(:, :, 9, 5) =

0.3536
−0.3468 − 0.0690i
0.3266 + 0.1353i
−0.2940 − 0.1964i
0.3536
−0.3468 − 0.0690i
0.3266 + 0.1353i
−0.2940 − 0.1964i
ans(:, :, 10, 5) =

0.3536
−0.2940 − 0.1964i
0.1353 + 0.3266i
0.0690 − 0.3468i
0.3536
−0.2940 − 0.1964i
0.1353 + 0.3266i
0.0690 − 0.3468i
ans(:, :, 11, 5) =

0.3536
−0.1964 − 0.2940i
−0.1353 + 0.3266i
0.3468 − 0.0690i

-continued

```
           0.3536
-0.1964 − 0.2940i
-0.1353 + 0.3266i
 0.3468 − 0.0690i
ans(:, :, 12, 5) =

0.3536
-0.0690 − 0.3468i
-0.3266 + 0.1353i
 0.1964 + 0.2940i
           0.3536
-0.0690 − 0.3468i
-0.3266 + 0.1353i
 0.1964 + 0.2940i
ans(:, :, 13, 5) =

0.3536
 0.0690 − 0.3468i
-0.3266 − 0.1353i
-0.1964 + 0.2940i
           0.3536
 0.0690 − 0.3468i
-0.3266 − 0.1353i
-0.1964 + 0.2940i
ans(:, :, 14, 5) =

0.3536
 0.1964 − 0.2940i
-0.1353 − 0.3266i
-0.3468 − 0.0690i
           0.3536
 0.1964 − 0.2940i
-0.1353 − 0.3266i
-0.3468 − 0.0690i
ans(:, :, 15, 5) =

0.3536
 0.2940 − 0.1964i
 0.1353 − 0.3266i
-0.0690 − 0.3468i
           0.3536
 0.2940 − 0.1964i
 0.1353 − 0.3266i
-0.0690 − 0.3468i
ans(:, :, 16, 5) =

0.3536
 0.3468 − 0.0690i
 0.3266 − 0.1353i
 0.2940 − 0.1964i
           0.3536
 0.3468 − 0.0690i
 0.3266 − 0.1353i
 0.2940 − 0.1964i
ans(:, :, 1, 6) =

0.3536
 0.3468 + 0.0690i
 0.3266 + 0.1353i
 0.2940 + 0.1964i
      0 + 0.3536i
-0.0690 + 0.3468i
-0.1353 + 0.3266i
-0.1964 + 0.2940i
ans(:, :, 2, 6) =

0.3536
 0.2940 + 0.1964i
 0.1353 + 0.3266i
-0.0690 + 0.3468i
      0 + 0.3536i
-0.1964 + 0.2940i
-0.3266 + 0.1353i
-0.3468 − 0.0690i
ans(:, :, 3, 6) =

0.3536
 0.1964 + 0.2940i
-0.1353 + 0.3266i
```

```
       −0.3468 + 0.0690i
            0 + 0.3536i
       −0.2940 + 0.1964i
       −0.3266 − 0.1353i
       −0.0690 − 0.3468i
       ans(:, :, 4, 6) =

0.3536
        0.0690 + 0.3468i
       −0.3266 + 0.1353i
       −0.1964 − 0.2940i
            0 + 0.3536i
       −0.3468 + 0.0690i
       −0.1353 − 0.3266i
        0.2940 − 0.1964i
       ans(:, :, 5, 6) =

0.3536
       −0.0690 + 0.3468i
       −0.3266 − 0.1353i
        0.1964 − 0.2940i
            0 + 0.3536i
       −0.3468 − 0.0690i
        0.1353 − 0.3266i
        0.2940 + 0.1964i
       ans(:, :, 6, 6) =

0.3536
       −0.1964 + 0.2940i
       −0.1353 − 0.3266i
        0.3468 + 0.0690i
            0 + 0.3536i
       −0.2940 − 0.1964i
        0.3266 − 0.1353i
       −0.0690 + 0.3468i
       ans(:, :, 7, 6) =

0.3536
       −0.2940 + 0.1964i
        0.1353 − 0.3266i
        0.0690 + 0.3468i
            0 + 0.3536i
       −0.1964 − 0.2940i
        0.3266 + 0.1353i
       −0.3468 + 0.0690i
       ans(:, :, 8, 6) =

0.3536
       −0.3468 + 0.0690i
        0.3266 − 0.1353i
       −0.2940 + 0.1964i
            0 + 0.3536i
       −0.0690 − 0.3468i
        0.1353 + 0.3266i
       −0.1964 − 0.2940i
       ans(:, :, 9, 6) =

0.3536
       −0.3468 − 0.0690i
        0.3266 + 0.1353i
       −0.2940 − 0.1964i
            0 + 0.3536i
        0.0690 − 0.3468i
       −0.1353 + 0.3266i
        0.1964 − 0.2940i
       ans(:, :, 10, 6) =

0.3536
       −0.2940 − 0.1964i
        0.1353 + 0.3266i
        0.0690 − 0.3468i
            0 + 0.3536i
        0.1964 − 0.2940i
       −0.3266 + 0.1353i
        0.3468 + 0.0690i
       ans(:, :, 11, 6) =

0.3536
       −0.1964 − 0.2940i
```

-continued

−0.1353 + 0.3266i
0.3468 − 0.0690i
0 + 0.3536i
0.2940 − 0.1964i
−0.3266 − 0.1353i
0.0690 + 0.3468i ans(:, :, 12, 6) =

0.3536
−0.0690 − 0.3468i
−0.3266 + 0.1353i
0.1964 + 0.2940i
0 + 0.3536i
0.3468 − 0.0690i
−0.1353 − 0.3266i
−0.2940 + 0.1964i ans(:, :, 13, 6) =

0.3536
0.0690 − 0.3468i
−0.3266 − 0.1353i
−0.1964 + 0.2940i
0 + 0.3536i
0.3468 + 0.0690i
0.1353 − 0.3266i
−0.2940 − 0.1964i ans(:, :, 14, 6) =

0.3536
0.1964 − 0.2940i
−0.1353 − 0.3266i
−0.3468 − 0.0690i
0 + 0.3536i
0.2940 + 0.1964i
0.3266 − 0.1353i
0.0690 − 0.3468i ans(:, :, 15, 6) =

0.3536
0.2940 − 0.1964i
0.1353 − 0.3266i
−0.0690 − 0.3468i
0 + 0.3536i
0.1964 + 0.2940i
0.3266 + 0.1353i
0.3468 − 0.0690i ans(:, :, 16, 6) =

0.3536
0.3468 − 0.0690i
0.3266 − 0.1353i
0.2940 − 0.1964i
0 + 0.3536i
0.0690 + 0.3468i
0.1353 + 0.3266i
0.1964 + 0.2940i ans(:, :, 1, 7) =

0.3536
0.3468 + 0.0690i
0.3266 + 0.1353i
0.2940 + 0.1964i
−0.3536
−0.3468 − 0.0690i
−0.3266 − 0.1353i
−0.2940 − 0.1964i ans(:, :, 2, 7) =

0.3536
0.2940 + 0.1964i
0.1353 + 0.3266i
−0.0690 + 0.3468i
−0.3536
−0.2940 − 0.1964i
−0.1353 − 0.3266i
0.0690 − 0.3468i

-continued ans(:, :, 3, 7) =

0.3536
0.1964 + 0.2940i
−0.1353 + 0.3266i
−0.3468 + 0.0690i
−0.3536
−0.1964 − 0.2940i
0.1353 − 0.3266i
0.3468 − 0.0690i ans(:, :, 4, 7) =

0.3536
0.0690 + 0.3468i
−0.3266 + 0.1353i
−0.1964 − 0.2940i
−0.3536
−0.0690 − 0.3468i
0.3266 − 0.1353i
0.1964 + 0.2940i ans(:, :, 5, 7) =

0.3536
−0.0690 + 0.3468i
−0.3266 − 0.1353i
0.1964 − 0.2940i
−0.3536
0.0690 − 0.3468i
0.3266 + 0.1353i
−0.1964 + 0.2940i ans(:, :, 6, 7) =

0.3536
−0.1964 + 0.2940i
−0.1353 − 0.3266i
0.3468 + 0.0690i
−0.3536
0.1964 − 0.2940i
0.1353 + 0.3266i
−0.3468 − 0.0690i ans(:, :, 7, 7) =

0.3536
−0.2940 + 0.1964i
0.1353 − 0.3266i
0.0690 + 0.3468i
−0.3536
0.2940 − 0.1964i
−0.1353 + 0.3266i
−0.0690 − 0.3468i ans(:, :, 8, 7) =

0.3536
−0.3468 + 0.0690i
0.3266 − 0.1353i
−0.2940 + 0.1964i
−0.3536
0.3468 − 0.0690i
−0.3266 + 0.1353i
0.2940 − 0.1964i ans(:, :, 9, 7) =

0.3536
−0.3468 − 0.0690i
0.3266 + 0.1353i
−0.2940 − 0.1964i
−0.3536
0.3468 + 0.0690i
−0.3266 − 0.1353i
0.2940 + 0.1964i ans(:, :, 10, 7) =

0.3536
−0.2940 − 0.1964i
0.1353 + 0.3266i
0.0690 − 0.3468i
−0.3536
0.2940 + 0.1964i

-continued

−0.1353 − 0.3266i
−0.0690 + 0.3468i
ans(:, :, 11, 7) =

0.3536
−0.1964 − 0.2940i
−0.1353 + 0.3266i
0.3468 − 0.0690i
−0.3536
0.1964 + 0.2940i
0.1353 − 0.3266i
−0.3468 + 0.0690i
ans(:, :, 12, 7) =

0.3536
−0.0690 − 0.3468i
−0.3266 + 0.1353i
0.1964 + 0.2940i
−0.3536
0.0690 + 0.3468i
0.3266 − 0.1353i
−0.1964 − 0.2940i
ans(:, :, 13, 7) =

0.3536
0.0690 − 0.3468i
−0.3266 − 0.1353i
−0.1964 + 0.2940i
−0.3536
−0.0690 + 0.3468i
0.3266 + 0.1353i
0.1964 − 0.2940i
ans(:, :, 14, 7) =

0.3536
0.1964 − 0.2940i
−0.1353 − 0.3266i
−0.3468 − 0.0690i
−0.3536
−0.1964 + 0.2940i
0.1353 + 0.3266i
0.3468 + 0.0690i
ans(:, :, 15, 7) =

0.3536
0.2940 − 0.1964i
0.1353 − 0.3266i
−0.0690 − 0.3468i
−0.3536
−0.2940 + 0.1964i
−0.1353 + 0.3266i
0.0690 + 0.3468i
ans(:, :, 16, 7) =

0.3536
0.3468 − 0.0690i
0.3266 − 0.1353i
0.2940 − 0.1964i
−0.3536
−0.3468 + 0.0690i
−0.3266 + 0.1353i
−0.2940 + 0.1964i
ans(:, :, 1, 8) =

0.3536
0.3468 + 0.0690i
0.3266 + 0.1353i
0.2940 + 0.1964i
0 − 0.3536i
0.0690 − 0.3468i
0.1353 − 0.3266i
0.1964 − 0.2940i
ans(:, :, 2, 8) =

0.3536
0.2940 + 0.1964i
0.1353 + 0.3266i
−0.0690 + 0.3468i
0 − 0.3536i

```
                    0.1964 − 0.2940i
                    0.3266 − 0.1353i
                    0.3468 + 0.0690i
                    ans(:, :, 3, 8) =

0.3536
                    0.1964 + 0.2940i
                   −0.1353 + 0.3266i
                   −0.3468 + 0.0690i
                        0 − 0.3536i
                    0.2940 − 0.1964i
                    0.3266 + 0.1353i
                    0.0690 + 0.3468i
                    ans(:, :, 4, 8) =

0.3536
                    0.0690 + 0.3468i
                   −0.3266 + 0.1353i
                   −0.1964 − 0.2940i
                        0 − 0.3536i
                    0.3468 − 0.0690i
                    0.1353 + 0.3266i
                   −0.2940 + 0.1964i
                    ans(:, :, 5, 8) =

0.3536
                   −0.0690 + 0.3468i
                   −0.3266 − 0.1353i
                    0.1964 − 0.2940i
                        0 − 0.3536i
                    0.3468 + 0.0690i
                   −0.1353 + 0.3266i
                   −0.2940 − 0.1964i
                    ans(:, :, 6, 8) =

0.3536
                   −0.1964 + 0.2940i
                   −0.1353 − 0.3266i
                    0.3468 + 0.0690i
                        0 − 0.3536i
                    0.2940 + 0.1964i
                   −0.3266 + 0.1353i
                    0.0690 − 0.3468i
                    ans(:, :, 7, 8) =

0.3536
                   −0.2940 + 0.1964i
                    0.1353 − 0.3266i
                    0.0690 + 0.3468i
                        0 − 0.3536i
                    0.1964 + 0.2940i
                   −0.3266 − 0.1353i
                    0.3468 − 0.0690i
                    ans(:, :, 8, 8) =

0.3536
                   −0.3468 + 0.0690i
                    0.3266 − 0.1353i
                   −0.2940 + 0.1964i
                        0 − 0.3536i
                    0.0690 + 0.3468i
                   −0.1353 − 0.3266i
                    0.1964 + 0.2940i
                    ans(:, :, 9, 8) =

0.3536
                   −0.3468 − 0.0690i
                    0.3266 + 0.1353i
                   −0.2940 − 0.1964i
                        0 − 0.3536i
                   −0.0690 + 0.3468i
                    0.1353 − 0.3266i
                   −0.1964 + 0.2940i
                    ans(:, :, 10, 8) =

0.3536
                   −0.2940 − 0.1964i
                    0.1353 + 0.3266i
                    0.0690 − 0.3468i
```

```
                    0 − 0.3536i
              −0.1964 + 0.2940i
               0.3266 − 0.1353i
              −0.3468 − 0.0690i
ans(:, :, 11, 8) =

0.3536
              −0.1964 − 0.2940i
              −0.1353 + 0.3266i
               0.3468 − 0.0690i
                    0 − 0.3536i
              −0.2940 + 0.1964i
               0.3266 + 0.1353i
              −0.0690 − 0.3468i
ans(:, :, 12, 8) =

0.3536
              −0.0690 − 0.3468i
              −0.3266 + 0.1353i
               0.1964 + 0.2940i
                    0 − 0.3536i
              −0.3468 + 0.0690i
               0.1353 + 0.3266i
               0.2940 − 0.1964i
ans(:, :, 13, 8) =

0.3536
               0.0690 − 0.3468i
              −0.3266 − 0.1353i
              −0.1964 + 0.2940i
                    0 − 0.3536i
              −0.3468 − 0.0690i
              −0.1353 + 0.3266i
               0.2940 + 0.1964i
ans(:, :, 14, 8) =

0.3536
               0.1964 − 0.2940i
              −0.1353 − 0.3266i
              −0.3468 − 0.0690i
                    0 − 0.3536i
              −0.2940 − 0.1964i
              −0.3266 + 0.1353i
              −0.0690 + 0.3468i
ans(:, :, 15, 8) =

0.3536
               0.2940 − 0.1964i
               0.1353 − 0.3266i
              −0.0690 − 0.3468i
                    0 − 0.3536i
              −0.1964 − 0.2940i
              −0.3266 − 0.1353i
              −0.3468 + 0.0690i
ans(:, :, 16, 8) =

0.3536
               0.3468 − 0.0690i
               0.3266 − 0.1353i
               0.2940 − 0.1964i
                    0 − 0.3536i
              −0.0690 − 0.3468i
              −0.1353 − 0.3266i
              −0.1964 − 0.2940i
ans(:, :, 1, 9) =

0.3536
               0.3266 + 0.1353i
               0.2500 + 0.2500i
               0.1353 + 0.3266i
                         0.3536
               0.3266 + 0.1353i
               0.2500 + 0.2500i
               0.1353 + 0.3266i
ans(:, :, 2, 9) =

0.3536
               0.2500 + 0.2500i
               0.0000 + 0.3536i
```

-continued $$
\begin{array}{c}
-0.2500 + 0.2500i \\
0.3536 \\
0.2500 + 0.2500i \\
0.0000 + 0.3536i \\
-0.2500 + 0.2500i \\
\end{array}
$$

ans(:, :, 3, 9) =

$$
\begin{array}{c}
0.3536 \\
0.1353 + 0.3266i \\
-0.2500 + 0.2500i \\
-0.3266 - 0.1353i \\
0.3536 \\
0.1353 + 0.3266i \\
-0.2500 + 0.2500i \\
-0.3266 - 0.1353i \\
\end{array}
$$

ans(:, :, 4, 9) =

$$
\begin{array}{c}
0.3536 \\
0.0000 + 0.3536i \\
-0.3536 + 0.0000i \\
-0.0000 - 0.3536i \\
0.3536 \\
0.0000 + 0.3536i \\
-0.3536 + 0.0000i \\
-0.0000 - 0.3536i \\
\end{array}
$$

ans(:, :, 5, 9) =

$$
\begin{array}{c}
0.3536 \\
-0.1353 + 0.3266i \\
-0.2500 - 0.2500i \\
0.3266 - 0.1353i \\
0.3536 \\
-0.1353 + 0.3266i \\
-0.2500 - 0.2500i \\
0.3266 - 0.1353i \\
\end{array}
$$

ans(:, :, 6, 9) =

$$
\begin{array}{c}
0.3536 \\
-0.2500 + 0.2500i \\
-0.0000 - 0.3536i \\
0.2500 + 0.2500i \\
0.3536 \\
-0.2500 + 0.2500i \\
-0.0000 - 0.3536i \\
0.2500 + 0.2500i \\
\end{array}
$$

ans(:, :, 7, 9) =

$$
\begin{array}{c}
0.3536 \\
-0.3266 + 0.1353i \\
0.2500 - 0.2500i \\
-0.1353 + 0.3266i \\
0.3536 \\
-0.3266 + 0.1353i \\
0.2500 - 0.2500i \\
-0.1353 + 0.3266i \\
\end{array}
$$

ans(:, :, 8, 9) =

$$
\begin{array}{c}
0.3536 \\
-0.3536 + 0.0000i \\
0.3536 - 0.0000i \\
-0.3536 + 0.0000i \\
0.3536 \\
-0.3536 + 0.0000i \\
0.3536 - 0.0000i \\
-0.3536 + 0.0000i \\
\end{array}
$$

ans(:, :, 9, 9) =

$$
\begin{array}{c}
0.3536 \\
-0.3266 - 0.1353i \\
0.2500 + 0.2500i \\
-0.1353 - 0.3266i \\
0.3536 \\
-0.3266 - 0.1353i \\
0.2500 + 0.2500i \\
-0.1353 - 0.3266i \\
\end{array}
$$

ans(:, :, 10, 9) =

$$
\begin{array}{c}
0.3536 \\
-0.2500 - 0.2500i \\
\end{array}
$$

-continued

```
    0.0000 + 0.3536i
    0.2500 − 0.2500i
        0.3536
   −0.2500 − 0.2500i
    0.0000 + 0.3536i
    0.2500 − 0.2500i
ans(:, :, 11, 9) =

0.3536
   −0.1353 − 0.3266i
   −0.2500 + 0.2500i
    0.3266 + 0.1353i
        0.3536
   −0.1353 − 0.3266i
   −0.2500 + 0.2500i
    0.3266 + 0.1353i
ans(:, :, 12, 9) =

0.3536
   −0.0000 − 0.3536i
   −0.3536 + 0.0000i
    0.0000 + 0.3536i
        0.3536
   −0.0000 − 0.3536i
   −0.3536 + 0.0000i
    0.0000 + 0.3536i
ans(:, :, 13, 9) =

0.3536
    0.1353 − 0.3266i
   −0.2500 − 0.2500i
   −0.3266 + 0.1353i
        0.3536
    0.1353 − 0.3266i
   −0.2500 − 0.2500i
   −0.3266 + 0.1353i
ans(:, :, 14, 9) =

0.3536
    0.2500 − 0.2500i
   −0.0000 − 0.3536i
   −0.2500 − 0.2500i
        0.3536
    0.2500 − 0.2500i
   −0.0000 − 0.3536i
   −0.2500 − 0.2500i
ans(:, :, 15, 9) =

0.3536
    0.3266 − 0.1353i
    0.2500 − 0.2500i
    0.1353 − 0.3266i
        0.3536
    0.3266 − 0.1353i
    0.2500 − 0.2500i
    0.1353 − 0.3266i
ans(:, :, 16, 9) =

0.3536
        0.3536
        0.3536
        0.3536
        0.3536
        0.3536
        0.3536
        0.3536
ans(:, :, 1, 10) =

0.3536
    0.3266 + 0.1353i
    0.2500 + 0.2500i
    0.1353 + 0.3266i
         0 + 0.3536i
   −0.1353 + 0.3266i
   −0.2500 + 0.2500i
   −0.3266 + 0.1353i
```

-continued ans(:, :, 2, 10) =

0.3536
0.2500 + 0.2500i
0.0000 + 0.3536i
−0.2500 + 0.2500i
0 + 0.3536i
−0.2500 + 0.2500i
−0.3536 + 0.0000i
−0.2500 − 0.2500i ans(:, :, 3, 10) =

0.3536
0.1353 + 0.3266i
−0.2500 + 0.2500i
−0.3266 − 0.1353i
0 + 0.3536i
−0.3266 + 0.1353i
−0.2500 − 0.2500i
0.1353 − 0.3266i ans(:, :, 4, 10) =

0.3536
0.0000 + 0.3536i
−0.3536 + 0.0000i
−0.0000 − 0.3536i
0 + 0.3536i
−0.3536 + 0.0000i
−0.0000 − 0.3536i
0.3536 − 0.0000i ans(:, :, 5, 10) =

0.3536
−0.1353 + 0.3266i
−0.2500 − 0.2500i
0.3266 − 0.1353i
0 + 0.3536i
−0.3266 − 0.1353i
0.2500 − 0.2500i
0.1353 + 0.3266i ans(:, :, 6, 10) =

0.3536
−0.2500 + 0.2500i
−0.0000 − 0.3536i
0.2500 + 0.2500i
0 + 0.3536i
−0.2500 − 0.2500i
0.3536 − 0.0000i
−0.2500 + 0.2500i ans(:, :, 7, 10) =

0.3536
−0.3266 + 0.1353i
0.2500 − 0.2500i
−0.1353 + 0.3266i
0 + 0.3536i
−0.1353 − 0.3266i
0.2500 + 0.2500i
−0.3266 − 0.1353i ans(:, :, 8, 10) =

0.3536
−0.3536 + 0.0000i
0.3536 − 0.0000i
−0.3536 + 0.0000i
0 + 0.3536i
−0.0000 − 0.3536i
0.0000 + 0.3536i
−0.0000 − 0.3536i ans(:, :, 9, 10) =

0.3536
−0.3266 − 0.1353i
0.2500 + 0.2500i
−0.1353 − 0.3266i
0 + 0.3536i
0.1353 − 0.3266i

-continued

−0.2500 + 0.2500i
0.3266 − 0.1353i
ans(:, :, 10, 10) =

0.3536
−0.2500 − 0.2500i
0.0000 + 0.3536i
0.2500 − 0.2500i
0 + 0.3536i
0.2500 − 0.2500i
−0.3536 + 0.0000i
0.2500 + 0.2500i
ans(:, :, 11, 10) =

0.3536
−0.1353 − 0.3266i
−0.2500 + 0.2500i
0.3266 + 0.1353i
0 + 0.3536i
0.3266 − 0.1353i
−0.2500 − 0.2500i
−0.1353 + 0.3266i
ans(:, :, 12, 10) =

0.3536
−0.0000 − 0.3536i
−0.3536 + 0.0000i
0.0000 + 0.3536i
0 + 0.3536i
0.3536 − 0.0000i
−0.0000 − 0.3536i
−0.3536 + 0.0000i
ans(:, :, 13, 10) =

0.3536
0.1353 − 0.3266i
−0.2500 − 0.2500i
−0.3266 + 0.1353i
0 + 0.3536i
0.3266 + 0.1353i
0.2500 − 0.2500i
−0.1353 − 0.3266i
ans(:, :, 14, 10) =

0.3536
0.2500 − 0.2500i
−0.0000 − 0.3536i
−0.2500 − 0.2500i
0 + 0.3536i
0.2500 + 0.2500i
0.3536 − 0.0000i
0.2500 − 0.2500i
ans(:, :, 15, 10) =

0.3536
0.3266 − 0.1353i
0.2500 − 0.2500i
0.1353 − 0.3266i
0 + 0.3536i
0.1353 + 0.3266i
0.2500 + 0.2500i
0.3266 + 0.1353i
ans(:, :, 16, 10) =

0.3536
0.3536
0.3536
0.3536
0 + 0.3536i
0 + 0.3536i
0 + 0.3536i
0 + 0.3536i
ans(:, :, 1, 11) =

0.3536
0.3266 + 0.1353i
0.2500 + 0.2500i
0.1353 + 0.3266i
−0.3536

-continued

−0.3266 − 0.1353i
−0.2500 − 0.2500i
−0.1353 − 0.3266i
ans(:, :, 2, 11) =

0.3536
0.2500 + 0.2500i
0.0000 + 0.3536i
−0.2500 + 0.2500i
−0.3536
−0.2500 − 0.2500i
−0.0000 − 0.3536i
0.2500 − 0.2500i
ans(:, :, 3, 11) =

0.3536
0.1353 + 0.3266i
−0.2500 + 0.2500i
−0.3266 − 0.1353i
−0.3536
−0.1353 − 0.3266i
0.2500 − 0.2500i
0.3266 + 0.1353i
ans(:, :, 4, 11) =

0.3536
0.0000 + 0.3536i
−0.3536 + 0.0000i
−0.0000 − 0.3536i
−0.3536
−0.0000 − 0.3536i
0.3536 − 0.0000i
0.0000 + 0.3536i
ans(:, :, 5, 11) =

0.3536
−0.1353 + 0.3266i
−0.2500 − 0.2500i
0.3266 − 0.1353i
−0.3536
0.1353 − 0.3266i
0.2500 + 0.2500i
−0.3266 + 0.1353i
ans(:, :, 6, 11) =

0.3536
−0.2500 + 0.2500i
−0.0000 − 0.3536i
0.2500 + 0.2500i
−0.3536
0.2500 − 0.2500i
0.0000 + 0.3536i
−0.2500 − 0.2500i
ans(:, :, 7, 11) =

0.3536
−0.3266 + 0.1353i
0.2500 − 0.2500i
−0.1353 + 0.3266i
−0.3536
0.3266 − 0.1353i
−0.2500 + 0.2500i
0.1353 − 0.3266i
ans(:, :, 8, 11) =

0.3536
−0.3536 + 0.0000i
0.3536 − 0.0000i
−0.3536 + 0.0000i
−0.3536
0.3536 − 0.0000i
−0.3536 + 0.0000i
0.3536 − 0.0000i
ans(:, :, 9, 11) =

0.3536
−0.3266 − 0.1353i
0.2500 + 0.2500i
−0.1353 − 0.3266i

-continued $$
\begin{array}{c}
-0.3536 \\
0.3266 + 0.1353i \\
-0.2500 - 0.2500i \\
0.1353 + 0.3266i
\end{array}
$$

ans(:, :, 10, 11) =

$$
\begin{array}{c}
0.3536 \\
-0.2500 - 0.2500i \\
0.0000 + 0.3536i \\
0.2500 - 0.2500i \\
-0.3536 \\
0.2500 + 0.2500i \\
-0.0000 - 0.3536i \\
-0.2500 + 0.2500i
\end{array}
$$

ans(:, :, 11, 11) =

$$
\begin{array}{c}
0.3536 \\
-0.1353 - 0.3266i \\
-0.2500 + 0.2500i \\
0.3266 + 0.1353i \\
-0.3536 \\
0.1353 + 0.3266i \\
0.2500 - 0.2500i \\
-0.3266 - 0.1353i
\end{array}
$$

ans(:, :, 12, 11) =

$$
\begin{array}{c}
0.3536 \\
-0.0000 - 0.3536i \\
-0.3536 + 0.0000i \\
0.0000 + 0.3536i \\
-0.3536 \\
0.0000 + 0.3536i \\
0.3536 - 0.0000i \\
-0.0000 - 0.3536i
\end{array}
$$

ans(:, :, 13, 11) =

$$
\begin{array}{c}
0.3536 \\
0.1353 - 0.3266i \\
-0.2500 - 0.2500i \\
-0.3266 + 0.1353i \\
-0.3536 \\
-0.1353 + 0.3266i \\
0.2500 + 0.2500i \\
0.3266 - 0.1353i
\end{array}
$$

ans(:, :, 14, 11) =

$$
\begin{array}{c}
0.3536 \\
0.2500 - 0.2500i \\
-0.0000 - 0.3536i \\
-0.2500 - 0.2500i \\
-0.3536 \\
-0.2500 + 0.2500i \\
0.0000 + 0.3536i \\
0.2500 + 0.2500i
\end{array}
$$

ans(:, :, 15, 11) =

$$
\begin{array}{c}
0.3536 \\
0.3266 - 0.1353i \\
0.2500 - 0.2500i \\
0.1353 - 0.3266i \\
-0.3536 \\
-0.3266 + 0.1353i \\
-0.2500 + 0.2500i \\
-0.1353 + 0.3266i
\end{array}
$$

ans(:, :, 16, 11) =

$$
\begin{array}{c}
0.3536 \\
0.3536 \\
0.3536 \\
0.3536 \\
-0.3536 \\
-0.3536 \\
-0.3536 \\
-0.3536
\end{array}
$$

ans(:, :, 1, 12) =

$$
\begin{array}{c}
0.3536 \\
0.3266 + 0.1353i \\
0.2500 + 0.2500i
\end{array}
$$

0.1353 + 0.3266i
0 − 0.3536i
0.1353 − 0.3266i
0.2500 − 0.2500i
0.3266 − 0.1353i
ans(:, :, 2, 12) =

0.3536
0.2500 + 0.2500i
0.0000 + 0.3536i
−0.2500 + 0.2500i
0 − 0.3536i
0.2500 − 0.2500i
0.3536 − 0.0000i
0.2500 + 0.2500i
ans(:, :, 3, 12) =

0.3536
0.1353 + 0.3266i
−0.2500 + 0.2500i
−0.3266 − 0.1353i
0 − 0.3536i
0.3266 − 0.1353i
0.2500 + 0.2500i
−0.1353 + 0.3266i
ans(:, :, 4, 12) =

0.3536
0.0000 + 0.3536i
−0.3536 + 0.0000i
−0.0000 − 0.3536i
0 − 0.3536i
0.3536 − 0.0000i
0.0000 + 0.3536i
−0.3536 + 0.0000i
ans(:, :, 5, 12) =

0.3536
−0.1353 + 0.3266i
−0.2500 − 0.2500i
0.3266 − 0.1353i
0 − 0.3536i
0.3266 + 0.1353i
−0.2500 + 0.2500i
−0.1353 − 0.3266i
ans(:, :, 6, 12) =

0.3536
−0.2500 + 0.2500i
−0.0000 − 0.3536i
0.2500 + 0.2500i
0 − 0.3536i
0.2500 + 0.2500i
−0.3536 + 0.0000i
0.2500 − 0.2500i
ans(:, :, 7, 12) =

0.3536
−0.3266 + 0.1353i
0.2500 − 0.2500i
−0.1353 + 0.3266i
0 − 0.3536i
0.1353 + 0.3266i
−0.2500 − 0.2500i
0.3266 + 0.1353i
ans(:, :, 8, 12) =

0.3536
−0.3536 + 0.0000i
0.3536 − 0.0000i
−0.3536 + 0.0000i
0 − 0.3536i
0.0000 + 0.3536i
−0.0000 − 0.3536i
0.0000 + 0.3536i
ans(:, :, 9, 12) =

0.3536
−0.3266 − 0.1353i

-continued 0.2500 + 0.2500i
−0.1353 − 0.3266i
0 − 0.3536i
−0.1353 + 0.3266i
0.2500 − 0.2500i
−0.3266 + 0.1353i
ans(:, :, 10, 12) =

0.3536
−0.2500 − 0.2500i
0.0000 + 0.3536i
0.2500 − 0.2500i
0 − 0.3536i
−0.2500 + 0.2500i
0.3536 − 0.0000i
−0.2500 − 0.2500i
ans(:, :, 11, 12) =

0.3536
−0.1353 − 0.3266i
−0.2500 + 0.2500i
0.3266 + 0.1353i
0 − 0.3536i
−0.3266 + 0.1353i
0.2500 + 0.2500i
0.1353 − 0.3266i
ans(:, :, 12, 12) =

0.3536
−0.0000 − 0.3536i
−0.3536 + 0.0000i
0.0000 + 0.3536i
0 − 0.3536i
−0.3536 + 0.0000i
0.0000 + 0.3536i
0.3536 − 0.0000i
ans(:, :, 13, 12) =

0.3536
0.1353 − 0.3266i
−0.2500 − 0.2500i
−0.3266 + 0.1353i
0 − 0.3536i
−0.3266 − 0.1353i
−0.2500 + 0.2500i
0.1353 + 0.3266i
ans(:, :, 14, 12) =

0.3536
0.2500 − 0.2500i
−0.0000 − 0.3536i
−0.2500 − 0.2500i
0 − 0.3536i
−0.2500 − 0.2500i
−0.3536 + 0.0000i
−0.2500 + 0.2500i
ans(:, :, 15, 12) =

0.3536
0.3266 − 0.1353i
0.2500 − 0.2500i
0.1353 − 0.3266i
0 − 0.3536i
−0.1353 − 0.3266i
−0.2500 − 0.2500i
−0.3266 − 0.1353i
ans(:, :, 16, 12) =

0.3536
0.3536
0.3536
0.3536
0 − 0.3536i
0 − 0.3536i
0 − 0.3536i
0 − 0.3536i

-continued ans(:, :, 1, 13) =

0.3536
0.2940 + 0.1964i
0.1353 + 0.3266i
−0.0690 + 0.3468i
0.3536
0.2940 + 0.1964i
0.1353 + 0.3266i
−0.0690 + 0.3468i ans(:, :, 2, 13) =

0.3536
0.1964 + 0.2940i
−0.1353 + 0.3266i
−0.3468 + 0.0690i
0.3536
0.1964 + 0.2940i
−0.1353 + 0.3266i
−0.3468 + 0.0690i ans(:, :, 3, 13) =

0.3536
0.0690 + 0.3468i
−0.3266 + 0.1353i
−0.1964 − 0.2940i
0.3536
0.0690 + 0.3468i
−0.3266 + 0.1353i
−0.1964 − 0.2940i ans(:, :, 4, 13) =

0.3536
−0.0690 + 0.3468i
−0.3266 − 0.1353i
0.1964 − 0.2940i
0.3536
−0.0690 + 0.3468i
−0.3266 − 0.1353i
0.1964 − 0.2940i ans(:, :, 5, 13) =

0.3536
−0.1964 + 0.2940i
−0.1353 − 0.3266i
0.3468 + 0.0690i
0.3536
−0.1964 + 0.2940i
−0.1353 − 0.3266i
0.3468 + 0.0690i ans(:, :, 6, 13) =

0.3536
−0.2940 + 0.1964i
0.1353 − 0.3266i
0.0690 + 0.3468i
0.3536
−0.2940 + 0.1964i
0.1353 − 0.3266i
0.0690 + 0.3468i ans(:, :, 7, 13) =

0.3536
−0.3468 + 0.0690i
0.3266 − 0.1353i
−0.2940 + 0.1964i
0.3536
−0.3468 + 0.0690i
0.3266 − 0.1353i
−0.2940 + 0.1964i ans(:, :, 8, 13) =

0.3536
−0.3468 − 0.0690i
0.3266 + 0.1353i
−0.2940 − 0.1964i
0.3536
−0.3468 − 0.0690i

-continued 0.3266 + 0.1353i
−0.2940 − 0.1964i
ans(:, :, 9, 13) =

0.3536
−0.2940 − 0.1964i
0.1353 + 0.3266i
0.0690 − 0.3468i
0.3536
−0.2940 − 0.1964i
0.1353 + 0.3266i
0.0690 − 0.3468i
ans(:, :, 10, 13) =

0.3536
−0.1964 − 0.2940i
−0.1353 + 0.3266i
0.3468 − 0.0690i
0.3536
−0.1964 − 0.2940i
−0.1353 + 0.3266i
0.3468 − 0.0690i
ans(:, :, 11, 13) =

0.3536
−0.0690 − 0.3468i
−0.3266 + 0.1353i
0.1964 + 0.2940i
0.3536
−0.0690 − 0.3468i
−0.3266 + 0.1353i
0.1964 + 0.2940i
ans(:, :, 12, 13) =

0.3536
0.0690 − 0.3468i
−0.3266 − 0.1353i
−0.1964 + 0.2940i
0.3536
0.0690 − 0.3468i
−0.3266 − 0.1353i
−0.1964 + 0.2940i
ans(:, :, 13, 13) =

0.3536
0.1964 − 0.2940i
−0.1353 − 0.3266i
−0.3468 − 0.0690i
0.3536
0.1964 − 0.2940i
−0.1353 − 0.3266i
−0.3468 − 0.0690i
ans(:, :, 14, 13) =

0.3536
0.2940 − 0.1964i
0.1353 − 0.3266i
−0.0690 − 0.3468i
0.3536
0.2940 − 0.1964i
0.1353 − 0.3266i
−0.0690 − 0.3468i
ans(:, :, 15, 13) =

0.3536
0.3468 − 0.0690i
0.3266 − 0.1353i
0.2940 − 0.1964i
0.3536
0.3468 − 0.0690i
0.3266 − 0.1353i
0.2940 − 0.1964i
ans(:, :, 16, 13) =

0.3536
0.3468 + 0.0690i
0.3266 + 0.1353i
0.2940 + 0.1964i
0.3536

-continued 0.3468 + 0.0690i
0.3266 + 0.1353i
0.2940 + 0.1964i
ans(:, :, 1, 14) =

0.3536
0.2940 + 0.1964i
0.1353 + 0.3266i
−0.0690 + 0.3468i
0 + 0.3536i
−0.1964 + 0.2940i
−0.3266 + 0.1353i
−0.3468 − 0.0690i
ans(:, :, 2, 14) =

0.3536
0.1964 + 0.2940i
−0.1353 + 0.3266i
−0.3468 + 0.0690i
0 + 0.3536i
−0.2940 + 0.1964i
−0.3266 − 0.1353i
−0.0690 − 0.3468i
ans(:, :, 3, 14) =

0.3536
0.0690 + 0.3468i
−0.3266 + 0.1353i
−0.1964 − 0.2940i
0 + 0.3536i
−0.3468 + 0.0690i
−0.1353 − 0.3266i
0.2940 − 0.1964i
ans(:, :, 4, 14) =

0.3536
−0.0690 + 0.3468i
−0.3266 − 0.1353i
0.1964 − 0.2940i
0 + 0.3536i
−0.3468 − 0.0690i
0.1353 − 0.3266i
0.2940 + 0.1964i
ans(:, :, 5, 14) =

0.3536
−0.1964 + 0.2940i
−0.1353 − 0.3266i
0.3468 + 0.0690i
0 + 0.3536i
−0.2940 − 0.1964i
0.3266 − 0.1353i
−0.0690 + 0.3468i
ans(:, :, 6, 14) =

0.3536
−0.2940 + 0.1964i
0.1353 − 0.3266i
0.0690 + 0.3468i
0 + 0.3536i
−0.1964 − 0.2940i
0.3266 + 0.1353i
−0.3468 + 0.0690i
ans(:, :, 7, 14) =

0.3536
−0.3468 + 0.0690i
0.3266 − 0.1353i
−0.2940 + 0.1964i
0 + 0.3536i
−0.0690 − 0.3468i
0.1353 + 0.3266i
−0.1964 − 0.2940i
ans(:, :, 8, 14) =

0.3536
−0.3468 − 0.0690i
0.3266 + 0.1353i
−0.2940 − 0.1964i

-continued

0 + 0.3536i
0.0690 − 0.3468i
−0.1353 + 0.3266i
0.1964 − 0.2940i
ans(:, :, 9, 14) =

0.3536
−0.2940 − 0.1964i
0.1353 + 0.3266i
0.0690 − 0.3468i
0 + 0.3536i
0.1964 − 0.2940i
−0.3266 + 0.1353i
0.3468 + 0.0690i
ans(:, :, 10, 14) =

0.3536
−0.1964 − 0.2940i
−0.1353 + 0.3266i
0.3468 − 0.0690i
0 + 0.3536i
0.2940 − 0.1964i
−0.3266 − 0.1353i
0.0690 + 0.3468i
ans(:, :, 11, 14) =

0.3536
−0.0690 − 0.3468i
−0.3266 + 0.1353i
0.1964 + 0.2940i
0 + 0.3536i
0.3468 − 0.0690i
−0.1353 − 0.3266i
−0.2940 + 0.1964i
ans(:, :, 12, 14) =

0.3536
0.0690 − 0.3468i
−0.3266 − 0.1353i
−0.1964 + 0.2940i
0 + 0.3536i
0.3468 + 0.0690i
0.1353 − 0.3266i
−0.2940 − 0.1964i
ans(:, :, 13, 14) =

0.3536
0.1964 − 0.2940i
−0.1353 − 0.3266i
−0.3468 − 0.0690i
0 + 0.3536i
0.2940 + 0.1964i
0.3266 − 0.1353i
0.0690 − 0.3468i
ans(:, :, 14, 14) =

0.3536
0.2940 − 0.1964i
0.1353 − 0.3266i
−0.0690 − 0.3468i
0 + 0.3536i
0.1964 + 0.2940i
0.3266 + 0.1353i
0.3468 − 0.0690i
ans(:, :, 15, 14) =

0.3536
0.3468 − 0.0690i
0.3266 − 0.1353i
0.2940 − 0.1964i
0 + 0.3536i
0.0690 + 0.3468i
0.1353 + 0.3266i
0.1964 + 0.2940i
ans(:, :, 16, 14) =

0.3536
0.3468 + 0.0690i
0.3266 + 0.1353i

-continued 0.2940 + 0.1964i
0 + 0.3536i
−0.0690 + 0.3468i
−0.1353 + 0.3266i
−0.1964 + 0.2940i
ans(:, :, 1, 15) =

0.3536
0.2940 + 0.1964i
0.1353 + 0.3266i
−0.0690 + 0.3468i
−0.3536
−0.2940 − 0.1964i
−0.1353 − 0.3266i
0.0690 − 0.3468i
ans(:, :, 2, 15) =

0.3536
0.1964 + 0.2940i
−0.1353 + 0.3266i
−0.3468 + 0.0690i
−0.3536
−0.1964 − 0.2940i
0.1353 − 0.3266i
0.3468 − 0.0690i
ans(:, :, 3, 15) =

0.3536
0.0690 + 0.3468i
−0.3266 + 0.1353i
−0.1964 − 0.2940i
−0.3536
−0.0690 − 0.3468i
0.3266 − 0.1353i
0.1964 + 0.2940i
ans(:, :, 4, 15) =

0.3536
−0.0690 + 0.3468i
−0.3266 − 0.1353i
0.1964 − 0.2940i
−0.3536
0.0690 − 0.3468i
0.3266 + 0.1353i
−0.1964 + 0.2940i
ans(:, :, 5, 15) =

0.3536
−0.1964 + 0.2940i
−0.1353 − 0.3266i
0.3468 + 0.0690i
−0.3536
0.1964 − 0.2940i
0.1353 + 0.3266i
−0.3468 − 0.0690i
ans(:, :, 6, 15) =

0.3536
−0.2940 + 0.1964i
0.1353 − 0.3266i
0.0690 + 0.3468i
−0.3536
0.2940 − 0.1964i
−0.1353 + 0.3266i
−0.0690 − 0.3468i
ans(:, :, 7, 15) =

0.3536
−0.3468 + 0.0690i
0.3266 − 0.1353i
−0.2940 + 0.1964i
−0.3536
0.3468 − 0.0690i
−0.3266 + 0.1353i
0.2940 − 0.1964i
ans(:, :, 8, 15) =

0.3536
−0.3468 − 0.0690i

-continued 0.3266 + 0.1353i
−0.2940 − 0.1964i
−0.3536
0.3468 + 0.0690i
−0.3266 − 0.1353i
0.2940 + 0.1964i ans(:, :, 9, 15) =

0.3536
−0.2940 − 0.1964i
0.1353 + 0.3266i
0.0690 − 0.3468i
−0.3536
0.2940 + 0.1964i
−0.1353 − 0.3266i
−0.0690 + 0.3468i ans(:, :, 10, 15) =

0.3536
−0.1964 − 0.2940i
−0.1353 + 0.3266i
0.3468 − 0.0690i
−0.3536
0.1964 + 0.2940i
0.1353 − 0.3266i
−0.3468 + 0.0690i ans(:, :, 11, 15) =

0.3536
−0.0690 − 0.3468i
−0.3266 + 0.1353i
0.1964 + 0.2940i
−0.3536
0.0690 + 0.3468i
0.3266 − 0.1353i
−0.1964 − 0.2940i ans(:, :, 12, 15) =

0.3536
0.0690 − 0.3468i
−0.3266 − 0.1353i
−0.1964 + 0.2940i
−0.3536
−0.0690 + 0.3468i
0.3266 + 0.1353i
0.1964 − 0.2940i ans(:, :, 13, 15) =

0.3536
0.1964 − 0.2940i
−0.1353 − 0.3266i
−0.3468 − 0.0690i
−0.3536
−0.1964 + 0.2940i
0.1353 + 0.3266i
0.3468 + 0.0690i ans(:, :, 14, 15) =

0.3536
0.2940 − 0.1964i
0.1353 − 0.3266i
−0.0690 − 0.3468i
−0.3536
−0.2940 + 0.1964i
−0.1353 + 0.3266i
0.0690 + 0.3468i ans(:, :, 15, 15) =

0.3536
0.3468 − 0.0690i
0.3266 − 0.1353i
0.2940 − 0.1964i
−0.3536
−0.3468 + 0.0690i
−0.3266 + 0.1353i
−0.2940 + 0.1964i

-continued

| ans(:, :, 16, 15) = |
|---|
| 0.3536 |
| 0.3468 + 0.0690i |
| 0.3266 + 0.1353i |
| 0.2940 + 0.1964i |
| −0.3536 |
| −0.3468 − 0.0690i |
| −0.3266 − 0.1353i |
| −0.2940 − 0.1964i |
| ans(:, :, 1, 16) = |
| 0.3536 |
| 0.2940 + 0.1964i |
| 0.1353 + 0.3266i |
| −0.0690 + 0.3468i |
| 0 − 0.3536i |
| 0.1964 − 0.2940i |
| 0.3266 − 0.1353i |
| 0.3468 + 0.0690i |
| ans(:, :, 2, 16) = |
| 0.3536 |
| 0.1964 + 0.2940i |
| −0.1353 + 0.3266i |
| −0.3468 + 0.0690i |
| 0 − 0.3536i |
| 0.2940 − 0.1964i |
| 0.3266 + 0.1353i |
| 0.0690 + 0.3468i |
| ans(:, :, 3, 16) = |
| 0.3536 |
| 0.0690 + 0.3468i |
| −0.3266 + 0.1353i |
| −0.1964 − 0.2940i |
| 0 − 0.3536i |
| 0.3468 − 0.0690i |
| 0.1353 + 0.3266i |
| −0.2940 + 0.1964i |
| ans(:, :, 4, 16) = |
| 0.3536 |
| −0.0690 + 0.3468i |
| −0.3266 − 0.1353i |
| 0.1964 − 0.2940i |
| 0 − 0.3536i |
| 0.3468 + 0.0690i |
| −0.1353 + 0.3266i |
| −0.2940 − 0.1964i |
| ans(:, :, 5, 16) = |
| 0.3536 |
| −0.1964 + 0.2940i |
| −0.1353 − 0.3266i |
| 0.3468 + 0.0690i |
| 0 − 0.3536i |
| 0.2940 + 0.1964i |
| −0.3266 + 0.1353i |
| 0.0690 − 0.3468i |
| ans(:, :, 6, 16) = |
| 0.3536 |
| −0.2940 + 0.1964i |
| 0.1353 − 0.3266i |
| 0.0690 + 0.3468i |
| 0 − 0.3536i |
| 0.1964 + 0.2940i |
| −0.3266 − 0.1353i |
| 0.3468 − 0.0690i |
| ans(:, :, 7, 16) = |
| 0.3536 |
| −0.3468 + 0.0690i |
| 0.3266 − 0.1353i |
| −0.2940 + 0.1964i |
| 0 − 0.3536i |
| 0.0690 + 0.3468i |

-continued

−0.1353 − 0.3266i
0.1964 + 0.2940i
ans(:, :, 8, 16) =

0.3536
−0.3468 − 0.0690i
0.3266 + 0.1353i
−0.2940 − 0.1964i
0 − 0.3536i
−0.0690 + 0.3468i
0.1353 − 0.3266i
−0.1964 + 0.2940i
ans(:, :, 9, 16) =

0.3536
−0.2940 − 0.1964i
0.1353 + 0.3266i
0.0690 − 0.3468i
0 − 0.3536i
−0.1964 + 0.2940i
0.3266 − 0.1353i
−0.3468 − 0.0690i
ans(:, :, 10, 16) =

0.3536
−0.1964 − 0.2940i
−0.1353 + 0.3266i
0.3468 − 0.0690i
0 − 0.3536i
−0.2940 + 0.1964i
0.3266 + 0.1353i
−0.0690 − 0.3468i
ans(:, :, 11, 16) =

0.3536
−0.0690 − 0.3468i
−0.3266 + 0.1353i
0.1964 + 0.2940i
0 − 0.3536i
−0.3468 + 0.0690i
0.1353 + 0.3266i
0.2940 − 0.1964i
ans(:, :, 12, 16) =

0.3536
0.0690 − 0.3468i
−0.3266 − 0.1353i
−0.1964 + 0.2940i
0 − 0.3536i
−0.3468 − 0.0690i
−0.1353 + 0.3266i
0.2940 + 0.1964i
ans(:, :, 13, 16) =

0.3536
0.1964 − 0.2940i
−0.1353 − 0.3266i
−0.3468 − 0.0690i
0 − 0.3536i
−0.2940 − 0.1964i
−0.3266 + 0.1353i
−0.0690 + 0.3468i
ans(:, :, 14, 16) =

0.3536
0.2940 − 0.1964i
0.1353 − 0.3266i
−0.0690 − 0.3468i
0 − 0.3536i
−0.1964 − 0.2940i
−0.3266 − 0.1353i
−0.3468 + 0.0690i
ans(:, :, 15, 16) =

0.3536
0.3468 − 0.0690i
0.3266 − 0.1353i
0.2940 − 0.1964i
0 − 0.3536i

-continued

```
            −0.0690 − 0.3468i
            −0.1353 − 0.3266i
            −0.1964 − 0.2940i
              ans(:, :, 16, 16) =

0.3536
              0.3468 + 0.0690i
              0.3266 + 0.1353i
              0.2940 + 0.1964i
                 0 − 0.3536i
              0.0690 − 0.3468i
              0.1353 − 0.3266i
              0.1964 − 0.2940i
```

- Rank 2

```
              ans(:, :, 1, 1) =

0.2500                         0.2500
        0.2500                         0.2500
        0.2500                         0.2500
        0.2500                         0.2500
        0.2500                        −0.2500
        0.2500                        −0.2500
        0.2500                        −0.2500
        0.2500                        −0.2500
              ans(:, :, 2, 1) =

0.2500                         0.2500
     0.2310 + 0.0957i                0.2310 + 0.0957i
     0.1768 + 0.1768i                0.1768 + 0.1768i
     0.0957 + 0.2310i                0.0957 + 0.2310i
        0.2500                        −0.2500
     0.2310 + 0.0957i               −0.2310 − 0.0957i
     0.1768 + 0.1768i               −0.1768 − 0.1768i
     0.0957 + 0.2310i               −0.0957 − 0.2310i
              ans(:, :, 3, 1) =

0.2500                         0.2500
     0.1768 + 0.1768i                0.1768 + 0.1768i
     0.0000 + 0.2500i                0.0000 + 0.2500i
    −0.1768 + 0.1768i               −0.1768 + 0.1768i
        0.2500                        −0.2500
     0.1768 + 0.1768i               −0.1768 − 0.1768i
     0.0000 + 0.2500i               −0.0000 − 0.2500i
    −0.1768 + 0.1768i                0.1768 − 0.1768i
              ans(:, :, 4, 1) =

0.2500                         0.2500
     0.0957 + 0.2310i                0.0957 + 0.2310i
    −0.1768 + 0.1768i               −0.1768 + 0.1768i
    −0.2310 − 0.0957i               −0.2310 − 0.0957i
        0.2500                        −0.2500
     0.0957 + 0.2310i               −0.0957 − 0.2310i
    −0.1768 + 0.1768i                0.1768 − 0.1768i
    −0.2310 − 0.0957i                0.2310 + 0.0957i
              ans(:, :, 5, 1) =

0.2500                         0.2500
     0.0000 + 0.2500i                0.0000 + 0.2500i
    −0.2500 + 0.0000i               −0.2500 + 0.0000i
    −0.0000 − 0.2500i               −0.0000 − 0.2500i
        0.2500                        −0.2500
     0.0000 + 0.2500i               −0.0000 − 0.2500i
    −0.2500 + 0.0000i                0.2500 − 0.0000i
    −0.0000 − 0.2500i                0.0000 + 0.2500i
              ans(:, :, 6, 1) =

0.2500                         0.2500
    −0.0957 + 0.2310i               −0.0957 + 0.2310i
    −0.1768 − 0.1768i               −0.1768 − 0.1768i
     0.2310 − 0.0957i                0.2310 − 0.0957i
        0.2500                        −0.2500
    −0.0957 + 0.2310i                0.0957 − 0.2310i
    −0.1768 − 0.1768i                0.1768 + 0.1768i
     0.2310 − 0.0957i               −0.2310 + 0.0957i
```

-continued ans(:, :, 7, 1) =

| 0.2500 | 0.2500 |
| −0.1768 + 0.1768i | −0.1768 + 0.1768i |
| −0.0000 − 0.2500i | −0.0000 − 0.2500i |
| 0.1768 + 0.1768i | 0.1768 + 0.1768i |
| 0.2500 | −0.2500 |
| −0.1768 + 0.1768i | 0.1768 − 0.1768i |
| −0.0000 − 0.2500i | 0.0000 + 0.2500i |
| 0.1768 + 0.1768i | −0.1768 − 0.1768i | ans(:, :, 8, 1) =

| 0.2500 | 0.2500 |
| −0.2310 + 0.0957i | −0.2310 + 0.0957i |
| 0.1768 − 0.1768i | 0.1768 − 0.1768i |
| −0.0957 + 0.2310i | −0.0957 + 0.2310i |
| 0.2500 | −0.2500 |
| −0.2310 + 0.0957i | 0.2310 − 0.0957i |
| 0.1768 − 0.1768i | −0.1768 + 0.1768i |
| −0.0957 + 0.2310i | 0.0957 − 0.2310i | ans(:, :, 9, 1) =

| 0.2500 | 0.2500 |
| −0.2500 + 0.0000i | −0.2500 + 0.0000i |
| 0.2500 − 0.0000i | 0.2500 − 0.0000i |
| −0.2500 + 0.0000i | −0.2500 + 0.0000i |
| 0.2500 | −0.2500 |
| −0.2500 + 0.0000i | 0.2500 − 0.0000i |
| 0.2500 − 0.0000i | −0.2500 + 0.0000i |
| −0.2500 + 0.0000i | 0.2500 − 0.0000i | ans(:, :, 10, 1) =

| 0.2500 | 0.2500 |
| −0.2310 − 0.0957i | −0.2310 − 0.0957i |
| 0.1768 + 0.1768i | 0.1768 + 0.1768i |
| −0.0957 − 0.2310i | −0.0957 − 0.2310i |
| 0.2500 | −0.2500 |
| −0.2310 − 0.0957i | 0.2310 + 0.0957i |
| 0.1768 + 0.1768i | −0.1768 − 0.1768i |
| −0.0957 − 0.2310i | 0.0957 + 0.2310i | ans(:, :, 11, 1) =

| 0.2500 | 0.2500 |
| −0.1768 − 0.1768i | −0.1768 − 0.1768i |
| 0.0000 + 0.2500i | 0.0000 + 0.2500i |
| 0.1768 − 0.1768i | 0.1768 − 0.1768i |
| 0.2500 | −0.2500 |
| −0.1768 − 0.1768i | 0.1768 + 0.1768i |
| 0.0000 + 0.2500i | −0.0000 − 0.2500i |
| 0.1768 − 0.1768i | −0.1768 + 0.1768i | ans(:, :, 12, 1) =

| 0.2500 | 0.2500 |
| −0.0957 − 0.2310i | −0.0957 − 0.2310i |
| −0.1768 + 0.1768i | −0.1768 + 0.1768i |
| 0.2310 + 0.0957i | 0.2310 + 0.0957i |
| 0.2500 | −0.2500 |
| −0.0957 − 0.2310i | 0.0957 + 0.2310i |
| −0.1768 + 0.1768i | 0.1768 − 0.1768i |
| 0.2310 + 0.0957i | −0.2310 − 0.0957i | ans(:, :, 13, 1) =

| 0.2500 | 0.2500 |
| −0.0000 − 0.2500i | −0.0000 − 0.2500i |
| −0.2500 + 0.0000i | −0.2500 + 0.0000i |
| 0.0000 + 0.2500i | 0.0000 + 0.2500i |
| 0.2500 | −0.2500 |
| −0.0000 − 0.2500i | 0.0000 + 0.2500i |
| −0.2500 + 0.0000i | 0.2500 − 0.0000i |
| 0.0000 + 0.2500i | −0.0000 − 0.2500i | ans(:, :, 14, 1) =

| 0.2500 | 0.2500 |
| 0.0957 − 0.2310i | 0.0957 − 0.2310i |
| −0.1768 − 0.1768i | −0.1768 − 0.1768i |
| −0.2310 + 0.0957i | −0.2310 + 0.0957i |
| 0.2500 | −0.2500 |
| 0.0957 − 0.2310i | −0.0957 + 0.2310i |

-continued

|  |  |
|---|---|
| −0.1768 − 0.1768i | 0.1768 + 0.1768i |
| −0.2310 + 0.0957i | 0.2310 − 0.0957i | ans(:, :, 15, 1) =

|  |  |
|---|---|
| 0.2500 | 0.2500 |
| 0.1768 − 0.1768i | 0.1768 − 0.1768i |
| −0.0000 − 0.2500i | −0.0000 − 0.2500i |
| −0.1768 − 0.1768i | −0.1768 − 0.1768i |
| 0.2500 | −0.2500 |
| 0.1768 − 0.1768i | −0.1768 + 0.1768i |
| −0.0000 − 0.2500i | 0.0000 + 0.2500i |
| −0.1768 − 0.1768i | 0.1768 + 0.1768i | ans(:, :, 16, 1) =

|  |  |
|---|---|
| 0.2500 | 0.2500 |
| 0.2310 − 0.0957i | 0.2310 − 0.0957i |
| 0.1768 − 0.1768i | 0.1768 − 0.1768i |
| 0.0957 − 0.2310i | 0.0957 − 0.2310i |
| 0.2500 | −0.2500 |
| 0.2310 − 0.0957i | −0.2310 + 0.0957i |
| 0.1768 − 0.1768i | −0.1768 + 0.1768i |
| 0.0957 − 0.2310i | −0.0957 + 0.2310i | ans(:, :, 1, 2) =

|  |  |
|---|---|
| 0.2500 | 0.2500 |
| 0.2500 | 0.2500 |
| 0.2500 | 0.2500 |
| 0.2500 | 0.2500 |
| 0 + 0.2500i | 0 − 0.2500i |
| 0 + 0.2500i | 0 − 0.2500i |
| 0 + 0.2500i | 0 − 0.2500i |
| 0 + 0.2500i | 0 − 0.2500i | ans(:, :, 2, 2) =

|  |  |
|---|---|
| 0.2500 | 0.2500 |
| 0.2310 + 0.0957i | 0.2310 + 0.0957i |
| 0.1768 + 0.1768i | 0.1768 + 0.1768i |
| 0.0957 + 0.2310i | 0.0957 + 0.2310i |
| 0 + 0.2500i | 0 − 0.2500i |
| −0.0957 + 0.2310i | 0.0957 − 0.2310i |
| −0.1768 + 0.1768i | 0.1768 − 0.1768i |
| −0.2310 + 0.0957i | 0.2310 − 0.0957i | ans(:, :, 3, 2) =

|  |  |
|---|---|
| 0.2500 | 0.2500 |
| 0.1768 + 0.1768i | 0.1768 + 0.1768i |
| 0.0000 + 0.2500i | 0.0000 + 0.2500i |
| −0.1768 + 0.1768i | −0.1768 + 0.1768i |
| 0 + 0.2500i | 0 − 0.2500i |
| −0.1768 + 0.1768i | 0.1768 − 0.1768i |
| −0.2500 + 0.0000i | 0.2500 − 0.0000i |
| −0.1768 − 0.1768i | 0.1768 + 0.1768i | ans(:, :, 4, 2) =

|  |  |
|---|---|
| 0.2500 | 0.2500 |
| 0.0957 + 0.2310i | 0.0957 + 0.2310i |
| −0.1768 + 0.1768i | −0.1768 + 0.1768i |
| −0.2310 − 0.0957i | −0.2310 − 0.0957i |
| 0 + 0.2500i | 0 − 0.2500i |
| −0.2310 + 0.0957i | 0.2310 − 0.0957i |
| −0.1768 − 0.1768i | 0.1768 + 0.1768i |
| 0.0957 − 0.2310i | −0.0957 + 0.2310i | ans(:, :, 5, 2) =

|  |  |
|---|---|
| 0.2500 | 0.2500 |
| 0.0000 + 0.2500i | 0.0000 + 0.2500i |
| −0.2500 + 0.0000i | −0.2500 + 0.0000i |
| −0.0000 − 0.2500i | −0.0000 − 0.2500i |
| 0 + 0.2500i | 0 − 0.2500i |
| −0.2500 + 0.0000i | 0.2500 − 0.0000i |
| −0.0000 − 0.2500i | 0.0000 + 0.2500i |
| 0.2500 − 0.0000i | −0.2500 + 0.0000i | ans(:, :, 6, 2) =

|  |  |
|---|---|
| 0.2500 | 0.2500 |
| −0.0957 + 0.2310i | −0.0957 + 0.2310i |
| −0.1768 − 0.1768i | −0.1768 − 0.1768i |
| 0.2310 − 0.0957i | 0.2310 − 0.0957i |
| 0 + 0.2500i | 0 − 0.2500i |

-continued

|  |  |
|---|---|
| −0.2310 − 0.0957i | 0.2310 + 0.0957i |
| 0.1768 − 0.1768i | −0.1768 + 0.1768i |
| 0.0957 + 0.2310i | −0.0957 − 0.2310i | ans(:, :, 7, 2) =

| | |
|---|---|
| 0.2500 | 0.2500 |
| −0.1768 + 0.1768i | −0.1768 + 0.1768i |
| −0.0000 − 0.2500i | −0.0000 − 0.2500i |
| 0.1768 + 0.1768i | 0.1768 + 0.1768i |
| 0 + 0.2500i | 0 − 0.2500i |
| −0.1768 − 0.1768i | 0.1768 + 0.1768i |
| 0.2500 − 0.0000i | −0.2500 + 0.0000i |
| −0.1768 + 0.1768i | 0.1768 − 0.1768i | ans(:, :, 8, 2) =

| | |
|---|---|
| 0.2500 | 0.2500 |
| −0.2310 + 0.0957i | −0.2310 + 0.0957i |
| 0.1768 − 0.1768i | 0.1768 − 0.1768i |
| −0.0957 + 0.2310i | −0.0957 + 0.2310i |
| 0 + 0.2500i | 0 − 0.2500i |
| −0.0957 − 0.2310i | 0.0957 + 0.2310i |
| 0.1768 + 0.1768i | −0.1768 − 0.1768i |
| −0.2310 − 0.0957i | 0.2310 + 0.0957i | ans(:, :, 9, 2) =

| | |
|---|---|
| 0.2500 | 0.2500 |
| −0.2500 + 0.0000i | −0.2500 + 0.0000i |
| 0.2500 − 0.0000i | 0.2500 − 0.0000i |
| −0.2500 + 0.0000i | −0.2500 + 0.0000i |
| 0 + 0.2500i | 0 − 0.2500i |
| −0.0000 − 0.2500i | 0.0000 + 0.2500i |
| 0.0000 + 0.2500i | −0.0000 − 0.2500i |
| −0.0000 − 0.2500i | 0.0000 + 0.2500i | ans(:, :, 10, 2) =

| | |
|---|---|
| 0.2500 | 0.2500 |
| −0.2310 − 0.0957i | −0.2310 − 0.0957i |
| 0.1768 + 0.1768i | 0.1768 + 0.1768i |
| −0.0957 − 0.2310i | −0.0957 − 0.2310i |
| 0 + 0.2500i | 0 − 0.2500i |
| 0.0957 − 0.2310i | −0.0957 + 0.2310i |
| −0.1768 + 0.1768i | 0.1768 − 0.1768i |
| 0.2310 − 0.0957i | −0.2310 + 0.0957i | ans(:, :, 11, 2) =

| | |
|---|---|
| 0.2500 | 0.2500 |
| −0.1768 − 0.1768i | −0.1768 − 0.1768i |
| 0.0000 + 0.2500i | 0.0000 + 0.2500i |
| 0.1768 − 0.1768i | 0.1768 − 0.1768i |
| 0 + 0.2500i | 0 − 0.2500i |
| 0.1768 − 0.1768i | −0.1768 + 0.1768i |
| −0.2500 + 0.0000i | 0.2500 − 0.0000i |
| 0.1768 + 0.1768i | −0.1768 − 0.1768i | ans(:, :, 12, 2) =

| | |
|---|---|
| 0.2500 | 0.2500 |
| −0.0957 − 0.2310i | −0.0957 − 0.2310i |
| −0.1768 + 0.1768i | −0.1768 + 0.1768i |
| 0.2310 + 0.0957i | 0.2310 + 0.0957i |
| 0 + 0.2500i | 0 − 0.2500i |
| 0.2310 − 0.0957i | −0.2310 + 0.0957i |
| −0.1768 − 0.1768i | 0.1768 + 0.1768i |
| −0.0957 + 0.2310i | 0.0957 − 0.2310i | ans(:, :, 13, 2) =

| | |
|---|---|
| 0.2500 | 0.2500 |
| −0.0000 − 0.2500i | −0.0000 − 0.2500i |
| −0.2500 + 0.0000i | −0.2500 + 0.0000i |
| 0.0000 + 0.2500i | 0.0000 + 0.2500i |
| 0 + 0.2500i | 0 − 0.2500i |
| 0.2500 − 0.0000i | −0.2500 + 0.0000i |
| −0.0000 − 0.2500i | 0.0000 + 0.2500i |
| −0.2500 + 0.0000i | 0.2500 − 0.0000i | ans(:, :, 14, 2) =

| | |
|---|---|
| 0.2500 | 0.2500 |
| 0.0957 − 0.2310i | 0.0957 − 0.2310i |
| −0.1768 − 0.1768i | −0.1768 − 0.1768i |
| −0.2310 + 0.0957i | −0.2310 + 0.0957i |

-continued

|  |  |
|---|---|
| 0 + 0.2500i | 0 − 0.2500i |
| 0.2310 + 0.0957i | −0.2310 − 0.0957i |
| 0.1768 − 0.1768i | −0.1768 + 0.1768i |
| −0.0957 − 0.2310i | 0.0957 + 0.2310i | ans(:, :, 15, 2) =

|  |  |
|---|---|
| 0.2500 | 0.2500 |
| 0.1768 − 0.1768i | 0.1768 − 0.1768i |
| −0.0000 − 0.2500i | −0.0000 − 0.2500i |
| −0.1768 − 0.1768i | −0.1768 − 0.1768i |
| 0 + 0.2500i | 0 − 0.2500i |
| 0.1768 + 0.1768i | −0.1768 − 0.1768i |
| 0.2500 − 0.0000i | −0.2500 + 0.0000i |
| 0.1768 − 0.1768i | −0.1768 + 0.1768i | ans(:, :, 16, 2) =

|  |  |
|---|---|
| 0.2500 | 0.2500 |
| 0.2310 − 0.0957i | 0.2310 − 0.0957i |
| 0.1768 − 0.1768i | 0.1768 − 0.1768i |
| 0.0957 − 0.2310i | 0.0957 − 0.2310i |
| 0 + 0.2500i | 0 − 0.2500i |
| 0.0957 + 0.2310i | −0.0957 − 0.2310i |
| 0.1768 + 0.1768i | −0.1768 − 0.1768i |
| 0.2310 + 0.0957i | −0.2310 − 0.0957i | ans(:, :, 1, 3) =

|  |  |
|---|---|
| 0.2500 | 0.2500 |
| 0.2452 + 0.0488i | 0.2452 + 0.0488i |
| 0.2310 + 0.0957i | 0.2310 + 0.0957i |
| 0.2079 + 0.1389i | 0.2079 + 0.1389i |
| 0.2500 | −0.2500 |
| 0.2452 + 0.0488i | −0.2452 − 0.0488i |
| 0.2310 + 0.0957i | −0.2310 − 0.0957i |
| 0.2079 + 0.1389i | −0.2079 − 0.1389i | ans(:, :, 2, 3) =

|  |  |
|---|---|
| 0.2500 | 0.2500 |
| 0.2079 + 0.1389i | 0.2079 + 0.1389i |
| 0.0957 + 0.2310i | 0.0957 + 0.2310i |
| −0.0488 + 0.2452i | −0.0488 + 0.2452i |
| 0.2500 | −0.2500 |
| 0.2079 + 0.1389i | −0.2079 − 0.1389i |
| 0.0957 + 0.2310i | −0.0957 − 0.2310i |
| −0.0488 + 0.2452i | 0.0488 − 0.2452i | ans(:, :, 3, 3) =

|  |  |
|---|---|
| 0.2500 | 0.2500 |
| 0.1389 + 0.2079i | 0.1389 + 0.2079i |
| −0.0957 + 0.2310i | −0.0957 + 0.2310i |
| −0.2452 + 0.0488i | −0.2452 + 0.0488i |
| 0.2500 | −0.2500 |
| 0.1389 + 0.2079i | −0.1389 − 0.2079i |
| −0.0957 + 0.2310i | 0.0957 − 0.2310i |
| −0.2452 + 0.0488i | 0.2452 − 0.0488i | ans(:, :, 4, 3) =

|  |  |
|---|---|
| 0.2500 | 0.2500 |
| 0.0488 + 0.2452i | 0.0488 + 0.2452i |
| −0.2310 + 0.0957i | −0.2310 + 0.0957i |
| −0.1389 − 0.2079i | −0.1389 − 0.2079i |
| 0.2500 | −0.2500 |
| 0.0488 + 0.2452i | −0.0488 − 0.2452i |
| −0.2310 + 0.0957i | 0.2310 − 0.0957i |
| −0.1389 − 0.2079i | 0.1389 + 0.2079i | ans(:, :, 5, 3) =

|  |  |
|---|---|
| 0.2500 | 0.2500 |
| −0.0488 + 0.2452i | −0.0488 + 0.2452i |
| −0.2310 − 0.0957i | −0.2310 − 0.0957i |
| 0.1389 − 0.2079i | 0.1389 − 0.2079i |
| 0.2500 | −0.2500 |
| −0.0488 + 0.2452i | 0.0488 − 0.2452i |
| −0.2310 − 0.0957i | 0.2310 + 0.0957i |
| 0.1389 − 0.2079i | −0.1389 + 0.2079i | ans(:, :, 6, 3) =

|  |  |
|---|---|
| 0.2500 | 0.2500 |
| −0.1389 + 0.2079i | −0.1389 + 0.2079i |
| −0.0957 − 0.2310i | −0.0957 − 0.2310i |

| | |
|---|---|
| 0.2452 + 0.0488i | 0.2452 + 0.0488i |
| 0.2500 | −0.2500 |
| −0.1389 + 0.2079i | 0.1389 − 0.2079i |
| −0.0957 − 0.2310i | 0.0957 + 0.2310i |
| 0.2452 + 0.0488i | −0.2452 − 0.0488i | ans(:, :, 7, 3) =

| | |
|---|---|
| 0.2500 | 0.2500 |
| −0.2079 + 0.1389i | −0.2079 + 0.1389i |
| 0.0957 − 0.2310i | 0.0957 − 0.2310i |
| 0.0488 + 0.2452i | 0.0488 + 0.2452i |
| 0.2500 | −0.2500 |
| −0.2079 + 0.1389i | 0.2079 − 0.1389i |
| 0.0957 − 0.2310i | −0.0957 + 0.2310i |
| 0.0488 + 0.2452i | −0.0488 − 0.2452i | ans(:, :, 8, 3) =

| | |
|---|---|
| 0.2500 | 0.2500 |
| −0.2452 + 0.0488i | −0.2452 + 0.0488i |
| 0.2310 − 0.0957i | 0.2310 − 0.0957i |
| −0.2079 + 0.1389i | −0.2079 + 0.1389i |
| 0.2500 | −0.2500 |
| −0.2452 + 0.0488i | 0.2452 − 0.0488i |
| 0.2310 − 0.0957i | −0.2310 + 0.0957i |
| −0.2079 + 0.1389i | 0.2079 − 0.1389i | ans(:, :, 9, 3) =

| | |
|---|---|
| 0.2500 | 0.2500 |
| −0.2452 − 0.0488i | −0.2452 − 0.0488i |
| 0.2310 + 0.0957i | 0.2310 + 0.0957i |
| −0.2079 − 0.1389i | −0.2079 − 0.1389i |
| 0.2500 | −0.2500 |
| −0.2452 − 0.0488i | 0.2452 + 0.0488i |
| 0.2310 + 0.0957i | −0.2310 − 0.0957i |
| −0.2079 − 0.1389i | 0.2079 + 0.1389i | ans(:, :, 10, 3) =

| | |
|---|---|
| 0.2500 | 0.2500 |
| −0.2079 − 0.1389i | −0.2079 − 0.1389i |
| 0.0957 + 0.2310i | 0.0957 + 0.2310i |
| 0.0488 − 0.2452i | 0.0488 − 0.2452i |
| 0.2500 | −0.2500 |
| −0.2079 − 0.1389i | 0.2079 + 0.1389i |
| 0.0957 + 0.2310i | −0.0957 − 0.2310i |
| 0.0488 − 0.2452i | −0.0488 + 0.2452i | ans(:, :, 11, 3) =

| | |
|---|---|
| 0.2500 | 0.2500 |
| −0.1389 − 0.2079i | −0.1389 − 0.2079i |
| −0.0957 + 0.2310i | −0.0957 + 0.2310i |
| 0.2452 − 0.0488i | 0.2452 − 0.0488i |
| 0.2500 | −0.2500 |
| −0.1389 − 0.2079i | 0.1389 + 0.2079i |
| −0.0957 + 0.2310i | 0.0957 − 0.2310i |
| 0.2452 − 0.0488i | −0.2452 + 0.0488i | ans(:, :, 12, 3) =

| | |
|---|---|
| 0.2500 | 0.2500 |
| −0.0488 − 0.2452i | −0.0488 − 0.2452i |
| −0.2310 + 0.0957i | −0.2310 + 0.0957i |
| 0.1389 + 0.2079i | 0.1389 + 0.2079i |
| 0.2500 | −0.2500 |
| −0.0488 − 0.2452i | 0.0488 + 0.2452i |
| −0.2310 + 0.0957i | 0.2310 − 0.0957i |
| 0.1389 + 0.2079i | −0.1389 − 0.2079i | ans(:, :, 13, 3) =

| | |
|---|---|
| 0.2500 | 0.2500 |
| 0.0488 − 0.2452i | 0.0488 − 0.2452i |
| −0.2310 − 0.0957i | −0.2310 − 0.0957i |
| −0.1389 + 0.2079i | −0.1389 + 0.2079i |
| 0.2500 | −0.2500 |
| 0.0488 − 0.2452i | −0.0488 + 0.2452i |
| −0.2310 − 0.0957i | 0.2310 + 0.0957i |
| −0.1389 + 0.2079i | 0.1389 − 0.2079i | ans(:, :, 14, 3) =

| | |
|---|---|
| 0.2500 | 0.2500 |
| 0.1389 − 0.2079i | 0.1389 − 0.2079i |

|                  |                  |
|------------------|------------------|
| −0.0957 − 0.2310i | −0.0957 − 0.2310i |
| −0.2452 − 0.0488i | −0.2452 − 0.0488i |
| 0.2500           | −0.2500          |
| 0.1389 − 0.2079i | −0.1389 + 0.2079i |
| −0.0957 − 0.2310i | 0.0957 + 0.2310i |
| −0.2452 − 0.0488i | 0.2452 + 0.0488i | ans(:, :, 15, 3) =

|                  |                  |
|------------------|------------------|
| 0.2500           | 0.2500           |
| 0.2079 − 0.1389i | 0.2079 − 0.1389i |
| 0.0957 − 0.2310i | 0.0957 − 0.2310i |
| −0.0488 − 0.2452i | −0.0488 − 0.2452i |
| 0.2500           | −0.2500          |
| 0.2079 − 0.1389i | −0.2079 + 0.1389i |
| 0.0957 − 0.2310i | −0.0957 + 0.2310i |
| −0.0488 − 0.2452i | 0.0488 + 0.2452i | ans(:, :, 16, 3) =

|                  |                  |
|------------------|------------------|
| 0.2500           | 0.2500           |
| 0.2452 − 0.0488i | 0.2452 − 0.0488i |
| 0.2310 − 0.0957i | 0.2310 − 0.0957i |
| 0.2079 − 0.1389i | 0.2079 − 0.1389i |
| 0.2500           | −0.2500          |
| 0.2452 − 0.0488i | −0.2452 + 0.0488i |
| 0.2310 − 0.0957i | −0.2310 + 0.0957i |
| 0.2079 − 0.1389i | −0.2079 + 0.1389i | ans(:, :, 1, 4) =

|                  |                  |
|------------------|------------------|
| 0.2500           | 0.2500           |
| 0.2452 + 0.0488i | 0.2452 + 0.0488i |
| 0.2310 + 0.0957i | 0.2310 + 0.0957i |
| 0.2079 + 0.1389i | 0.2079 + 0.1389i |
| 0 + 0.2500i      | 0 − 0.2500i      |
| −0.0488 + 0.2452i | 0.0488 − 0.2452i |
| −0.0957 + 0.2310i | 0.0957 − 0.2310i |
| −0.1389 + 0.2079i | 0.1389 − 0.2079i | ans(:, :, 2, 4) =

|                  |                  |
|------------------|------------------|
| 0.2500           | 0.2500           |
| 0.2079 + 0.1389i | 0.2079 + 0.1389i |
| 0.0957 + 0.2310i | 0.0957 + 0.2310i |
| −0.0488 + 0.2452i | −0.0488 + 0.2452i |
| 0 + 0.2500i      | 0 − 0.2500i      |
| −0.1389 + 0.2079i | 0.1389 − 0.2079i |
| −0.2310 + 0.0957i | 0.2310 − 0.0957i |
| −0.2452 − 0.0488i | 0.2452 + 0.0488i | ans(:, :, 3, 4) =

|                  |                  |
|------------------|------------------|
| 0.2500           | 0.2500           |
| 0.1389 + 0.2079i | 0.1389 + 0.2079i |
| −0.0957 + 0.2310i | −0.0957 + 0.2310i |
| −0.2452 + 0.0488i | −0.2452 + 0.0488i |
| 0 + 0.2500i      | 0 − 0.2500i      |
| −0.2079 + 0.1389i | 0.2079 − 0.1389i |
| −0.2310 − 0.0957i | 0.2310 + 0.0957i |
| −0.0488 − 0.2452i | 0.0488 + 0.2452i | ans(:, :, 4, 4) =

|                  |                  |
|------------------|------------------|
| 0.2500           | 0.2500           |
| 0.0488 + 0.2452i | 0.0488 + 0.2452i |
| −0.2310 + 0.0957i | −0.2310 + 0.0957i |
| −0.1389 − 0.2079i | −0.1389 − 0.2079i |
| 0 + 0.2500i      | 0 − 0.2500i      |
| −0.2452 + 0.0488i | 0.2452 − 0.0488i |
| −0.0957 − 0.2310i | 0.0957 + 0.2310i |
| 0.2079 − 0.1389i | −0.2079 + 0.1389i | ans(:, :, 5, 4) =

|                  |                  |
|------------------|------------------|
| 0.2500           | 0.2500           |
| −0.0488 + 0.2452i | −0.0488 + 0.2452i |
| −0.2310 − 0.0957i | −0.2310 − 0.0957i |
| 0.1389 − 0.2079i | 0.1389 − 0.2079i |
| 0 + 0.2500i      | 0 − 0.2500i      |
| −0.2452 − 0.0488i | 0.2452 + 0.0488i |
| 0.0957 − 0.2310i | −0.0957 + 0.2310i |
| 0.2079 + 0.1389i | −0.2079 − 0.1389i |

-continued ans(:, :, 6, 4) =

| 0.2500 | 0.2500 |
| −0.1389 + 0.2079i | −0.1389 + 0.2079i |
| −0.0957 − 0.2310i | −0.0957 − 0.2310i |
| 0.2452 + 0.0488i | 0.2452 + 0.0488i |
| 0 + 0.2500i | 0 − 0.2500i |
| −0.2079 − 0.1389i | 0.2079 + 0.1389i |
| 0.2310 − 0.0957i | −0.2310 + 0.0957i |
| −0.0488 + 0.2452i | 0.0488 − 0.2452i | ans(:, :, 7, 4) =

| 0.2500 | 0.2500 |
| −0.2079 + 0.1389i | −0.2079 + 0.1389i |
| 0.0957 − 0.2310i | 0.0957 − 0.2310i |
| 0.0488 + 0.2452i | 0.0488 + 0.2452i |
| 0 + 0.2500i | 0 − 0.2500i |
| −0.1389 − 0.2079i | 0.1389 + 0.2079i |
| 0.2310 + 0.0957i | −0.2310 − 0.0957i |
| −0.2452 + 0.0488i | 0.2452 − 0.0488i | ans(:, :, 8, 4) =

| 0.2500 | 0.2500 |
| −0.2452 + 0.0488i | −0.2452 + 0.0488i |
| 0.2310 − 0.0957i | 0.2310 − 0.0957i |
| −0.2079 + 0.1389i | −0.2079 + 0.1389i |
| 0 + 0.2500i | 0 − 0.2500i |
| −0.0488 − 0.2452i | 0.0488 + 0.2452i |
| 0.0957 + 0.2310i | −0.0957 − 0.2310i |
| −0.1389 − 0.2079i | 0.1389 + 0.2079i | ans(:, :, 9, 4) =

| 0.2500 | 0.2500 |
| −0.2452 − 0.0488i | −0.2452 − 0.0488i |
| 0.2310 + 0.0957i | 0.2310 + 0.0957i |
| −0.2079 − 0.1389i | −0.2079 − 0.1389i |
| 0 + 0.2500i | 0 − 0.2500i |
| 0.0488 − 0.2452i | −0.0488 + 0.2452i |
| −0.0957 + 0.2310i | 0.0957 − 0.2310i |
| 0.1389 − 0.2079i | −0.1389 + 0.2079i | ans(:, :, 10, 4) =

| 0.2500 | 0.2500 |
| −0.2079 − 0.1389i | −0.2079 − 0.1389i |
| 0.0957 + 0.2310i | 0.0957 + 0.2310i |
| 0.0488 − 0.2452i | 0.0488 − 0.2452i |
| 0 + 0.2500i | 0 − 0.2500i |
| 0.1389 − 0.2079i | −0.1389 + 0.2079i |
| −0.2310 + 0.0957i | 0.2310 − 0.0957i |
| 0.2452 + 0.0488i | −0.2452 − 0.0488i | ans(:, :, 11, 4) =

| 0.2500 | 0.2500 |
| −0.1389 − 0.2079i | −0.1389 − 0.2079i |
| −0.0957 + 0.2310i | −0.0957 + 0.2310i |
| 0.2452 − 0.0488i | 0.2452 − 0.0488i |
| 0 + 0.2500i | 0 − 0.2500i |
| 0.2079 − 0.1389i | −0.2079 + 0.1389i |
| −0.2310 − 0.0957i | 0.2310 + 0.0957i |
| 0.0488 + 0.2452i | −0.0488 − 0.2452i | ans(:, :, 12, 4) =

| 0.2500 | 0.2500 |
| −0.0488 − 0.2452i | −0.0488 − 0.2452i |
| −0.2310 + 0.0957i | −0.2310 + 0.0957i |
| 0.1389 + 0.2079i | 0.1389 + 0.2079i |
| 0 + 0.2500i | 0 − 0.2500i |
| 0.2452 − 0.0488i | −0.2452 + 0.0488i |
| −0.0957 − 0.2310i | 0.0957 + 0.2310i |
| −0.2079 + 0.1389i | 0.2079 − 0.1389i | ans(:, :, 13, 4) =

| 0.2500 | 0.2500 |
| 0.0488 − 0.2452i | 0.0488 − 0.2452i |
| −0.2310 − 0.0957i | −0.2310 − 0.0957i |
| −0.1389 + 0.2079i | −0.1389 + 0.2079i |
| 0 + 0.2500i | 0 − 0.2500i |
| 0.2452 + 0.0488i | −0.2452 − 0.0488i |

-continued

| | |
|---|---|
| 0.0957 − 0.2310i | −0.0957 + 0.2310i |
| −0.2079 − 0.1389i | 0.2079 + 0.1389i | ans(:, :, 14, 4) =

| | |
|---|---|
| 0.2500 | 0.2500 |
| 0.1389 − 0.2079i | 0.1389 − 0.2079i |
| −0.0957 − 0.2310i | −0.0957 − 0.2310i |
| −0.2452 − 0.0488i | −0.2452 − 0.0488i |
| 0 + 0.2500i | 0 − 0.2500i |
| 0.2079 + 0.1389i | −0.2079 − 0.1389i |
| 0.2310 − 0.0957i | −0.2310 + 0.0957i |
| 0.0488 − 0.2452i | −0.0488 + 0.2452i | ans(:, :, 15, 4) =

| | |
|---|---|
| 0.2500 | 0.2500 |
| 0.2079 − 0.1389i | 0.2079 − 0.1389i |
| 0.0957 − 0.2310i | 0.0957 − 0.2310i |
| −0.0488 − 0.2452i | −0.0488 − 0.2452i |
| 0 + 0.2500i | 0 − 0.2500i |
| 0.1389 + 0.2079i | −0.1389 − 0.2079i |
| 0.2310 + 0.0957i | −0.2310 − 0.0957i |
| 0.2452 − 0.0488i | −0.2452 + 0.0488i | ans(:, :, 16, 4) =

| | |
|---|---|
| 0.2500 | 0.2500 |
| 0.2452 − 0.0488i | 0.2452 − 0.0488i |
| 0.2310 − 0.0957i | 0.2310 − 0.0957i |
| 0.2079 − 0.1389i | 0.2079 − 0.1389i |
| 0 + 0.2500i | 0 − 0.2500i |
| 0.0488 + 0.2452i | −0.0488 − 0.2452i |
| 0.0957 + 0.2310i | −0.0957 − 0.2310i |
| 0.1389 + 0.2079i | −0.1389 − 0.2079i | ans(:, :, 1, 5) =

| | |
|---|---|
| 0.2500 | 0.2500 |
| 0.2310 + 0.0957i | 0.2310 + 0.0957i |
| 0.1768 + 0.1768i | 0.1768 + 0.1768i |
| 0.0957 + 0.2310i | 0.0957 + 0.2310i |
| 0.2500 | −0.2500 |
| 0.2310 + 0.0957i | −0.2310 − 0.0957i |
| 0.1768 + 0.1768i | −0.1768 − 0.1768i |
| 0.0957 + 0.2310i | −0.0957 − 0.2310i | ans(:, :, 2, 5) =

| | |
|---|---|
| 0.2500 | 0.2500 |
| 0.1768 + 0.1768i | 0.1768 + 0.1768i |
| 0.0000 + 0.2500i | 0.0000 + 0.2500i |
| −0.1768 + 0.1768i | −0.1768 + 0.1768i |
| 0.2500 | −0.2500 |
| 0.1768 + 0.1768i | −0.1768 − 0.1768i |
| 0.0000 + 0.2500i | −0.0000 − 0.2500i |
| −0.1768 + 0.1768i | 0.1768 − 0.1768i | ans(:, :, 3, 5) =

| | |
|---|---|
| 0.2500 | 0.2500 |
| 0.0957 + 0.2310i | 0.0957 + 0.2310i |
| −0.1768 + 0.1768i | −0.1768 + 0.1768i |
| −0.2310 − 0.0957i | −0.2310 − 0.0957i |
| 0.2500 | −0.2500 |
| 0.0957 + 0.2310i | −0.0957 − 0.2310i |
| −0.1768 + 0.1768i | 0.1768 − 0.1768i |
| −0.2310 − 0.0957i | 0.2310 + 0.0957i | ans(:, :, 4, 5) =

| | |
|---|---|
| 0.2500 | 0.2500 |
| 0.0000 + 0.2500i | 0.0000 + 0.2500i |
| −0.2500 + 0.0000i | −0.2500 + 0.0000i |
| −0.0000 − 0.2500i | −0.0000 − 0.2500i |
| 0.2500 | −0.2500 |
| 0.0000 + 0.2500i | −0.0000 − 0.2500i |
| −0.2500 + 0.0000i | 0.2500 − 0.0000i |
| −0.0000 − 0.2500i | 0.0000 + 0.2500i | ans(:, :, 5, 5) =

| | |
|---|---|
| 0.2500 | 0.2500 |
| −0.0957 + 0.2310i | −0.0957 + 0.2310i |
| −0.1768 − 0.1768i | −0.1768 − 0.1768i |
| 0.2310 − 0.0957i | 0.2310 − 0.0957i |
| 0.2500 | −0.2500 |

-continued

| | |
|---|---|
| −0.0957 + 0.2310i | 0.0957 − 0.2310i |
| −0.1768 − 0.1768i | 0.1768 + 0.1768i |
| 0.2310 − 0.0957i | −0.2310 + 0.0957i | ans(:, :, 6, 5) =

| | |
|---|---|
| 0.2500 | 0.2500 |
| −0.1768 + 0.1768i | −0.1768 + 0.1768i |
| −0.0000 − 0.2500i | −0.0000 − 0.2500i |
| 0.1768 + 0.1768i | 0.1768 + 0.1768i |
| 0.2500 | −0.2500 |
| −0.1768 + 0.1768i | 0.1768 − 0.1768i |
| −0.0000 − 0.2500i | 0.0000 + 0.2500i |
| 0.1768 + 0.1768i | −0.1768 − 0.1768i | ans(:, :, 7, 5) =

| | |
|---|---|
| 0.2500 | 0.2500 |
| −0.2310 + 0.0957i | −0.2310 + 0.0957i |
| 0.1768 − 0.1768i | 0.1768 − 0.1768i |
| −0.0957 + 0.2310i | −0.0957 + 0.2310i |
| 0.2500 | −0.2500 |
| −0.2310 + 0.0957i | 0.2310 − 0.0957i |
| 0.1768 − 0.1768i | −0.1768 + 0.1768i |
| −0.0957 + 0.2310i | 0.0957 − 0.2310i | ans(:, :, 8, 5) =

| | |
|---|---|
| 0.2500 | 0.2500 |
| −0.2500 + 0.0000i | −0.2500 + 0.0000i |
| 0.2500 − 0.0000i | 0.2500 − 0.0000i |
| −0.2500 + 0.0000i | −0.2500 + 0.0000i |
| 0.2500 | −0.2500 |
| −0.2500 + 0.0000i | 0.2500 − 0.0000i |
| 0.2500 − 0.0000i | −0.2500 + 0.0000i |
| −0.2500 + 0.0000i | 0.2500 − 0.0000i | ans(:, :, 9, 5) =

| | |
|---|---|
| 0.2500 | 0.2500 |
| −0.2310 − 0.0957i | −0.2310 − 0.0957i |
| 0.1768 + 0.1768i | 0.1768 + 0.1768i |
| −0.0957 − 0.2310i | −0.0957 − 0.2310i |
| 0.2500 | −0.2500 |
| −0.2310 − 0.0957i | 0.2310 + 0.0957i |
| 0.1768 + 0.1768i | −0.1768 − 0.1768i |
| −0.0957 − 0.2310i | 0.0957 + 0.2310i | ans(:, :, 10, 5) =

| | |
|---|---|
| 0.2500 | 0.2500 |
| −0.1768 − 0.1768i | −0.1768 − 0.1768i |
| 0.0000 + 0.2500i | 0.0000 + 0.2500i |
| 0.1768 − 0.1768i | 0.1768 − 0.1768i |
| 0.2500 | −0.2500 |
| −0.1768 − 0.1768i | 0.1768 + 0.1768i |
| 0.0000 + 0.2500i | −0.0000 − 0.2500i |
| 0.1768 − 0.1768i | −0.1768 + 0.1768i | ans(:, :, 11, 5) =

| | |
|---|---|
| 0.2500 | 0.2500 |
| −0.0957 − 0.2310i | −0.0957 − 0.2310i |
| −0.1768 + 0.1768i | −0.1768 + 0.1768i |
| 0.2310 + 0.0957i | 0.2310 + 0.0957i |
| 0.2500 | −0.2500 |
| −0.0957 − 0.2310i | 0.0957 + 0.2310i |
| −0.1768 + 0.1768i | 0.1768 − 0.1768i |
| 0.2310 + 0.0957i | −0.2310 − 0.0957i | ans(:, :, 12, 5) =

| | |
|---|---|
| 0.2500 | 0.2500 |
| −0.0000 − 0.2500i | −0.0000 − 0.2500i |
| −0.2500 + 0.0000i | −0.2500 + 0.0000i |
| 0.0000 + 0.2500i | 0.0000 + 0.2500i |
| 0.2500 | −0.2500 |
| −0.0000 − 0.2500i | 0.0000 + 0.2500i |
| −0.2500 + 0.0000i | 0.2500 − 0.0000i |
| 0.0000 + 0.2500i | −0.0000 − 0.2500i | ans(:, :, 13, 5) =

| | |
|---|---|
| 0.2500 | 0.2500 |
| 0.0957 − 0.2310i | 0.0957 − 0.2310i |
| −0.1768 − 0.1768i | −0.1768 − 0.1768i |
| −0.2310 + 0.0957i | −0.2310 + 0.0957i |

```
     0.2500                          −0.2500
 0.0957 − 0.2310i                −0.0957 + 0.2310i
−0.1768 − 0.1768i                 0.1768 + 0.1768i
−0.2310 + 0.0957i                 0.2310 − 0.0957i
``` ans(:, :, 14, 5) =

```
     0.2500                           0.2500
 0.1768 − 0.1768i                 0.1768 − 0.1768i
−0.0000 − 0.2500i                −0.0000 − 0.2500i
−0.1768 − 0.1768i                −0.1768 − 0.1768i
     0.2500                          −0.2500
 0.1768 − 0.1768i                −0.1768 + 0.1768i
−0.0000 − 0.2500i                 0.0000 + 0.2500i
−0.1768 − 0.1768i                 0.1768 + 0.1768i
``` ans(:, :, 15, 5) =

```
     0.2500                           0.2500
 0.2310 − 0.0957i                 0.2310 − 0.0957i
 0.1768 − 0.1768i                 0.1768 − 0.1768i
 0.0957 − 0.2310i                 0.0957 − 0.2310i
     0.2500                          −0.2500
 0.2310 − 0.0957i                −0.2310 + 0.0957i
 0.1768 − 0.1768i                −0.1768 + 0.1768i
 0.0957 − 0.2310i                −0.0957 + 0.2310i
``` ans(:, :, 16, 5) =

```
     0.2500                           0.2500
     0.2500                           0.2500
     0.2500                           0.2500
     0.2500                           0.2500
     0.2500                          −0.2500
     0.2500                          −0.2500
     0.2500                          −0.2500
     0.2500                          −0.2500
``` ans(:, :, 1, 6) =

```
     0.2500                           0.2500
 0.2310 + 0.0957i                 0.2310 + 0.0957i
 0.1768 + 0.1768i                 0.1768 + 0.1768i
 0.0957 + 0.2310i                 0.0957 + 0.2310i
     0 + 0.2500i                       0 − 0.2500i
−0.0957 + 0.2310i                 0.0957 − 0.2310i
−0.1768 + 0.1768i                 0.1768 − 0.1768i
−0.2310 + 0.0957i                 0.2310 − 0.0957i
``` ans(:, :, 2, 6) =

```
     0.2500                           0.2500
 0.1768 + 0.1768i                 0.1768 + 0.1768i
 0.0000 + 0.2500i                 0.0000 + 0.2500i
−0.1768 + 0.1768i                −0.1768 + 0.1768i
     0 + 0.2500i                       0 − 0.2500i
−0.1768 + 0.1768i                 0.1768 − 0.1768i
−0.2500 + 0.0000i                 0.2500 − 0.0000i
−0.1768 − 0.1768i                 0.1768 + 0.1768i
``` ans(:, :, 3, 6) =

```
     0.2500                           0.2500
 0.0957 + 0.2310i                 0.0957 + 0.2310i
−0.1768 + 0.1768i                −0.1768 + 0.1768i
−0.2310 − 0.0957i                −0.2310 − 0.0957i
     0 + 0.2500i                       0 − 0.2500i
−0.2310 + 0.0957i                 0.2310 − 0.0957i
−0.1768 − 0.1768i                 0.1768 + 0.1768i
 0.0957 − 0.2310i                −0.0957 + 0.2310i
``` ans(:, :, 4, 6) =

```
     0.2500                           0.2500
 0.0000 + 0.2500i                 0.0000 + 0.2500i
−0.2500 + 0.0000i                −0.2500 + 0.0000i
−0.0000 − 0.2500i                −0.0000 − 0.2500i
     0 + 0.2500i                       0 − 0.2500i
−0.2500 + 0.0000i                 0.2500 − 0.0000i
−0.0000 − 0.2500i                 0.0000 + 0.2500i
 0.2500 − 0.0000i                −0.2500 + 0.0000i
``` ans(:, :, 5, 6) =

```
     0.2500                           0.2500
−0.0957 + 0.2310i                −0.0957 + 0.2310i
−0.1768 − 0.1768i                −0.1768 − 0.1768i
```

-continued

| | |
|---|---|
| 0.2310 − 0.0957i | 0.2310 − 0.0957i |
| 0 + 0.2500i | 0 − 0.2500i |
| −0.2310 − 0.0957i | 0.2310 + 0.0957i |
| 0.1768 − 0.1768i | −0.1768 + 0.1768i |
| 0.0957 + 0.2310i | −0.0957 − 0.2310i | ans(:, :, 6, 6) =

| | |
|---|---|
| 0.2500 | 0.2500 |
| −0.1768 + 0.1768i | −0.1768 + 0.1768i |
| −0.0000 − 0.2500i | −0.0000 − 0.2500i |
| 0.1768 + 0.1768i | 0.1768 + 0.1768i |
| 0 + 0.2500i | 0 − 0.2500i |
| −0.1768 − 0.1768i | 0.1768 + 0.1768i |
| 0.2500 − 0.0000i | −0.2500 + 0.0000i |
| −0.1768 + 0.1768i | 0.1768 − 0.1768i | ans(:, :, 7, 6) =

| | |
|---|---|
| 0.2500 | 0.2500 |
| −0.2310 + 0.0957i | −0.2310 + 0.0957i |
| 0.1768 − 0.1768i | 0.1768 − 0.1768i |
| −0.0957 + 0.2310i | −0.0957 + 0.2310i |
| 0 + 0.2500i | 0 − 0.2500i |
| −0.0957 − 0.2310i | 0.0957 + 0.2310i |
| 0.1768 + 0.1768i | −0.1768 − 0.1768i |
| −0.2310 − 0.0957i | 0.2310 + 0.0957i | ans(:, :, 8, 6) =

| | |
|---|---|
| 0.2500 | 0.2500 |
| −0.2500 + 0.0000i | −0.2500 + 0.0000i |
| 0.2500 − 0.0000i | 0.2500 − 0.0000i |
| −0.2500 + 0.0000i | −0.2500 + 0.0000i |
| 0 + 0.2500i | 0 − 0.2500i |
| −0.0000 − 0.2500i | 0.0000 + 0.2500i |
| 0.0000 + 0.2500i | −0.0000 − 0.2500i |
| −0.0000 − 0.2500i | 0.0000 + 0.2500i | ans(:, :, 9, 6) =

| | |
|---|---|
| 0.2500 | 0.2500 |
| −0.2310 − 0.0957i | −0.2310 − 0.0957i |
| 0.1768 + 0.1768i | 0.1768 + 0.1768i |
| −0.0957 − 0.2310i | −0.0957 − 0.2310i |
| 0 + 0.2500i | 0 − 0.2500i |
| 0.0957 − 0.2310i | −0.0957 + 0.2310i |
| −0.1768 + 0.1768i | 0.1768 − 0.1768i |
| 0.2310 − 0.0957i | −0.2310 + 0.0957i | ans(:, :, 10, 6) =

| | |
|---|---|
| 0.2500 | 0.2500 |
| −0.1768 − 0.1768i | −0.1768 − 0.1768i |
| 0.0000 + 0.2500i | 0.0000 + 0.2500i |
| 0.1768 − 0.1768i | 0.1768 − 0.1768i |
| 0 + 0.2500i | 0 − 0.2500i |
| 0.1768 − 0.1768i | −0.1768 + 0.1768i |
| −0.2500 + 0.0000i | 0.2500 − 0.0000i |
| 0.1768 + 0.1768i | −0.1768 − 0.1768i | ans(:, :, 11, 6) =

| | |
|---|---|
| 0.2500 | 0.2500 |
| −0.0957 − 0.2310i | −0.0957 − 0.2310i |
| −0.1768 + 0.1768i | −0.1768 + 0.1768i |
| 0.2310 + 0.0957i | 0.2310 + 0.0957i |
| 0 + 0.2500i | 0 − 0.2500i |
| 0.2310 − 0.0957i | −0.2310 + 0.0957i |
| −0.1768 − 0.1768i | 0.1768 + 0.1768i |
| −0.0957 + 0.2310i | 0.0957 − 0.2310i | ans(:, :, 12, 6) =

| | |
|---|---|
| 0.2500 | 0.2500 |
| −0.0000 − 0.2500i | −0.0000 − 0.2500i |
| −0.2500 + 0.0000i | −0.2500 + 0.0000i |
| 0.0000 + 0.2500i | 0.0000 + 0.2500i |
| 0 + 0.2500i | 0 − 0.2500i |
| 0.2500 − 0.0000i | −0.2500 + 0.0000i |
| −0.0000 − 0.2500i | 0.0000 + 0.2500i |
| −0.2500 + 0.0000i | 0.2500 − 0.0000i | ans(:, :, 13, 6) =

| | |
|---|---|
| 0.2500 | 0.2500 |
| 0.0957 − 0.2310i | 0.0957 − 0.2310i |

-continued

| | |
|---|---|
| −0.1768 − 0.1768i | −0.1768 − 0.1768i |
| −0.2310 + 0.0957i | −0.2310 + 0.0957i |
| 0 + 0.2500i | 0 − 0.2500i |
| 0.2310 + 0.0957i | −0.2310 − 0.0957i |
| 0.1768 − 0.1768i | −0.1768 + 0.1768i |
| −0.0957 − 0.2310i | 0.0957 + 0.2310i | ans(:, :, 14, 6) =

| | |
|---|---|
| 0.2500 | 0.2500 |
| 0.1768 − 0.1768i | 0.1768 − 0.1768i |
| −0.0000 − 0.2500i | −0.0000 − 0.2500i |
| −0.1768 − 0.1768i | −0.1768 − 0.1768i |
| 0 + 0.2500i | 0 − 0.2500i |
| 0.1768 + 0.1768i | −0.1768 − 0.1768i |
| 0.2500 − 0.0000i | −0.2500 + 0.0000i |
| 0.1768 − 0.1768i | −0.1768 + 0.1768i | ans(:, :, 15, 6) =

| | |
|---|---|
| 0.2500 | 0.2500 |
| 0.2310 − 0.0957i | 0.2310 − 0.0957i |
| 0.1768 − 0.1768i | 0.1768 − 0.1768i |
| 0.0957 − 0.2310i | 0.0957 − 0.2310i |
| 0 + 0.2500i | 0 − 0.2500i |
| 0.0957 + 0.2310i | −0.0957 − 0.2310i |
| 0.1768 + 0.1768i | −0.1768 − 0.1768i |
| 0.2310 + 0.0957i | −0.2310 − 0.0957i | ans(:, :, 16, 6) =

| | |
|---|---|
| 0.2500 | 0.2500 |
| 0.2500 | 0.2500 |
| 0.2500 | 0.2500 |
| 0.2500 | 0.2500 |
| 0 + 0.2500i | 0 − 0.2500i |
| 0 + 0.2500i | 0 − 0.2500i |
| 0 + 0.2500i | 0 − 0.2500i |
| 0 + 0.2500i | 0 − 0.2500i | ans(:, :, 1, 7) =

| | |
|---|---|
| 0.2500 | 0.2500 |
| 0.2079 + 0.1389i | 0.2079 + 0.1389i |
| 0.0957 + 0.2310i | 0.0957 + 0.2310i |
| −0.0488 + 0.2452i | −0.0488 + 0.2452i |
| 0.2500 | −0.2500 |
| 0.2079 + 0.1389i | −0.2079 − 0.1389i |
| 0.0957 + 0.2310i | −0.0957 − 0.2310i |
| −0.0488 + 0.2452i | 0.0488 − 0.2452i | ans(:, :, 2, 7) =

| | |
|---|---|
| 0.2500 | 0.2500 |
| 0.1389 + 0.2079i | 0.1389 + 0.2079i |
| −0.0957 + 0.2310i | −0.0957 + 0.2310i |
| −0.2452 + 0.0488i | −0.2452 + 0.0488i |
| 0.2500 | −0.2500 |
| 0.1389 + 0.2079i | −0.1389 − 0.2079i |
| −0.0957 + 0.2310i | 0.0957 − 0.2310i |
| −0.2452 + 0.0488i | 0.2452 − 0.0488i | ans(:, :, 3, 7) =

| | |
|---|---|
| 0.2500 | 0.2500 |
| 0.0488 + 0.2452i | 0.0488 + 0.2452i |
| −0.2310 + 0.0957i | −0.2310 + 0.0957i |
| −0.1389 − 0.2079i | −0.1389 − 0.2079i |
| 0.2500 | −0.2500 |
| 0.0488 + 0.2452i | −0.0488 − 0.2452i |
| −0.2310 + 0.0957i | 0.2310 − 0.0957i |
| −0.1389 − 0.2079i | 0.1389 + 0.2079i | ans(:, :, 4, 7) =

| | |
|---|---|
| 0.2500 | 0.2500 |
| −0.0488 + 0.2452i | −0.0488 + 0.2452i |
| −0.2310 − 0.0957i | −0.2310 − 0.0957i |
| 0.1389 − 0.2079i | 0.1389 − 0.2079i |
| 0.2500 | −0.2500 |
| −0.0488 + 0.2452i | 0.0488 − 0.2452i |
| −0.2310 − 0.0957i | 0.2310 + 0.0957i |
| 0.1389 − 0.2079i | −0.1389 + 0.2079i |

-continued

| ans(:, :, 5, 7) = | |
|---|---|
| 0.2500 | 0.2500 |
| −0.1389 + 0.2079i | −0.1389 + 0.2079i |
| −0.0957 − 0.2310i | −0.0957 − 0.2310i |
| 0.2452 + 0.0488i | 0.2452 + 0.0488i |
| 0.2500 | −0.2500 |
| −0.1389 + 0.2079i | 0.1389 − 0.2079i |
| −0.0957 − 0.2310i | 0.0957 + 0.2310i |
| 0.2452 + 0.0488i | −0.2452 − 0.0488i |

| ans(:, :, 6, 7) = | |
|---|---|
| 0.2500 | 0.2500 |
| −0.2079 + 0.1389i | −0.2079 + 0.1389i |
| 0.0957 − 0.2310i | 0.0957 − 0.2310i |
| 0.0488 + 0.2452i | 0.0488 + 0.2452i |
| 0.2500 | −0.2500 |
| −0.2079 + 0.1389i | 0.2079 − 0.1389i |
| 0.0957 − 0.2310i | −0.0957 + 0.2310i |
| 0.0488 + 0.2452i | −0.0488 − 0.2452i |

| ans(:, :, 7, 7) = | |
|---|---|
| 0.2500 | 0.2500 |
| −0.2452 + 0.0488i | −0.2452 + 0.0488i |
| 0.2310 − 0.0957i | 0.2310 − 0.0957i |
| −0.2079 + 0.1389i | −0.2079 + 0.1389i |
| 0.2500 | −0.2500 |
| −0.2452 + 0.0488i | 0.2452 − 0.0488i |
| 0.2310 − 0.0957i | −0.2310 + 0.0957i |
| −0.2079 + 0.1389i | 0.2079 − 0.1389i |

| ans(:, :, 8, 7) = | |
|---|---|
| 0.2500 | 0.2500 |
| −0.2452 − 0.0488i | −0.2452 − 0.0488i |
| 0.2310 + 0.0957i | 0.2310 + 0.0957i |
| −0.2079 − 0.1389i | −0.2079 − 0.1389i |
| 0.2500 | −0.2500 |
| −0.2452 − 0.0488i | 0.2452 + 0.0488i |
| 0.2310 + 0.0957i | −0.2310 − 0.0957i |
| −0.2079 − 0.1389i | 0.2079 + 0.1389i |

| ans(:, :, 9, 7) = | |
|---|---|
| 0.2500 | 0.2500 |
| −0.2079 − 0.1389i | −0.2079 − 0.1389i |
| 0.0957 + 0.2310i | 0.0957 + 0.2310i |
| 0.0488 − 0.2452i | 0.0488 − 0.2452i |
| 0.2500 | −0.2500 |
| −0.2079 − 0.1389i | 0.2079 + 0.1389i |
| 0.0957 + 0.2310i | −0.0957 − 0.2310i |
| 0.0488 − 0.2452i | −0.0488 + 0.2452i |

| ans(:, :, 10, 7) = | |
|---|---|
| 0.2500 | 0.2500 |
| −0.1389 − 0.2079i | −0.1389 − 0.2079i |
| −0.0957 + 0.2310i | −0.0957 + 0.2310i |
| 0.2452 − 0.0488i | 0.2452 − 0.0488i |
| 0.2500 | −0.2500 |
| −0.1389 − 0.2079i | 0.1389 + 0.2079i |
| −0.0957 + 0.2310i | 0.0957 − 0.2310i |
| 0.2452 − 0.0488i | −0.2452 + 0.0488i |

| ans(:, :, 11, 7) = | |
|---|---|
| 0.2500 | 0.2500 |
| −0.0488 − 0.2452i | −0.0488 − 0.2452i |
| −0.2310 + 0.0957i | −0.2310 + 0.0957i |
| 0.1389 + 0.2079i | 0.1389 + 0.2079i |
| 0.2500 | −0.2500 |
| −0.0488 − 0.2452i | 0.0488 + 0.2452i |
| −0.2310 + 0.0957i | 0.2310 − 0.0957i |
| 0.1389 + 0.2079i | −0.1389 − 0.2079i |

| ans(:, :, 12, 7) = | |
|---|---|
| 0.2500 | 0.2500 |
| 0.0488 − 0.2452i | 0.0488 − 0.2452i |
| −0.2310 − 0.0957i | −0.2310 − 0.0957i |
| −0.1389 + 0.2079i | −0.1389 + 0.2079i |
| 0.2500 | −0.2500 |
| 0.0488 − 0.2452i | −0.0488 + 0.2452i |

-continued

|  |  |
|---|---|
| −0.2310 − 0.0957i | 0.2310 + 0.0957i |
| −0.1389 + 0.2079i | 0.1389 − 0.2079i | ans(:, :, 13, 7) =

| 0.2500 | 0.2500 |
|---|---|
| 0.1389 − 0.2079i | 0.1389 − 0.2079i |
| −0.0957 − 0.2310i | −0.0957 − 0.2310i |
| −0.2452 − 0.0488i | −0.2452 − 0.0488i |
| 0.2500 | −0.2500 |
| 0.1389 − 0.2079i | −0.1389 + 0.2079i |
| −0.0957 − 0.2310i | 0.0957 + 0.2310i |
| −0.2452 − 0.0488i | 0.2452 + 0.0488i | ans(:, :, 14, 7) =

| 0.2500 | 0.2500 |
|---|---|
| 0.2079 − 0.1389i | 0.2079 − 0.1389i |
| 0.0957 − 0.2310i | 0.0957 − 0.2310i |
| −0.0488 − 0.2452i | −0.0488 − 0.2452i |
| 0.2500 | −0.2500 |
| 0.2079 − 0.1389i | −0.2079 + 0.1389i |
| 0.0957 − 0.2310i | −0.0957 + 0.2310i |
| −0.0488 − 0.2452i | 0.0488 + 0.2452i | ans(:, :, 15, 7) =

| 0.2500 | 0.2500 |
|---|---|
| 0.2452 − 0.0488i | 0.2452 − 0.0488i |
| 0.2310 − 0.0957i | 0.2310 − 0.0957i |
| 0.2079 − 0.1389i | 0.2079 − 0.1389i |
| 0.2500 | −0.2500 |
| 0.2452 − 0.0488i | −0.2452 + 0.0488i |
| 0.2310 − 0.0957i | −0.2310 + 0.0957i |
| 0.2079 − 0.1389i | −0.2079 + 0.1389i | ans(:, :, 16, 7) =

| 0.2500 | 0.2500 |
|---|---|
| 0.2452 + 0.0488i | 0.2452 + 0.0488i |
| 0.2310 + 0.0957i | 0.2310 + 0.0957i |
| 0.2079 + 0.1389i | 0.2079 + 0.1389i |
| 0.2500 | −0.2500 |
| 0.2452 + 0.0488i | −0.2452 − 0.0488i |
| 0.2310 + 0.0957i | −0.2310 − 0.0957i |
| 0.2079 + 0.1389i | −0.2079 − 0.1389i | ans(:, :, 1, 8) =

| 0.2500 | 0.2500 |
|---|---|
| 0.2079 + 0.1389i | 0.2079 + 0.1389i |
| 0.0957 + 0.2310i | 0.0957 + 0.2310i |
| −0.0488 + 0.2452i | −0.0488 + 0.2452i |
| 0 + 0.2500i | 0 − 0.2500i |
| −0.1389 + 0.2079i | 0.1389 − 0.2079i |
| −0.2310 + 0.0957i | 0.2310 − 0.0957i |
| −0.2452 − 0.0488i | 0.2452 + 0.0488i | ans(:, :, 2, 8) =

| 0.2500 | 0.2500 |
|---|---|
| 0.1389 + 0.2079i | 0.1389 + 0.2079i |
| −0.0957 + 0.2310i | −0.0957 + 0.2310i |
| −0.2452 + 0.0488i | −0.2452 + 0.0488i |
| 0 + 0.2500i | 0 − 0.2500i |
| −0.2079 + 0.1389i | 0.2079 − 0.1389i |
| −0.2310 − 0.0957i | 0.2310 + 0.0957i |
| −0.0488 − 0.2452i | 0.0488 + 0.2452i | ans(:, :, 3, 8) =

| 0.2500 | 0.2500 |
|---|---|
| 0.0488 + 0.2452i | 0.0488 + 0.2452i |
| −0.2310 + 0.0957i | −0.2310 + 0.0957i |
| −0.1389 − 0.2079i | −0.1389 − 0.2079i |
| 0 + 0.2500i | 0 − 0.2500i |
| −0.2452 + 0.0488i | 0.2452 − 0.0488i |
| −0.0957 − 0.2310i | 0.0957 + 0.2310i |
| 0.2079 − 0.1389i | −0.2079 + 0.1389i | ans(:, :, 4, 8) =

| 0.2500 | 0.2500 |
|---|---|
| −0.0488 + 0.2452i | −0.0488 + 0.2452i |
| −0.2310 − 0.0957i | −0.2310 − 0.0957i |
| 0.1389 − 0.2079i | 0.1389 − 0.2079i |
| 0 + 0.2500i | 0 − 0.2500i |

|   |   |
|---|---|
| −0.2452 − 0.0488i | 0.2452 + 0.0488i |
| 0.0957 − 0.2310i | −0.0957 + 0.2310i |
| 0.2079 + 0.1389i | −0.2079 − 0.1389i | ans(:, :, 5, 8) =

|   |   |
|---|---|
| 0.2500 | 0.2500 |
| −0.1389 + 0.2079i | −0.1389 + 0.2079i |
| −0.0957 − 0.2310i | −0.0957 − 0.2310i |
| 0.2452 + 0.0488i | 0.2452 + 0.0488i |
| 0 + 0.2500i | 0 − 0.2500i |
| −0.2079 − 0.1389i | 0.2079 + 0.1389i |
| 0.2310 − 0.0957i | −0.2310 + 0.0957i |
| −0.0488 + 0.2452i | 0.0488 − 0.2452i | ans(:, :, 6, 8) =

|   |   |
|---|---|
| 0.2500 | 0.2500 |
| −0.2079 + 0.1389i | −0.2079 + 0.1389i |
| 0.0957 − 0.2310i | 0.0957 − 0.2310i |
| 0.0488 + 0.2452i | 0.0488 + 0.2452i |
| 0 + 0.2500i | 0 − 0.2500i |
| −0.1389 − 0.2079i | 0.1389 + 0.2079i |
| 0.2310 + 0.0957i | −0.2310 − 0.0957i |
| −0.2452 + 0.0488i | 0.2452 − 0.0488i | ans(:, :, 7, 8) =

|   |   |
|---|---|
| 0.2500 | 0.2500 |
| −0.2452 + 0.0488i | −0.2452 + 0.0488i |
| 0.2310 − 0.0957i | 0.2310 − 0.0957i |
| −0.2079 + 0.1389i | −0.2079 + 0.1389i |
| 0 + 0.2500i | 0 − 0.2500i |
| −0.0488 − 0.2452i | 0.0488 + 0.2452i |
| 0.0957 + 0.2310i | −0.0957 − 0.2310i |
| −0.1389 − 0.2079i | 0.1389 + 0.2079i | ans(:, :, 8, 8) =

|   |   |
|---|---|
| 0.2500 | 0.2500 |
| −0.2452 − 0.0488i | −0.2452 − 0.0488i |
| 0.2310 + 0.0957i | 0.2310 + 0.0957i |
| −0.2079 − 0.1389i | −0.2079 − 0.1389i |
| 0 + 0.2500i | 0 − 0.2500i |
| 0.0488 − 0.2452i | −0.0488 + 0.2452i |
| −0.0957 + 0.2310i | 0.0957 − 0.2310i |
| 0.1389 − 0.2079i | −0.1389 + 0.2079i | ans(:, :, 9, 8) =

|   |   |
|---|---|
| 0.2500 | 0.2500 |
| −0.2079 − 0.1389i | −0.2079 − 0.1389i |
| 0.0957 + 0.2310i | 0.0957 + 0.2310i |
| 0.0488 − 0.2452i | 0.0488 − 0.2452i |
| 0 + 0.2500i | 0 − 0.2500i |
| 0.1389 − 0.2079i | −0.1389 + 0.2079i |
| −0.2310 + 0.0957i | 0.2310 − 0.0957i |
| 0.2452 + 0.0488i | −0.2452 − 0.0488i | ans(:, :, 10, 8) =

|   |   |
|---|---|
| 0.2500 | 0.2500 |
| −0.1389 − 0.2079i | −0.1389 − 0.2079i |
| −0.0957 + 0.2310i | −0.0957 + 0.2310i |
| 0.2452 − 0.0488i | 0.2452 − 0.0488i |
| 0 + 0.2500i | 0 − 0.2500i |
| 0.2079 − 0.1389i | −0.2079 + 0.1389i |
| −0.2310 − 0.0957i | 0.2310 + 0.0957i |
| 0.0488 + 0.2452i | −0.0488 − 0.2452i | ans(:, :, 11, 8) =

|   |   |
|---|---|
| 0.2500 | 0.2500 |
| −0.0488 − 0.2452i | −0.0488 − 0.2452i |
| −0.2310 + 0.0957i | −0.2310 + 0.0957i |
| 0.1389 + 0.2079i | 0.1389 + 0.2079i |
| 0 + 0.2500i | 0 − 0.2500i |
| 0.2452 − 0.0488i | −0.2452 + 0.0488i |
| −0.0957 − 0.2310i | 0.0957 + 0.2310i |
| −0.2079 + 0.1389i | 0.2079 − 0.1389i | ans(:, :, 12, 8) =

|   |   |
|---|---|
| 0.2500 | 0.2500 |
| 0.0488 − 0.2452i | 0.0488 − 0.2452i |
| −0.2310 − 0.0957i | −0.2310 − 0.0957i |
| −0.1389 + 0.2079i | −0.1389 + 0.2079i |

-continued

|  |  |
|---|---|
| 0 + 0.2500i | 0 − 0.2500i |
| 0.2452 + 0.0488i | −0.2452 − 0.0488i |
| 0.0957 − 0.2310i | −0.0957 + 0.2310i |
| −0.2079 − 0.1389i | 0.2079 + 0.1389i | ans(:, :, 13, 8) =

| 0.2500 | 0.2500 |
|---|---|
| 0.1389 − 0.2079i | 0.1389 − 0.2079i |
| −0.0957 − 0.2310i | −0.0957 − 0.2310i |
| −0.2452 − 0.0488i | −0.2452 − 0.0488i |
| 0 + 0.2500i | 0 − 0.2500i |
| 0.2079 + 0.1389i | −0.2079 − 0.1389i |
| 0.2310 − 0.0957i | −0.2310 + 0.0957i |
| 0.0488 − 0.2452i | −0.0488 + 0.2452i | ans(:, :, 14, 8) =

| 0.2500 | 0.2500 |
|---|---|
| 0.2079 − 0.1389i | 0.2079 − 0.1389i |
| 0.0957 − 0.2310i | 0.0957 − 0.2310i |
| −0.0488 − 0.2452i | −0.0488 − 0.2452i |
| 0 + 0.2500i | 0 − 0.2500i |
| 0.1389 + 0.2079i | −0.1389 − 0.2079i |
| 0.2310 + 0.0957i | −0.2310 − 0.0957i |
| 0.2452 − 0.0488i | −0.2452 + 0.0488i | ans(:, :, 15, 8) =

| 0.2500 | 0.2500 |
|---|---|
| 0.2452 − 0.0488i | 0.2452 − 0.0488i |
| 0.2310 − 0.0957i | 0.2310 − 0.0957i |
| 0.2079 − 0.1389i | 0.2079 − 0.1389i |
| 0 + 0.2500i | 0 − 0.2500i |
| 0.0488 + 0.2452i | −0.0488 − 0.2452i |
| 0.0957 + 0.2310i | −0.0957 − 0.2310i |
| 0.1389 + 0.2079i | −0.1389 − 0.2079i | ans(:, :, 16, 8) =

| 0.2500 | 0.2500 |
|---|---|
| 0.2452 + 0.0488i | 0.2452 + 0.0488i |
| 0.2310 + 0.0957i | 0.2310 + 0.0957i |
| 0.2079 + 0.1389i | 0.2079 + 0.1389i |
| 0 + 0.2500i | 0 − 0.2500i |
| −0.0488 + 0.2452i | 0.0488 − 0.2452i |
| −0.0957 + 0.2310i | 0.0957 − 0.2310i |
| −0.1389 + 0.2079i | 0.1389 − 0.2079i | ans(:, :, 1, 9) =

| 0.2500 | 0.2500 |
|---|---|
| 0.2500 | 0.2452 + 0.0488i |
| 0.2500 | 0.2310 + 0.0957i |
| 0.2500 | 0.2079 + 0.1389i |
| 0.2500 | −0.2500 |
| 0.2500 | −0.2452 − 0.0488i |
| 0.2500 | −0.2310 − 0.0957i |
| 0.2500 | −0.2079 − 0.1389i | ans(:, :, 2, 9) =

| 0.2500 | 0.2500 |
|---|---|
| 0.2310 + 0.0957i | 0.2079 + 0.1389i |
| 0.1768 + 0.1768i | 0.0957 + 0.2310i |
| 0.0957 + 0.2310i | −0.0488 + 0.2452i |
| 0.2500 | −0.2500 |
| 0.2310 + 0.0957i | −0.2079 − 0.1389i |
| 0.1768 + 0.1768i | −0.0957 − 0.2310i |
| 0.0957 + 0.2310i | 0.0488 − 0.2452i | ans(:, :, 3, 9) =

| 0.2500 | 0.2500 |
|---|---|
| 0.1768 + 0.1768i | 0.1389 + 0.2079i |
| 0.0000 + 0.2500i | −0.0957 + 0.2310i |
| −0.1768 + 0.1768i | −0.2452 + 0.0488i |
| 0.2500 | −0.2500 |
| 0.1768 + 0.1768i | −0.1389 − 0.2079i |
| 0.0000 + 0.2500i | 0.0957 − 0.2310i |
| −0.1768 + 0.1768i | 0.2452 − 0.0488i | ans(:, :, 4, 9) =

| 0.2500 | 0.2500 |
|---|---|
| 0.0957 + 0.2310i | 0.0488 + 0.2452i |
| −0.1768 + 0.1768i | −0.2310 + 0.0957i |

-continued

| | |
|---|---|
| −0.2310 − 0.0957i | −0.1389 − 0.2079i |
| 0.2500 | −0.2500 |
| 0.0957 + 0.2310i | −0.0488 − 0.2452i |
| −0.1768 + 0.1768i | 0.2310 − 0.0957i |
| −0.2310 − 0.0957i | 0.1389 + 0.2079i | ans(:, :, 5, 9) =

| | |
|---|---|
| 0.2500 | 0.2500 |
| 0.0000 + 0.2500i | −0.0488 + 0.2452i |
| −0.2500 + 0.0000i | −0.2310 − 0.0957i |
| −0.0000 − 0.2500i | 0.1389 − 0.2079i |
| 0.2500 | −0.2500 |
| 0.0000 + 0.2500i | 0.0488 − 0.2452i |
| −0.2500 + 0.0000i | 0.2310 + 0.0957i |
| −0.0000 − 0.2500i | −0.1389 + 0.2079i | ans(:, :, 6, 9) =

| | |
|---|---|
| 0.2500 | 0.2500 |
| −0.0957 + 0.2310i | −0.1389 + 0.2079i |
| −0.1768 − 0.1768i | −0.0957 − 0.2310i |
| 0.2310 − 0.0957i | 0.2452 + 0.0488i |
| 0.2500 | −0.2500 |
| −0.0957 + 0.2310i | 0.1389 − 0.2079i |
| −0.1768 − 0.1768i | 0.0957 + 0.2310i |
| 0.2310 − 0.0957i | −0.2452 − 0.0488i | ans(:, :, 7, 9) =

| | |
|---|---|
| 0.2500 | 0.2500 |
| −0.1768 + 0.1768i | −0.2079 + 0.1389i |
| −0.0000 − 0.2500i | 0.0957 − 0.2310i |
| 0.1768 + 0.1768i | 0.0488 + 0.2452i |
| 0.2500 | −0.2500 |
| −0.1768 + 0.1768i | 0.2079 − 0.1389i |
| −0.0000 − 0.2500i | −0.0957 + 0.2310i |
| 0.1768 + 0.1768i | −0.0488 − 0.2452i | ans(:, :, 8, 9) =

| | |
|---|---|
| 0.2500 | 0.2500 |
| −0.2310 + 0.0957i | −0.2452 + 0.0488i |
| 0.1768 − 0.1768i | 0.2310 − 0.0957i |
| −0.0957 + 0.2310i | −0.2079 + 0.1389i |
| 0.2500 | −0.2500 |
| −0.2310 + 0.0957i | 0.2452 − 0.0488i |
| 0.1768 − 0.1768i | −0.2310 + 0.0957i |
| −0.0957 + 0.2310i | 0.2079 − 0.1389i | ans(:, :, 9, 9) =

| | |
|---|---|
| 0.2500 | 0.2500 |
| −0.2500 + 0.0000i | −0.2452 − 0.0488i |
| 0.2500 − 0.0000i | 0.2310 + 0.0957i |
| −0.2500 + 0.0000i | −0.2079 − 0.1389i |
| 0.2500 | −0.2500 |
| −0.2500 + 0.0000i | 0.2452 + 0.0488i |
| 0.2500 − 0.0000i | −0.2310 − 0.0957i |
| −0.2500 + 0.0000i | 0.2079 + 0.1389i | ans(:, :, 10, 9) =

| | |
|---|---|
| 0.2500 | 0.2500 |
| −0.2310 − 0.0957i | −0.2079 − 0.1389i |
| 0.1768 + 0.1768i | 0.0957 + 0.2310i |
| −0.0957 − 0.2310i | 0.0488 − 0.2452i |
| 0.2500 | −0.2500 |
| −0.2310 − 0.0957i | 0.2079 + 0.1389i |
| 0.1768 + 0.1768i | −0.0957 − 0.2310i |
| −0.0957 − 0.2310i | −0.0488 + 0.2452i | ans(:, :, 11, 9) =

| | |
|---|---|
| 0.2500 | 0.2500 |
| −0.1768 − 0.1768i | −0.1389 − 0.2079i |
| 0.0000 + 0.2500i | −0.0957 + 0.2310i |
| 0.1768 − 0.1768i | 0.2452 − 0.0488i |
| 0.2500 | −0.2500 |
| −0.1768 − 0.1768i | 0.1389 + 0.2079i |
| 0.0000 + 0.2500i | 0.0957 − 0.2310i |
| 0.1768 − 0.1768i | −0.2452 + 0.0488i | ans(:, :, 12, 9) =

| | |
|---|---|
| 0.2500 | 0.2500 |
| −0.0957 − 0.2310i | −0.0488 − 0.2452i |

-continued

|  |  |
|---|---|
| −0.1768 + 0.1768i | −0.2310 + 0.0957i |
| 0.2310 + 0.0957i | 0.1389 + 0.2079i |
| 0.2500 | −0.2500 |
| −0.0957 − 0.2310i | 0.0488 + 0.2452i |
| −0.1768 + 0.1768i | 0.2310 − 0.0957i |
| 0.2310 + 0.0957i | −0.1389 − 0.2079i | ans(:, :, 13, 9) =

|  |  |
|---|---|
| 0.2500 | 0.2500 |
| −0.0000 − 0.2500i | 0.0488 − 0.2452i |
| −0.2500 + 0.0000i | −0.2310 − 0.0957i |
| 0.0000 + 0.2500i | −0.1389 + 0.2079i |
| 0.2500 | −0.2500 |
| −0.0000 − 0.2500i | −0.0488 + 0.2452i |
| −0.2500 + 0.0000i | 0.2310 + 0.0957i |
| 0.0000 + 0.2500i | 0.1389 − 0.2079i | ans(:, :, 14, 9) =

|  |  |
|---|---|
| 0.2500 | 0.2500 |
| 0.0957 − 0.2310i | 0.1389 − 0.2079i |
| −0.1768 − 0.1768i | −0.0957 − 0.2310i |
| −0.2310 + 0.0957i | −0.2452 − 0.0488i |
| 0.2500 | −0.2500 |
| 0.0957 − 0.2310i | −0.1389 + 0.2079i |
| −0.1768 − 0.1768i | 0.0957 + 0.2310i |
| −0.2310 + 0.0957i | 0.2452 + 0.0488i | ans(:, :, 15, 9) =

|  |  |
|---|---|
| 0.2500 | 0.2500 |
| 0.1768 − 0.1768i | 0.2079 − 0.1389i |
| −0.0000 − 0.2500i | 0.0957 − 0.2310i |
| −0.1768 − 0.1768i | −0.0488 − 0.2452i |
| 0.2500 | −0.2500 |
| 0.1768 − 0.1768i | −0.2079 + 0.1389i |
| −0.0000 − 0.2500i | −0.0957 + 0.2310i |
| −0.1768 − 0.1768i | 0.0488 + 0.2452i | ans(:, :, 16, 9) =

|  |  |
|---|---|
| 0.2500 | 0.2500 |
| 0.2310 − 0.0957i | 0.2452 − 0.0488i |
| 0.1768 − 0.1768i | 0.2310 − 0.0957i |
| 0.0957 − 0.2310i | 0.2079 − 0.1389i |
| 0.2500 | −0.2500 |
| 0.2310 − 0.0957i | −0.2452 + 0.0488i |
| 0.1768 − 0.1768i | −0.2310 + 0.0957i |
| 0.0957 − 0.2310i | −0.2079 + 0.1389i | ans(:, :, 1, 10) =

|  |  |
|---|---|
| 0.2500 | 0.2500 |
| 0.2500 | 0.2452 + 0.0488i |
| 0.2500 | 0.2310 + 0.0957i |
| 0.2500 | 0.2079 + 0.1389i |
| 0 + 0.2500i | 0 − 0.2500i |
| 0 + 0.2500i | 0.0488 − 0.2452i |
| 0 + 0.2500i | 0.0957 − 0.2310i |
| 0 + 0.2500i | 0.1389 − 0.2079i | ans(:, :, 2, 10) =

|  |  |
|---|---|
| 0.2500 | 0.2500 |
| 0.2310 + 0.0957i | 0.2079 + 0.1389i |
| 0.1768 + 0.1768i | 0.0957 + 0.2310i |
| 0.0957 + 0.2310i | −0.0488 + 0.2452i |
| 0 + 0.2500i | 0 − 0.2500i |
| −0.0957 + 0.2310i | 0.1389 − 0.2079i |
| −0.1768 + 0.1768i | 0.2310 − 0.0957i |
| −0.2310 + 0.0957i | 0.2452 + 0.0488i | ans(:, :, 3, 10) =

|  |  |
|---|---|
| 0.2500 | 0.2500 |
| 0.1768 + 0.1768i | 0.1389 + 0.2079i |
| 0.0000 + 0.2500i | −0.0957 + 0.2310i |
| −0.1768 + 0.1768i | −0.2452 + 0.0488i |
| 0 + 0.2500i | 0 − 0.2500i |
| −0.1768 + 0.1768i | 0.2079 − 0.1389i |
| −0.2500 + 0.0000i | 0.2310 + 0.0957i |
| −0.1768 − 0.1768i | 0.0488 + 0.2452i |

-continued ans(:, :, 4, 10) =

| 0.2500 | 0.2500 |
| 0.0957 + 0.2310i | 0.0488 + 0.2452i |
| −0.1768 + 0.1768i | −0.2310 + 0.0957i |
| −0.2310 − 0.0957i | −0.1389 − 0.2079i |
| 0 + 0.2500i | 0 − 0.2500i |
| −0.2310 + 0.0957i | 0.2452 − 0.0488i |
| −0.1768 − 0.1768i | 0.0957 + 0.2310i |
| 0.0957 − 0.2310i | −0.2079 + 0.1389i | ans(:, :, 5, 10) =

| 0.2500 | 0.2500 |
| 0.0000 + 0.2500i | −0.0488 + 0.2452i |
| −0.2500 + 0.0000i | −0.2310 − 0.0957i |
| −0.0000 − 0.2500i | 0.1389 − 0.2079i |
| 0 + 0.2500i | 0 − 0.2500i |
| −0.2500 + 0.0000i | 0.2452 + 0.0488i |
| −0.0000 − 0.2500i | −0.0957 + 0.2310i |
| 0.2500 − 0.0000i | −0.2079 − 0.1389i | ans(:, :, 6, 10) =

| 0.2500 | 0.2500 |
| −0.0957 + 0.2310i | −0.1389 + 0.2079i |
| −0.1768 − 0.1768i | −0.0957 − 0.2310i |
| 0.2310 − 0.0957i | 0.2452 + 0.0488i |
| 0 + 0.2500i | 0 − 0.2500i |
| −0.2310 − 0.0957i | 0.2079 + 0.1389i |
| 0.1768 − 0.1768i | −0.2310 + 0.0957i |
| 0.0957 + 0.2310i | 0.0488 − 0.2452i | ans(:, :, 7, 10) =

| 0.2500 | 0.2500 |
| −0.1768 + 0.1768i | −0.2079 + 0.1389i |
| −0.0000 − 0.2500i | 0.0957 − 0.2310i |
| 0.1768 + 0.1768i | 0.0488 + 0.2452i |
| 0 + 0.2500i | 0 − 0.2500i |
| −0.1768 − 0.1768i | 0.1389 + 0.2079i |
| 0.2500 − 0.0000i | −0.2310 − 0.0957i |
| −0.1768 + 0.1768i | 0.2452 − 0.0488i | ans(:, :, 8, 10) =

| 0.2500 | 0.2500 |
| −0.2310 + 0.0957i | −0.2452 + 0.0488i |
| 0.1768 − 0.1768i | 0.2310 − 0.0957i |
| −0.0957 + 0.2310i | −0.2079 + 0.1389i |
| 0 + 0.2500i | 0 − 0.2500i |
| −0.0957 − 0.2310i | 0.0488 + 0.2452i |
| 0.1768 + 0.1768i | −0.0957 − 0.2310i |
| −0.2310 − 0.0957i | 0.1389 + 0.2079i | ans(:, :, 9, 10) =

| 0.2500 | 0.2500 |
| −0.2500 + 0.0000i | −0.2452 − 0.0488i |
| 0.2500 − 0.0000i | 0.2310 + 0.0957i |
| −0.2500 + 0.0000i | −0.2079 − 0.1389i |
| 0 + 0.2500i | 0 − 0.2500i |
| −0.0000 − 0.2500i | −0.0488 + 0.2452i |
| 0.0000 + 0.2500i | 0.0957 − 0.2310i |
| −0.0000 − 0.2500i | −0.1389 + 0.2079i | ans(:, :, 10, 10) =

| 0.2500 | 0.2500 |
| −0.2310 − 0.0957i | −0.2079 − 0.1389i |
| 0.1768 + 0.1768i | 0.0957 + 0.2310i |
| −0.0957 − 0.2310i | 0.0488 − 0.2452i |
| 0 + 0.2500i | 0 − 0.2500i |
| 0.0957 − 0.2310i | −0.1389 + 0.2079i |
| −0.1768 + 0.1768i | 0.2310 − 0.0957i |
| 0.2310 − 0.0957i | −0.2452 − 0.0488i | ans(:, :, 11, 10) =

| 0.2500 | 0.2500 |
| −0.1768 − 0.1768i | −0.1389 − 0.2079i |
| 0.0000 + 0.2500i | −0.0957 + 0.2310i |
| 0.1768 − 0.1768i | 0.2452 − 0.0488i |
| 0 + 0.2500i | 0 − 0.2500i |
| 0.1768 − 0.1768i | −0.2079 + 0.1389i |

|  |  |
|---|---|
| −0.2500 + 0.0000i | 0.2310 + 0.0957i |
| 0.1768 + 0.1768i | −0.0488 − 0.2452i | ans(:, :, 12, 10) =

|  |  |
|---|---|
| 0.2500 | 0.2500 |
| −0.0957 − 0.2310i | −0.0488 − 0.2452i |
| −0.1768 + 0.1768i | −0.2310 + 0.0957i |
| 0.2310 + 0.0957i | 0.1389 + 0.2079i |
| 0 + 0.2500i | 0 − 0.2500i |
| 0.2310 − 0.0957i | −0.2452 + 0.0488i |
| −0.1768 − 0.1768i | 0.0957 + 0.2310i |
| −0.0957 + 0.2310i | 0.2079 − 0.1389i | ans(:, :, 13, 10) =

|  |  |
|---|---|
| 0.2500 | 0.2500 |
| −0.0000 − 0.2500i | 0.0488 − 0.2452i |
| −0.2500 + 0.0000i | −0.2310 − 0.0957i |
| 0.0000 + 0.2500i | −0.1389 + 0.2079i |
| 0 + 0.2500i | 0 − 0.2500i |
| 0.2500 − 0.0000i | −0.2452 − 0.0488i |
| −0.0000 − 0.2500i | −0.0957 + 0.2310i |
| −0.2500 + 0.0000i | 0.2079 + 0.1389i | ans(:, :, 14, 10) =

|  |  |
|---|---|
| 0.2500 | 0.2500 |
| 0.0957 − 0.2310i | 0.1389 − 0.2079i |
| −0.1768 − 0.1768i | −0.0957 − 0.2310i |
| −0.2310 + 0.0957i | −0.2452 − 0.0488i |
| 0 + 0.2500i | 0 − 0.2500i |
| 0.2310 + 0.0957i | −0.2079 − 0.1389i |
| 0.1768 − 0.1768i | −0.2310 + 0.0957i |
| −0.0957 − 0.2310i | −0.0488 + 0.2452i | ans(:, :, 15, 10) =

|  |  |
|---|---|
| 0.2500 | 0.2500 |
| 0.1768 − 0.1768i | 0.2079 − 0.1389i |
| −0.0000 − 0.2500i | 0.0957 − 0.2310i |
| −0.1768 − 0.1768i | −0.0488 − 0.2452i |
| 0 + 0.2500i | 0 − 0.2500i |
| 0.1768 + 0.1768i | −0.1389 − 0.2079i |
| 0.2500 − 0.0000i | −0.2310 − 0.0957i |
| 0.1768 − 0.1768i | −0.2452 + 0.0488i | ans(:, :, 16, 10) =

|  |  |
|---|---|
| 0.2500 | 0.2500 |
| 0.2310 − 0.0957i | 0.2452 − 0.0488i |
| 0.1768 − 0.1768i | 0.2310 − 0.0957i |
| 0.0957 − 0.2310i | 0.2079 − 0.1389i |
| 0 + 0.2500i | 0 − 0.2500i |
| 0.0957 + 0.2310i | −0.0488 − 0.2452i |
| 0.1768 + 0.1768i | −0.0957 − 0.2310i |
| 0.2310 + 0.0957i | −0.1389 − 0.2079i | ans(:, :, 1, 11) =

|  |  |
|---|---|
| 0.2500 | 0.2500 |
| 0.2452 + 0.0488i | 0.2310 + 0.0957i |
| 0.2310 + 0.0957i | 0.1768 + 0.1768i |
| 0.2079 + 0.1389i | 0.0957 + 0.2310i |
| 0.2500 | −0.2500 |
| 0.2452 + 0.0488i | −0.2310 − 0.0957i |
| 0.2310 + 0.0957i | −0.1768 − 0.1768i |
| 0.2079 + 0.1389i | −0.0957 − 0.2310i | ans(:, :, 2, 11) =

|  |  |
|---|---|
| 0.2500 | 0.2500 |
| 0.2079 + 0.1389i | 0.1768 + 0.1768i |
| 0.0957 + 0.2310i | 0.0000 + 0.2500i |
| −0.0488 + 0.2452i | −0.1768 + 0.1768i |
| 0.2500 | −0.2500 |
| 0.2079 + 0.1389i | −0.1768 − 0.1768i |
| 0.0957 + 0.2310i | −0.0000 − 0.2500i |
| −0.0488 + 0.2452i | 0.1768 − 0.1768i | ans(:, :, 3, 11) =

|  |  |
|---|---|
| 0.2500 | 0.2500 |
| 0.1389 + 0.2079i | 0.0957 + 0.2310i |
| −0.0957 + 0.2310i | −0.1768 + 0.1768i |
| −0.2452 + 0.0488i | −0.2310 − 0.0957i |
| 0.2500 | −0.2500 |

-continued

|  |  |
|---|---|
| 0.1389 + 0.2079i | −0.0957 − 0.2310i |
| −0.0957 + 0.2310i | 0.1768 − 0.1768i |
| −0.2452 + 0.0488i | 0.2310 + 0.0957i | ans(:, :, 4, 11) =

|  |  |
|---|---|
| 0.2500 | 0.2500 |
| 0.0488 + 0.2452i | 0.0000 + 0.2500i |
| −0.2310 + 0.0957i | −0.2500 + 0.0000i |
| −0.1389 − 0.2079i | −0.0000 − 0.2500i |
| 0.2500 | −0.2500 |
| 0.0488 + 0.2452i | −0.0000 − 0.2500i |
| −0.2310 + 0.0957i | 0.2500 − 0.0000i |
| −0.1389 − 0.2079i | 0.0000 + 0.2500i | ans(:, :, 5, 11) =

|  |  |
|---|---|
| 0.2500 | 0.2500 |
| −0.0488 + 0.2452i | −0.0957 + 0.2310i |
| −0.2310 − 0.0957i | −0.1768 − 0.1768i |
| 0.1389 − 0.2079i | 0.2310 − 0.0957i |
| 0.2500 | −0.2500 |
| −0.0488 + 0.2452i | 0.0957 − 0.2310i |
| −0.2310 − 0.0957i | 0.1768 + 0.1768i |
| 0.1389 − 0.2079i | −0.2310 + 0.0957i | ans(:, :, 6, 11) =

|  |  |
|---|---|
| 0.2500 | 0.2500 |
| −0.1389 + 0.2079i | −0.1768 + 0.1768i |
| −0.0957 − 0.2310i | −0.0000 − 0.2500i |
| 0.2452 + 0.0488i | 0.1768 + 0.1768i |
| 0.2500 | −0.2500 |
| −0.1389 + 0.2079i | 0.1768 − 0.1768i |
| −0.0957 − 0.2310i | 0.0000 + 0.2500i |
| 0.2452 + 0.0488i | −0.1768 − 0.1768i | ans(:, :, 7, 11) =

|  |  |
|---|---|
| 0.2500 | 0.2500 |
| −0.2079 + 0.1389i | −0.2310 + 0.0957i |
| 0.0957 − 0.2310i | 0.1768 − 0.1768i |
| 0.0488 + 0.2452i | −0.0957 + 0.2310i |
| 0.2500 | −0.2500 |
| −0.2079 + 0.1389i | 0.2310 − 0.0957i |
| 0.0957 − 0.2310i | −0.1768 + 0.1768i |
| 0.0488 + 0.2452i | 0.0957 − 0.2310i | ans(:, :, 8, 11) =

|  |  |
|---|---|
| 0.2500 | 0.2500 |
| −0.2452 + 0.0488i | −0.2500 + 0.0000i |
| 0.2310 − 0.0957i | 0.2500 − 0.0000i |
| −0.2079 + 0.1389i | −0.2500 + 0.0000i |
| 0.2500 | −0.2500 |
| −0.2452 + 0.0488i | 0.2500 − 0.0000i |
| 0.2310 − 0.0957i | −0.2500 + 0.0000i |
| −0.2079 + 0.1389i | 0.2500 − 0.0000i | ans(:, :, 9, 11) =

|  |  |
|---|---|
| 0.2500 | 0.2500 |
| −0.2452 − 0.0488i | −0.2310 − 0.0957i |
| 0.2310 + 0.0957i | 0.1768 + 0.1768i |
| −0.2079 − 0.1389i | −0.0957 − 0.2310i |
| 0.2500 | −0.2500 |
| −0.2452 − 0.0488i | 0.2310 + 0.0957i |
| 0.2310 + 0.0957i | −0.1768 − 0.1768i |
| −0.2079 − 0.1389i | 0.0957 + 0.2310i | ans(:, :, 10, 11) =

|  |  |
|---|---|
| 0.2500 | 0.2500 |
| −0.2079 − 0.1389i | −0.1768 − 0.1768i |
| 0.0957 + 0.2310i | 0.0000 + 0.2500i |
| 0.0488 − 0.2452i | 0.1768 − 0.1768i |
| 0.2500 | −0.2500 |
| −0.2079 − 0.1389i | 0.1768 + 0.1768i |
| 0.0957 + 0.2310i | −0.0000 − 0.2500i |
| 0.0488 − 0.2452i | −0.1768 + 0.1768i | ans(:, :, 11, 11) =

|  |  |
|---|---|
| 0.2500 | 0.2500 |
| −0.1389 − 0.2079i | −0.0957 − 0.2310i |
| −0.0957 + 0.2310i | −0.1768 + 0.1768i |
| 0.2452 − 0.0488i | 0.2310 + 0.0957i |

-continued

| | |
|---|---|
| 0.2500 | −0.2500 |
| −0.1389 − 0.2079i | 0.0957 + 0.2310i |
| −0.0957 + 0.2310i | 0.1768 − 0.1768i |
| 0.2452 − 0.0488i | −0.2310 − 0.0957i | ans(:, :, 12, 11) =

| | |
|---|---|
| 0.2500 | 0.2500 |
| −0.0488 − 0.2452i | −0.0000 − 0.2500i |
| −0.2310 + 0.0957i | −0.2500 + 0.0000i |
| 0.1389 + 0.2079i | 0.0000 + 0.2500i |
| 0.2500 | −0.2500 |
| −0.0488 − 0.2452i | 0.0000 + 0.2500i |
| −0.2310 + 0.0957i | 0.2500 − 0.0000i |
| 0.1389 + 0.2079i | −0.0000 − 0.2500i | ans(:, :, 13, 11) =

| | |
|---|---|
| 0.2500 | 0.2500 |
| 0.0488 − 0.2452i | 0.0957 − 0.2310i |
| −0.2310 − 0.0957i | −0.1768 − 0.1768i |
| −0.1389 + 0.2079i | −0.2310 + 0.0957i |
| 0.2500 | −0.2500 |
| 0.0488 − 0.2452i | −0.0957 + 0.2310i |
| −0.2310 − 0.0957i | 0.1768 + 0.1768i |
| −0.1389 + 0.2079i | 0.2310 − 0.0957i | ans(:, :, 14, 11) =

| | |
|---|---|
| 0.2500 | 0.2500 |
| 0.1389 − 0.2079i | 0.1768 − 0.1768i |
| −0.0957 − 0.2310i | −0.0000 − 0.2500i |
| −0.2452 − 0.0488i | −0.1768 − 0.1768i |
| 0.2500 | −0.2500 |
| 0.1389 − 0.2079i | −0.1768 + 0.1768i |
| −0.0957 − 0.2310i | 0.0000 + 0.2500i |
| −0.2452 − 0.0488i | 0.1768 + 0.1768i | ans(:, :, 15, 11) =

| | |
|---|---|
| 0.2500 | 0.2500 |
| 0.2079 − 0.1389i | 0.2310 − 0.0957i |
| 0.0957 − 0.2310i | 0.1768 − 0.1768i |
| −0.0488 − 0.2452i | 0.0957 − 0.2310i |
| 0.2500 | −0.2500 |
| 0.2079 − 0.1389i | −0.2310 + 0.0957i |
| 0.0957 − 0.2310i | −0.1768 + 0.1768i |
| −0.0488 − 0.2452i | −0.0957 + 0.2310i | ans(:, :, 16, 11) =

| | |
|---|---|
| 0.2500 | 0.2500 |
| 0.2452 − 0.0488i | 0.2500 |
| 0.2310 − 0.0957i | 0.2500 |
| 0.2079 − 0.1389i | 0.2500 |
| 0.2500 | −0.2500 |
| 0.2452 − 0.0488i | −0.2500 |
| 0.2310 − 0.0957i | −0.2500 |
| 0.2079 − 0.1389i | −0.2500 | ans(:, :, 1, 12) =

| | |
|---|---|
| 0.2500 | 0.2500 |
| 0.2452 + 0.0488i | 0.2310 + 0.0957i |
| 0.2310 + 0.0957i | 0.1768 + 0.1768i |
| 0.2079 + 0.1389i | 0.0957 + 0.2310i |
| 0 + 0.2500i | 0 − 0.2500i |
| −0.0488 + 0.2452i | 0.0957 − 0.2310i |
| −0.0957 + 0.2310i | 0.1768 − 0.1768i |
| −0.1389 + 0.2079i | 0.2310 − 0.0957i | ans(:, :, 2, 12) =

| | |
|---|---|
| 0.2500 | 0.2500 |
| 0.2079 + 0.1389i | 0.1768 + 0.1768i |
| 0.0957 + 0.2310i | 0.0000 + 0.2500i |
| −0.0488 + 0.2452i | −0.1768 + 0.1768i |
| 0 + 0.2500i | 0 − 0.2500i |
| −0.1389 + 0.2079i | 0.1768 − 0.1768i |
| −0.2310 + 0.0957i | 0.2500 − 0.0000i |
| −0.2452 − 0.0488i | 0.1768 + 0.1768i | ans(:, :, 3, 12) =

| | |
|---|---|
| 0.2500 | 0.2500 |
| 0.1389 + 0.2079i | 0.0957 + 0.2310i |
| −0.0957 + 0.2310i | −0.1768 + 0.1768i |

-continued

| | |
|---|---|
| −0.2452 + 0.0488i | −0.2310 − 0.0957i |
| 0 + 0.2500i | 0 − 0.2500i |
| −0.2079 + 0.1389i | 0.2310 − 0.0957i |
| −0.2310 − 0.0957i | 0.1768 + 0.1768i |
| −0.0488 − 0.2452i | −0.0957 + 0.2310i | ans(:, :, 4, 12) =

| | |
|---|---|
| 0.2500 | 0.2500 |
| 0.0488 + 0.2452i | 0.0000 + 0.2500i |
| −0.2310 + 0.0957i | −0.2500 + 0.0000i |
| −0.1389 − 0.2079i | −0.0000 − 0.2500i |
| 0 + 0.2500i | 0 − 0.2500i |
| −0.2452 + 0.0488i | 0.2500 − 0.0000i |
| −0.0957 − 0.2310i | 0.0000 + 0.2500i |
| 0.2079 − 0.1389i | −0.2500 + 0.0000i | ans(:, :, 5, 12) =

| | |
|---|---|
| 0.2500 | 0.2500 |
| −0.0488 + 0.2452i | −0.0957 + 0.2310i |
| −0.2310 − 0.0957i | −0.1768 − 0.1768i |
| 0.1389 − 0.2079i | 0.2310 − 0.0957i |
| 0 + 0.2500i | 0 − 0.2500i |
| −0.2452 − 0.0488i | 0.2310 + 0.0957i |
| 0.0957 − 0.2310i | −0.1768 + 0.1768i |
| 0.2079 + 0.1389i | −0.0957 − 0.2310i | ans(:, :, 6, 12) =

| | |
|---|---|
| 0.2500 | 0.2500 |
| −0.1389 + 0.2079i | −0.1768 + 0.1768i |
| −0.0957 − 0.2310i | −0.0000 − 0.2500i |
| 0.2452 + 0.0488i | 0.1768 + 0.1768i |
| 0 + 0.2500i | 0 − 0.2500i |
| −0.2079 − 0.1389i | 0.1768 + 0.1768i |
| 0.2310 − 0.0957i | −0.2500 + 0.0000i |
| −0.0488 + 0.2452i | 0.1768 − 0.1768i | ans(:, :, 7, 12) =

| | |
|---|---|
| 0.2500 | 0.2500 |
| −0.2079 + 0.1389i | −0.2310 + 0.0957i |
| 0.0957 − 0.2310i | 0.1768 − 0.1768i |
| 0.0488 + 0.2452i | −0.0957 + 0.2310i |
| 0 + 0.2500i | 0 − 0.2500i |
| −0.1389 − 0.2079i | 0.0957 + 0.2310i |
| 0.2310 + 0.0957i | −0.1768 − 0.1768i |
| −0.2452 + 0.0488i | 0.2310 + 0.0957i | ans(:, :, 8, 12) =

| | |
|---|---|
| 0.2500 | 0.2500 |
| −0.2452 + 0.0488i | −0.2500 + 0.0000i |
| 0.2310 − 0.0957i | 0.2500 − 0.0000i |
| −0.2079 + 0.1389i | −0.2500 + 0.0000i |
| 0 + 0.2500i | 0 − 0.2500i |
| −0.0488 − 0.2452i | 0.0000 + 0.2500i |
| 0.0957 + 0.2310i | −0.0000 − 0.2500i |
| −0.1389 − 0.2079i | 0.0000 + 0.2500i | ans(:, :, 9, 12) =

| | |
|---|---|
| 0.2500 | 0.2500 |
| −0.2452 − 0.0488i | −0.2310 − 0.0957i |
| 0.2310 + 0.0957i | 0.1768 + 0.1768i |
| −0.2079 − 0.1389i | −0.0957 − 0.2310i |
| 0 + 0.2500i | 0 − 0.2500i |
| 0.0488 − 0.2452i | −0.0957 + 0.2310i |
| −0.0957 + 0.2310i | 0.1768 + 0.1768i |
| 0.1389 − 0.2079i | −0.2310 + 0.0957i | ans(:, :, 10, 12) =

| | |
|---|---|
| 0.2500 | 0.2500 |
| −0.2079 − 0.1389i | −0.1768 − 0.1768i |
| 0.0957 + 0.2310i | 0.0000 + 0.2500i |
| 0.0488 − 0.2452i | 0.1768 − 0.1768i |
| 0 + 0.2500i | 0 − 0.2500i |
| 0.1389 − 0.2079i | −0.1768 + 0.1768i |
| −0.2310 + 0.0957i | 0.2500 − 0.0000i |
| 0.2452 + 0.0488i | −0.1768 − 0.1768i | ans(:, :, 11, 12) =

| | |
|---|---|
| 0.2500 | 0.2500 |
| −0.1389 − 0.2079i | −0.0957 − 0.2310i |

|  |  |
|---|---|
| −0.0957 + 0.2310i | −0.1768 + 0.1768i |
| 0.2452 − 0.0488i | 0.2310 + 0.0957i |
| 0 + 0.2500i | 0 − 0.2500i |
| 0.2079 − 0.1389i | −0.2310 + 0.0957i |
| −0.2310 − 0.0957i | 0.1768 + 0.1768i |
| 0.0488 + 0.2452i | 0.0957 − 0.2310i | ans(:, :, 12, 12) =

|  |  |
|---|---|
| 0.2500 | 0.2500 |
| −0.0488 − 0.2452i | −0.0000 − 0.2500i |
| −0.2310 + 0.0957i | −0.2500 + 0.0000i |
| 0.1389 + 0.2079i | 0.0000 + 0.2500i |
| 0 + 0.2500i | 0 − 0.2500i |
| 0.2452 − 0.0488i | −0.2500 − 0.0000i |
| −0.0957 − 0.2310i | 0.0000 + 0.2500i |
| −0.2079 + 0.1389i | 0.2500 − 0.0000i | ans(:, :, 13, 12) =

|  |  |
|---|---|
| 0.2500 | 0.2500 |
| 0.0488 − 0.2452i | 0.0957 − 0.2310i |
| −0.2310 − 0.0957i | −0.1768 − 0.1768i |
| −0.1389 + 0.2079i | −0.2310 + 0.0957i |
| 0 + 0.2500i | 0 − 0.2500i |
| 0.2452 + 0.0488i | −0.2310 − 0.0957i |
| 0.0957 − 0.2310i | −0.1768 + 0.1768i |
| −0.2079 − 0.1389i | 0.0957 + 0.2310i | ans(:, :, 14, 12) =

|  |  |
|---|---|
| 0.2500 | 0.2500 |
| 0.1389 − 0.2079i | 0.1768 − 0.1768i |
| −0.0957 − 0.2310i | −0.0000 − 0.2500i |
| −0.2452 − 0.0488i | −0.1768 − 0.1768i |
| 0 + 0.2500i | 0 − 0.2500i |
| 0.2079 + 0.1389i | −0.1768 − 0.1768i |
| 0.2310 − 0.0957i | −0.2500 + 0.0000i |
| 0.0488 − 0.2452i | −0.1768 + 0.1768i | ans(:, :, 15, 12) =

|  |  |
|---|---|
| 0.2500 | 0.2500 |
| 0.2079 − 0.1389i | 0.2310 − 0.0957i |
| 0.0957 − 0.2310i | 0.1768 − 0.1768i |
| −0.0488 − 0.2452i | 0.0957 − 0.2310i |
| 0 + 0.2500i | 0 − 0.2500i |
| 0.1389 + 0.2079i | −0.0957 − 0.2310i |
| 0.2310 + 0.0957i | −0.1768 − 0.1768i |
| 0.2452 − 0.0488i | −0.2310 − 0.0957i | ans(:, :, 16, 12) =

|  |  |
|---|---|
| 0.2500 | 0.2500 |
| 0.2452 − 0.0488i | 0.2500 |
| 0.2310 − 0.0957i | 0.2500 |
| 0.2079 − 0.1389i | 0.2500 |
| 0 + 0.2500i | 0 − 0.2500i |
| 0.0488 + 0.2452i | 0 − 0.2500i |
| 0.0957 + 0.2310i | 0 − 0.2500i |
| 0.1389 + 0.2079i | 0 − 0.2500i | ans(:, :, 1, 13) =

|  |  |
|---|---|
| 0.2500 | 0.2500 |
| 0.2500 | 0.2079 + 0.1389i |
| 0.2500 | 0.0957 + 0.2310i |
| 0.2500 | −0.0488 + 0.2452i |
| 0.2500 | −0.2500 |
| 0.2500 | −0.2079 − 0.1389i |
| 0.2500 | −0.0957 − 0.2310i |
| 0.2500 | 0.0488 − 0.2452i | ans(:, :, 2, 13) =

|  |  |
|---|---|
| 0.2500 | 0.2500 |
| 0.2310 + 0.0957i | 0.1389 + 0.2079i |
| 0.1768 + 0.1768i | −0.0957 + 0.2310i |
| 0.0957 + 0.2310i | −0.2452 + 0.0488i |
| 0.2500 | −0.2500 |
| 0.2310 + 0.0957i | −0.1389 − 0.2079i |
| 0.1768 + 0.1768i | 0.0957 − 0.2310i |
| 0.0957 + 0.2310i | 0.2452 − 0.0488i |

-continued ans(:, :, 3, 13) =

| 0.2500 | 0.2500 |
| 0.1768 + 0.1768i | 0.0488 + 0.2452i |
| 0.0000 + 0.2500i | −0.2310 + 0.0957i |
| −0.1768 + 0.1768i | −0.1389 − 0.2079i |
| 0.2500 | −0.2500 |
| 0.1768 + 0.1768i | −0.0488 − 0.2452i |
| 0.0000 + 0.2500i | 0.2310 − 0.0957i |
| −0.1768 + 0.1768i | 0.1389 + 0.2079i | ans(:, :, 4, 13) =

| 0.2500 | 0.2500 |
| 0.0957 + 0.2310i | −0.0488 + 0.2452i |
| −0.1768 + 0.1768i | −0.2310 − 0.0957i |
| −0.2310 − 0.0957i | 0.1389 − 0.2079i |
| 0.2500 | −0.2500 |
| 0.0957 + 0.2310i | 0.0488 − 0.2452i |
| −0.1768 + 0.1768i | 0.2310 + 0.0957i |
| −0.2310 − 0.0957i | −0.1389 + 0.2079i | ans(:, :, 5, 13) =

| 0.2500 | 0.2500 |
| 0.0000 + 0.2500i | −0.1389 + 0.2079i |
| −0.2500 + 0.0000i | −0.0957 − 0.2310i |
| −0.0000 − 0.2500i | 0.2452 + 0.0488i |
| 0.2500 | −0.2500 |
| 0.0000 + 0.2500i | 0.1389 − 0.2079i |
| −0.2500 + 0.0000i | 0.0957 + 0.2310i |
| −0.0000 − 0.2500i | −0.2452 − 0.0488i | ans(:, :, 6, 13) =

| 0.2500 | 0.2500 |
| −0.0957 + 0.2310i | −0.2079 + 0.1389i |
| −0.1768 − 0.1768i | 0.0957 − 0.2310i |
| 0.2310 − 0.0957i | 0.0488 + 0.2452i |
| 0.2500 | −0.2500 |
| −0.0957 + 0.2310i | 0.2079 − 0.1389i |
| −0.1768 − 0.1768i | −0.0957 + 0.2310i |
| 0.2310 − 0.0957i | −0.0488 − 0.2452i | ans(:, :, 7, 13) =

| 0.2500 | 0.2500 |
| −0.1768 + 0.1768i | −0.2452 + 0.0488i |
| −0.0000 − 0.2500i | 0.2310 − 0.0957i |
| 0.1768 + 0.1768i | −0.2079 + 0.1389i |
| 0.2500 | −0.2500 |
| −0.1768 + 0.1768i | 0.2452 − 0.0488i |
| −0.0000 − 0.2500i | −0.2310 + 0.0957i |
| 0.1768 + 0.1768i | 0.2079 − 0.1389i | ans(:, :, 8, 13) =

| 0.2500 | 0.2500 |
| −0.2310 + 0.0957i | −0.2452 − 0.0488i |
| 0.1768 − 0.1768i | 0.2310 + 0.0957i |
| −0.0957 + 0.2310i | −0.2079 − 0.1389i |
| 0.2500 | −0.2500 |
| −0.2310 + 0.0957i | 0.2452 + 0.0488i |
| 0.1768 − 0.1768i | −0.2310 − 0.0957i |
| −0.0957 + 0.2310i | 0.2079 + 0.1389i | ans(:, :, 9, 13) =

| 0.2500 | 0.2500 |
| −0.2500 + 0.0000i | −0.2079 − 0.1389i |
| 0.2500 − 0.0000i | 0.0957 + 0.2310i |
| −0.2500 + 0.0000i | 0.0488 − 0.2452i |
| 0.2500 | −0.2500 |
| −0.2500 + 0.0000i | 0.2079 + 0.1389i |
| 0.2500 − 0.0000i | −0.0957 − 0.2310i |
| −0.2500 + 0.0000i | −0.0488 + 0.2452i | ans(:, :, 10, 13) =

| 0.2500 | 0.2500 |
| −0.2310 − 0.0957i | −0.1389 − 0.2079i |
| 0.1768 + 0.1768i | −0.0957 + 0.2310i |
| −0.0957 − 0.2310i | 0.2452 − 0.0488i |
| 0.2500 | −0.2500 |
| −0.2310 − 0.0957i | 0.1389 + 0.2079i |

-continued

|  |  |
|---|---|
| 0.1768 + 0.1768i | 0.0957 − 0.2310i |
| −0.0957 − 0.2310i | −0.2452 + 0.0488i | ans(:, :, 11, 13) =

|  |  |
|---|---|
| 0.2500 | 0.2500 |
| −0.1768 − 0.1768i | −0.0488 − 0.2452i |
| 0.0000 + 0.2500i | −0.2310 + 0.0957i |
| 0.1768 − 0.1768i | 0.1389 + 0.2079i |
| 0.2500 | −0.2500 |
| −0.1768 − 0.1768i | 0.0488 + 0.2452i |
| 0.0000 + 0.2500i | 0.2310 − 0.0957i |
| 0.1768 − 0.1768i | −0.1389 − 0.2079i | ans(:, :, 12, 13) =

|  |  |
|---|---|
| 0.2500 | 0.2500 |
| −0.0957 − 0.2310i | 0.0488 − 0.2452i |
| −0.1768 + 0.1768i | −0.2310 − 0.0957i |
| 0.2310 + 0.0957i | −0.1389 + 0.2079i |
| 0.2500 | −0.2500 |
| −0.0957 − 0.2310i | −0.0488 + 0.2452i |
| −0.1768 + 0.1768i | 0.2310 + 0.0957i |
| 0.2310 + 0.0957i | 0.1389 − 0.2079i | ans(:, :, 13, 13) =

|  |  |
|---|---|
| 0.2500 | 0.2500 |
| −0.0000 − 0.2500i | 0.1389 − 0.2079i |
| −0.2500 + 0.0000i | −0.0957 − 0.2310i |
| 0.0000 + 0.2500i | −0.2452 − 0.0488i |
| 0.2500 | −0.2500 |
| −0.0000 − 0.2500i | −0.1389 + 0.2079i |
| −0.2500 + 0.0000i | 0.0957 + 0.2310i |
| 0.0000 + 0.2500i | 0.2452 + 0.0488i | ans(:, :, 14, 13) =

|  |  |
|---|---|
| 0.2500 | 0.2500 |
| 0.0957 − 0.2310i | 0.2079 − 0.1389i |
| −0.1768 − 0.1768i | 0.0957 − 0.2310i |
| −0.2310 + 0.0957i | −0.0488 − 0.2452i |
| 0.2500 | −0.2500 |
| 0.0957 − 0.2310i | −0.2079 + 0.1389i |
| −0.1768 − 0.1768i | −0.0957 + 0.2310i |
| −0.2310 + 0.0957i | 0.0488 + 0.2452i | ans(:, :, 15, 13) =

|  |  |
|---|---|
| 0.2500 | 0.2500 |
| 0.1768 − 0.1768i | 0.2452 − 0.0488i |
| −0.0000 − 0.2500i | 0.2310 − 0.0957i |
| −0.1768 − 0.1768i | 0.2079 − 0.1389i |
| 0.2500 | −0.2500 |
| 0.1768 − 0.1768i | −0.2452 + 0.0488i |
| −0.0000 − 0.2500i | −0.2310 − 0.0957i |
| −0.1768 − 0.1768i | −0.2079 + 0.1389i | ans(:, :, 16, 13) =

|  |  |
|---|---|
| 0.2500 | 0.2500 |
| 0.2310 − 0.0957i | 0.2452 + 0.0488i |
| 0.1768 − 0.1768i | 0.2310 + 0.0957i |
| 0.0957 − 0.2310i | 0.2079 + 0.1389i |
| 0.2500 | −0.2500 |
| 0.2310 − 0.0957i | −0.2452 − 0.0488i |
| 0.1768 − 0.1768i | −0.2310 − 0.0957i |
| 0.0957 − 0.2310i | −0.2079 − 0.1389i | ans(:, :, 1, 14) =

|  |  |
|---|---|
| 0.2500 | 0.2500 |
| 0.2500 | 0.2079 + 0.1389i |
| 0.2500 | 0.0957 + 0.2310i |
| 0.2500 | −0.0488 + 0.2452i |
| 0 + 0.2500i | 0 − 0.2500i |
| 0 + 0.2500i | 0.1389 − 0.2079i |
| 0 + 0.2500i | 0.2310 − 0.0957i |
| 0 + 0.2500i | 0.2452 + 0.0488i | ans(:, :, 2, 14) =

|  |  |
|---|---|
| 0.2500 | 0.2500 |
| 0.2310 + 0.0957i | 0.1389 + 0.2079i |
| 0.1768 + 0.1768i | −0.0957 + 0.2310i |
| 0.0957 + 0.2310i | −0.2452 + 0.0488i |
| 0 + 0.2500i | 0 − 0.2500i |

-continued

|  |  |
|---|---|
| −0.0957 + 0.2310i | 0.2079 − 0.1389i |
| −0.1768 + 0.1768i | 0.2310 + 0.0957i |
| −0.2310 + 0.0957i | 0.0488 + 0.2452i | ans(:, :, 3, 14) =

| 0.2500 | 0.2500 |
|---|---|
| 0.1768 + 0.1768i | 0.0488 + 0.2452i |
| 0.0000 + 0.2500i | −0.2310 + 0.0957i |
| −0.1768 + 0.1768i | −0.1389 − 0.2079i |
| 0 + 0.2500i | 0 − 0.2500i |
| −0.1768 + 0.1768i | 0.2452 − 0.0488i |
| −0.2500 + 0.0000i | 0.0957 + 0.2310i |
| −0.1768 − 0.1768i | −0.2079 + 0.1389i | ans(:, :, 4, 14) =

| 0.2500 | 0.2500 |
|---|---|
| 0.0957 + 0.2310i | −0.0488 + 0.2452i |
| −0.1768 + 0.1768i | −0.2310 − 0.0957i |
| −0.2310 − 0.0957i | 0.1389 − 0.2079i |
| 0 + 0.2500i | 0 − 0.2500i |
| −0.2310 + 0.0957i | 0.2452 + 0.0488i |
| −0.1768 − 0.1768i | −0.0957 + 0.2310i |
| 0.0957 − 0.2310i | −0.2079 − 0.1389i | ans(:, :, 5, 14) =

| 0.2500 | 0.2500 |
|---|---|
| 0.0000 + 0.2500i | −0.1389 + 0.2079i |
| −0.2500 + 0.0000i | −0.0957 − 0.2310i |
| −0.0000 − 0.2500i | 0.2452 + 0.0488i |
| 0 + 0.2500i | 0 − 0.2500i |
| −0.2500 + 0.0000i | 0.2079 + 0.1389i |
| −0.0000 − 0.2500i | −0.2310 + 0.0957i |
| 0.2500 − 0.0000i | 0.0488 − 0.2452i | ans(:, :, 6, 14) =

| 0.2500 | 0.2500 |
|---|---|
| −0.0957 + 0.2310i | −0.2079 + 0.1389i |
| −0.1768 − 0.1768i | 0.0957 − 0.2310i |
| 0.2310 − 0.0957i | 0.0488 + 0.2452i |
| 0 + 0.2500i | 0 − 0.2500i |
| −0.2310 − 0.0957i | 0.1389 + 0.2079i |
| 0.1768 − 0.1768i | −0.2310 − 0.0957i |
| 0.0957 + 0.2310i | 0.2452 − 0.0488i | ans(:, :, 7, 14) =

| 0.2500 | 0.2500 |
|---|---|
| −0.1768 + 0.1768i | −0.2452 + 0.0488i |
| −0.0000 − 0.2500i | 0.2310 − 0.0957i |
| 0.1768 + 0.1768i | −0.2079 + 0.1389i |
| 0 + 0.2500i | 0 − 0.2500i |
| −0.1768 − 0.1768i | 0.0488 + 0.2452i |
| 0.2500 − 0.0000i | −0.0957 − 0.2310i |
| −0.1768 + 0.1768i | 0.1389 + 0.2079i | ans(:, :, 8, 14) =

| 0.2500 | 0.2500 |
|---|---|
| −0.2310 + 0.0957i | −0.2452 − 0.0488i |
| 0.1768 − 0.1768i | 0.2310 + 0.0957i |
| −0.0957 + 0.2310i | −0.2079 − 0.1389i |
| 0 + 0.2500i | 0 − 0.2500i |
| −0.0957 − 0.2310i | −0.0488 + 0.2452i |
| 0.1768 + 0.1768i | 0.0957 − 0.2310i |
| −0.2310 − 0.0957i | −0.1389 + 0.2079i | ans(:, :, 9, 14) =

| 0.2500 | 0.2500 |
|---|---|
| −0.2500 + 0.0000i | −0.2079 − 0.1389i |
| 0.2500 − 0.0000i | 0.0957 + 0.2310i |
| −0.2500 + 0.0000i | 0.0488 − 0.2452i |
| 0 + 0.2500i | 0 − 0.2500i |
| −0.0000 − 0.2500i | −0.1389 + 0.2079i |
| 0.0000 + 0.2500i | 0.2310 − 0.0957i |
| −0.0000 − 0.2500i | −0.2452 − 0.0488i | ans(:, :, 10, 14) =

| 0.2500 | 0.2500 |
|---|---|
| −0.2310 − 0.0957i | −0.1389 − 0.2079i |
| 0.1768 + 0.1768i | −0.0957 + 0.2310i |
| −0.0957 − 0.2310i | 0.2452 − 0.0488i |

|  |  |
|---|---|
| 0 + 0.2500i | 0 − 0.2500i |
| 0.0957 − 0.2310i | −0.2079 + 0.1389i |
| −0.1768 + 0.1768i | 0.2310 + 0.0957i |
| 0.2310 − 0.0957i | −0.0488 − 0.2452i |
| ans(:, :, 11, 14) = | |
| 0.2500 | 0.2500 |
| −0.1768 − 0.1768i | −0.0488 − 0.2452i |
| 0.0000 + 0.2500i | −0.2310 + 0.0957i |
| 0.1768 − 0.1768i | 0.1389 + 0.2079i |
| 0 + 0.2500i | 0 − 0.2500i |
| 0.1768 − 0.1768i | −0.2452 + 0.0488i |
| −0.2500 + 0.0000i | 0.0957 + 0.2310i |
| 0.1768 + 0.1768i | 0.2079 − 0.1389i |
| ans(:, :, 12, 14) = | |
| 0.2500 | 0.2500 |
| −0.0957 − 0.2310i | 0.0488 − 0.2452i |
| −0.1768 + 0.1768i | −0.2310 − 0.0957i |
| 0.2310 + 0.0957i | −0.1389 + 0.2079i |
| 0 + 0.2500i | 0 − 0.2500i |
| 0.2310 − 0.0957i | −0.2452 − 0.0488i |
| −0.1768 − 0.1768i | −0.0957 + 0.2310i |
| −0.0957 + 0.2310i | 0.2079 + 0.1389i |
| ans(:, :, 13, 14) = | |
| 0.2500 | 0.2500 |
| −0.0000 − 0.2500i | 0.1389 − 0.2079i |
| −0.2500 + 0.0000i | −0.0957 − 0.2310i |
| 0.0000 + 0.2500i | −0.2452 − 0.0488i |
| 0 + 0.2500i | 0 − 0.2500i |
| 0.2500 − 0.0000i | −0.2079 − 0.1389i |
| −0.0000 − 0.2500i | −0.2310 + 0.0957i |
| −0.2500 + 0.0000i | −0.0488 + 0.2452i |
| ans(:, :, 14, 14) = | |
| 0.2500 | 0.2500 |
| 0.0957 − 0.2310i | 0.2079 − 0.1389i |
| −0.1768 − 0.1768i | 0.0957 − 0.2310i |
| −0.2310 + 0.0957i | −0.0488 − 0.2452i |
| 0 + 0.2500i | 0 − 0.2500i |
| 0.2310 + 0.0957i | −0.1389 − 0.2079i |
| 0.1768 − 0.1768i | −0.2310 − 0.0957i |
| −0.0957 − 0.2310i | −0.2452 + 0.0488i |
| ans(:, :, 15, 14) = | |
| 0.2500 | 0.2500 |
| 0.1768 − 0.1768i | 0.2452 − 0.0488i |
| −0.0000 − 0.2500i | 0.2310 − 0.0957i |
| −0.1768 − 0.1768i | 0.2079 − 0.1389i |
| 0 + 0.2500i | 0 − 0.2500i |
| 0.1768 + 0.1768i | −0.0488 − 0.2452i |
| 0.2500 − 0.0000i | −0.0957 − 0.2310i |
| 0.1768 − 0.1768i | −0.1389 − 0.2079i |
| ans(:, :, 16, 14) = | |
| 0.2500 | 0.2500 |
| 0.2310 − 0.0957i | 0.2452 + 0.0488i |
| 0.1768 − 0.1768i | 0.2310 + 0.0957i |
| 0.0957 − 0.2310i | 0.2079 + 0.1389i |
| 0 + 0.2500i | 0 − 0.2500i |
| 0.0957 + 0.2310i | 0.0488 − 0.2452i |
| 0.1768 + 0.1768i | 0.0957 − 0.2310i |
| 0.2310 + 0.0957i | 0.1389 − 0.2079i |
| ans(:, :, 1, 15) = | |
| 0.2500 | 0.2500 |
| 0.2452 + 0.0488i | 0.2079 + 0.1389i |
| 0.2310 + 0.0957i | 0.0957 + 0.2310i |
| 0.2079 + 0.1389i | −0.0488 + 0.2452i |
| 0.2500 | −0.2500 |
| 0.2452 + 0.0488i | −0.2079 − 0.1389i |
| 0.2310 + 0.0957i | −0.0957 − 0.2310i |
| 0.2079 + 0.1389i | 0.0488 − 0.2452i |
| ans(:, :, 2, 15) = | |
| 0.2500 | 0.2500 |
| 0.2079 + 0.1389i | 0.1389 + 0.2079i |
| 0.0957 + 0.2310i | −0.0957 + 0.2310i |

-continued

| | |
|---|---|
| −0.0488 + 0.2452i | −0.2452 + 0.0488i |
| 0.2500 | −0.2500 |
| 0.2079 + 0.1389i | −0.1389 − 0.2079i |
| 0.0957 + 0.2310i | 0.0957 − 0.2310i |
| −0.0488 + 0.2452i | 0.2452 − 0.0488i | ans(:, :, 3, 15) =

| | |
|---|---|
| 0.2500 | 0.2500 |
| 0.1389 + 0.2079i | 0.0488 + 0.2452i |
| −0.0957 + 0.2310i | −0.2310 + 0.0957i |
| −0.2452 + 0.0488i | −0.1389 − 0.2079i |
| 0.2500 | −0.2500 |
| 0.1389 + 0.2079i | −0.0488 − 0.2452i |
| −0.0957 + 0.2310i | 0.2310 − 0.0957i |
| −0.2452 + 0.0488i | 0.1389 + 0.2079i | ans(:, :, 4, 15) =

| | |
|---|---|
| 0.2500 | 0.2500 |
| 0.0488 + 0.2452i | −0.0488 + 0.2452i |
| −0.2310 + 0.0957i | −0.2310 − 0.0957i |
| −0.1389 − 0.2079i | 0.1389 − 0.2079i |
| 0.2500 | −0.2500 |
| 0.0488 + 0.2452i | 0.0488 − 0.2452i |
| −0.2310 + 0.0957i | 0.2310 − 0.0957i |
| −0.1389 − 0.2079i | −0.1389 + 0.2079i | ans(:, :, 5, 15) =

| | |
|---|---|
| 0.2500 | 0.2500 |
| −0.0488 + 0.2452i | −0.1389 + 0.2079i |
| −0.2310 − 0.0957i | −0.0957 − 0.2310i |
| 0.1389 − 0.2079i | 0.2452 + 0.0488i |
| 0.2500 | −0.2500 |
| −0.0488 + 0.2452i | 0.1389 − 0.2079i |
| −0.2310 − 0.0957i | 0.0957 + 0.2310i |
| 0.1389 − 0.2079i | −0.2452 − 0.0488i | ans(:, :, 6, 15) =

| | |
|---|---|
| 0.2500 | 0.2500 |
| −0.1389 + 0.2079i | −0.2079 + 0.1389i |
| −0.0957 − 0.2310i | 0.0957 − 0.2310i |
| 0.2452 + 0.0488i | 0.0488 + 0.2452i |
| 0.2500 | −0.2500 |
| −0.1389 + 0.2079i | 0.2079 − 0.1389i |
| −0.0957 − 0.2310i | −0.0957 + 0.2310i |
| 0.2452 + 0.0488i | −0.0488 − 0.2452i | ans(:, :, 7, 15) =

| | |
|---|---|
| 0.2500 | 0.2500 |
| −0.2079 + 0.1389i | −0.2452 + 0.0488i |
| 0.0957 − 0.2310i | 0.2310 − 0.0957i |
| 0.0488 + 0.2452i | −0.2079 + 0.1389i |
| 0.2500 | −0.2500 |
| −0.2079 + 0.1389i | 0.2452 − 0.0488i |
| 0.0957 − 0.2310i | −0.2310 + 0.0957i |
| 0.0488 + 0.2452i | 0.2079 − 0.1389i | ans(:, :, 8, 15) =

| | |
|---|---|
| 0.2500 | 0.2500 |
| −0.2452 + 0.0488i | −0.2452 − 0.0488i |
| 0.2310 − 0.0957i | 0.2310 + 0.0957i |
| −0.2079 + 0.1389i | −0.2079 − 0.1389i |
| 0.2500 | −0.2500 |
| −0.2452 + 0.0488i | 0.2452 + 0.0488i |
| 0.2310 − 0.0957i | −0.2310 − 0.0957i |
| −0.2079 + 0.1389i | 0.2079 + 0.1389i | ans(:, :, 9, 15) =

| | |
|---|---|
| 0.2500 | 0.2500 |
| −0.2452 − 0.0488i | −0.2079 − 0.1389i |
| 0.2310 + 0.0957i | 0.0957 + 0.2310i |
| −0.2079 − 0.1389i | 0.0488 − 0.2452i |
| 0.2500 | −0.2500 |
| −0.2452 − 0.0488i | 0.2079 + 0.1389i |
| 0.2310 + 0.0957i | −0.0957 − 0.2310i |
| −0.2079 − 0.1389i | −0.0488 + 0.2452i | ans(:, :, 10, 15) =

| | |
|---|---|
| 0.2500 | 0.2500 |
| −0.2079 − 0.1389i | −0.1389 − 0.2079i |

|  |  |
|---|---|
| 0.0957 + 0.2310i | −0.0957 + 0.2310i |
| 0.0488 − 0.2452i | 0.2452 − 0.0488i |
| 0.2500 | −0.2500 |
| −0.2079 − 0.1389i | 0.1389 + 0.2079i |
| 0.0957 + 0.2310i | 0.0957 − 0.2310i |
| 0.0488 − 0.2452i | −0.2452 + 0.0488i | ans(:, :, 11, 15) =

|  |  |
|---|---|
| 0.2500 | 0.2500 |
| −0.1389 − 0.2079i | −0.0488 − 0.2452i |
| −0.0957 + 0.2310i | −0.2310 + 0.0957i |
| 0.2452 − 0.0488i | 0.1389 + 0.2079i |
| 0.2500 | −0.2500 |
| −0.1389 − 0.2079i | 0.0488 + 0.2452i |
| −0.0957 + 0.2310i | 0.2310 − 0.0957i |
| 0.2452 − 0.0488i | −0.1389 − 0.2079i | ans(:, :, 12, 15) =

|  |  |
|---|---|
| 0.2500 | 0.2500 |
| −0.0488 − 0.2452i | 0.0488 − 0.2452i |
| −0.2310 + 0.0957i | −0.2310 − 0.0957i |
| 0.1389 + 0.2079i | −0.1389 + 0.2079i |
| 0.2500 | −0.2500 |
| −0.0488 − 0.2452i | −0.0488 − 0.2452i |
| −0.2310 + 0.0957i | 0.2310 + 0.0957i |
| 0.1389 + 0.2079i | 0.1389 − 0.2079i | ans(:, :, 13, 15) =

|  |  |
|---|---|
| 0.2500 | 0.2500 |
| 0.0488 − 0.2452i | 0.1389 − 0.2079i |
| −0.2310 − 0.0957i | −0.0957 − 0.2310i |
| −0.1389 + 0.2079i | −0.2452 − 0.0488i |
| 0.2500 | −0.2500 |
| 0.0488 − 0.2452i | −0.1389 + 0.2079i |
| −0.2310 − 0.0957i | 0.0957 + 0.2310i |
| −0.1389 + 0.2079i | 0.2452 + 0.0488i | ans(:, :, 14, 15) =

|  |  |
|---|---|
| 0.2500 | 0.2500 |
| 0.1389 − 0.2079i | 0.2079 − 0.1389i |
| −0.0957 − 0.2310i | 0.0957 − 0.2310i |
| −0.2452 − 0.0488i | −0.0488 − 0.2452i |
| 0.2500 | −0.2500 |
| 0.1389 − 0.2079i | −0.2079 + 0.1389i |
| −0.0957 − 0.2310i | −0.0957 + 0.2310i |
| −0.2452 − 0.0488i | 0.0488 + 0.2452i | ans(:, :, 15, 15) =

|  |  |
|---|---|
| 0.2500 | 0.2500 |
| 0.2079 − 0.1389i | 0.2452 − 0.0488i |
| 0.0957 − 0.2310i | 0.2310 − 0.0957i |
| −0.0488 − 0.2452i | 0.2079 − 0.1389i |
| 0.2500 | −0.2500 |
| 0.2079 − 0.1389i | −0.2452 + 0.0488i |
| 0.0957 − 0.2310i | −0.2310 + 0.0957i |
| −0.0488 − 0.2452i | −0.2079 + 0.1389i | ans(:, :, 16, 15) =

|  |  |
|---|---|
| 0.2500 | 0.2500 |
| 0.2452 − 0.0488i | 0.2452 + 0.0488i |
| 0.2310 − 0.0957i | 0.2310 + 0.0957i |
| 0.2079 − 0.1389i | 0.2079 + 0.1389i |
| 0.2500 | −0.2500 |
| 0.2452 − 0.0488i | −0.2452 − 0.0488i |
| 0.2310 − 0.0957i | −0.2310 − 0.0957i |
| 0.2079 − 0.1389i | −0.2079 − 0.1389i | ans(:, :, 1, 16) =

|  |  |
|---|---|
| 0.2500 | 0.2500 |
| 0.2452 + 0.0488i | 0.2079 + 0.1389i |
| 0.2310 + 0.0957i | 0.0957 + 0.2310i |
| 0.2079 + 0.1389i | −0.0488 + 0.2452i |
| 0 + 0.2500i | 0 − 0.2500i |
| −0.0488 + 0.2452i | 0.1389 − 0.2079i |
| −0.0957 + 0.2310i | 0.2310 − 0.0957i |
| −0.1389 + 0.2079i | 0.2452 + 0.0488i |

-continued

| ans(:, :, 2, 16) = | |
|---|---|
| 0.2500 | 0.2500 |
| 0.2079 + 0.1389i | 0.1389 + 0.2079i |
| 0.0957 + 0.2310i | −0.0957 + 0.2310i |
| −0.0488 + 0.2452i | −0.2452 + 0.0488i |
| 0 + 0.2500i | 0 − 0.2500i |
| −0.1389 + 0.2079i | 0.2079 − 0.1389i |
| −0.2310 + 0.0957i | 0.2310 + 0.0957i |
| −0.2452 − 0.0488i | 0.0488 + 0.2452i |

| ans(:, :, 3, 16) = | |
|---|---|
| 0.2500 | 0.2500 |
| 0.1389 + 0.2079i | 0.0488 + 0.2452i |
| −0.0957 + 0.2310i | −0.2310 + 0.0957i |
| −0.2452 + 0.0488i | −0.1389 − 0.2079i |
| 0 + 0.2500i | 0 − 0.2500i |
| −0.2079 + 0.1389i | 0.2452 − 0.0488i |
| −0.2310 − 0.0957i | 0.0957 + 0.2310i |
| −0.0488 − 0.2452i | −0.2079 + 0.1389i |

| ans(:, :, 4, 16) = | |
|---|---|
| 0.2500 | 0.2500 |
| 0.0488 + 0.2452i | −0.0488 + 0.2452i |
| −0.2310 + 0.0957i | −0.2310 − 0.0957i |
| −0.1389 − 0.2079i | 0.1389 − 0.2079i |
| 0 + 0.2500i | 0 − 0.2500i |
| −0.2452 + 0.0488i | 0.2452 + 0.0488i |
| −0.0957 − 0.2310i | −0.0957 + 0.2310i |
| 0.2079 − 0.1389i | −0.2079 − 0.1389i |

| ans(:, :, 5, 16) = | |
|---|---|
| 0.2500 | 0.2500 |
| −0.0488 + 0.2452i | −0.1389 + 0.2079i |
| −0.2310 − 0.0957i | −0.0957 − 0.2310i |
| 0.1389 − 0.2079i | 0.2452 + 0.0488i |
| 0 + 0.2500i | 0 − 0.2500i |
| −0.2452 − 0.0488i | 0.2079 + 0.1389i |
| 0.0957 − 0.2310i | −0.2310 + 0.0957i |
| 0.2079 + 0.1389i | 0.0488 − 0.2452i |

| ans(:, :, 6, 16) = | |
|---|---|
| 0.2500 | 0.2500 |
| −0.1389 + 0.2079i | −0.2079 + 0.1389i |
| −0.0957 − 0.2310i | 0.0957 − 0.2310i |
| 0.2452 + 0.0488i | 0.0488 + 0.2452i |
| 0 + 0.2500i | 0 − 0.2500i |
| −0.2079 − 0.1389i | 0.1389 + 0.2079i |
| 0.2310 − 0.0957i | −0.2310 − 0.0957i |
| −0.0488 + 0.2452i | 0.2452 − 0.0488i |

| ans(:, :, 7, 16) = | |
|---|---|
| 0.2500 | 0.2500 |
| −0.2079 + 0.1389i | −0.2452 + 0.0488i |
| 0.0957 − 0.2310i | 0.2310 − 0.0957i |
| 0.0488 + 0.2452i | −0.2079 + 0.1389i |
| 0 + 0.2500i | 0 − 0.2500i |
| −0.1389 − 0.2079i | 0.0488 + 0.2452i |
| 0.2310 + 0.0957i | −0.0957 − 0.2310i |
| −0.2452 + 0.0488i | 0.1389 + 0.2079i |

| ans(:, :, 8, 16) = | |
|---|---|
| 0.2500 | 0.2500 |
| −0.2452 + 0.0488i | −0.2452 − 0.0488i |
| 0.2310 − 0.0957i | 0.2310 + 0.0957i |
| −0.2079 + 0.1389i | −0.2079 − 0.1389i |
| 0 + 0.2500i | 0 − 0.2500i |
| −0.0488 − 0.2452i | −0.0488 + 0.2452i |
| 0.0957 + 0.2310i | 0.0957 − 0.2310i |
| −0.1389 − 0.2079i | −0.1389 + 0.2079i |

| ans(:, :, 9, 16) = | |
|---|---|
| 0.2500 | 0.2500 |
| −0.2452 − 0.0488i | −0.2079 − 0.1389i |
| 0.2310 + 0.0957i | 0.0957 + 0.2310i |
| −0.2079 − 0.1389i | 0.0488 − 0.2452i |
| 0 + 0.2500i | 0 − 0.2500i |
| 0.0488 − 0.2452i | −0.1389 + 0.2079i |

-continued

| | |
|---|---|
| −0.0957 + 0.2310i | 0.2310 − 0.0957i |
| 0.1389 − 0.2079i | −0.2452 − 0.0488i | ans(:, :, 10, 16) =

| | |
|---|---|
| 0.2500 | 0.2500 |
| −0.2079 − 0.1389i | −0.1389 − 0.2079i |
| 0.0957 + 0.2310i | −0.0957 + 0.2310i |
| 0.0488 − 0.2452i | 0.2452 − 0.0488i |
| 0 + 0.2500i | 0 − 0.2500i |
| 0.1389 − 0.2079i | −0.2079 + 0.1389i |
| −0.2310 + 0.0957i | 0.2310 + 0.0957i |
| 0.2452 + 0.0488i | −0.0488 − 0.2452i | ans(:, :, 11, 16) =

| | |
|---|---|
| 0.2500 | 0.2500 |
| −0.1389 − 0.2079i | −0.0488 − 0.2452i |
| −0.0957 + 0.2310i | −0.2310 + 0.0957i |
| 0.2452 + 0.0488i | 0.1389 + 0.2079i |
| 0 + 0.2500i | 0 − 0.2500i |
| 0.2079 − 0.1389i | −0.2452 + 0.0488i |
| −0.2310 − 0.0957i | 0.0957 + 0.2310i |
| 0.0488 + 0.2452i | 0.2079 − 0.1389i | ans(:, :, 12, 16) =

| | |
|---|---|
| 0.2500 | 0.2500 |
| −0.0488 − 0.2452i | 0.0488 − 0.2452i |
| −0.2310 + 0.0957i | −0.2310 − 0.0957i |
| 0.1389 + 0.2079i | −0.1389 + 0.2079i |
| 0 + 0.2500i | 0 − 0.2500i |
| 0.2452 − 0.0488i | −0.2452 − 0.0488i |
| −0.0957 − 0.2310i | −0.0957 + 0.2310i |
| −0.2079 + 0.1389i | 0.2079 + 0.1389i | ans(:, :, 13, 16) =

| | |
|---|---|
| 0.2500 | 0.2500 |
| 0.0488 − 0.2452i | 0.1389 − 0.2079i |
| −0.2310 − 0.0957i | −0.0957 − 0.2310i |
| −0.1389 + 0.2079i | −0.2452 − 0.0488i |
| 0 + 0.2500i | 0 − 0.2500i |
| 0.2452 + 0.0488i | −0.2079 − 0.1389i |
| 0.0957 − 0.2310i | −0.2310 + 0.0957i |
| −0.2079 − 0.1389i | −0.0488 + 0.2452i | ans(:, :, 14, 16) =

| | |
|---|---|
| 0.2500 | 0.2500 |
| 0.1389 − 0.2079i | 0.2079 − 0.1389i |
| −0.0957 − 0.2310i | 0.0957 − 0.2310i |
| −0.2452 − 0.0488i | −0.0488 − 0.2452i |
| 0 + 0.2500i | 0 − 0.2500i |
| 0.2079 + 0.1389i | −0.1389 − 0.2079i |
| 0.2310 − 0.0957i | −0.2310 − 0.0957i |
| 0.0488 − 0.2452i | −0.2452 + 0.0488i | ans(:, :, 15, 16) =

| | |
|---|---|
| 0.2500 | 0.2500 |
| 0.2079 − 0.1389i | 0.2452 − 0.0488i |
| 0.0957 − 0.2310i | 0.2310 − 0.0957i |
| −0.0488 − 0.2452i | 0.2079 − 0.1389i |
| 0 + 0.2500i | 0 − 0.2500i |
| 0.1389 + 0.2079i | −0.0488 − 0.2452i |
| 0.2310 + 0.0957i | −0.0957 − 0.2310i |
| 0.2452 − 0.0488i | −0.1389 − 0.2079i | ans(:, :, 16, 16) =

| | |
|---|---|
| 0.2500 | 0.2500 |
| 0.2452 − 0.0488i | 0.2452 + 0.0488i |
| 0.2310 − 0.0957i | 0.2310 + 0.0957i |
| 0.2079 − 0.1389i | 0.2079 + 0.1389i |
| 0 + 0.2500i | 0 − 0.2500i |
| 0.0488 + 0.2452i | 0.0488 − 0.2452i |
| 0.0957 + 0.2310i | 0.0957 − 0.2310i |
| 0.1389 + 0.2079i | 0.1389 − 0.2079i |

- Rank 3 ans(:, :, 1, 1) =

| | | |
|---|---|---|
| 0.2041 | 0.2041 | 0.2041 |
| 0.2041 | 0.2041 | 0.0000 + 0.2041i |

-continued

| | | |
|---|---|---|
| 0.2041 | 0.2041 | −0.2041 + 0.0000i |
| 0.2041 | 0.2041 | −0.0000 − 0.2041i |
| 0.2041 | −0.2041 | −0.2041 |
| 0.2041 | −0.2041 | −0.0000 − 0.2041i |
| 0.2041 | −0.2041 | 0.2041 − 0.0000i |
| 0.2041 | −0.2041 | 0.0000 + 0.2041i |
| | ans(:, :, 2, 1) = | |
| 0.2041 | 0.2041 | 0.2041 |
| 0 + 0.2041i | 0 + 0.2041i | −0.2041 + 0.0000i |
| −0.2041 | −0.2041 | 0.2041 − 0.0000i |
| 0 − 0.2041i | 0 − 0.2041i | −0.2041 + 0.0000i |
| 0.2041 | −0.2041 | −0.2041 |
| 0 + 0.2041i | 0 − 0.2041i | 0.2041 − 0.0000i |
| −0.2041 | 0.2041 | −0.2041 + 0.0000i |
| 0 − 0.2041i | 0 + 0.2041i | 0.2041 − 0.0000i |
| | ans(:, :, 3, 1) = | |
| 0.2041 | 0.2041 | 0.2041 |
| −0.2041 | −0.2041 | −0.0000 − 0.2041i |
| 0.2041 | 0.2041 | −0.2041 + 0.0000i |
| −0.2041 | −0.2041 | 0.0000 + 0.2041i |
| 0.2041 | −0.2041 | −0.2041 |
| −0.2041 | 0.2041 | 0.0000 + 0.2041i |
| 0.2041 | −0.2041 | 0.2041 − 0.0000i |
| −0.2041 | 0.2041 | −0.0000 − 0.2041i |
| | ans(:, :, 4, 1) = | |
| 0.2041 | 0.2041 | 0.2041 |
| 0 − 0.2041i | 0 − 0.2041i | 0.2041 − 0.0000i |
| −0.2041 | −0.2041 | 0.2041 − 0.0000i |
| 0 + 0.2041i | 0 + 0.2041i | 0.2041 − 0.0000i |
| 0.2041 | −0.2041 | −0.2041 |
| 0 − 0.2041i | 0 + 0.2041i | −0.2041 + 0.0000i |
| −0.2041 | 0.2041 | −0.2041 + 0.0000i |
| 0 + 0.2041i | 0 − 0.2041i | −0.2041 + 0.0000i |
| | ans(:, :, 1, 2) = | |
| 0.2041 | 0.2041 | 0.2041 |
| 0.0000 + 0.2041i | 0.2041 | 0.0000 + 0.2041i |
| −0.2041 + 0.0000i | 0.2041 | −0.2041 + 0.0000i |
| −0.0000 − 0.2041i | 0.2041 | −0.0000 − 0.2041i |
| 0.2041 | −0.2041 | −0.2041 |
| 0.0000 + 0.2041i | −0.2041 | −0.0000 − 0.2041i |
| −0.2041 + 0.0000i | −0.2041 | 0.2041 − 0.0000i |
| −0.0000 − 0.2041i | −0.2041 | 0.0000 + 0.2041i |
| | ans(:, :, 2, 2) = | |
| 0.2041 | 0.2041 | 0.2041 |
| −0.2041 + 0.0000i | 0 + 0.2041i | −0.2041 + 0.0000i |
| 0.2041 − 0.0000i | −0.2041 | 0.2041 − 0.0000i |
| −0.2041 + 0.0000i | 0 − 0.2041i | −0.2041 + 0.0000i |
| 0.2041 | −0.2041 | −0.2041 |
| −0.2041 + 0.0000i | 0 − 0.2041i | 0.2041 − 0.0000i |
| 0.2041 − 0.0000i | 0.2041 | −0.2041 + 0.0000i |
| −0.2041 + 0.0000i | 0 + 0.2041i | 0.2041 − 0.0000i |
| | ans(:, :, 3, 2) = | |
| 0.2041 | 0.2041 | 0.2041 |
| −0.0000 − 0.2041i | −0.2041 | −0.0000 − 0.2041i |
| −0.2041 + 0.0000i | 0.2041 | −0.2041 + 0.0000i |
| 0.0000 + 0.2041i | −0.2041 | 0.0000 + 0.2041i |
| 0.2041 | −0.2041 | −0.2041 |
| −0.0000 − 0.2041i | 0.2041 | 0.0000 + 0.2041i |
| −0.2041 + 0.0000i | −0.2041 | 0.2041 − 0.0000i |
| 0.0000 + 0.2041i | 0.2041 | −0.0000 − 0.2041i |
| | ans(:, :, 4, 2) = | |
| 0.2041 | 0.2041 | 0.2041 |
| 0.2041 − 0.0000i | 0 − 0.2041i | 0.2041 − 0.0000i |
| 0.2041 − 0.0000i | −0.2041 | 0.2041 − 0.0000i |
| 0.2041 − 0.0000i | 0 + 0.2041i | 0.2041 − 0.0000i |
| 0.2041 | −0.2041 | −0.2041 |
| 0.2041 − 0.0000i | 0 + 0.2041i | −0.2041 + 0.0000i |
| 0.2041 − 0.0000i | 0.2041 | −0.2041 + 0.0000i |
| 0.2041 − 0.0000i | 0 − 0.2041i | −0.2041 + 0.0000i |

-continued

| ans(:, :, 1, 3) = | | |
|---|---|---|
| 0.2041 | 0.2041 | 0.2041 |
| 0.2041 | 0.0000 + 0.2041i | 0.0000 + 0.2041i |
| 0.2041 | −0.2041 + 0.0000i | −0.2041 + 0.0000i |
| 0.2041 | −0.0000 − 0.2041i | −0.0000 − 0.2041i |
| 0.2041 | 0.2041 | −0.2041 |
| 0.2041 | 0.0000 + 0.2041i | −0.0000 − 0.2041i |
| 0.2041 | −0.2041 + 0.0000i | 0.2041 − 0.0000i |
| 0.2041 | −0.0000 − 0.2041i | 0.0000 + 0.2041i |

| ans(:, :, 2, 3) = | | |
|---|---|---|
| 0.2041 | 0.2041 | 0.2041 |
| 0 + 0.2041i | −0.2041 + 0.0000i | −0.2041 + 0.0000i |
| −0.2041 | 0.2041 − 0.0000i | 0.2041 − 0.0000i |
| 0 − 0.2041i | −0.2041 + 0.0000i | −0.2041 + 0.0000i |
| 0.2041 | 0.2041 | −0.2041 |
| 0 + 0.2041i | −0.2041 + 0.0000i | 0.2041 − 0.0000i |
| −0.2041 | 0.2041 − 0.0000i | −0.2041 + 0.0000i |
| 0 − 0.2041i | −0.2041 + 0.0000i | 0.2041 − 0.0000i |

| ans(:, :, 3, 3) = | | |
|---|---|---|
| 0.2041 | 0.2041 | 0.2041 |
| −0.2041 | −0.0000 − 0.2041i | −0.0000 − 0.2041i |
| 0.2041 | −0.2041 + 0.0000i | −0.2041 + 0.0000i |
| −0.2041 | 0.0000 + 0.2041i | 0.0000 + 0.2041i |
| 0.2041 | 0.2041 | −0.2041 |
| −0.2041 | −0.0000 − 0.2041i | 0.0000 + 0.2041i |
| 0.2041 | −0.2041 + 0.0000i | 0.2041 − 0.0000i |
| −0.2041 | 0.0000 + 0.2041i | −0.0000 − 0.2041i |

| ans(:, :, 4, 3) = | | |
|---|---|---|
| 0.2041 | 0.2041 | 0.2041 |
| 0 − 0.2041i | 0.2041 − 0.0000i | 0.2041 − 0.0000i |
| −0.2041 | 0.2041 − 0.0000i | 0.2041 − 0.0000i |
| 0 + 0.2041i | 0.2041 − 0.0000i | 0.2041 − 0.0000i |
| 0.2041 | 0.2041 | −0.2041 |
| 0 − 0.2041i | 0.2041 − 0.0000i | −0.2041 + 0.0000i |
| −0.2041 | 0.2041 − 0.0000i | −0.2041 + 0.0000i |
| 0 + 0.2041i | 0.2041 − 0.0000i | −0.2041 + 0.0000i |

| ans(:, :, 1, 4) = | | |
|---|---|---|
| 0.2041 | 0.2041 | 0.2041 |
| 0.0000 + 0.2041i | 0.2041 | 0.2041 |
| −0.2041 + 0.0000i | 0.2041 | 0.2041 |
| −0.0000 − 0.2041i | 0.2041 | 0.2041 |
| 0.2041 | 0.2041 | −0.2041 |
| 0.0000 + 0.2041i | 0.2041 | −0.2041 |
| −0.2041 + 0.0000i | 0.2041 | −0.2041 |
| −0.0000 − 0.2041i | 0.2041 | −0.2041 |

| ans(:, :, 2, 4) = | | |
|---|---|---|
| 0.2041 | 0.2041 | 0.2041 |
| −0.2041 + 0.0000i | 0 + 0.2041i | 0 + 0.2041i |
| 0.2041 − 0.0000i | −0.2041 | −0.2041 |
| −0.2041 + 0.0000i | 0 − 0.2041i | 0 − 0.2041i |
| 0.2041 | 0.2041 | −0.2041 |
| −0.2041 + 0.0000i | 0 + 0.2041i | 0 − 0.2041i |
| 0.2041 − 0.0000i | −0.2041 | 0.2041 |
| −0.2041 + 0.0000i | 0 − 0.2041i | 0 + 0.2041i |

| ans(:, :, 3, 4) = | | |
|---|---|---|
| 0.2041 | 0.2041 | 0.2041 |
| −0.0000 − 0.2041i | −0.2041 | −0.2041 |
| −0.2041 + 0.0000i | 0.2041 | 0.2041 |
| 0.0000 + 0.2041i | −0.2041 | −0.2041 |
| 0.2041 | 0.2041 | −0.2041 |
| −0.0000 − 0.2041i | −0.2041 | 0.2041 |
| −0.2041 + 0.0000i | 0.2041 | −0.2041 |
| 0.0000 + 0.2041i | −0.2041 | 0.2041 |

| ans(:, :, 4, 4) = | | |
|---|---|---|
| 0.2041 | 0.2041 | 0.2041 |
| 0.2041 − 0.0000i | 0 − 0.2041i | 0 − 0.2041i |
| 0.2041 − 0.0000i | −0.2041 | −0.2041 |
| 0.2041 − 0.0000i | 0 + 0.2041i | 0 + 0.2041i |
| 0.2041 | 0.2041 | −0.2041 |
| 0.2041 − 0.0000i | 0 − 0.2041i | 0 + 0.2041i |

-continued

| | | |
|---|---|---|
| 0.2041 − 0.0000i | −0.2041 | 0.2041 |
| 0.2041 − 0.0000i | 0 + 0.2041i | 0 − 0.2041i | ans(:, :, 1, 5) =

| | | |
|---|---|---|
| 0.2041 | 0.2041 | 0.2041 |
| 0.1886 + 0.0781i | 0.1886 + 0.0781i | −0.0781 + 0.1886i |
| 0.1443 + 0.1443i | 0.1443 + 0.1443i | −0.1443 − 0.1443i |
| 0.0781 + 0.1886i | 0.0781 + 0.1886i | 0.1886 − 0.0781i |
| 0.2041 | −0.2041 | −0.2041 |
| 0.1886 + 0.0781i | −0.1886 − 0.0781i | 0.0781 − 0.1886i |
| 0.1443 + 0.1443i | −0.1443 − 0.1443i | 0.1443 + 0.1443i |
| 0.0781 + 0.1886i | −0.0781 − 0.1886i | −0.1886 + 0.0781i | ans(:, :, 2, 5) =

| | | |
|---|---|---|
| 0.2041 | 0.2041 | 0.2041 |
| −0.0781 + 0.1886i | −0.0781 + 0.1886i | −0.1886 − 0.0781i |
| −0.1443 − 0.1443i | −0.1443 − 0.1443i | 0.1443 + 0.1443i |
| 0.1886 − 0.0781i | 0.1886 − 0.0781i | −0.0781 − 0.1886i |
| 0.2041 | −0.2041 | −0.2041 |
| −0.0781 + 0.1886i | 0.0781 − 0.1886i | 0.1886 + 0.0781i |
| −0.1443 − 0.1443i | 0.1443 + 0.1443i | −0.1443 − 0.1443i |
| 0.1886 − 0.0781i | −0.1886 + 0.0781i | 0.0781 + 0.1886i | ans(:, :, 3, 5) =

| | | |
|---|---|---|
| 0.2041 | 0.2041 | 0.2041 |
| −0.1886 − 0.0781i | −0.1886 − 0.0781i | 0.0781 − 0.1886i |
| 0.1443 + 0.1443i | 0.1443 + 0.1443i | −0.1443 − 0.1443i |
| −0.0781 − 0.1886i | −0.0781 − 0.1886i | −0.1886 + 0.0781i |
| 0.2041 | −0.2041 | −0.2041 |
| −0.1886 − 0.0781i | 0.1886 + 0.0781i | −0.0781 + 0.1886i |
| 0.1443 + 0.1443i | −0.1443 − 0.1443i | 0.1443 + 0.1443i |
| −0.0781 − 0.1886i | 0.0781 + 0.1886i | 0.1886 − 0.0781i | ans(:, :, 4, 5) =

| | | |
|---|---|---|
| 0.2041 | 0.2041 | 0.2041 |
| 0.0781 − 0.1886i | 0.0781 − 0.1886i | 0.1886 + 0.0781i |
| −0.1443 − 0.1443i | −0.1443 − 0.1443i | 0.1443 + 0.1443i |
| −0.1886 + 0.0781i | −0.1886 + 0.0781i | 0.0781 + 0.1886i |
| 0.2041 | −0.2041 | −0.2041 |
| 0.0781 − 0.1886i | −0.0781 + 0.1886i | −0.1886 − 0.0781i |
| −0.1443 − 0.1443i | 0.1443 + 0.1443i | −0.1443 − 0.1443i |
| −0.1886 + 0.0781i | 0.1886 − 0.0781i | −0.0781 − 0.1886i | ans(:, :, 1, 6) =

| | | |
|---|---|---|
| 0.2041 | 0.2041 | 0.2041 |
| −0.0781 + 0.1886i | 0.1886 + 0.0781i | −0.0781 + 0.1886i |
| −0.1443 − 0.1443i | 0.1443 + 0.1443i | −0.1443 − 0.1443i |
| 0.1886 − 0.0781i | 0.0781 + 0.1886i | 0.1886 − 0.0781i |
| 0.2041 | −0.2041 | −0.2041 |
| −0.0781 + 0.1886i | −0.1886 − 0.0781i | 0.0781 − 0.1886i |
| −0.1443 − 0.1443i | −0.1443 − 0.1443i | 0.1443 + 0.1443i |
| 0.1886 − 0.0781i | −0.0781 − 0.1886i | −0.1886 + 0.0781i | ans(:, :, 2, 6) =

| | | |
|---|---|---|
| 0.2041 | 0.2041 | 0.2041 |
| −0.1886 − 0.0781i | −0.0781 + 0.1886i | −0.1886 − 0.0781i |
| 0.1443 + 0.1443i | −0.1443 − 0.1443i | 0.1443 + 0.1443i |
| −0.0781 − 0.1886i | 0.1886 − 0.0781i | −0.0781 − 0.1886i |
| 0.2041 | −0.2041 | −0.2041 |
| −0.1886 − 0.0781i | 0.0781 − 0.1886i | 0.1886 + 0.0781i |
| 0.1443 + 0.1443i | 0.1443 + 0.1443i | −0.1443 − 0.1443i |
| −0.0781 − 0.1886i | −0.1886 + 0.0781i | 0.0781 + 0.1886i | ans(:, :, 3, 6) =

| | | |
|---|---|---|
| 0.2041 | 0.2041 | 0.2041 |
| 0.0781 − 0.1886i | −0.1886 − 0.0781i | 0.0781 − 0.1886i |
| −0.1443 − 0.1443i | 0.1443 + 0.1443i | −0.1443 − 0.1443i |
| −0.1886 + 0.0781i | −0.0781 − 0.1886i | −0.1886 + 0.0781i |
| 0.2041 | −0.2041 | −0.2041 |
| 0.0781 − 0.1886i | 0.1886 + 0.0781i | −0.0781 + 0.1886i |
| −0.1443 − 0.1443i | −0.1443 − 0.1443i | 0.1443 + 0.1443i |
| −0.1886 + 0.0781i | 0.0781 + 0.1886i | 0.1886 − 0.0781i | ans(:, :, 4, 6) =

| | | |
|---|---|---|
| 0.2041 | 0.2041 | 0.2041 |
| 0.1886 + 0.0781i | 0.0781 − 0.1886i | 0.1886 + 0.0781i |
| 0.1443 + 0.1443i | −0.1443 − 0.1443i | 0.1443 + 0.1443i |
| 0.0781 + 0.1886i | −0.1886 + 0.0781i | 0.0781 + 0.1886i |
| 0.2041 | −0.2041 | −0.2041 |

-continued

| | | |
|---|---|---|
| 0.1886 + 0.0781i | −0.0781 + 0.1886i | −0.1886 − 0.0781i |
| 0.1443 + 0.1443i | 0.1443 + 0.1443i | −0.1443 − 0.1443i |
| 0.0781 + 0.1886i | 0.1886 − 0.0781i | −0.0781 − 0.1886i | ans(:, :, 1, 7) =

| | | |
|---|---|---|
| 0.2041 | 0.2041 | 0.2041 |
| 0.1886 + 0.0781i | −0.0781 + 0.1886i | −0.0781 + 0.1886i |
| 0.1443 + 0.1443i | −0.1443 − 0.1443i | −0.1443 − 0.1443i |
| 0.0781 + 0.1886i | 0.1886 − 0.0781i | 0.1886 − 0.0781i |
| 0.2041 | 0.2041 | −0.2041 |
| 0.1886 + 0.0781i | −0.0781 + 0.1886i | 0.0781 − 0.1886i |
| 0.1443 + 0.1443i | −0.1443 − 0.1443i | 0.1443 + 0.1443i |
| 0.0781 + 0.1886i | 0.1886 − 0.0781i | −0.1886 + 0.0781i | ans(:, :, 2, 7) =

| | | |
|---|---|---|
| 0.2041 | 0.2041 | 0.2041 |
| −0.0781 + 0.1886i | −0.1886 − 0.0781i | −0.1886 − 0.0781i |
| −0.1443 − 0.1443i | 0.1443 + 0.1443i | 0.1443 + 0.1443i |
| 0.1886 − 0.0781i | −0.0781 − 0.1886i | −0.0781 − 0.1886i |
| 0.2041 | 0.2041 | −0.2041 |
| −0.0781 + 0.1886i | −0.1886 − 0.0781i | 0.1886 + 0.0781i |
| −0.1443 − 0.1443i | 0.1443 + 0.1443i | −0.1443 − 0.1443i |
| 0.1886 − 0.0781i | −0.0781 − 0.1886i | 0.0781 + 0.1886i | ans(:, :, 3, 7) =

| | | |
|---|---|---|
| 0.2041 | 0.2041 | 0.2041 |
| −0.1886 − 0.0781i | 0.0781 − 0.1886i | 0.0781 − 0.1886i |
| 0.1443 + 0.1443i | −0.1443 − 0.1443i | −0.1443 − 0.1443i |
| −0.0781 − 0.1886i | −0.1886 + 0.0781i | −0.1886 + 0.0781i |
| 0.2041 | −0.2041 | −0.2041 |
| −0.1886 − 0.0781i | 0.0781 − 0.1886i | −0.0781 + 0.1886i |
| 0.1443 + 0.1443i | −0.1443 − 0.1443i | 0.1443 + 0.1443i |
| −0.0781 − 0.1886i | −0.1886 + 0.0781i | 0.1886 − 0.0781i | ans(:, :, 4, 7) =

| | | |
|---|---|---|
| 0.2041 | 0.2041 | 0.2041 |
| 0.0781 − 0.1886i | 0.1886 + 0.0781i | 0.1886 + 0.0781i |
| −0.1443 − 0.1443i | 0.1443 + 0.1443i | 0.1443 + 0.1443i |
| −0.1886 + 0.0781i | 0.0781 + 0.1886i | 0.0781 + 0.1886i |
| 0.2041 | 0.2041 | −0.2041 |
| 0.0781 − 0.1886i | 0.1886 + 0.0781i | −0.1886 − 0.0781i |
| −0.1443 − 0.1443i | 0.1443 + 0.1443i | −0.1443 − 0.1443i |
| −0.1886 + 0.0781i | 0.0781 + 0.1886i | −0.0781 − 0.1886i | ans(:, :, 1, 8) =

| | | |
|---|---|---|
| 0.2041 | 0.2041 | 0.2041 |
| −0.0781 + 0.1886i | 0.1886 + 0.0781i | 0.1886 + 0.0781i |
| −0.1443 − 0.1443i | 0.1443 + 0.1443i | 0.1443 + 0.1443i |
| 0.1886 − 0.0781i | 0.0781 + 0.1886i | 0.0781 + 0.1886i |
| 0.2041 | 0.2041 | −0.2041 |
| −0.0781 + 0.1886i | 0.1886 + 0.0781i | −0.1886 − 0.0781i |
| −0.1443 − 0.1443i | 0.1443 + 0.1443i | −0.1443 − 0.1443i |
| 0.1886 − 0.0781i | 0.0781 + 0.1886i | −0.0781 − 0.1886i | ans(:, :, 2, 8) =

| | | |
|---|---|---|
| 0.2041 | 0.2041 | 0.2041 |
| −0.1886 − 0.0781i | −0.0781 + 0.1886i | −0.0781 + 0.1886i |
| 0.1443 + 0.1443i | −0.1443 − 0.1443i | −0.1443 − 0.1443i |
| −0.0781 − 0.1886i | 0.1886 − 0.0781i | 0.1886 − 0.0781i |
| 0.2041 | 0.2041 | −0.2041 |
| −0.1886 − 0.0781i | −0.0781 + 0.1886i | 0.0781 − 0.1886i |
| 0.1443 + 0.1443i | −0.1443 − 0.1443i | 0.1443 + 0.1443i |
| −0.0781 − 0.1886i | 0.1886 − 0.0781i | −0.1886 + 0.0781i | ans(:, :, 3, 8) =

| | | |
|---|---|---|
| 0.2041 | 0.2041 | 0.2041 |
| 0.0781 − 0.1886i | −0.1886 − 0.0781i | −0.1886 − 0.0781i |
| −0.1443 − 0.1443i | 0.1443 + 0.1443i | 0.1443 + 0.1443i |
| −0.1886 + 0.0781i | −0.0781 − 0.1886i | −0.0781 − 0.1886i |
| 0.2041 | 0.2041 | −0.2041 |
| 0.0781 − 0.1886i | −0.1886 − 0.0781i | 0.1886 + 0.0781i |
| −0.1443 − 0.1443i | 0.1443 + 0.1443i | −0.1443 − 0.1443i |
| −0.1886 + 0.0781i | −0.0781 − 0.1886i | 0.0781 + 0.1886i | ans(:, :, 4, 8) =

| | | |
|---|---|---|
| 0.2041 | 0.2041 | 0.2041 |
| 0.1886 + 0.0781i | 0.0781 − 0.1886i | 0.0781 − 0.1886i |
| 0.1443 + 0.1443i | −0.1443 − 0.1443i | −0.1443 − 0.1443i |
| 0.0781 + 0.1886i | −0.1886 + 0.0781i | −0.1886 + 0.0781i |

-continued

|  |  |  |
|---|---|---|
| 0.2041 | 0.2041 | −0.2041 |
| 0.1886 + 0.0781i | 0.0781 − 0.1886i | −0.0781 + 0.1886i |
| 0.1443 + 0.1443i | −0.1443 − 0.1443i | 0.1443 + 0.1443i |
| 0.0781 + 0.1886i | −0.1886 + 0.0781i | 0.1886 − 0.0781i | ans(:, :, 1, 9) =

|  |  |  |
|---|---|---|
| 0.2041 | 0.2041 | 0.2041 |
| 0.1443 + 0.1443i | 0.1443 + 0.1443i | −0.1443 + 0.1443i |
| 0.0000 + 0.2041i | 0.0000 + 0.2041i | −0.0000 − 0.2041i |
| −0.1443 + 0.1443i | −0.1443 + 0.1443i | 0.1443 + 0.1443i |
| 0.2041 | −0.2041 | −0.2041 |
| 0.1443 + 0.1443i | −0.1443 − 0.1443i | 0.1443 − 0.1443i |
| 0.0000 + 0.2041i | −0.0000 − 0.2041i | 0.0000 + 0.2041i |
| −0.1443 + 0.1443i | 0.1443 − 0.1443i | −0.1443 − 0.1443i | ans(:, :, 2, 9) =

|  |  |  |
|---|---|---|
| 0.2041 | 0.2041 | 0.2041 |
| −0.1443 + 0.1443i | −0.1443 + 0.1443i | −0.1443 − 0.1443i |
| −0.0000 − 0.2041i | −0.0000 − 0.2041i | 0.0000 + 0.2041i |
| 0.1443 + 0.1443i | 0.1443 + 0.1443i | 0.1443 − 0.1443i |
| 0.2041 | −0.2041 | −0.2041 |
| −0.1443 + 0.1443i | 0.1443 − 0.1443i | 0.1443 + 0.1443i |
| −0.0000 − 0.2041i | 0.0000 + 0.2041i | −0.0000 − 0.2041i |
| 0.1443 + 0.1443i | −0.1443 − 0.1443i | −0.1443 + 0.1443i | ans(:, :, 3, 9) =

|  |  |  |
|---|---|---|
| 0.2041 | 0.2041 | 0.2041 |
| −0.1443 − 0.1443i | −0.1443 − 0.1443i | 0.1443 − 0.1443i |
| 0.0000 + 0.2041i | 0.0000 + 0.2041i | −0.0000 − 0.2041i |
| 0.1443 − 0.1443i | 0.1443 − 0.1443i | −0.1443 − 0.1443i |
| 0.2041 | −0.2041 | −0.2041 |
| −0.1443 − 0.1443i | 0.1443 + 0.1443i | −0.1443 + 0.1443i |
| 0.0000 + 0.2041i | −0.0000 − 0.2041i | 0.0000 + 0.2041i |
| 0.1443 − 0.1443i | −0.1443 + 0.1443i | 0.1443 + 0.1443i | ans(:, :, 4, 9) =

|  |  |  |
|---|---|---|
| 0.2041 | 0.2041 | 0.2041 |
| 0.1443 − 0.1443i | 0.1443 − 0.1443i | 0.1443 + 0.1443i |
| −0.0000 − 0.2041i | −0.0000 − 0.2041i | 0.0000 + 0.2041i |
| −0.1443 − 0.1443i | −0.1443 − 0.1443i | −0.1443 + 0.1443i |
| 0.2041 | −0.2041 | −0.2041 |
| 0.1443 − 0.1443i | −0.1443 + 0.1443i | −0.1443 − 0.1443i |
| −0.0000 − 0.2041i | 0.0000 + 0.2041i | −0.0000 − 0.2041i |
| −0.1443 − 0.1443i | 0.1443 + 0.1443i | 0.1443 − 0.1443i | ans(:, :, 1, 10) =

|  |  |  |
|---|---|---|
| 0.2041 | 0.2041 | 0.2041 |
| −0.1443 + 0.1443i | 0.1443 + 0.1443i | −0.1443 + 0.1443i |
| −0.0000 − 0.2041i | 0.0000 + 0.2041i | −0.0000 − 0.2041i |
| 0.1443 + 0.1443i | −0.1443 + 0.1443i | 0.1443 + 0.1443i |
| 0.2041 | −0.2041 | −0.2041 |
| −0.1443 + 0.1443i | −0.1443 − 0.1443i | 0.1443 − 0.1443i |
| −0.0000 − 0.2041i | −0.0000 − 0.2041i | 0.0000 + 0.2041i |
| 0.1443 + 0.1443i | 0.1443 − 0.1443i | −0.1443 − 0.1443i | ans(:, :, 2, 10) =

|  |  |  |
|---|---|---|
| 0.2041 | 0.2041 | 0.2041 |
| −0.1443 − 0.1443i | −0.1443 + 0.1443i | −0.1443 − 0.1443i |
| 0.0000 + 0.2041i | −0.0000 − 0.2041i | 0.0000 + 0.2041i |
| 0.1443 − 0.1443i | 0.1443 + 0.1443i | 0.1443 − 0.1443i |
| 0.2041 | −0.2041 | −0.2041 |
| −0.1443 − 0.1443i | 0.1443 − 0.1443i | 0.1443 + 0.1443i |
| 0.0000 + 0.2041i | 0.0000 + 0.2041i | −0.0000 − 0.2041i |
| 0.1443 − 0.1443i | −0.1443 − 0.1443i | −0.1443 + 0.1443i | ans(:, :, 3, 10) =

|  |  |  |
|---|---|---|
| 0.2041 | 0.2041 | 0.2041 |
| 0.1443 − 0.1443i | −0.1443 − 0.1443i | 0.1443 − 0.1443i |
| −0.0000 − 0.2041i | 0.0000 + 0.2041i | −0.0000 − 0.2041i |
| −0.1443 − 0.1443i | 0.1443 − 0.1443i | −0.1443 − 0.1443i |
| 0.2041 | −0.2041 | −0.2041 |
| 0.1443 − 0.1443i | 0.1443 + 0.1443i | −0.1443 + 0.1443i |
| −0.0000 − 0.2041i | −0.0000 − 0.2041i | 0.0000 + 0.2041i |
| −0.1443 − 0.1443i | −0.1443 + 0.1443i | 0.1443 + 0.1443i | ans(:, :, 4, 10) =

|  |  |  |
|---|---|---|
| 0.2041 | 0.2041 | 0.2041 |
| 0.1443 + 0.1443i | 0.1443 − 0.1443i | 0.1443 + 0.1443i |
| 0.0000 + 0.2041i | −0.0000 − 0.2041i | 0.0000 + 0.2041i |

| | | |
|---|---|---|
| −0.1443 + 0.1443i | −0.1443 − 0.1443i | −0.1443 + 0.1443i |
| 0.2041 | −0.2041 | −0.2041 |
| 0.1443 + 0.1443i | −0.1443 + 0.1443i | −0.1443 − 0.1443i |
| 0.0000 + 0.2041i | 0.0000 + 0.2041i | −0.0000 − 0.2041i |
| −0.1443 + 0.1443i | 0.1443 + 0.1443i | 0.1443 − 0.1443i | ans(:, :, 1, 11) =

| | | |
|---|---|---|
| 0.2041 | 0.2041 | 0.2041 |
| 0.1443 + 0.1443i | −0.1443 + 0.1443i | −0.1443 + 0.1443i |
| 0.0000 + 0.2041i | −0.0000 − 0.2041i | −0.0000 − 0.2041i |
| −0.1443 + 0.1443i | 0.1443 + 0.1443i | 0.1443 + 0.1443i |
| 0.2041 | 0.2041 | −0.2041 |
| 0.1443 + 0.1443i | −0.1443 + 0.1443i | 0.1443 + 0.1443i |
| 0.0000 + 0.2041i | −0.0000 − 0.2041i | 0.0000 + 0.2041i |
| −0.1443 + 0.1443i | 0.1443 + 0.1443i | −0.1443 − 0.1443i | ans(:, :, 2, 11) =

| | | |
|---|---|---|
| 0.2041 | 0.2041 | 0.2041 |
| −0.1443 + 0.1443i | −0.1443 − 0.1443i | −0.1443 − 0.1443i |
| −0.0000 − 0.2041i | 0.0000 + 0.2041i | 0.0000 + 0.2041i |
| 0.1443 + 0.1443i | 0.1443 − 0.1443i | 0.1443 − 0.1443i |
| 0.2041 | 0.2041 | −0.2041 |
| −0.1443 + 0.1443i | −0.1443 − 0.1443i | 0.1443 + 0.1443i |
| −0.0000 − 0.2041i | 0.0000 + 0.2041i | −0.0000 − 0.2041i |
| 0.1443 + 0.1443i | 0.1443 − 0.1443i | −0.1443 + 0.1443i | ans(:, :, 3, 11) =

| | | |
|---|---|---|
| 0.2041 | 0.2041 | 0.2041 |
| −0.1443 − 0.1443i | 0.1443 − 0.1443i | 0.1443 − 0.1443i |
| 0.0000 + 0.2041i | −0.0000 − 0.2041i | −0.0000 − 0.2041i |
| 0.1443 − 0.1443i | −0.1443 − 0.1443i | −0.1443 − 0.1443i |
| 0.2041 | 0.2041 | −0.2041 |
| −0.1443 − 0.1443i | 0.1443 − 0.1443i | −0.1443 + 0.1443i |
| 0.0000 + 0.2041i | −0.0000 − 0.2041i | 0.0000 + 0.2041i |
| 0.1443 − 0.1443i | −0.1443 − 0.1443i | 0.1443 + 0.1443i | ans(:, :, 4, 11) =

| | | |
|---|---|---|
| 0.2041 | 0.2041 | 0.2041 |
| 0.1443 − 0.1443i | 0.1443 + 0.1443i | 0.1443 + 0.1443i |
| −0.0000 − 0.2041i | 0.0000 + 0.2041i | 0.0000 + 0.2041i |
| −0.1443 − 0.1443i | −0.1443 + 0.1443i | −0.1443 − 0.1443i |
| 0.2041 | 0.2041 | −0.2041 |
| 0.1443 − 0.1443i | 0.1443 + 0.1443i | −0.1443 − 0.1443i |
| −0.0000 − 0.2041i | 0.0000 + 0.2041i | −0.0000 − 0.2041i |
| −0.1443 − 0.1443i | −0.1443 + 0.1443i | 0.1443 − 0.1443i | ans(:, :, 1, 12) =

| | | |
|---|---|---|
| 0.2041 | 0.2041 | 0.2041 |
| −0.1443 + 0.1443i | 0.1443 + 0.1443i | 0.1443 + 0.1443i |
| −0.0000 − 0.2041i | 0.0000 + 0.2041i | 0.0000 + 0.2041i |
| 0.1443 + 0.1443i | −0.1443 + 0.1443i | −0.1443 + 0.1443i |
| 0.2041 | 0.2041 | −0.2041 |
| −0.1443 + 0.1443i | 0.1443 + 0.1443i | −0.1443 − 0.1443i |
| −0.0000 − 0.2041i | 0.0000 + 0.2041i | −0.0000 − 0.2041i |
| 0.1443 + 0.1443i | −0.1443 + 0.1443i | 0.1443 − 0.1443i | ans(:, :, 2, 12) =

| | | |
|---|---|---|
| 0.2041 | 0.2041 | 0.2041 |
| −0.1443 − 0.1443i | −0.1443 + 0.1443i | −0.1443 + 0.1443i |
| 0.0000 + 0.2041i | −0.0000 − 0.2041i | −0.0000 − 0.2041i |
| 0.1443 − 0.1443i | 0.1443 + 0.1443i | 0.1443 + 0.1443i |
| 0.2041 | 0.2041 | −0.2041 |
| −0.1443 − 0.1443i | −0.1443 + 0.1443i | 0.1443 + 0.1443i |
| 0.0000 + 0.2041i | −0.0000 − 0.2041i | 0.0000 + 0.2041i |
| 0.1443 − 0.1443i | 0.1443 + 0.1443i | −0.1443 − 0.1443i | ans(:, :, 3, 12) =

| | | |
|---|---|---|
| 0.2041 | 0.2041 | 0.2041 |
| 0.1443 − 0.1443i | −0.1443 − 0.1443i | −0.1443 − 0.1443i |
| −0.0000 − 0.2041i | 0.0000 + 0.2041i | 0.0000 + 0.2041i |
| −0.1443 − 0.1443i | 0.1443 − 0.1443i | 0.1443 − 0.1443i |
| 0.2041 | 0.2041 | −0.2041 |
| 0.1443 − 0.1443i | −0.1443 − 0.1443i | 0.1443 + 0.1443i |
| −0.0000 − 0.2041i | 0.0000 + 0.2041i | −0.0000 − 0.2041i |
| −0.1443 − 0.1443i | 0.1443 − 0.1443i | −0.1443 + 0.1443i | ans(:, :, 4, 12) =

| | | |
|---|---|---|
| 0.2041 | 0.2041 | 0.2041 |
| 0.1443 + 0.1443i | 0.1443 − 0.1443i | 0.1443 − 0.1443i |

| | | |
|---|---|---|
| 0.0000 + 0.2041i | −0.0000 − 0.2041i | −0.0000 − 0.2041i |
| −0.1443 + 0.1443i | −0.1443 − 0.1443i | −0.1443 − 0.1443i |
| 0.2041 | 0.2041 | −0.2041 |
| 0.1443 + 0.1443i | 0.1443 − 0.1443i | −0.1443 + 0.1443i |
| 0.0000 + 0.2041i | −0.0000 − 0.2041i | 0.0000 + 0.2041i |
| −0.1443 + 0.1443i | −0.1443 − 0.1443i | 0.1443 + 0.1443i | ans(:, :, 1, 13) =

| | | |
|---|---|---|
| 0.2041 | 0.2041 | 0.2041 |
| 0.0781 + 0.1886i | 0.0781 + 0.1886i | −0.1886 + 0.0781i |
| −0.1443 + 0.1443i | −0.1443 + 0.1443i | 0.1443 − 0.1443i |
| −0.1886 − 0.0781i | −0.1886 − 0.0781i | −0.0781 + 0.1886i |
| 0.2041 | −0.2041 | −0.2041 |
| 0.0781 + 0.1886i | −0.0781 − 0.1886i | 0.1886 − 0.0781i |
| −0.1443 + 0.1443i | 0.1443 − 0.1443i | −0.1443 + 0.1443i |
| −0.1886 − 0.0781i | 0.1886 + 0.0781i | 0.0781 − 0.1886i | ans(:, :, 2, 13) =

| | | |
|---|---|---|
| 0.2041 | 0.2041 | 0.2041 |
| −0.1886 + 0.0781i | −0.1886 + 0.0781i | −0.0781 − 0.1886i |
| 0.1443 − 0.1443i | 0.1443 − 0.1443i | −0.1443 + 0.1443i |
| −0.0781 + 0.1886i | −0.0781 + 0.1886i | 0.1886 + 0.0781i |
| 0.2041 | −0.2041 | −0.2041 |
| −0.1886 + 0.0781i | 0.1886 − 0.0781i | 0.0781 + 0.1886i |
| 0.1443 − 0.1443i | −0.1443 + 0.1443i | 0.1443 − 0.1443i |
| −0.0781 + 0.1886i | 0.0781 − 0.1886i | −0.1886 − 0.0781i | ans(:, :, 3, 13) =

| | | |
|---|---|---|
| 0.2041 | 0.2041 | 0.2041 |
| −0.0781 − 0.1886i | −0.0781 − 0.1886i | 0.1886 − 0.0781i |
| −0.1443 + 0.1443i | −0.1443 + 0.1443i | 0.1443 − 0.1443i |
| 0.1886 + 0.0781i | 0.1886 + 0.0781i | 0.0781 − 0.1886i |
| 0.2041 | −0.2041 | −0.2041 |
| −0.0781 − 0.1886i | 0.0781 + 0.1886i | −0.1886 + 0.0781i |
| −0.1443 + 0.1443i | 0.1443 − 0.1443i | −0.1443 + 0.1443i |
| 0.1886 + 0.0781i | −0.1886 − 0.0781i | −0.0781 + 0.1886i | ans(:, :, 4, 13) =

| | | |
|---|---|---|
| 0.2041 | 0.2041 | 0.2041 |
| 0.1886 − 0.0781i | 0.1886 − 0.0781i | 0.0781 + 0.1886i |
| 0.1443 − 0.1443i | 0.1443 − 0.1443i | −0.1443 + 0.1443i |
| 0.0781 − 0.1886i | 0.0781 − 0.1886i | −0.1886 − 0.0781i |
| 0.2041 | −0.2041 | −0.2041 |
| 0.1886 − 0.0781i | −0.1886 + 0.0781i | −0.0781 − 0.1886i |
| 0.1443 − 0.1443i | −0.1443 + 0.1443i | 0.1443 − 0.1443i |
| 0.0781 − 0.1886i | −0.0781 + 0.1886i | 0.1886 + 0.0781i | ans(:, :, 1, 14) =

| | | |
|---|---|---|
| 0.2041 | 0.2041 | 0.2041 |
| −0.1886 + 0.0781i | 0.0781 + 0.1886i | −0.1886 + 0.0781i |
| 0.1443 − 0.1443i | −0.1443 + 0.1443i | 0.1443 − 0.1443i |
| −0.0781 + 0.1886i | −0.1886 − 0.0781i | −0.0781 + 0.1886i |
| 0.2041 | −0.2041 | −0.2041 |
| −0.1886 + 0.0781i | −0.0781 − 0.1886i | 0.1886 − 0.0781i |
| 0.1443 − 0.1443i | 0.1443 − 0.1443i | −0.1443 + 0.1443i |
| −0.0781 + 0.1886i | 0.1886 + 0.0781i | 0.0781 − 0.1886i | ans(:, :, 2, 14) =

| | | |
|---|---|---|
| 0.2041 | 0.2041 | 0.2041 |
| −0.0781 − 0.1886i | −0.1886 + 0.0781i | −0.0781 − 0.1886i |
| −0.1443 + 0.1443i | 0.1443 − 0.1443i | −0.1443 + 0.1443i |
| 0.1886 + 0.0781i | −0.0781 + 0.1886i | 0.1886 + 0.0781i |
| 0.2041 | −0.2041 | −0.2041 |
| −0.0781 − 0.1886i | 0.1886 − 0.0781i | 0.0781 + 0.1886i |
| −0.1443 + 0.1443i | −0.1443 + 0.1443i | 0.1443 − 0.1443i |
| 0.1886 + 0.0781i | 0.0781 − 0.1886i | −0.1886 − 0.0781i | ans(:, :, 3, 14) =

| | | |
|---|---|---|
| 0.2041 | 0.2041 | 0.2041 |
| 0.1886 − 0.0781i | −0.0781 − 0.1886i | 0.1886 − 0.0781i |
| 0.1443 − 0.1443i | −0.1443 + 0.1443i | 0.1443 − 0.1443i |
| 0.0781 − 0.1886i | 0.1886 + 0.0781i | 0.0781 − 0.1886i |
| 0.2041 | −0.2041 | −0.2041 |
| 0.1886 − 0.0781i | 0.0781 + 0.1886i | −0.1886 + 0.0781i |
| 0.1443 − 0.1443i | 0.1443 − 0.1443i | −0.1443 + 0.1443i |
| 0.0781 − 0.1886i | −0.1886 − 0.0781i | −0.0781 + 0.1886i |

-continued

| ans(:, :, 4, 14) = | | |
|---|---|---|
| 0.2041 | 0.2041 | 0.2041 |
| 0.0781 + 0.1886i | 0.1886 − 0.0781i | 0.0781 + 0.1886i |
| −0.1443 + 0.1443i | 0.1443 − 0.1443i | −0.1443 + 0.1443i |
| −0.1886 − 0.0781i | 0.0781 − 0.1886i | −0.1886 − 0.0781i |
| 0.2041 | −0.2041 | −0.2041 |
| 0.0781 + 0.1886i | −0.1886 + 0.0781i | −0.0781 − 0.1886i |
| −0.1443 + 0.1443i | −0.1443 + 0.1443i | 0.1443 − 0.1443i |
| −0.1886 − 0.0781i | −0.0781 + 0.1886i | 0.1886 + 0.0781i |

| ans(:, :, 1, 15) = | | |
|---|---|---|
| 0.2041 | 0.2041 | 0.2041 |
| 0.0781 + 0.1886i | −0.1886 + 0.0781i | −0.1886 + 0.0781i |
| −0.1443 + 0.1443i | 0.1443 − 0.1443i | 0.1443 − 0.1443i |
| −0.1886 − 0.0781i | −0.0781 + 0.1886i | −0.0781 + 0.1886i |
| 0.2041 | 0.2041 | −0.2041 |
| 0.0781 + 0.1886i | −0.1886 + 0.0781i | 0.1886 − 0.0781i |
| −0.1443 + 0.1443i | 0.1443 − 0.1443i | −0.1443 + 0.1443i |
| −0.1886 − 0.0781i | −0.0781 + 0.1886i | 0.0781 − 0.1886i |

| ans(:, :, 2, 15) = | | |
|---|---|---|
| 0.2041 | 0.2041 | 0.2041 |
| −0.1886 + 0.0781i | −0.0781 − 0.1886i | −0.0781 − 0.1886i |
| 0.1443 − 0.1443i | −0.1443 + 0.1443i | −0.1443 + 0.1443i |
| −0.0781 + 0.1886i | 0.1886 + 0.0781i | 0.1886 + 0.0781i |
| 0.2041 | 0.2041 | −0.2041 |
| −0.1886 + 0.0781i | −0.0781 − 0.1886i | 0.0781 + 0.1886i |
| 0.1443 − 0.1443i | −0.1443 + 0.1443i | 0.1443 − 0.1443i |
| −0.0781 + 0.1886i | 0.1886 + 0.0781i | −0.1886 − 0.0781i |

| ans(:, :, 3, 15) = | | |
|---|---|---|
| 0.2041 | 0.2041 | 0.2041 |
| −0.0781 − 0.1886i | 0.1886 − 0.0781i | 0.1886 − 0.0781i |
| −0.1443 + 0.1443i | 0.1443 − 0.1443i | 0.1443 − 0.1443i |
| 0.1886 + 0.0781i | 0.0781 − 0.1886i | 0.0781 − 0.1886i |
| 0.2041 | 0.2041 | −0.2041 |
| −0.0781 − 0.1886i | 0.1886 − 0.0781i | −0.1886 + 0.0781i |
| −0.1443 + 0.1443i | 0.1443 − 0.1443i | −0.1443 + 0.1443i |
| 0.1886 + 0.0781i | 0.0781 − 0.1886i | −0.0781 + 0.1886i |

| ans(:, :, 4, 15) = | | |
|---|---|---|
| 0.2041 | 0.2041 | 0.2041 |
| 0.1886 − 0.0781i | 0.0781 + 0.1886i | 0.0781 + 0.1886i |
| 0.1443 − 0.1443i | −0.1443 + 0.1443i | −0.1443 + 0.1443i |
| 0.0781 − 0.1886i | −0.1886 − 0.0781i | −0.1886 − 0.0781i |
| 0.2041 | 0.2041 | −0.2041 |
| 0.1886 − 0.0781i | 0.0781 + 0.1886i | −0.0781 − 0.1886i |
| 0.1443 − 0.1443i | −0.1443 + 0.1443i | 0.1443 − 0.1443i |
| 0.0781 − 0.1886i | −0.1886 − 0.0781i | 0.1886 + 0.0781i |

| ans(:, :, 1, 16) = | | |
|---|---|---|
| 0.2041 | 0.2041 | 0.2041 |
| −0.1886 + 0.0781i | 0.0781 + 0.1886i | 0.0781 + 0.1886i |
| 0.1443 − 0.1443i | −0.1443 + 0.1443i | −0.1443 + 0.1443i |
| −0.0781 + 0.1886i | −0.1886 − 0.0781i | −0.1886 − 0.0781i |
| 0.2041 | 0.2041 | −0.2041 |
| −0.1886 + 0.0781i | 0.0781 + 0.1886i | −0.0781 − 0.1886i |
| 0.1443 − 0.1443i | −0.1443 + 0.1443i | 0.1443 − 0.1443i |
| −0.0781 + 0.1886i | −0.1886 − 0.0781i | 0.1886 + 0.0781i |

| ans(:, :, 2, 16) = | | |
|---|---|---|
| 0.2041 | 0.2041 | 0.2041 |
| −0.0781 − 0.1886i | −0.1886 + 0.0781i | −0.1886 + 0.0781i |
| −0.1443 + 0.1443i | 0.1443 − 0.1443i | 0.1443 − 0.1443i |
| 0.1886 + 0.0781i | −0.0781 + 0.1886i | −0.0781 + 0.1886i |
| 0.2041 | 0.2041 | −0.2041 |
| −0.0781 − 0.1886i | −0.1886 + 0.0781i | 0.1886 − 0.0781i |
| −0.1443 + 0.1443i | 0.1443 − 0.1443i | −0.1443 + 0.1443i |
| 0.1886 + 0.0781i | −0.0781 + 0.1886i | 0.0781 − 0.1886i |

| ans(:, :, 3, 16) = | | |
|---|---|---|
| 0.2041 | 0.2041 | 0.2041 |
| 0.1886 − 0.0781i | −0.0781 − 0.1886i | −0.0781 − 0.1886i |
| 0.1443 − 0.1443i | −0.1443 + 0.1443i | −0.1443 + 0.1443i |
| 0.0781 − 0.1886i | 0.1886 + 0.0781i | 0.1886 + 0.0781i |
| 0.2041 | 0.2041 | −0.2041 |
| 0.1886 − 0.0781i | −0.0781 − 0.1886i | 0.0781 + 0.1886i |

-continued

| | | |
|---|---|---|
| 0.1443 − 0.1443i | −0.1443 + 0.1443i | 0.1443 − 0.1443i |
| 0.0781 − 0.1886i | 0.1886 + 0.0781i | −0.1886 − 0.0781i | ans(:, :, 4, 16) =

| | | |
|---|---|---|
| 0.2041 | 0.2041 | 0.2041 |
| 0.0781 + 0.1886i | 0.1886 − 0.0781i | 0.1886 − 0.0781i |
| −0.1443 + 0.1443i | 0.1443 − 0.1443i | 0.1443 − 0.1443i |
| −0.1886 − 0.0781i | 0.0781 − 0.1886i | 0.0781 − 0.1886i |
| 0.2041 | 0.2041 | −0.2041 |
| 0.0781 + 0.1886i | 0.1886 − 0.0781i | −0.1886 + 0.0781i |
| −0.1443 + 0.1443i | 0.1443 − 0.1443i | −0.1443 + 0.1443i |
| −0.1886 − 0.0781i | 0.0781 − 0.1886i | −0.0781 + 0.1886i |

- Rank 4 ans(:, :, 1, 1) =
columns 1-2

| | |
|---|---|
| 0.1768 | 0.1768 |
| 0.1768 | 0.0000 + 0.1768i |
| 0.1768 | −0.1768 + 0.0000i |
| 0.1768 | −0.0000 − 0.1768i |
| 0.1768 | 0.1768 |
| 0.1768 | 0.0000 + 0.1768i |
| 0.1768 | −0.1768 + 0.0000i |
| 0.1768 | −0.0000 − 0.1768i | columns 3-4

| | |
|---|---|
| 0.1768 | 0.1768 |
| 0.1768 | 0.0000 + 0.1768i |
| 0.1768 | −0.1768 + 0.0000i |
| −0.1768 | −0.1768 |
| −0.1768 | −0.0000 − 0.1768i |
| −0.1768 | 0.1768 − 0.0000i |
| −0.1768 | 0.0000 + 0.1768i | ans(:, :, 2, 1) =
columns 1-2

| | |
|---|---|
| 0.1768 | 0.1768 |
| 0 + 0.1768i | −0.1768 + 0.0000i |
| −0.1768 | 0.1768 − 0.0000i |
| 0 − 0.1768i | −0.1768 + 0.0000i |
| 0.1768 | 0.1768 |
| 0 + 0.1768i | −0.1768 + 0.0000i |
| −0.1768 | 0.1768 − 0.0000i |
| 0 − 0.1768i | −0.1768 + 0.0000i |

Columns 3-4

| | |
|---|---|
| 0.1768 | 0.1768 |
| 0 + 0.1768i | −0.1768 + 0.0000i |
| −0.1768 | 0.1768 − 0.0000i |
| 0 − 0.1768i | −0.1768 + 0.0000i |
| −0.1768 | −0.1768 |
| 0 − 0.1768i | 0.1768 − 0.0000i |
| 0.1768 | −0.1768 + 0.0000i |
| 0 + 0.1768i | 0.1768 − 0.0000i | ans(:, :, 3, 1) =
columns 1-2

| | |
|---|---|
| 0.1768 | 0.1768 |
| −0.1768 | −0.0000 − 0.1768i |
| 0.1768 | −0.1768 + 0.0000i |
| −0.1768 | 0.0000 + 0.1768i |
| 0.1768 | 0.1768 |
| −0.1768 | −0.0000 − 0.1768i |
| 0.1768 | −0.1768 + 0.0000i |
| −0.1768 | 0.0000 + 0.1768i |

Columns 3-4

| | |
|---|---|
| 0.1768 | 0.1768 |
| −0.1768 | −0.0000 − 0.1768i |
| 0.1768 | −0.1768 + 0.0000i |
| −0.1768 | 0.0000 + 0.1768i |
| −0.1768 | −0.1768 |
| 0.1768 | 0.0000 + 0.1768i |
| −0.1768 | 0.1768 − 0.0000i |
| 0.1768 | −0.0000 − 0.1768i |

-continued ans(:, :, 4, 1) =
columns 1-2

| | |
|---|---|
| 0.1768 | 0.1768 |
| 0 − 0.1768i | 0.1768 − 0.0000i |
| −0.1768 | 0.1768 − 0.0000i |
| 0 + 0.1768i | 0.1768 − 0.0000i |
| 0.1768 | 0.1768 |
| 0 − 0.1768i | 0.1768 − 0.0000i |
| −0.1768 | 0.1768 − 0.0000i |
| 0 + 0.1768i | 0.1768 − 0.0000i |

Columns 3-4

| | |
|---|---|
| 0.1768 | 0.1768 |
| 0 − 0.1768i | 0.1768 − 0.0000i |
| −0.1768 | 0.1768 − 0.0000i |
| 0 + 0.1768i | 0.1768 − 0.0000i |
| −0.1768 | −0.1768 |
| 0 + 0.1768i | −0.1768 + 0.0000i |
| 0.1768 | −0.1768 + 0.0000i |
| 0 − 0.1768i | −0.1768 + 0.0000i | ans(:, :, 1, 2) =
columns 1-2

| | |
|---|---|
| 0.1768 | 0.1768 |
| 0.1768 | 0.0000 + 0.1768i |
| 0.1768 | −0.1768 + 0.0000i |
| 0.1768 | −0.0000 − 0.1768i |
| 0 + 0.1768i | 0 + 0.1768i |
| 0 + 0.1768i | −0.1768 + 0.0000i |
| 0 + 0.1768i | −0.0000 − 0.1768i |
| 0 + 0.1768i | 0.1768 − 0.0000i |

Columns 3-4

| | |
|---|---|
| 0.1768 | 0.1768 |
| 0.1768 | 0.0000 + 0.1768i |
| 0.1768 | −0.1768 + 0.0000i |
| 0.1768 | −0.0000 − 0.1768i |
| 0 − 0.1768i | 0 − 0.1768i |
| 0 − 0.1768i | 0.1768 − 0.0000i |
| 0 − 0.1768i | 0.0000 + 0.1768i |
| 0 − 0.1768i | −0.1768 + 0.0000i | ans(:, :, 2, 2) =
columns 1-2

| | |
|---|---|
| 0.1768 | 0.1768 |
| 0 + 0.1768i | −0.1768 + 0.0000i |
| −0.1768 | 0.1768 − 0.0000i |
| 0 − 0.1768i | −0.1768 + 0.0000i |
| 0 + 0.1768i | 0 + 0.1768i |
| −0.1768 | −0.0000 − 0.1768i |
| 0 − 0.1768i | 0.0000 + 0.1768i |
| 0.1768 | −0.0000 − 0.1768i |

Columns 3-4

| | |
|---|---|
| 0.1768 | 0.1768 |
| 0 + 0.1768i | −0.1768 + 0.0000i |
| −0.1768 | 0.1768 − 0.0000i |
| 0 − 0.1768i | −0.1768 + 0.0000i |
| 0 − 0.1768i | 0 − 0.1768i |
| 0.1768 | 0.0000 + 0.1768i |
| 0 + 0.1768i | −0.0000 − 0.1768i |
| −0.1768 | 0.0000 + 0.1768i | ans(:, :, 3, 2) =
columns 1-2

| | |
|---|---|
| 0.1768 | 0.1768 |
| −0.1768 | −0.0000 − 0.1768i |
| 0.1768 | −0.1768 + 0.0000i |
| −0.1768 | 0.0000 + 0.1768i |
| 0 + 0.1768i | 0 + 0.1768i |
| 0 − 0.1768i | 0.1768 − 0.0000i |
| 0 + 0.1768i | −0.0000 − 0.1768i |
| 0 − 0.1768i | −0.1768 + 0.0000i |

Columns 3-4

| | |
|---|---|
| 0.1768 | 0.1768 |
| −0.1768 | −0.0000 − 0.1768i |
| 0.1768 | −0.1768 + 0.0000i |

-continued

| | |
|---|---|
| −0.1768 | 0.0000 + 0.1768i |
| 0 − 0.1768i | 0 − 0.1768i |
| 0 + 0.1768i | −0.1768 + 0.0000i |
| 0 − 0.1768i | 0.0000 + 0.1768i |
| 0 + 0.1768i | 0.1768 − 0.0000i | ans(:, :, 4, 2) =
columns 1-2

| | |
|---|---|
| 0.1768 | 0.1768 |
| 0 − 0.1768i | 0.1768 − 0.0000i |
| −0.1768 | 0.1768 − 0.0000i |
| 0 + 0.1768i | 0.1768 − 0.0000i |
| 0 + 0.1768i | 0 + 0.1768i |
| 0.1768 | 0.0000 + 0.1768i |
| 0 − 0.1768i | 0.0000 + 0.1768i |
| −0.1768 | 0.0000 + 0.1768i |

Columns 3-4

| | |
|---|---|
| 0.1768 | 0.1768 |
| 0 − 0.1768i | 0.1768 − 0.0000i |
| −0.1768 | 0.1768 − 0.0000i |
| 0 + 0.1768i | 0.1768 − 0.0000i |
| 0 − 0.1768i | 0 − 0.1768i |
| −0.1768 | −0.0000 − 0.1768i |
| 0 + 0.1768i | −0.0000 − 0.1768i |
| 0.1768 | −0.0000 − 0.1768i | ans(:, :, 1, 3) =
columns 1-2

| | |
|---|---|
| 0.1768 | 0.1768 |
| 0.1633 + 0.0676i | −0.0676 + 0.1633i |
| 0.1250 + 0.1250i | −0.1250 − 0.1250i |
| 0.0676 + 0.1633i | 0.1633 − 0.0676i |
| 0.1768 | 0.1768 |
| 0.1633 + 0.0676i | −0.0676 + 0.1633i |
| 0.1250 + 0.1250i | −0.1250 − 0.1250i |
| 0.0676 + 0.1633i | 0.1633 − 0.0676i |

Columns 3-4

| | |
|---|---|
| 0.1768 | 0.1768 |
| 0.1633 + 0.0676i | −0.0676 + 0.1633i |
| 0.1250 + 0.1250i | −0.1250 − 0.1250i |
| 0.0676 + 0.1633i | 0.1633 − 0.0676i |
| −0.1768 | −0.1768 |
| −0.1633 − 0.0676i | 0.0676 − 0.1633i |
| −0.1250 − 0.1250i | 0.1250 + 0.1250i |
| −0.0676 − 0.1633i | −0.1633 + 0.0676i | ans(:, :, 2, 3) =
columns 1-2

| | |
|---|---|
| 0.1768 | 0.1768 |
| −0.0676 + 0.1633i | −0.1633 − 0.0676i |
| −0.1250 − 0.1250i | 0.1250 + 0.1250i |
| 0.1633 − 0.0676i | −0.0676 − 0.1633i |
| 0.1768 | 0.1768 |
| −0.0676 + 0.1633i | −0.1633 − 0.0676i |
| −0.1250 − 0.1250i | 0.1250 + 0.1250i |
| 0.1633 − 0.0676i | −0.0676 − 0.1633i |

Columns 3-4

| | |
|---|---|
| 0.1768 | 0.1768 |
| −0.0676 + 0.1633i | −0.1633 − 0.0676i |
| −0.1250 − 0.1250i | 0.1250 + 0.1250i |
| 0.1633 − 0.0676i | −0.0676 − 0.1633i |
| −0.1768 | −0.1768 |
| 0.0676 − 0.1633i | 0.1633 + 0.0676i |
| 0.1250 + 0.1250i | −0.1250 − 0.1250i |
| −0.1633 + 0.0676i | 0.0676 + 0.1633i | ans(:, :, 3, 3) =
columns 1-2

| | |
|---|---|
| 0.1768 | 0.1768 |
| −0.1633 − 0.0676i | 0.0676 − 0.1633i |
| 0.1250 + 0.1250i | −0.1250 − 0.1250i |
| −0.0676 − 0.1633i | −0.1633 + 0.0676i |
| 0.1768 | 0.1768 |
| −0.1633 − 0.0676i | 0.0676 − 0.1633i |
| 0.1250 + 0.1250i | −0.1250 − 0.1250i |
| −0.0676 − 0.1633i | −0.1633 + 0.0676i |

| Columns 3-4 | |
|---|---|
| 0.1768 | 0.1768 |
| −0.1633 − 0.0676i | 0.0676 − 0.1633i |
| 0.1250 + 0.1250i | −0.1250 − 0.1250i |
| −0.0676 − 0.1633i | −0.1633 + 0.0676i |
| −0.1768 | −0.1768 |
| 0.1633 + 0.0676i | −0.0676 + 0.1633i |
| −0.1250 − 0.1250i | 0.1250 + 0.1250i |
| 0.0676 + 0.1633i | 0.1633 − 0.0676i |
| ans(:, :, 4, 3) = | |
| columns 1-2 | |
| 0.1768 | 0.1768 |
| 0.0676 − 0.1633i | 0.1633 + 0.0676i |
| −0.1250 − 0.1250i | 0.1250 + 0.1250i |
| −0.1633 + 0.0676i | 0.0676 + 0.1633i |
| 0.1768 | 0.1768 |
| 0.0676 − 0.1633i | 0.1633 + 0.0676i |
| −0.1250 − 0.1250i | 0.1250 + 0.1250i |
| −0.1633 + 0.0676i | 0.0676 + 0.1633i |
| Columns 3-4 | |
| 0.1768 | 0.1768 |
| 0.0676 − 0.1633i | 0.1633 + 0.0676i |
| −0.1250 − 0.1250i | 0.1250 + 0.1250i |
| −0.1633 + 0.0676i | 0.0676 + 0.1633i |
| −0.1768 | −0.1768 |
| −0.0676 + 0.1633i | −0.1633 − 0.0676i |
| 0.1250 + 0.1250i | −0.1250 − 0.1250i |
| 0.1633 − 0.0676i | −0.0676 − 0.1633i |
| ans(:, :, 1, 4) = | |
| columns 1-2 | |
| 0.1768 | 0.1768 |
| 0.1633 + 0.0676i | −0.0676 + 0.1633i |
| 0.1250 + 0.1250i | −0.1250 − 0.1250i |
| 0.0676 + 0.1633i | 0.1633 − 0.0676i |
| 0 + 0.1768i | 0 + 0.1768i |
| −0.0676 + 0.1633i | −0.1633 − 0.0676i |
| −0.1250 + 0.1250i | 0.1250 − 0.1250i |
| −0.1633 + 0.0676i | 0.0676 + 0.1633i |
| Columns 3-4 | |
| 0.1768 | 0.1768 |
| 0.1633 + 0.0676i | −0.0676 + 0.1633i |
| 0.1250 + 0.1250i | −0.1250 − 0.1250i |
| 0.0676 + 0.1633i | 0.1633 − 0.0676i |
| 0 − 0.1768i | 0 − 0.1768i |
| 0.0676 − 0.1633i | 0.1633 + 0.0676i |
| 0.1250 − 0.1250i | −0.1250 + 0.1250i |
| 0.1633 − 0.0676i | −0.0676 − 0.1633i |
| ans(:, :, 2, 4) = | |
| columns 1-2 | |
| 0.1768 | 0.1768 |
| −0.0676 + 0.1633i | −0.1633 − 0.0676i |
| −0.1250 − 0.1250i | 0.1250 + 0.1250i |
| 0.1633 − 0.0676i | −0.0676 − 0.1633i |
| 0 + 0.1768i | 0 + 0.1768i |
| −0.1633 − 0.0676i | 0.0676 − 0.1633i |
| 0.1250 − 0.1250i | −0.1250 + 0.1250i |
| 0.0676 + 0.1633i | 0.1633 − 0.0676i |
| Columns 3-4 | |
| 0.1768 | 0.1768 |
| −0.0676 + 0.1633i | −0.1633 − 0.0676i |
| −0.1250 − 0.1250i | 0.1250 + 0.1250i |
| 0.1633 − 0.0676i | −0.0676 − 0.1633i |
| 0 − 0.1768i | 0 − 0.1768i |
| 0.1633 + 0.0676i | −0.0676 − 0.1633i |
| −0.1250 + 0.1250i | 0.1250 − 0.1250i |
| −0.0676 − 0.1633i | −0.1633 + 0.0676i |
| ans(:, :, 3, 4) = | |
| columns 1-2 | |
| 0.1768 | 0.1768 |
| −0.1633 − 0.0676i | 0.0676 − 0.1633i |
| 0.1250 + 0.1250i | −0.1250 − 0.1250i |

|  |  |
|---|---|
| −0.0676 − 0.1633i | −0.1633 + 0.0676i |
| 0 + 0.1768i | 0 + 0.1768i |
| 0.0676 − 0.1633i | 0.1633 + 0.0676i |
| −0.1250 + 0.1250i | 0.1250 − 0.1250i |
| 0.1633 − 0.0676i | −0.0676 − 0.1633i |

Columns 3-4

|  |  |
|---|---|
| 0.1768 | 0.1768 |
| −0.1633 − 0.0676i | 0.0676 − 0.1633i |
| 0.1250 + 0.1250i | −0.1250 − 0.1250i |
| −0.0676 − 0.1633i | −0.1633 + 0.0676i |
| 0 − 0.1768i | 0 − 0.1768i |
| −0.0676 + 0.1633i | −0.1633 − 0.0676i |
| 0.1250 − 0.1250i | −0.1250 + 0.1250i |
| −0.1633 + 0.0676i | 0.0676 + 0.1633i | ans(:, :, 4, 4) =
Columns 1-2

|  |  |
|---|---|
| 0.1768 | 0.1768 |
| 0.0676 − 0.1633i | 0.1633 + 0.0676i |
| −0.1250 − 0.1250i | 0.1250 + 0.1250i |
| −0.1633 + 0.0676i | 0.0676 + 0.1633i |
| 0 + 0.1768i | 0 + 0.1768i |
| 0.1633 + 0.0676i | −0.0676 + 0.1633i |
| 0.1250 − 0.1250i | −0.1250 − 0.1250i |
| −0.0676 − 0.1633i | −0.1633 + 0.0676i |

Columns 3-4

|  |  |
|---|---|
| 0.1768 | 0.1768 |
| 0.0676 − 0.1633i | 0.1633 + 0.0676i |
| −0.1250 − 0.1250i | 0.1250 + 0.1250i |
| −0.1633 + 0.0676i | 0.0676 + 0.1633i |
| 0 − 0.1768i | 0 − 0.1768i |
| −0.1633 − 0.0676i | 0.0676 − 0.1633i |
| −0.1250 + 0.1250i | 0.1250 − 0.1250i |
| 0.0676 + 0.1633i | 0.1633 − 0.0676i | ans(:, :, 1, 5) =
Columns 1-2

|  |  |
|---|---|
| 0.1768 | 0.1768 |
| 0.1250 + 0.1250i | −0.1250 + 0.1250i |
| 0.0000 + 0.1768i | −0.0000 − 0.1768i |
| −0.1250 + 0.1250i | 0.1250 + 0.1250i |
| 0.1768 | 0.1768 |
| 0.1250 + 0.1250i | −0.1250 + 0.1250i |
| 0.0000 + 0.1768i | −0.0000 − 0.1768i |
| −0.1250 + 0.1250i | 0.1250 + 0.1250i |

Columns 3-4

|  |  |
|---|---|
| 0.1768 | 0.1768 |
| 0.1250 + 0.1250i | −0.1250 + 0.1250i |
| 0.0000 + 0.1768i | −0.0000 − 0.1768i |
| −0.1250 + 0.1250i | 0.1250 + 0.1250i |
| −0.1768 | −0.1768 |
| −0.1250 − 0.1250i | 0.1250 − 0.1250i |
| −0.0000 − 0.1768i | 0.0000 + 0.1768i |
| 0.1250 − 0.1250i | −0.1250 − 0.1250i | ans(:, :, 2, 5) =
Columns 1-2

|  |  |
|---|---|
| 0.1768 | 0.1768 |
| −0.1250 + 0.1250i | −0.1250 − 0.1250i |
| −0.0000 − 0.1768i | 0.0000 + 0.1768i |
| 0.1250 + 0.1250i | 0.1250 − 0.1250i |
| 0.1768 | 0.1768 |
| −0.1250 + 0.1250i | −0.1250 − 0.1250i |
| −0.0000 − 0.1768i | 0.0000 + 0.1768i |
| 0.1250 + 0.1250i | 0.1250 − 0.1250i |

Columns 3-4

|  |  |
|---|---|
| 0.1768 | 0.1768 |
| −0.1250 + 0.1250i | −0.1250 − 0.1250i |
| −0.0000 − 0.1768i | 0.0000 + 0.1768i |
| 0.1250 + 0.1250i | 0.1250 − 0.1250i |
| −0.1768 | −0.1768 |
| 0.1250 − 0.1250i | 0.1250 + 0.1250i |
| 0.0000 + 0.1768i | −0.0000 − 0.1768i |
| −0.1250 − 0.1250i | −0.1250 + 0.1250i |

-continued ans(:, :, 3, 5) =
Columns 1-2

| | |
|---|---|
| 0.1768 | 0.1768 |
| −0.1250 − 0.1250i | 0.1250 − 0.1250i |
| 0.0000 + 0.1768i | −0.0000 − 0.1768i |
| 0.1250 − 0.1250i | −0.1250 − 0.1250i |
| 0.1768 | 0.1768 |
| −0.1250 − 0.1250i | 0.1250 − 0.1250i |
| 0.0000 + 0.1768i | −0.0000 − 0.1768i |
| 0.1250 − 0.1250i | −0.1250 − 0.1250i |

Columns 3-4

| | |
|---|---|
| 0.1768 | 0.1768 |
| −0.1250 − 0.1250i | 0.1250 − 0.1250i |
| 0.0000 + 0.1768i | −0.0000 − 0.1768i |
| 0.1250 − 0.1250i | −0.1250 − 0.1250i |
| −0.1768 | −0.1768 |
| 0.1250 + 0.1250i | −0.1250 + 0.1250i |
| −0.0000 − 0.1768i | 0.0000 + 0.1768i |
| −0.1250 + 0.1250i | 0.1250 + 0.1250i | ans(:, :, 4, 5) =
Columns 1-2

| | |
|---|---|
| 0.1768 | 0.1768 |
| 0.1250 − 0.1250i | 0.1250 + 0.1250i |
| −0.0000 − 0.1768i | 0.0000 + 0.1768i |
| −0.1250 − 0.1250i | −0.1250 + 0.1250i |
| 0.1768 | 0.1768 |
| 0.1250 − 0.1250i | 0.1250 + 0.1250i |
| −0.0000 − 0.1768i | 0.0000 + 0.1768i |
| −0.1250 − 0.1250i | −0.1250 + 0.1250i |

Columns 3-4

| | |
|---|---|
| 0.1768 | 0.1768 |
| 0.1250 − 0.1250i | 0.1250 + 0.1250i |
| −0.0000 − 0.1768i | 0.0000 + 0.1768i |
| −0.1250 − 0.1250i | −0.1250 + 0.1250i |
| −0.1768 | −0.1768 |
| −0.1250 + 0.1250i | −0.1250 − 0.1250i |
| 0.0000 + 0.1768i | −0.0000 − 0.1768i |
| 0.1250 + 0.1250i | 0.1250 − 0.1250i | ans(:, :, 1, 6) =
Columns 1-2

| | |
|---|---|
| 0.1768 | 0.1768 |
| 0.1250 + 0.1250i | −0.1250 + 0.1250i |
| 0.0000 + 0.1768i | −0.0000 − 0.1768i |
| −0.1250 + 0.1250i | 0.1250 + 0.1250i |
| 0 + 0.1768i | 0 + 0.1768i |
| −0.1250 + 0.1250i | −0.1250 − 0.1250i |
| −0.1768 + 0.0000i | 0.1768 − 0.0000i |
| −0.1250 − 0.1250i | −0.1250 + 0.1250i |

Columns 3-4

| | |
|---|---|
| 0.1768 | 0.1768 |
| 0.1250 + 0.1250i | −0.1250 + 0.1250i |
| 0.0000 + 0.1768i | −0.0000 − 0.1768i |
| −0.1250 + 0.1250i | 0.1250 + 0.1250i |
| 0 − 0.1768i | 0 − 0.1768i |
| 0.1250 − 0.1250i | 0.1250 + 0.1250i |
| 0.1768 − 0.0000i | −0.1768 + 0.0000i |
| 0.1250 + 0.1250i | 0.1250 − 0.1250i | ans(:, :, 2, 6) =
Columns 1-2

| | |
|---|---|
| 0.1768 | 0.1768 |
| −0.1250 + 0.1250i | −0.1250 − 0.1250i |
| −0.0000 − 0.1768i | 0.0000 + 0.1768i |
| 0.1250 + 0.1250i | 0.1250 − 0.1250i |
| 0 + 0.1768i | 0 + 0.1768i |
| −0.1250 − 0.1250i | 0.1250 − 0.1250i |
| 0.1768 − 0.0000i | −0.1768 + 0.0000i |
| −0.1250 + 0.1250i | 0.1250 + 0.1250i |

Columns 3-4

| | |
|---|---|
| 0.1768 | 0.1768 |
| −0.1250 + 0.1250i | −0.1250 − 0.1250i |
| −0.0000 − 0.1768i | 0.0000 + 0.1768i |

-continued

|  |  |
|---|---|
| 0.1250 + 0.1250i | 0.1250 − 0.1250i |
| 0 − 0.1768i | 0 − 0.1768i |
| 0.1250 + 0.1250i | −0.1250 + 0.1250i |
| −0.1768 + 0.0000i | 0.1768 − 0.0000i |
| 0.1250 − 0.1250i | −0.1250 − 0.1250i | ans(:, :, 3, 6) =
Columns 1-2

|  |  |
|---|---|
| 0.1768 | 0.1768 |
| −0.1250 − 0.1250i | 0.1250 − 0.1250i |
| 0.0000 + 0.1768i | −0.0000 − 0.1768i |
| 0.1250 − 0.1250i | −0.1250 − 0.1250i |
| 0 + 0.1768i | 0 + 0.1768i |
| 0.1250 − 0.1250i | 0.1250 + 0.1250i |
| −0.1768 + 0.0000i | 0.1768 − 0.0000i |
| 0.1250 + 0.1250i | 0.1250 − 0.1250i |

Columns 3-4

|  |  |
|---|---|
| 0.1768 | 0.1768 |
| −0.1250 − 0.1250i | 0.1250 − 0.1250i |
| 0.0000 + 0.1768i | −0.0000 − 0.1768i |
| 0.1250 − 0.1250i | −0.1250 − 0.1250i |
| 0 − 0.1768i | 0 − 0.1768i |
| −0.1250 + 0.1250i | −0.1250 − 0.1250i |
| 0.1768 − 0.0000i | −0.1768 + 0.0000i |
| −0.1250 − 0.1250i | −0.1250 + 0.1250i | ans(:, :, 4, 6) =
Columns 1-2

|  |  |
|---|---|
| 0.1768 | 0.1768 |
| 0.1250 − 0.1250i | 0.1250 + 0.1250i |
| −0.0000 − 0.1768i | 0.0000 + 0.1768i |
| −0.1250 − 0.1250i | −0.1250 − 0.1250i |
| 0 + 0.1768i | 0 + 0.1768i |
| 0.1250 + 0.1250i | −0.1250 + 0.1250i |
| 0.1768 − 0.0000i | −0.1768 + 0.0000i |
| 0.1250 − 0.1250i | −0.1250 − 0.1250i |

Columns 3-4

|  |  |
|---|---|
| 0.1768 | 0.1768 |
| 0.1250 − 0.1250i | 0.1250 + 0.1250i |
| −0.0000 − 0.1768i | 0.0000 + 0.1768i |
| −0.1250 − 0.1250i | −0.1250 − 0.1250i |
| 0 − 0.1768i | 0 − 0.1768i |
| −0.1250 − 0.1250i | 0.1250 − 0.1250i |
| −0.1768 + 0.0000i | 0.1768 − 0.0000i |
| −0.1250 + 0.1250i | 0.1250 + 0.1250i | ans(:, :, 1, 7) =
Columns 1-2

|  |  |
|---|---|
| 0.1768 | 0.1768 |
| 0.0676 + 0.1633i | −0.1633 + 0.0676i |
| −0.1250 + 0.1250i | 0.1250 − 0.1250i |
| −0.1633 − 0.0676i | −0.0676 + 0.1633i |
| 0.1768 | 0.1768 |
| 0.0676 + 0.1633i | −0.1633 + 0.0676i |
| −0.1250 + 0.1250i | 0.1250 − 0.1250i |
| −0.1633 − 0.0676i | −0.0676 + 0.1633i |

Columns 3-4

|  |  |
|---|---|
| 0.1768 | 0.1768 |
| 0.0676 + 0.1633i | −0.1633 + 0.0676i |
| −0.1250 + 0.1250i | 0.1250 − 0.1250i |
| −0.1633 − 0.0676i | −0.0676 + 0.1633i |
| −0.1768 | −0.1768 |
| −0.0676 − 0.1633i | 0.1633 − 0.0676i |
| 0.1250 − 0.1250i | −0.1250 + 0.1250i |
| 0.1633 + 0.0676i | 0.0676 − 0.1633i | ans(:, :, 2, 7) =
Columns 1-2

|  |  |
|---|---|
| 0.1768 | 0.1768 |
| −0.1633 + 0.0676i | −0.0676 − 0.1633i |
| 0.1250 − 0.1250i | −0.1250 + 0.1250i |
| −0.0676 + 0.1633i | 0.1633 + 0.0676i |
| 0.1768 | 0.1768 |
| −0.1633 + 0.0676i | −0.0676 − 0.1633i |
| 0.1250 − 0.1250i | −0.1250 + 0.1250i |
| −0.0676 + 0.1633i | 0.1633 + 0.0676i |

| Columns 3-4 | |
|---|---|
| 0.1768 | 0.1768 |
| −0.1633 + 0.0676i | −0.0676 − 0.1633i |
| 0.1250 − 0.1250i | −0.1250 + 0.1250i |
| −0.0676 + 0.1633i | 0.1633 + 0.0676i |
| −0.1768 | −0.1768 |
| 0.1633 − 0.0676i | 0.0676 + 0.1633i |
| −0.1250 + 0.1250i | 0.1250 − 0.1250i |
| 0.0676 − 0.1633i | −0.1633 − 0.0676i | ans(:, :, 3, 7) =

| Columns 1-2 | |
|---|---|
| 0.1768 | 0.1768 |
| −0.0676 − 0.1633i | 0.1633 − 0.0676i |
| −0.1250 + 0.1250i | 0.1250 − 0.1250i |
| 0.1633 + 0.0676i | 0.0676 − 0.1633i |
| 0.1768 | 0.1768 |
| −0.0676 − 0.1633i | 0.1633 − 0.0676i |
| −0.1250 + 0.1250i | 0.1250 − 0.1250i |
| 0.1633 + 0.0676i | 0.0676 − 0.1633i |

| Columns 3-4 | |
|---|---|
| 0.1768 | 0.1768 |
| −0.0676 − 0.1633i | 0.1633 − 0.0676i |
| −0.0676 − 0.1633i | 0.1633 − 0.0676i |
| 0.1633 + 0.0676i | 0.0676 − 0.1633i |
| −0.1768 | −0.1768 |
| 0.0676 + 0.1633i | −0.1633 + 0.0676i |
| 0.1250 − 0.1250i | −0.1250 + 0.1250i |
| −0.1633 − 0.0676i | −0.0676 + 0.1633i | ans(:, :, 4, 7) =

| Columns 1-2 | |
|---|---|
| 0.1768 | 0.1768 |
| 0.1633 − 0.0676i | 0.0676 + 0.1633i |
| 0.1250 − 0.1250i | −0.1250 + 0.1250i |
| 0.0676 − 0.1633i | −0.1633 − 0.0676i |
| 0.1768 | 0.1768 |
| 0.1633 − 0.0676i | 0.0676 + 0.1633i |
| 0.1250 − 0.1250i | −0.1250 + 0.1250i |
| 0.0676 − 0.1633i | −0.1633 − 0.0676i |

| Columns 3-4 | |
|---|---|
| 0.1768 | 0.1768 |
| 0.1633 − 0.0676i | 0.0676 + 0.1633i |
| 0.1250 − 0.1250i | −0.1250 + 0.1250i |
| 0.0676 − 0.1633i | −0.1633 − 0.0676i |
| −0.1768 | −0.1768 |
| −0.1633 + 0.0676i | −0.0676 − 0.1633i |
| −0.1250 + 0.1250i | 0.1250 − 0.1250i |
| −0.0676 + 0.1633i | 0.1633 + 0.0676i | ans(:, :, 1, 8) =

| Columns 1-2 | |
|---|---|
| 0.1768 | 0.1768 |
| 0.0676 + 0.1633i | −0.1633 + 0.0676i |
| −0.1250 + 0.1250i | 0.1250 − 0.1250i |
| −0.1633 − 0.0676i | −0.0676 + 0.1633i |
| 0 + 0.1768i | 0 + 0.1768i |
| −0.1633 + 0.0676i | −0.0676 − 0.1633i |
| −0.1250 − 0.1250i | 0.1250 + 0.1250i |
| 0.0676 − 0.1633i | −0.1633 − 0.0676i |

| Columns 3-4 | |
|---|---|
| 0.1768 | 0.1768 |
| 0.0676 + 0.1633i | −0.1633 + 0.0676i |
| −0.1250 + 0.1250i | 0.1250 − 0.1250i |
| −0.1633 − 0.0676i | −0.0676 + 0.1633i |
| 0 − 0.1768i | 0 − 0.1768i |
| 0.1633 − 0.0676i | 0.0676 + 0.1633i |
| 0.1250 + 0.1250i | −0.1250 − 0.1250i |
| −0.0676 + 0.1633i | 0.1633 + 0.0676i | ans(:, :, 2, 8) =

| Columns 1-2 | |
|---|---|
| 0.1768 | 0.1768 |
| −0.1633 + 0.0676i | −0.0676 − 0.1633i |
| 0.1250 − 0.1250i | −0.1250 + 0.1250i |

-continued

| | |
|---|---|
| −0.0676 + 0.1633i | 0.1633 + 0.0676i |
| 0 + 0.1768i | 0 + 0.1768i |
| −0.0676 − 0.1633i | 0.1633 − 0.0676i |
| 0.1250 + 0.1250i | −0.1250 − 0.1250i |
| −0.1633 − 0.0676i | −0.0676 + 0.1633i |

Columns 3-4

| | |
|---|---|
| 0.1768 | 0.1768 |
| −0.1633 + 0.0676i | −0.0676 − 0.1633i |
| 0.1250 − 0.1250i | −0.1250 + 0.1250i |
| −0.0676 + 0.1633i | 0.1633 + 0.0676i |
| 0 − 0.1768i | 0 − 0.1768i |
| 0.0676 + 0.1633i | −0.1633 + 0.0676i |
| −0.1250 − 0.1250i | 0.1250 + 0.1250i |
| 0.1633 + 0.0676i | 0.0676 − 0.1633i | ans(:, :, 3, 8) =
Columns 1-2

| | |
|---|---|
| 0.1768 | 0.1768 |
| −0.0676 − 0.1633i | 0.1633 − 0.0676i |
| −0.1250 + 0.1250i | 0.1250 − 0.1250i |
| 0.1633 + 0.0676i | 0.0676 − 0.1633i |
| 0 + 0.1768i | 0 + 0.1768i |
| 0.1633 − 0.0676i | 0.0676 + 0.1633i |
| −0.1250 − 0.1250i | 0.1250 + 0.1250i |
| −0.0676 + 0.1633i | 0.1633 + 0.0676i |

Columns 3-4

| | |
|---|---|
| 0.1768 | 0.1768 |
| −0.0676 − 0.1633i | 0.1633 − 0.0676i |
| −0.1250 + 0.1250i | 0.1250 − 0.1250i |
| 0.1633 + 0.0676i | 0.0676 − 0.1633i |
| 0 − 0.1768i | 0 − 0.1768i |
| −0.1633 + 0.0676i | −0.0676 − 0.1633i |
| 0.1250 + 0.1250i | −0.1250 − 0.1250i |
| 0.0676 − 0.1633i | −0.1633 − 0.0676i | ans(:, :, 4, 8) =
Columns 1-2

| | |
|---|---|
| 0.1768 | 0.1768 |
| 0.1633 − 0.0676i | 0.0676 + 0.1633i |
| 0.1250 − 0.1250i | −0.1250 + 0.1250i |
| 0.0676 − 0.1633i | −0.1633 − 0.0676i |
| 0 + 0.1768i | 0 + 0.1768i |
| 0.0676 + 0.1633i | −0.1633 + 0.0676i |
| 0.1250 + 0.1250i | −0.1250 − 0.1250i |
| 0.1633 + 0.0676i | 0.0676 − 0.1633i |

Columns 3-4

| | |
|---|---|
| 0.1768 | 0.1768 |
| 0.1633 − 0.0676i | 0.0676 + 0.1633i |
| 0.1250 − 0.1250i | −0.1250 + 0.1250i |
| 0.0676 − 0.1633i | −0.1633 − 0.0676i |
| 0 − 0.1768i | 0 − 0.1768i |
| −0.0676 − 0.1633i | 0.1633 − 0.0676i |
| −0.1250 − 0.1250i | 0.1250 + 0.1250i |
| −0.1633 − 0.0676i | −0.0676 + 0.1633i |

- Rank 5 ans(:, :, 1) =
Colums 1-3

| | | |
|---|---|---|
| 0.1581 | 0.1581 | 0.1581 |
| 0.1581 | 0.1581 | 0 + 0.1581i |
| 0.1581 | 0.1581 | −0.1581 |
| 0.1581 | 0.1581 | 0 − 0.1581i |
| 0.1581 | −0.1581 | 0.1581 |
| 0.1581 | −0.1581 | 0 + 0.1581i |
| 0.1581 | −0.1581 | −0.1581 |
| 0.1581 | −0.1581 | 0 − 0.1581i |

Colums 4-5

| | |
|---|---|
| 0.1581 | 0.1581 |
| 0 + 0.1581i | −0.1581 |
| −0.1581 | 0.1581 |
| 0 − 0.1581i | −0.1581 |
| −0.1581 | 0.1581 |

-continued

```
        0 − 0.1581i              −0.1581
        0.1581                    0.1581
        0 + 0.1581i              −0.1581
``` ans(:, :, 2) =
Colums 1-3

```
     0.1581               0.1581               0.1581
 0.1118 + 0.1118i     0.1118 + 0.1118i    −0.1118 + 0.1118i
 0.0000 + 0.1581i     0.0000 + 0.1581i    −0.0000 − 0.1581i
−0.1118 + 0.1118i    −0.1118 + 0.1118i     0.1118 + 0.1118i
     0.1581              −0.1581               0.1581
 0.1118 + 0.1118i    −0.1118 − 0.1118i    −0.1118 + 0.1118i
 0.0000 + 0.1581i    −0.0000 − 0.1581i    −0.0000 − 0.1581i
−0.1118 + 0.1118i     0.1118 − 0.1118i     0.1118 + 0.1118i
```

Colums 4-5

```
         0.1581                    0.1581
    −0.1118 + 0.1118i         −0.1118 − 0.1118i
    −0.0000 − 0.1581i          0.0000 + 0.1581i
     0.1118 + 0.1118i          0.1118 − 0.1118i
        −0.1581                    0.1581
     0.1118 − 0.1118i         −0.1118 − 0.1118i
     0.0000 + 0.1581i          0.0000 + 0.1581i
    −0.1118 − 0.1118i          0.1118 − 0.1118i
``` ans(:, :, 3) =
Colums 1-3

```
     0.1581               0.1581               0.1581
 0.1461 + 0.0605i     0.1461 + 0.0605i    −0.0605 + 0.1461i
 0.1118 + 0.1118i     0.1118 + 0.1118i    −0.1118 − 0.1118i
 0.0605 + 0.1461i     0.0605 + 0.1461i     0.1461 − 0.0605i
     0.1581              −0.1581               0.1581
 0.1461 + 0.0605i    −0.1461 − 0.0605i    −0.0605 + 0.1461i
 0.1118 + 0.1118i    −0.1118 − 0.1118i    −0.1118 − 0.1118i
 0.0605 + 0.1461i    −0.0605 − 0.1461i     0.1461 − 0.0605i
```

Colums 4-5

```
         0.1581                    0.1581
    −0.0605 + 0.1461i         −0.1461 − 0.0605i
    −0.1118 − 0.1118i          0.1118 + 0.1118i
     0.1461 − 0.0605i         −0.0605 − 0.1461i
        −0.1581                    0.1581
     0.0605 − 0.1461i         −0.1461 − 0.0605i
     0.1118 + 0.1118i          0.1118 + 0.1118i
    −0.1461 + 0.0605i         −0.0605 − 0.1461i
``` ans(:, :, 4) =
Colums 1-3

```
     0.1581               0.1581               0.1581               0.1581               0.1581
 0.0605 + 0.1461i     0.0605 + 0.1461i    −0.1461 + 0.0605i    −0.1461 + 0.0605i    −0.0605 − 0.1461i
−0.1118 + 0.1118i    −0.1118 + 0.1118i     0.1118 − 0.1118i
−0.1461 − 0.0605i    −0.1461 − 0.0605i    −0.0605 + 0.1461i
     0.1581              −0.1581               0.1581
 0.0605 + 0.1461i    −0.0605 − 0.1461i    −0.1461 + 0.0605i
−0.1118 + 0.1118i     0.1118 − 0.1118i     0.1118 − 0.1118i
−0.1461 − 0.0605i     0.1461 + 0.0605i    −0.0605 + 0.1461i
```

Colums 4-5

```
         0.1581                    0.1581
    −0.1461 + 0.0605i         −0.0605 − 0.1461i
     0.1118 − 0.1118i         −0.1118 + 0.1118i
    −0.0605 + 0.1461i          0.1461 + 0.0605i
        −0.1581                    0.1581
     0.1461 − 0.0605i         −0.0605 − 0.1461i
    −0.1118 + 0.1118i         −0.1118 + 0.1118i
     0.0605 − 0.1461i          0.1461 + 0.0605i
```

- Rank 6 ans(:, :, 1) =
Columns 1-3

```
     0.1443               0.1443               0.1443
     0.1443               0.1443           0 + 0.1443i
```

-continued

| | | |
|---|---|---|
| 0.1443 | 0.1443 | −0.1443 |
| 0.1443 | 0.1443 | 0 − 0.1443i |
| 0.1443 | −0.1443 | 0.1443 |
| 0.1443 | −0.1443 | 0 + 0.1443i |
| 0.1443 | −0.1443 | −0.1443 |
| 0.1443 | −0.1443 | 0 − 0.1443i |

Colums 4-6

| | | |
|---|---|---|
| 0.1443 | 0.1443 | 0.1443 |
| 0 + 0.1443i | −0.1443 | −0.1443 |
| −0.1443 | 0.1443 | 0.1443 |
| 0 − 0.1443i | −0.1443 | −0.1443 |
| −0.1443 | 0.1443 | −0.1443 |
| 0 − 0.1443i | −0.1443 | 0.1443 |
| 0.1443 | 0.1443 | −0.1443 |
| 0 + 0.1443i | −0.1443 | 0.1443 | ans(:, :, 2) =
Columns 1-3

| | | |
|---|---|---|
| 0.1443 | 0.1443 | 0.1443 |
| 0.1021 + 0.1021i | 0.1021 + 0.1021i | −0.1021 + 0.1021i |
| 0.0000 + 0.1443i | 0.0000 + 0.1443i | −0.0000 − 0.1443i |
| −0.1021 + 0.1021i | −0.1021 + 0.1021i | 0.1021 + 0.1021i |
| 0.1443 | −0.1443 | 0.1443 |
| 0.1021 + 0.1021i | −0.1021 − 0.1021i | −0.1021 + 0.1021i |
| 0.0000 + 0.1443i | −0.0000 − 0.1443i | −0.0000 − 0.1443i |
| −0.1021 + 0.1021i | 0.1021 − 0.1021i | 0.1021 + 0.1021i |

Colums 4-6

| | | |
|---|---|---|
| 0.1443 | 0.1443 | 0.1443 |
| −0.1021 + 0.1021i | −0.1021 − 0.1021i | −0.1021 − 0.1021i |
| −0.0000 − 0.1443i | 0.0000 + 0.1443i | 0.0000 + 0.1443i |
| 0.1021 + 0.1021i | 0.1021 − 0.1021i | 0.1021 − 0.1021i |
| −0.1443 | 0.1443 | −0.1443 |
| 0.1021 − 0.1021i | −0.1021 − 0.1021i | 0.1021 + 0.1021i |
| 0.0000 + 0.1443i | 0.0000 + 0.1443i | −0.0000 − 0.1443i |
| −0.1021 − 0.1021i | 0.1021 − 0.1021i | −0.1021 + 0.1021i | ans(:, :, 3) =
Columns 1-3

| | | |
|---|---|---|
| 0.1443 | 0.1443 | 0.1443 |
| 0.1334 + 0.0552i | 0.1334 + 0.0552i | −0.0552 + 0.1334i |
| 0.1021 + 0.1021i | 0.1021 + 0.1021i | −0.1021 − 0.1021i |
| 0.0552 + 0.1334i | 0.0552 + 0.1334i | 0.1334 − 0.0552i |
| 0.1443 | −0.1443 | 0.1443 |
| 0.1334 + 0.0552i | −0.1334 − 0.0552i | −0.0552 + 0.1334i |
| 0.1021 + 0.1021i | −0.1021 − 0.1021i | −0.1021 − 0.1021i |
| 0.0552 + 0.1334i | −0.0552 − 0.1334i | 0.1334 − 0.0552i |

Colums 4-6

| | | |
|---|---|---|
| 0.1443 | 0.1443 | 0.1443 |
| −0.0552 + 0.1334i | −0.1334 − 0.0552i | −0.1334 − 0.0552i |
| −0.1021 − 0.1021i | 0.1021 + 0.1021i | 0.1021 + 0.1021i |
| 0.1334 − 0.0552i | −0.0552 − 0.1334i | −0.0552 − 0.1334i |
| −0.1443 | 0.1443 | −0.1443 |
| 0.0552 − 0.1334i | −0.1334 − 0.0552i | 0.1334 + 0.0552i |
| 0.1021 + 0.1021i | 0.1021 + 0.1021i | −0.1021 − 0.1021i |
| −0.1334 + 0.0552i | −0.0552 − 0.1334i | 0.0552 + 0.1334i | ans(:, :, 4) =
Columns 1-3

| | | |
|---|---|---|
| 0.1443 | 0.1443 | 0.1443 |
| 0.0552 + 0.1334i | 0.0552 + 0.1334i | −0.1334 + 0.0552i |
| −0.1021 + 0.1021i | −0.1021 + 0.1021i | 0.1021 − 0.1021i |
| −0.1334 − 0.0552i | −0.1334 − 0.0552i | −0.0552 + 0.1334i |
| 0.1443 | −0.1443 | 0.1443 |
| 0.0552 + 0.1334i | −0.0552 − 0.1334i | −0.1334 + 0.0552i |
| −0.1021 + 0.1021i | 0.1021 − 0.1021i | 0.1021 − 0.1021i |
| −0.1334 − 0.0552i | 0.1334 + 0.0552i | −0.0552 + 0.1334i |

Colums 4-6

| | | |
|---|---|---|
| 0.1443 | 0.1443 | 0.1443 |
| −0.1334 + 0.0552i | −0.0552 − 0.1334i | −0.0552 − 0.1334i |
| 0.1021 − 0.1021i | −0.1021 + 0.1021i | −0.1021 + 0.1021i |
| −0.0552 + 0.1334i | 0.1334 + 0.0552i | 0.1334 + 0.0552i |
| −0.1443 | 0.1443 | −0.1443 |
| 0.1334 − 0.0552i | −0.0552 − 0.1334i | 0.0552 + 0.1334i |

| | | |
|---|---|---|
| −0.1021 + 0.1021i | −0.1021 + 0.1021i | 0.1021 − 0.1021i |
| 0.0552 − 0.1334i | 0.1334 + 0.0552i | −0.1334 − 0.0552i |

- Rank 7 ans(:, :, 1) =
Columns 1-3

| | | |
|---|---|---|
| 0.1336 | 0.1336 | 0.1336 |
| 0.1336 | 0.1336 | 0 + 0.1336i |
| 0.1336 | 0.1336 | −0.1336 |
| 0.1336 | 0.1336 | 0 − 0.1336i |
| 0.1336 | −0.1336 | 0.1336 |
| 0.1336 | −0.1336 | 0 + 0.1336i |
| 0.1336 | −0.1336 | −0.1336 |
| 0.1336 | −0.1336 | 0 − 0.1336i |

Colums 4-7

| | | | |
|---|---|---|---|
| 0.1336 | 0.1336 | 0.1336 | 0.1336 |
| 0 + 0.1336i | −0.1336 | −0.1336 | 0 − 0.1336i |
| −0.1336 | 0.1336 | 0.1336 | −0.1336 |
| 0 − 0.1336i | −0.1336 | −0.1336 | 0 + 0.1336i |
| −0.1336 | 0.1336 | −0.1336 | 0.1336 |
| 0 − 0.1336i | −0.1336 | 0.1336 | 0 − 0.1336i |
| 0.1336 | 0.1336 | −0.1336 | −0.1336 |
| 0 + 0.1336i | −0.1336 | 0.1336 | 0 + 0.1336i | ans(:, :, 2) =
Columns 1-3

| | | |
|---|---|---|
| 0.1336 | 0.1336 | 0.1336 |
| 0.0945 + 0.0945i | 0.0945 + 0.0945i | −0.0945 + 0.0945i |
| 0.0000 + 0.1336i | 0.0000 + 0.1336i | −0.0000 − 0.1336i |
| −0.0945 + 0.0945i | −0.0945 + 0.0945i | 0.0945 + 0.0945i |
| 0.1336 | −0.1336 | 0.1336 |
| 0.0945 + 0.0945i | −0.0945 − 0.0945i | −0.0945 + 0.0945i |
| 0.0000 + 0.1336i | −0.0000 − 0.1336i | −0.0000 − 0.1336i |
| −0.0945 + 0.0945i | 0.0945 − 0.0945i | 0.0945 + 0.0945i |

Colums 4-7

| | | | |
|---|---|---|---|
| 0.1336 | 0.1336 | 0.1336 | 0.1336 |
| −0.0945 + 0.0945i | −0.0945 − 0.0945i | −0.0945 − 0.0945i | 0.0945 − 0.0945i |
| −0.0000 − 0.1336i | 0.0000 + 0.1336i | 0.0000 + 0.1336i | −0.0000 − 0.1336i |
| 0.0945 + 0.0945i | 0.0945 − 0.0945i | 0.0945 − 0.0945i | −0.0945 − 0.0945i |
| −0.1336 | 0.1336 | −0.1336 | 0.1336 |
| 0.0945 − 0.0945i | −0.0945 − 0.0945i | 0.0945 + 0.0945i | 0.0945 − 0.0945i |
| 0.0000 + 0.1336i | 0.0000 + 0.1336i | −0.0000 − 0.1336i | −0.0000 − 0.1336i |
| −0.0945 − 0.0945i | 0.0945 − 0.0945i | −0.0945 + 0.0945i | −0.0945 − 0.0945i | ans(:, :, 3) =
Columns 1-3

| | | |
|---|---|---|
| 0.1336 | 0.1336 | 0.1336 |
| 0.1235 + 0.0511i | 0.1235 + 0.0511i | −0.0511 + 0.1235i |
| 0.0945 + 0.0945i | 0.0945 + 0.0945i | −0.0945 − 0.0945i |
| 0.0511 + 0.1235i | 0.0511 + 0.1235i | 0.1235 − 0.0511i |
| 0.1336 | −0.1336 | 0.1336 |
| 0.1235 + 0.0511i | −0.1235 − 0.0511i | −0.0511 + 0.1235i |
| 0.0945 + 0.0945i | −0.0945 − 0.0945i | −0.0945 − 0.0945i |
| 0.0511 + 0.1235i | −0.0511 − 0.1235i | 0.1235 − 0.0511i |

Colums 4-7

| | | | |
|---|---|---|---|
| 0.1336 | 0.1336 | 0.1336 | 0.1336 |
| −0.0511 + 0.1235i | −0.1235 − 0.0511i | −0.1235 − 0.0511i | 0.0511 − 0.1235i |
| −0.0945 − 0.0945i | 0.0945 + 0.0945i | 0.0945 + 0.0945i | −0.0945 − 0.0945i |
| 0.1235 − 0.0511i | −0.0511 − 0.1235i | −0.0511 − 0.1235i | −0.1235 + 0.0511i |
| −0.1336 | 0.1336 | −0.1336 | 0.1336 |
| 0.0511 − 0.1235i | −0.1235 − 0.0511i | 0.1235 + 0.0511i | 0.0511 − 0.1235i |
| 0.0945 + 0.0945i | 0.0945 + 0.0945i | −0.0945 − 0.0945i | −0.0945 − 0.0945i |
| −0.1235 + 0.0511i | −0.0511 − 0.1235i | 0.0511 + 0.1235i | −0.1235 + 0.0511i | ans(:, :, 4) =
Columns 1-3

| | | |
|---|---|---|
| 0.1336 | 0.1336 | 0.1336 |
| 0.0511 + 0.1235i | 0.0511 + 0.1235i | −0.1235 + 0.0511i |

-continued

| | | |
|---|---|---|
| −0.0945 + 0.0945i | −0.0945 + 0.0945i | 0.0945 − 0.0945i |
| −0.1235 − 0.0511i | −0.1235 − 0.0511i | −0.0511 + 0.1235i |
| 0.1336 | −0.1336 | 0.1336 |
| 0.0511 + 0.1235i | −0.0511 − 0.1235i | −0.1235 + 0.0511i |
| −0.0945 + 0.0945i | 0.0945 − 0.0945i | 0.0945 − 0.0945i |
| −0.1235 − 0.0511i | 0.1235 + 0.0511i | −0.0511 + 0.1235i |

Colums 4-7

| | | | |
|---|---|---|---|
| 0.1336 | 0.1336 | 0.1336 | 0.1336 |
| −0.1235 + 0.0511i | −0.0511 − 0.1235i | −0.0511 − 0.1235i | 0.1235 − 0.0511i |
| 0.0945 − 0.0945i | −0.0945 + 0.0945i | −0.0945 + 0.0945i | 0.0945 − 0.0945i |
| −0.0511 + 0.1235i | 0.1235 + 0.0511i | 0.1235 + 0.0511i | 0.0511 − 0.1235i |
| −0.1336 | 0.1336 | −0.1336 | 0.1336 |
| 0.1235 − 0.0511i | −0.0511 − 0.1235i | 0.0511 + 0.1235i | 0.1235 − 0.0511i |
| −0.0945 + 0.0945i | −0.0945 + 0.0945i | 0.0945 − 0.0945i | 0.0945 − 0.0945i |
| 0.0511 − 0.1235i | 0.1235 + 0.0511i | −0.1235 − 0.0511i | 0.0511 − 0.1235i |

- Rank 8 ans(:, :, 1) =
Columns 1-4

| | | | |
|---|---|---|---|
| 0.1250 | 0.1250 | 0.1250 | 0.1250 |
| 0.1250 | 0.1250 | 0.1250i | 0.1250i |
| 0.1250 | 0.1250 | −0.1250 | −0.1250 |
| 0.1250 | 0.1250 | −0.1250i | −0.1250i |
| 0.1250 | −0.1250 | 0.1250 | −0.1250 |
| 0.1250 | −0.1250 | 0.1250i | −0.1250i |
| 0.1250 | −0.1250 | −0.1250 | 0.1250 |
| 0.1250 | −0.1250 | −0.1250i | 0.1250i |

Columns 5-8

| | | | |
|---|---|---|---|
| 0.1250 | 0.1250 | 0.1250 | 0.1250 |
| −0.1250 | −0.1250 | −0.1250i | −0.1250i |
| 0.1250 | 0.1250 | −0.1250 | −0.1250 |
| −0.1250 | −0.1250 | 0.1250i | 0.1250i |
| 0.1250 | −0.1250 | 0.1250 | −0.1250 |
| −0.1250 | 0.1250 | −0.1250i | 0.1250i |
| 0.1250 | −0.1250 | −0.1250 | 0.1250 |
| −0.1250 | 0.1250 | 0.1250i | −0.1250i |

Figure 4:
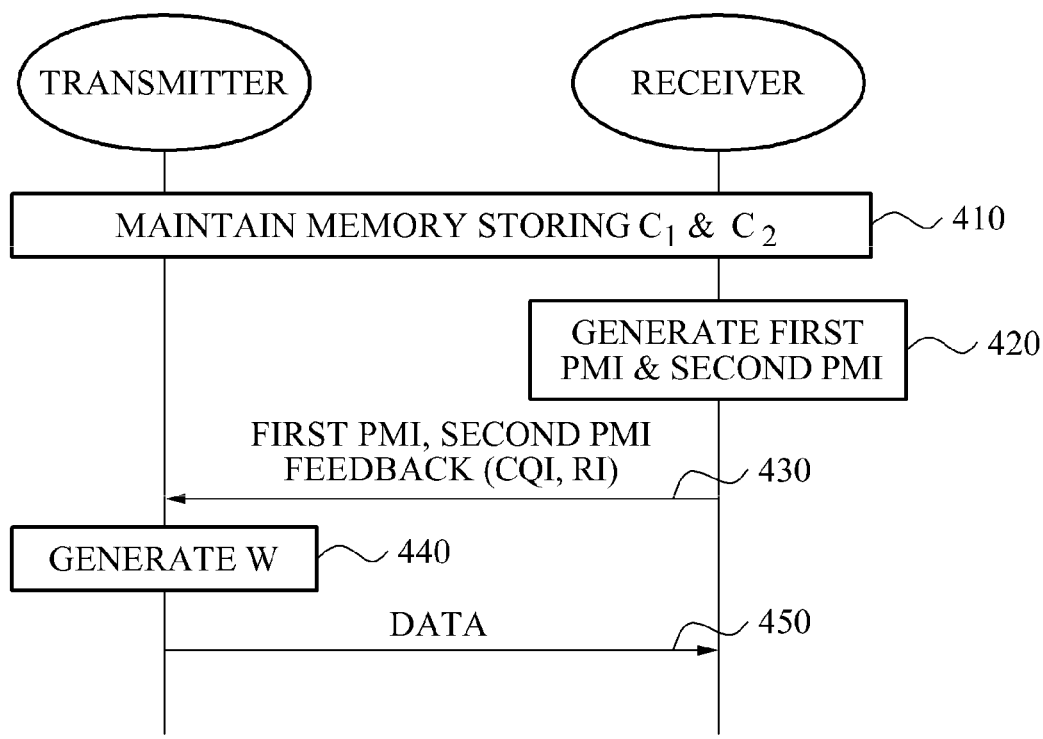
FIG. 4 is a diagram illustrating an example of a communication method of a receiver and a transmitter that share channel information using two codebooks.

FIG. 4 illustrates an example of a communication method of a receiver and a transmitter that share channel information using two codebooks.

Referring to FIG. 4, the transmitter and the receiver may maintain a memory storing a first codebook $C_1$ and a second codebook $C_2$.

At 420, the receiver may generate a first precoding matrix indicator from the first codebook $C_1$, and may generate a second precoding matrix indicator from the second codebook $C_2$ based on a state of a channel formed from the transmitter to the receiver. In this example, the first precoding matrix indicator may indicate one of first codewords included in the first codebook $C_1$, and the second precoding matrix indicator may indicate one of second codewords included in the second codebook $C_2$. A combination of the first precoding matrix indicator and the second precoding matrix indicator may indicate a recommended precoding matrix. For example, when the first precoding matrix indicator indicates $W_1$ and the second precoding matrix indicator indicates $W_2$, the recommended precoding matrix W may be calculated as $W_1 W_2$.

At 430, the receiver may transmit the first precoding matrix indicator and the second precoding matrix indicator to the transmitter. The receiver may further transmit channel quality information indicating the quality of the channel and a rank indicator indicating a preferred rank.

At 440, the transmitter may extract $W_1$ from the first codebook $C_1$, and extract $W_2$ from the second codebook $C_2$, based on the first precoding matrix indicator and the second precoding matrix indicator and then generate a precoding matrix W based on $W_1$ and $W_2$. As described above, W may correspond to a function of $W_1$ and $W_2$, for example, $W = W_1 W_2$.

At 450, the transmitter may precode at least one data stream based on the precoding matrix W and may transmit data. The transmitter may transmit the data using a plurality of transmit antennas, for example, 2, 4, 8, and the like.

An example in which the first codebook $C_1$ and the second codebook $C_2$ independently exist is described. As described above, the receiver may transmit, to the transmitter, the first precoding matrix indicator indicating the first codeword $W_1$ included in the first codebook $C_1$ and the second precoding matrix indicator indicating the second codeword $W_2$ included in the second codebook $C_2$. The transmitter may extract the first codeword $W_1$ from the first codebook $C_1$, and extract the second codeword $W_2$ from the second codebook $C_2$, based on the first precoding matrix indicator and the second precoding matrix indicator and then calculate the precoding matrix W according to a predetermined function, for example, $W = W_1 W_2$. The calculated precoding matrix may be used to precode a data stream.

As another example, the overall codebook C in which the first codebook $C_1$ and the second codebook $C_2$ are integrated may exist. That is, probable candidates of the precoding matrix W may be calculated and thereby be pre-stored as the overall codebook C. In this example, the precoding matrix candidates included in the overall codebook C may be indicated by the first precoding matrix indicator and the second precoding matrix indicator. To indicate one of the candidates included in the overall codebook C, the receiver may transmit the first precoding matrix indicator and the second precoding matrix indicator to the transmitter. The transmitter may extract one of the candidates based on the first precoding matrix indicator and the second precoding matrix. The extracted candidate may be used to precode a data stream as a precoding matrix.

Accordingly, an example in which the first codebook $C_1$ and the second codebook $C_2$ are stored in the transmitter and the receiver may exist. An example in which the overall codebook C instead of the first codebook $C_1$ and the second codebook $C_2$ is stored may exist. In the above examples, only difference lies in that the precoding matrix W is calculated by substantially using $W_1$ and $W_2$. Accordingly, to store the overall codebook C in the transmitter and the receiver may be understood to be substantially equivalent to store the first codebook $C_1$ and the second codebook $C_2$ in the transmitter and the receiver.

Reporting Modes

As described above, the receiver may feed back, to the transmitter, a rank indicator, a first precoding matrix indicator, a second precoding matrix indicator, channel quality information (CQI), and the like. Hereinafter, a variety of reporting modes will be introduced.

1. PUCCH 1-1 Sub-Mode 2

In PUCCH 1-1 sub-mode 2, the receiver may feed back, to the transmitter via a physical uplink control channel (PUCCH), a rank indicator, a first precoding matrix indicator extracted from a subset of a first codebook $C_1$, a second precoding matrix indicator extracted from a subset of a second codebook $C_2$, CQI, and the like. That is, the receiver may use a previously fed back rank indicator as a presumption. CQI corresponds to CQI_s and denotes subband CQI.

For each rank, the subset of the first codebook $C_1$ and the subset of the second codebook $C_2$ may guarantee the whole payload size for the first precoding matrix indicator, the second precoding matrix indicator, and CQI(s) to be used within maximum N bits, for example, 11 bits.

For each rank, the subset of the first codebook $C_1$ and the subset of the second codebook $C_2$ may be fixed.

For each rank the subset of the first codebook $C_1$ and the subset of the second codebook $C_2$ may be independently present or may be integrated and thereby be present.

2. PUCCH 1-1 Sub-Mode 1

In PUCCH 1-1 sub-mode 1, the first precoding matrix indicator and the rank indicator may be fed back from the receiver to the transmitter in the same subframe.

To determine the subset of the first codebook $C_1$ and the subset of the second codebook $C_2$ from the first codebook $C_1$ and the second codebook $C_2$ may be performed dependent on a final codebook design. In particular, it may be performed to guarantee that the whole payload size may sufficiently decrease.

A recommended precoding matrix may be indicated in two subframes based on the previously fed back rank indicator.

In one subframe, the rank indicator and the first precoding matrix indicator extracted from the subset of the first codebook $C_1$ may be commonly encoded and be fed back from the receiver to the transmitter.

In another subframe, wideband CQI and the second precoding matrix indicator extracted from the subset of the second codebook $C_2$ may be fed back from the receiver to the transmitter. When the subset of the second codebook $C_2$ includes only a single element, the second precoding matrix indicator may not be fed back.

3. PUCCH 2-1 Sub-Mode 1

In PUCCH 2-1 sub-mode 1, a recommended precoding matrix may be indicated in three subframes based on the previously fed back rank indicator.

In one subframe, the rank indicator and a one-bit precoder type indicator (PTI) may be fed back from the receiver to the transmitter. The PTI may have a single bit size and information to be fed back may be determined based on a value of PTI.

In another subframe, when PTI='0', the first precoding matrix indicator extracted from the subset of the first codebook $C_1$ may be reported(*fed back. When PTI='1', the second precoding matrix indicator extracted from the subset of the second codebook $C_2$ and wideband CQI may be fed back from the receiver to the transmitter.

In still another subframe, when PTI='0', wideband CQI and the second precoding matrix indicator extracted from the subset of the second codebook $C_2$ may be fed back from the receiver to the transmitter. When PTI='1', subband CQI and the second precoding matrix indicator extracted from the subset of the second codebook $C_2$ may be fed back from the receiver to the transmitter.

When the transmitter has two and four transmit antennas, PTI may be regarded as '1' and may not be separately signaled.

Codebook Subset for Ranks 1, 2, 3, and 4

1. Definition of $W_1^{(k)}$ for rank 1 and rank 2:

Similar to the aforementioned suggestion 3, definition may be made as follows:

$$B = [\, b_0 \quad b_1 \quad \ldots \quad b_{31} \,],$$

$$[B]_{1+m,1+n} = e^{j\frac{2\pi mn}{32}},$$

$$m = 0, 1, 2, 3, n = 0, 1, \ldots 31$$

$$X^{(k)} \in \left\{ \frac{1}{2}[\, b_{2k \bmod 32} \quad b_{(2k+1) \bmod 32} \quad b_{(2k+2) \bmod 32} \quad b_{(2k+3) \bmod 32} \,] \\ : k = 0, 1, \ldots, 15 \right\}$$

$$W_1^{(k)} = \begin{bmatrix} X^{(k)} & 0 \\ 0 & X^{(k)} \end{bmatrix}$$

$$C_{1,(1,2)} = \{W_1^{(0)}, W_1^{(1)}, W_1^{(2)}, \ldots, W_1^{(15)}\}$$

In this example, $[B]_{1 \circ m, 1+n}$ indicates an element present in an $(1+m)^{th}$ row and an $(1+n)^{th}$ column among elements belonging to B, and $b_z(z=0, 1, 2, \ldots, 31)$ corresponds to a $z^{th}$ column vector of the matrix B, and a mod b denotes a remainder when a is divided by b.

2. Definition of $W_1^{(k)}$ for Rank 3 and Rank 4:

Similar to the aforementioned suggestion 3, definition may be made as follows:

$$B = [\, b_0 \quad b_1 \quad \ldots \quad b_{31} \,],$$

$$[B]_{1+m,1+n} = e^{j\frac{2\pi mn}{32}},$$

$$m = 0, 1, 2, 3, n = 0, 1, \ldots 15$$

$$X^{(k)} \in \left\{ \frac{1}{2}[\, b_{4k \bmod 16} \quad b_{(4k+1) \bmod 16} \quad \ldots \quad b_{(4k+3) \bmod 16} \,] \\ : k = 0, 1, 2, 3 \right\}$$

$$W_1^{(k)} = \begin{bmatrix} X^{(k)} & 0 \\ 0 & X^{(k)} \end{bmatrix}$$

A. Subset of First Codebook and Subset of Second Codebook for PUCCH 2-1 Sub-Mode 1:

i. For ranks 2, 3, and 4, when the subset of the first codebook includes four bits and the subset of the second codebook includes two bits:

1. For Rank 2:

Hereinafter, the subset of the first codebook may be referred to as '$C_1$' and the subset of the second codebook may be referred to as '$C_2$'. The subset $C_2$ of the second codebook may be defined as follows:

$$W_2 \in C_2 = \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\}$$

$(Y_1, Y_2) \in \{(\tilde{e}_1, \tilde{e}_1), (\tilde{e}_3, \tilde{e}_3)\}$ or $(Y_1, Y_2) \in \{(\tilde{e}_2, \tilde{e}_2), (\tilde{e}_4, \tilde{e}_4)\}$ 2. For Rank 3:

$$W_2 \in C_2 = \left\{ \frac{1}{\sqrt{3}\sqrt{2}}\begin{bmatrix} Y_1 & Y_2 \\ Y_1 & -Y_2 \end{bmatrix} \right\}$$

$(Y_1, Y_2) \in$
$\{(e_1, [e_1 \; e_5]), (e_2, [e_2 \; e_6]), (e_3, [e_3 \; e_7]), (e_4, [e_4 \; e_8])\}$ or $$W_2 \in C_2 = \left\{ \frac{1}{\sqrt{3}\sqrt{2}}\begin{bmatrix} Y_1 & Y_2 \\ Y_1 & -Y_2 \end{bmatrix} \right\}$$

$(Y_1, Y_2) \in$
$\{(e_5, [e_1 \; e_5]), (e_6, [e_2 \; e_6]), (e_7, [e_3 \; e_7]), (e_8, [e_4 \; e_8])\}$ or $$W_2 \in C_2 = \left\{ \frac{1}{\sqrt{3}\sqrt{2}}\begin{bmatrix} Y_1 & Y_2 \\ Y_1 & -Y_2 \end{bmatrix} \right\}$$

$(Y_1, Y_2) \in$
$\{([e_1 \; e_5], e_5), ([e_2 \; e_6], e_6), ([e_3 \; e_7], e_7), ([e_4 \; e_8], e_8),\}$ or $$W_2 \in C_2 = \left\{ \frac{1}{\sqrt{3}\sqrt{2}}\begin{bmatrix} Y_1 & Y_2 \\ Y_1 & -Y_2 \end{bmatrix} \right\}$$

$(Y_1, Y_2) \in$
$\{([e_5 \; e_1], e_1), ([e_6 \; e_2], e_2), ([e_7 \; e_3], e_3), ([e_8 \; e_4], e_4)\}$

3. For Rank 4:

$$W_2 \in C_2 = \left\{ \frac{1}{\sqrt{4}\sqrt{2}}\begin{bmatrix} Y & Y \\ Y & -Y \end{bmatrix} \right\}$$

$Y \in \{[e_1 \; e_5], [e_2 \; e_6], [e_3 \; e_7], [e_4 \; e_8]\}$ or $$W_2 \in C_2 = \left\{ \frac{1}{\sqrt{4}\sqrt{2}}\begin{bmatrix} Y & Y \\ Y & -Y \end{bmatrix}, \frac{1}{\sqrt{4}\sqrt{2}}\begin{bmatrix} Y & Y \\ jY & -jY \end{bmatrix} \right\}$$

$Y \in \{[e_1 \; e_5], [e_3 \; e_7]\}$ or $Y \in \{[e_2 \; e_6], [e_4 \; e_8]\}$

B. Subset of First Codebook and Subset of Second Codebook for PUCCH 1-1 Sub-Mode 2:

i. For ranks 3 and 4, when the subset of the first codebook includes a single bit and the subset of the second codebook includes three bits:

1. For Rank 3:

$C_1 = \{W_1^{(0)}, W_1^{(2)}\}$ or $C_1 = \{W_1^{(1)}, W_1^{(3)}\}$ $$W_2 \in C_2 = \left\{ \frac{1}{\sqrt{2}}\begin{bmatrix} Y_1 & Y_2 \\ Y_1 & -Y_2 \end{bmatrix} \right\}$$

$(Y_1, Y_2) \in$
$\left\{ \begin{array}{l} (e_1, [e_1 \; e_5]), (e_2, [e_2 \; e_6]), (e_3, [e_3 \; e_7]), (e_4, [e_4 \; e_8]), \\ ([e_1 \; e_5], e_5), ([e_2 \; e_6], e_6), ([e_3 \; e_7], e_7), ([e_4 \; e_8], e_8) \end{array} \right\}$ 2. For Rank 4:

$C_1 = \{W_1^{(0)}, W_1^{(2)}\}$ or $C_1 = \{W_1^{(1)}, W_1^{(3)}\}$ $$W_2 \in C_2 = \left\{ \frac{1}{\sqrt{2}}\begin{bmatrix} Y & Y \\ Y & -Y \end{bmatrix}, \frac{1}{\sqrt{2}}\begin{bmatrix} Y & Y \\ jY & -jY \end{bmatrix} \right\}$$

$Y \in \{[e_1 \; e_5], [e_2 \; e_6], [e_3 \; e_7], [e_4 \; e_8]\}$ ii. When the Subset of the First Codebook Includes Two Bits and the Subset of the Second Codebook Includes Two Bits:

1. For Rank 1:

$C_1 = \{W_1^{(2)}, W_1^{(6)}, W_1^{(10)}, W_1^{(14)}\}$ or $C_1 = \{W_1^{(0)}, W_1^{(4)}, W_1^{(8)}, W_1^{(12)}\}$ $$W_2 \in C_2 = \left\{ \frac{1}{\sqrt{2}}\begin{bmatrix} Y \\ Y \end{bmatrix} \right\}$$

$Y \in \{\tilde{e}_1, \tilde{e}_2, \tilde{e}_3, \tilde{e}_4\}$ or $$W_2 \in C_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix} \right\}$$

$Y \in \{\tilde{e}_1, \tilde{e}_3\}$ or $Y \in \{\tilde{e}_2, \tilde{e}_4\}$

2. For Rank 2:

$C_1 = \{W_1^{(2)}, W_1^{(6)}, W_1^{(10)}, W_1^{(14)}\}$ or $C_1 = \{W_1^{(0)}, W_1^{(4)}, W_1^{(8)}, W_1^{(12)}\}$ $$W_2 \in C_2 = \left\{ \frac{1}{\sqrt{2}\sqrt{2}}\begin{bmatrix} Y_1 & Y_2 \\ Y_1 & -Y_2 \end{bmatrix}, \frac{1}{\sqrt{2}\sqrt{2}}\begin{bmatrix} Y_1 & Y_2 \\ jY_1 & -jY_2 \end{bmatrix} \right\}$$

$(Y_1, Y_2) \in \{(\tilde{e}_1, \tilde{e}_1), (\tilde{e}_3, \tilde{e}_3)\}$ or $(Y_1, Y_2) \in \{(\tilde{e}_2, \tilde{e}_2), (\tilde{e}_4, \tilde{e}_4)\}$ or $$W_2 \in C_2 = \left\{ \frac{1}{\sqrt{2}\sqrt{2}}\begin{bmatrix} Y_1 & Y_2 \\ Y_1 & -Y_2 \end{bmatrix} \right\}$$

$(Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4)\}$ 3. For Rank 3:

$C_1 = \{W_1^{(0)}, W_1^{(1)}, W_1^{(2)}, W_1^{(3)}\}$ $$W_2 \in C_2 = \left\{ \frac{1}{\sqrt{3}\sqrt{2}}\begin{bmatrix} Y_1 & Y_2 \\ Y_1 & -Y_2 \end{bmatrix} \right\}$$

$(Y_1, Y_2) \in$
$\{(e_1, [e_1 \; e_5]), (e_2, [e_2 \; e_6]), (e_3, [e_3 \; e_7]), (e_4, [e_4 \; e_8])\}$ or $$C_1 = \{W_1^{(0)}, W_1^{(1)}, W_1^{(2)}, W_1^{(3)}\}$$

$$W_2 \in C_2 = \left\{\frac{1}{\sqrt{3}\sqrt{2}}\begin{bmatrix} Y_1 & Y_2 \\ Y_1 & -Y_2 \end{bmatrix}\right\}$$

$(Y_1, Y_2) \in$ $\{(e_5, [e_1 \ e_5]), (e_6, [e_2 \ e_6]), (e_7, [e_3 \ e_7]), (e_8, [e_4 \ e_8])\}$ or $$C_1 = \{W_1^{(0)}, W_1^{(1)}, W_1^{(2)}, W_1^{(3)}\}$$

$$W_2 \in C_2 = \left\{\frac{1}{\sqrt{3}\sqrt{2}}\begin{bmatrix} Y_1 & Y_2 \\ Y_1 & -Y_2 \end{bmatrix}\right\}$$

$(Y_1, Y_2) \in$ $\{([e_1 \ e_5], e_5), ([e_2 \ e_6], e_6), ([e_3 \ e_7], e_7), ([e_4 \ e_8], e_8),\}$ or $$C_1 = \{W_1^{(0)}, W_1^{(1)}, W_1^{(2)}, W_1^{(3)}\}$$

$$W_2 \in C_2 = \left\{\frac{1}{\sqrt{3}\sqrt{2}}\begin{bmatrix} Y_1 & Y_2 \\ Y_1 & -Y_2 \end{bmatrix}\right\}$$

$(Y_1, Y_2) \in$ $\{([e_5 \ e_1], e_1), ([e_6 \ e_2], e_2), ([e_7 \ e_3], e_3), ([e_8 \ e_4], e_4)\}$

4. For Rank 4:

$$C_1 = \{W_1^{(0)}, W_1^{(1)}, W_1^{(2)}, W_1^{(3)}\}$$

$$W_2 \in C_2 = \left\{\frac{1}{\sqrt{4}\sqrt{2}}\begin{bmatrix} Y & Y \\ Y & -Y \end{bmatrix}\right\}$$

$Y \in \{[e_1 \ e_5], [e_2 \ e_6], [e_3 \ e_7], [e_4 \ e_8]\}$ or $$C_1 = \{W_1^{(0)}, W_1^{(1)}, W_1^{(2)}, W_1^{(3)}\}$$

$$W_2 \in C_2 = \left\{\frac{1}{\sqrt{4}\sqrt{2}}\begin{bmatrix} Y & Y \\ Y & -Y \end{bmatrix}, \frac{1}{\sqrt{4}\sqrt{2}}\begin{bmatrix} Y & Y \\ jY & -jY \end{bmatrix}\right\}$$

$Y \in \{[e_1 \ e_5], [e_3 \ e_7]\}$ or $Y \in \{[e_2 \ e_6], [e_4 \ e_8]\}$ iii. When the Subset of the First Codebook Includes Three Bits and the Subset of the Second Codebook Includes a Single Bit:

1. For Rank 1:

$$C_1 = \{W_1^{(0)}, W_1^{(2)}, W_1^{(4)}, W_1^{(6)}, W_1^{(8)}, W_1^{(10)}, W_1^{(12)}, W_1^{(14)}\}$$

$$W_2 \in C_2 = \left\{\frac{1}{\sqrt{2}}\begin{bmatrix} Y \\ Y \end{bmatrix}\right\}$$

$Y \in \{\tilde{e}_1, \tilde{e}_3\}$ or $$W_2 \in C_2 = \left\{\frac{1}{\sqrt{2}}\begin{bmatrix} Y \\ Y \end{bmatrix}, \frac{1}{\sqrt{2}}\begin{bmatrix} Y \\ jY \end{bmatrix}\right\}$$

$Y \in \{\tilde{e}_1\}$ or $Y \in \{\tilde{e}_2\}$ or $Y \in \{\tilde{e}_3\}$ or $Y \in \{\tilde{e}_4\}$ or $$W_2 \in C_2 = \left\{\frac{1}{\sqrt{2}}\begin{bmatrix} Y \\ Y \end{bmatrix}, \frac{1}{\sqrt{2}}\begin{bmatrix} Y \\ -Y \end{bmatrix}\right\}$$

$Y \in \{\tilde{e}_1\}$ or $Y \in \{\tilde{e}_2\}$ or $Y \in \{\tilde{e}_3\}$ or $Y \in \{\tilde{e}_4\}$ 2. For Rank 2:

$$C_1 = \{W_1^{(0)}, W_1^{(2)}, W_1^{(4)}, W_1^{(6)}, W_1^{(8)}, W_1^{(10)}, W_1^{(12)}, W_1^{(14)}\}$$

$$W_2 \in C_2 = \left\{\frac{1}{\sqrt{2}\sqrt{2}}\begin{bmatrix} Y_1 & Y_2 \\ Y_1 & -Y_2 \end{bmatrix}, \frac{1}{\sqrt{2}\sqrt{2}}\begin{bmatrix} Y_1 & Y_2 \\ jY_1 & -jY_2 \end{bmatrix}\right\}$$

$(Y_1, Y_2) \in \{(\tilde{e}_1, \tilde{e}_1)\}$ or $(Y_1, Y_2) \in \{(\tilde{e}_2, \tilde{e}_2)\}$ or $(Y_1, Y_2) \in \{(\tilde{e}_3, \tilde{e}_3)\}$ or $(Y_1, Y_2) \in \{(\tilde{e}_4, \tilde{e}_4)\}$ or $$W_2 \in C_2 = \left\{\frac{1}{\sqrt{2}\sqrt{2}}\begin{bmatrix} Y_1 & Y_2 \\ Y_1 & -Y_2 \end{bmatrix}\right\}$$

$(Y_1, Y_2) \in \{(\tilde{e}_1, \tilde{e}_1), (\tilde{e}_3, \tilde{e}_3)\}$ or $(Y_1, Y_2) \in \{(\tilde{e}_2, \tilde{e}_2), (\tilde{e}_4, \tilde{e}_4)\}$ 3. For Rank 3 and Rank 4:

The subset $C_1$ of the first codebook and the subset $C_2$ of the second codebook for rank 3 and rank 4 may be the same as the subset $C_1$ of the 2-bit first codebook and the subset $C_2$ of the 2-bit second codebook that are described above. For rank 3 and rank 4, the subset $C_1$ of the first codebook may have only a size of two bits.

iv. When the Subset of the First Codebook Includes Four Bits and the Subset of the Second Codebook Includes Zero Bit:

1. For Rank 1:

$$C_1 = \{W_1^{(0)}, W_1^{(1)}, W_1^{(2)}, \ldots, W_1^{(15)}\}$$

$$W_2 \in C_2 = \left\{\frac{1}{\sqrt{2}}\begin{bmatrix} Y \\ Y \end{bmatrix}\right\}$$

$Y \in \{\tilde{e}_1\}$ or $Y \in \{\tilde{e}_2\}$ or $Y \in \{\tilde{e}_3\}$ or $Y \in \{\tilde{e}_4\}$ or $$C_1 = \{W_1^{(0)}, W_1^{(2)}, W_1^{(4)}, \ldots, W_1^{(14)}\} \text{ with}$$

$$W_2 \in C_2 = \left\{\frac{1}{\sqrt{2}}\begin{bmatrix} Y \\ Y \end{bmatrix}\right\}$$

$Y \in \{\tilde{e}_1\}$ or $$C_1 = \{W_1^{(1)}, W_1^{(3)}, W_1^{(5)}, \ldots, W_1^{(15)}\} \text{ with}$$

$$W_2 \in C_2 = \left\{\frac{1}{\sqrt{2}}\begin{bmatrix} Y \\ -Y \end{bmatrix}\right\}$$

$Y \in \{\tilde{e}_1\}$

2. For Rank 2:

$$C_1 = \{W_1^{(0)}, W_1^{(1)}, W_1^{(2)}, \ldots, W_1^{(15)}\}$$

$$W_2 \in C_2 = \left\{\frac{1}{\sqrt{2}\sqrt{2}}\begin{bmatrix} Y_1 & Y_2 \\ Y_1 & -Y_2 \end{bmatrix}\right\}$$

-continued $(Y_1, Y_2) \in \{(\tilde{e}_1, \tilde{e}_1)\}$ or $(Y_1, Y_2) \in \{(\tilde{e}_2, \tilde{e}_2)\}$ or $(Y_1, Y_2) \in \{(\tilde{e}_3, \tilde{e}_3)\}$ or $(Y_1, Y_2) \in \{(\tilde{e}_4, \tilde{e}_4)\}$ 3. For Rank 3 and Rank 4:

The subset $C_1$ of the first codebook and the subset $C_2$ of the second codebook for rank 3 and rank 4 may be the same as the subset $C_1$ of the 2-bit first codebook and the subset $C_2$ of the 2-bit second codebook that are described above. For rank 3 and rank 4, the subset $C_1$ of the first codebook may have only a size of two bits.

C. Subset of First Codebook for PUCCH 1-1 Sub-Mode 1 when a Rank Indicator and a First Precoding Matrix Indicator are Commonly Encoded:

i. Five Bits of Common Encoding of Rank Indicator and First Precoding Matrix Indicator—Example 1:

1. For Rank 1 and Rank 2:

$C_1 = \{W_1^{(0)}, W_1^{(2)}, W_1^{(4)}, W_1^{(6)}, W_1^{(8)}, W_1^{(10)}, W_1^{(12)}, W_1^{(14)}\}$ or $C_1 \{W_1^{(1)}, W_1^{(3)}, W_1^{(5)}, W_1^{(7)}, W_1^{(9)}, W_1^{(11)}, W_1^{(13)}, W_1^{(15)}\}$

2. For Rank 3 and Rank 4:

$C_1 = \{W_1^{(1)}, W_1^{(3)}\}$ or $C_1 = \{W_1^{(1)}, W_1^{(3)}\}$

3. For Rank 5 and Rank 6:

$C_1 = \{W_1^{(0)}, W_1^{(1)}, W_1^{(2)}, W_1^{(3)}\}$

4. For Rank 7:

$C_1 = \{W_1^{(0)}, W_1^{(1)}, W_1^{(2)}\}$

5. For Rank 8:

$C_1 = \{W_1^{(0)}\}$ ii. Five Bits of Common Encoding of Rank Indicator and First Precoding Matrix Indicator—Example 2:

1. For Rank 1 and Rank 2:

$C_1 = \{W_1^{(0)}, W_1^{(2)}, W_1^{(4)}, W_1^{(6)}, W_1^{(8)}, W_1^{(10)}, W_1^{(12)}, W_1^{(14)}\}$ or $C_1 = \{W_1^{(1)}, W_1^{(3)}, W_1^{(5)}, W_1^{(7)}, W_1^{(9)}, W_1^{(11)}, W_1^{(13)}, W_1^{(15)}\}$

2. For Rank 3 and Rank 4:

$C_1 = \{W_1^{(0)}, W_1^{(1)}, W_1^{(2)}, W_1^{(3)}\}$

3. For Rank 5 and Rank 6:

$C_1 = \{W_1^{(0)}, W_1^{(1)}, W_1^{(2)}\}$

4. For Rank 7:

$C_1 = \{W_1^{(0)}\}$

5. For Rank 8:

$C_1 = \{W_1^{(0)}\}$

Other Expressions

Detailed digits of the full first codebook $C_1$ and the full second codebook $C_2$ are expressed above using ans(:,:,n) for each of various ranks. The aforementioned expression scheme may be complex and thus, the full first codebook $C_1$ and the full second codebook $C_2$ are expressed below using a relatively simple expression scheme.

$i_1$ may correspond to a first precoding matrix indicator and $i_2$ may correspond to a second precoding matrix indicator. $\varphi_n$ and $v_m$ may be expressed as follows:

$\varphi_n = e^{j\pi n/2}$ $v_m = [1 \; e^{j2\pi n/32} \; e^{j4\pi n/32} \; e^{j6\pi n/32}]^T$ In this example, the first codebook $C_1$ and the second codebook $C_2$ for rank 1 may be simply expressed by the following tables. The following tables may represent the overall codebook C in which the first codebook $C_1$ and the second codebook $C_2$ are integrated.

First codebook $C_1$ and second codebook $C_2$ for rank 1:

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| 0-14 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |
| 15 | $W_{0,0}^{(1)}$ | $W_{0,1}^{(1)}$ | $W_{0,2}^{(1)}$ | $W_{0,3}^{(1)}$ | $W_{1,0}^{(1)}$ | $W_{1,1}^{(1)}$ | $W_{1,2}^{(1)}$ | $W_{1,3}^{(1)}$ | where $W_{m,n}^{(1)} = \frac{1}{\sqrt{8}} \begin{bmatrix} v_m \\ \varphi_n v_m \end{bmatrix}$ First Codebook $C_1$ and Second Codebook $C_2$ for Rank 2:

| | $i_2$ | | | |
|---|---|---|---|---|
| $i_1$ | 0 | 1 | 2 | 3 |
| 0-14 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| 15 | $W_{30,30,0}^{(2)}$ | $W_{30,30,1}^{(2)}$ | $W_{31,31,0}^{(2)}$ | $W_{31,31,1}^{(2)}$ |

| | $i_2$ | | | |
|---|---|---|---|---|
| $i_1$ | 4 | 5 | 6 | 7 |
| 0-14 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| 15 | $W_{0,0,0}^{(2)}$ | $W_{0,0,1}^{(2)}$ | $W_{1,1,0}^{(2)}$ | $W_{1,1,1}^{(2)}$ |

-continued

| $i_1$ | $i_2$ | | | |
|---|---|---|---|---|
| | 8 | 9 | 10 | 11 |
| 0-14 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |
| 15 | $W^{(2)}_{30,31,0}$ | $W^{(2)}_{30,31,1}$ | $W^{(2)}_{31,0,0}$ | $W^{(2)}_{31,0,1}$ |

| $i_1$ | $i_2$ | | | |
|---|---|---|---|---|
| | 12 | 13 | 14 | 15 |
| 0-14 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ |
| 15 | $W^{(2)}_{30,1,0}$ | $W^{(2)}_{30,1,1}$ | $W^{(2)}_{31,1,0}$ | $W^{(2)}_{31,1,1}$ | where $W^{(2)}_{m,m',n} = \frac{1}{4}\begin{bmatrix} v_m & v_{m'} \\ \varphi_n v_m & -\varphi_n v_{m'} \end{bmatrix}$ First Codebook $C_1$ and Second Codebook $C_2$ for Rank 3:

| $i_1$ | $i_2$ | | | |
|---|---|---|---|---|
| | 0 | 1 | 2 | 3 |
| 0-3 | $W^{(3)}_{4i_1,4i_1,4i_1+4}$ | $W^{(3)}_{4i_1+4,4i_1,4i_1+4}$ | $\tilde{W}^{(3)}_{4i_1,4i_1,4i_1+4}$ | $\tilde{W}^{(3)}_{4i_1+4,4i_1,4i_1}$ |

| $i_1$ | $i_2$ | | | |
|---|---|---|---|---|
| | 4 | 5 | 6 | 7 |
| 0-3 | $W^{(3)}_{4i_1+1,4i_1+1,4i_1+5}$ | $W^{(3)}_{4i_1+5,4i_1+1,4i_1+5}$ | $\tilde{W}^{(3)}_{4i_1+1,4i_1+5,4i_1+5}$ | $\tilde{W}^{(3)}_{4i_1+5,4i_1+1,4i_1+1}$ |

| $i_1$ | $i_2$ | | | |
|---|---|---|---|---|
| | 8 | 9 | 10 | 11 |
| 0-3 | $W^{(3)}_{4i_1+2,4i_1+2,4i_1+6}$ | $W^{(3)}_{4i_1+6,4i_1+2,4i_1+6}$ | $\tilde{W}^{(3)}_{4i_1+2,4i_1+6,4i_1+6}$ | $\tilde{W}^{(3)}_{4i_1+6,4i_1+2,4i_1+2}$ |

| $i_1$ | $i_2$ | | | |
|---|---|---|---|---|
| | 12 | 13 | 14 | 15 |
| 0-3 | $W^{(3)}_{4i_1+3,4i_1+3,4i_1+7}$ | $W^{(3)}_{4i_1+7,4i_1+3,4i_1+7}$ | $\tilde{W}^{(3)}_{4i_1+3,4i_1+7,4i_1+7}$ | $\tilde{W}^{(3)}_{4i_1+7,4i_1+3,4i_1+3}$ | where $W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}}\begin{bmatrix} v_m & v_{m'} & v_{m''} \\ v_m & v_{m'} & -v_{m''} \end{bmatrix}$ First Codebook $C_1$ and Second Codebook $C_2$ for Rank 4:

| $i_1$ | $i_2$ | | | |
|---|---|---|---|---|
| | 0 | 1 | 2 | 3 |
| 0-3 | $W^{(4)}_{4i_1,4i_1+4,0}$ | $W^{(4)}_{4i_1,4i_1+4,1}$ | $W^{(4)}_{4i_1+1,4i_1+5,0}$ | $W^{(4)}_{4i_1+1,4i_1+5,1}$ |

| $i_1$ | $i_2$ | | | |
|---|---|---|---|---|
| | 4 | 5 | 6 | 7 |
| 0-3 | $W^{(4)}_{4i_1+2,4i_1+6,0}$ | $W^{(4)}_{4i_1+2,4i_1+6,1}$ | $W^{(4)}_{4i_1+3,4i_1+7,0}$ | $W^{(4)}_{4i_1+3,4i_1+7,1}$ | where $W^{(4)}_{m,m',n} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ First Codebook $C_1$ and Second Codebook $C_2$ for Rank 5:

| $i_1$ | $i_2$ |
|---|---|
| | 0 |
| 0-3 | $W^{(5)}_{i_1} = \frac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

First Codebook $C_1$ and Second Codebook $C_2$ for Rank 6:

| $i_1$ | $i_2$ |
|---|---|
| | 0 |
| 0-3 | $W^{(6)}_{i_1} = \frac{1}{\sqrt{48}}\begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

First Codebook $C_1$ and Second Codebook $C_2$ for Rank 7:

| $i_1$ | $i_2$ |
|---|---|
| | 0 |
| 0-3 | $W^{(7)}_{i_1} = \frac{1}{\sqrt{56}}\begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

First Codebook $C_1$ and Second Codebook $C_2$ for Rank 8:

| $i_1$ | $i_2$ |
|---|---|
|  | 0 |
| 0 | $W_{i_1}^{(8)} = \frac{1}{8}\begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

The aforementioned simple expression of the full first codebook $C_1$ and the full second codebook $C_2$ may also be applicable to the subset of the first codebook $C_1$ and the subset of the second codebook $C_2$.

A. Subset of First Codebook and Subset of Second Codebook for PUCCH 2-1 Sub-Mode 1:

i. For ranks 2, 3, and 4, when the subset of the first codebook includes four bits and the subset of the second codebook includes two bits:

The subset of the first codebook and the subset of the second codebook for rank r may be defined by selecting subsequent $i_1$ and/or $i_2$ from the full first codebook $C_1$ and the full second codebook $C_2$ for rank r that are described above.

For example, the following subset of the first codebook and the subset of the second codebook for rank 2 may be defined by selecting $i_2=\{0,1,4,5\}$ or $\{0,2,4,6\}$ from the full first codebook $C_1$ and the full second codebook $C_2$ for rank 2.

1. For Rank 2:

$i_2=\{0,1,4,5\}$ or $\{0,2,4,6\}$

2. For Rank 3:

$i_2=\{0,4,8,12\}$ or $\{1,5,9,13\}$ or $\{2,6,10,14\}$ or $\{3,7,11,15\}$

3. For Rank 4:

$i_2=\{0,2,4,6\}$ or $\{0,1,4,5\}$ or $\{2,3,6,7\}$

B. Subset of First Codebook and Subset of Second Codebook for PUCCH 1-1 Sub-Mode 2:

i. For Ranks 3 and 4, when the Subset of the First Codebook Includes a Single Bit and the Subset of the Second Codebook Includes Three Bits:

1. For Rank 3:

$i_1=\{0,2\}$ or $\{1,3\}$ $i_2=\{0,1,2,3,8,9,10,11\}$

2. For Rank 4:

$i_1=\{0,2\}$ or $\{1,3\}$ $i_2=\{0,1,2,3,4,5,6,7\}$ ii. When the Subset of the First Codebook Includes Two Bits and the Subset of the Second Codebook Includes Two Bits:

1. For Rank 1:

$i_1=\{0,4,8,12\}$ or $\{2,6,10,14\}$ $i_2=\{0,1,8,9\}$ or $\{4,5,12,13\}$ or $\{0,4,8,12\}$

2. For Rank 2:

$i_1=\{0,4,8,12\}$ or $\{2,6,10,14\}$ $i_2=\{0,1,4,5\}$ or $\{2,3,6,7\}$ or $\{0,2,4,6\}$

3. For Rank 3:

$i_1=\{0,1,2,3\}$ $i_2=\{0,4,8,12\}$ or $\{1,5,9,13\}$ or $\{2,6,10,14\}$ or $\{3,7,11,15\}$

4. For Rank 4:

$i_1=\{0,1,2,3\}$ $i_2=\{0,2,4,6\}$ or $\{0,1,4,5\}$ or $\{2,3,6,7\}$ iii. When the Subset of the First Codebook Includes Three Bits and the Subset of the Second Codebook Includes a Single Bit:

1. For Rank 1:

$i_1=\{0,2,4,6,8,10,12,14\}$ $i_2=\{0,8\}$ or $\{0,1\}$ or $\{4,5\}$ or $\{8,9\}$ or $\{12,13\}$ or $\{0,2\}$ or $\{4,6\}$ or $\{8,10\}$ or $\{12,14\}$

2. For Rank 2:

$i_1=\{0,2,4,6,8,10,12,14\}$ $i_2=\{0,1\}$ or $\{2,3\}$ or $\{4,5\}$ or $\{6,7\}$ or $\{0,4\}$ or $\{2,6\}$

3. For Rank 3 and Rank 4:

The subset $C_1$ of the first codebook and the subset $C_2$ of the second codebook for rank 3 and rank 4 may be the same as the subset $C_1$ of the two-bit first codebook and the subset $C_2$ of the two-bit second codebook that are described above.

iv. When the Subset of the First Codebook Includes Four Bits and the Subset of the Second Codebook Includes Zero Bit:

1. For Rank 1:

$i_1=\{0,1,2,\ldots,16\}$ $i_2=\{0\}$ or $\{4\}$ or $\{8\}$ or $\{12\}$ or $i_1=\{0,2,4,\ldots,14\}$ with $i_2=\{0\}$ and $i_1=\{1,3,5,\ldots,15\}$ with $i_2=\{2\}$ 2. For Rank 2:

$i_1=\{0,1,2,\ldots,16\}$ $i_2=\{0\}$ or $\{2\}$ or $\{4\}$ or $\{6\}$

3. For Rank 3 and Rank 4:

The subset $C_1$ of the first codebook and the subset $C_2$ of the second codebook for rank 3 and rank 4 may be the same as the subset $C_1$ of the two-bit first codebook and the subset $C_2$ of the two-bit second codebook that are described above.

C. Subset of First Codebook for PUCCH 1-1 Sub-Mode 1 when a Rank Indicator and a First Precoding Matrix Indicator are Commonly Encoded:

i. Five Bits of Common Encoding of Rank Indicator and First Precoding Matrix Indicator—Example 1:

1. For Rank 1 and Rank 2:

$i_1=\{0,2,4,\ldots,14\}$ or $i_1=\{1,3,5,\ldots,15\}$

2. For Rank 3 and Rank 4:

$i_1=\{0,2\}$ or $i_1=\{1,3\}$

3. For Rank 5 and Rank 6:

$i_1=\{0,1,2,3\}$

4. For Rank 7:

$i_1=\{0,12\}$

5. For Rank 8:

$i_1=\{0\}$ ii. Five Bits of Common Encoding of Rank Indicator and First Precoding Matrix Indicator—Example 2:
1. For Rank 1 and Rank 2:

$i_1=\{0,2,4,\ldots,14\}$ or $i_1=\{1,3,5,\ldots,15\}$

2. For Rank 3 and Rank 4:

$i_1=\{0,1,2,3\}$

3. For Rank 5 and Rank 5:

$i_1=\{0,1,2\}$

4. For Rank 7:

$i_1=\{0\}$

5. For Rank 8:

$i_1=\{0\}$

Description related to the subset of the first codebook and the subset of the second codebook varying based on a reporting mode is described above.

Detailed digits of the subset of the first codebook and the subset of the second codebook with respect to some reporting modes may follow as:

1. Subset of First Codebook and Subset of Second Codebook in PUCCH 1-1 Sub-Mode 2:

(1) For Rank 1:

For example, when the subset of the first codebook includes three bits and the subset of the second codebook includes a single bit, the subset of the first codebook may include ans(:,:,n=1), ans(:,:,n=3), ans(:,:,n=5), ans(:,:,n=7), ans(:,:,n=9), ans(:,:,n=11), ans(:,:,n=13), and ans(:,:,n=15) that are described above.

That is, codewords included in the subset of the first codebook may be expressed as follows:

| ans(:, :, 1) = | | | |
|---|---|---|---|
| columns 1-4 | | | |
| 0.5000 | 0.5000 | 0.5000 | 0.5000 |
| 0.5000 | 0.4904 + 0.0975i | 0.4619 + 0.1913i | 0.4157 + 0.2778i |
| 0.5000 | 0.4619 + 0.1913i | 0.3536 + 0.3536i | 0.1913 + 0.4619i |
| 0.5000 | 0.4157 + 0.2778i | 0.1913 + 0.4619i | −0.0975 + 0.4904i |
| 0 | 0 | 0 | 0 |
| 0 | 0 | 0 | 0 |
| 0 | 0 | 0 | 0 |
| 0 | 0 | 0 | 0 |
| columns 5-8 | | | |
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.5000 | 0.4904 + 0.0975i | 0.4619 + 0.1913i | 0.4157 + 0.2778i |
| 0.5000 | 0.4619 + 0.1913i | 0.3536 + 0.3536i | 0.1913 + 0.4619i |
| 0.5000 | 0.4157 + 0.2778i | 0.1913 + 0.4619i | −0.0975 + 0.4904i |
| ans(:, :, 3) = | | | |
| columns 1-4 | | | |
| 0.5000 | 0.5000 | 0.5000 | 0.5000 |
| 0.3536 + 0.3536i | 0.2778 + 0.4157i | 0.1913 + 0.4619i | 0.0975 + 0.4904i |
| 0.0000 + 0.5000i | −0.1913 + 0.4619i | −0.3536 + 0.3536i | −0.4619 + 0.1913i |
| −0.3536 + 0.3536i | −0.4904 + 0.0975i | −0.4619 − 0.1913i | −0.2778 − 0.4157i |
| 0 | 0 | 0 | 0 |
| 0 | 0 | 0 | 0 |
| 0 | 0 | 0 | 0 |
| 0 | 0 | 0 | 0 |
| columns 5-8 | | | |
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.3536 + 0.3536i | 0.2778 + 0.4157i | 0.1913 + 0.4619i | 0.0975 + 0.4904i |
| 0.0000 + 0.5000i | −0.1913 + 0.4619i | −0.3536 + 0.3536i | −0.4619 + 0.1913i |
| −0.3536 + 0.3536i | −0.4904 + 0.0975i | −0.4619 − 0.1913i | −0.2778 − 0.4157i |
| ans(:, :, 5) = | | | |
| columns 1-4 | | | |
| 0.5000 | 0.5000 | 0.5000 | 0.5000 |
| 0.0000 + 0.5000i | −0.0975 + 0.4904i | −0.1913 + 0.4619i | −0.2778 + 0.4157i |
| −0.5000 + 0.0000i | −0.4619 − 0.1913i | −0.3536 − 0.3536i | −0.1913 − 0.4619i |
| −0.0000 − 0.5000i | 0.2778 − 0.4157i | 0.4619 − 0.1913i | 0.4904 + 0.0975i |
| 0 | 0 | 0 | 0 |
| 0 | 0 | 0 | 0 |
| 0 | 0 | 0 | 0 |
| 0 | 0 | 0 | 0 |
| columns 5-8 | | | |
| 0 | 0 | 0 | 0 |
| 0 | 0 | 0 | 0 |

-continued

|  |  |  |  |
|---|---|---|---|
| 0 | 0 | 0 | 0 |
| 0 | 0 | 0 | 0 |
| 0.5000 | 0.5000 | 0.5000 | 0.5000 |
| 0.0000 + 0.5000i | −0.0975 + 0.4904i | −0.1913 + 0.4619i | −0.2778 + 0.4157i |
| −0.5000 + 0.0000i | −0.4619 − 0.1913i | −0.3536 − 0.3536i | −0.1913 − 0.4619i |
| −0.0000 − 0.5000i | 0.2778 − 0.4157i | 0.4619 − 0.1913i | 0.4904 + 0.0975i | ans(:, :, 7) =
columns 1-4

|  |  |  |  |
|---|---|---|---|
| 0.5000 | 0.5000 | 0.5000 | 0.5000 |
| −0.3536 + 0.3536i | −0.4157 + 0.2778i | −0.4619 + 0.1913i | −0.4904 + 0.0975i |
| −0.0000 − 0.5000i | 0.1913 − 0.4619i | 0.3536 − 0.3536i | 0.4619 − 0.1913i |
| 0.3536 + 0.3536i | 0.0975 + 0.4904i | −0.1913 + 0.4619i | −0.4157 + 0.2778i |
| 0 | 0 | 0 | 0 |
| 0 | 0 | 0 | 0 |
| 0 | 0 | 0 | 0 |
| 0 | 0 | 0 | 0 | columns 5-8

|  |  |  |  |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.3536 + 0.3536i | −0.4157 + 0.2778i | −0.4619 + 0.1913i | −0.4904 + 0.0975i |
| −0.0000 − 0.5000i | 0.1913 − 0.4619i | 0.3536 − 0.3536i | 0.4619 − 0.1913i |
| 0.3536 + 0.3536i | 0.0975 + 0.4904i | −0.1913 + 0.4619i | −0.4157 + 0.2778i | ans(:, :, 9) =
columns 1-4

|  |  |  |  |
|---|---|---|---|
| 0.5000 | 0.5000 | 0.5000 | 0.5000 |
| −0.5000 + 0.0000i | −0.4904 − 0.0975i | −0.4619 − 0.1913i | −0.4157 − 0.2778i |
| 0.5000 − 0.0000i | 0.4619 + 0.1913i | 0.3536 + 0.3536i | 0.1913 + 0.4619i |
| −0.5000 + 0.0000i | −0.4157 − 0.2778i | −0.1913 − 0.4619i | 0.0975 − 0.4904i |
| 0 | 0 | 0 | 0 |
| 0 | 0 | 0 | 0 |
| 0 | 0 | 0 | 0 |
| 0 | 0 | 0 | 0 | columns 5-8

|  |  |  |  |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.5000 + 0.0000i | −0.4904 − 0.0975i | −0.4619 − 0.1913i | −0.4157 − 0.2778i |
| 0.5000 − 0.0000i | 0.4619 + 0.1913i | 0.3536 + 0.3536i | 0.1913 + 0.4619i |
| −0.5000 + 0.0000i | −0.4157 − 0.2778i | −0.1913 − 0.4619i | 0.0975 − 0.4904i | ans(:, :, 11) =
columns 1-4

|  |  |  |  |
|---|---|---|---|
| 0.5000 | 0.5000 | 0.5000 | 0.5000 |
| −0.3536 − 0.3536i | −0.2778 − 0.4157i | −0.1913 − 0.4619i | −0.0975 − 0.4904i |
| 0.0000 + 0.5000i | −0.1913 + 0.4619i | −0.3536 + 0.3536i | −0.4619 + 0.1913i |
| 0.3536 − 0.3536i | 0.4904 − 0.0975i | 0.4619 + 0.1913i | 0.2778 + 0.4157i |
| 0 | 0 | 0 | 0 |
| 0 | 0 | 0 | 0 |
| 0 | 0 | 0 | 0 |
| 0 | 0 | 0 | 0 | columns 5-8

|  |  |  |  |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.3536 − 0.3536i | −0.2778 − 0.4157i | −0.1913 − 0.4619i | −0.0975 − 0.4904i |
| 0.0000 + 0.5000i | −0.1913 + 0.4619i | −0.3536 + 0.3536i | −0.4619 + 0.1913i |
| 0.3536 − 0.3536i | 0.4904 − 0.0975i | 0.4619 + 0.1913i | 0.2778 + 0.4157i | ans(:, :, 13) =
columns 1-4

|  |  |  |  |
|---|---|---|---|
| 0.5000 | 0.5000 | 0.5000 | 0.5000 |
| −0.0000 − 0.5000i | 0.0975 − 0.4904i | 0.1913 − 0.4619i | 0.2778 − 0.4157i |
| −0.5000 + 0.0000i | −0.4619 − 0.1913i | −0.3536 − 0.3536i | −0.1913 − 0.4619i |
| 0.0000 + 0.5000i | −0.2778 + 0.4157i | −0.4619 + 0.1913i | −0.4904 − 0.0975i |
| 0 | 0 | 0 | 0 |
| 0 | 0 | 0 | 0 |

-continued

| | | | |
|---|---|---|---|
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| −0.0000 − 0.5000i | 0.0975 − 0.4904i | 0.1913 − 0.4619i | 0.2778 − 0.4157i |
| −0.5000 + 0.0000i | −0.4619 − 0.1913i | −0.3536 − 0.3536i | −0.1913 − 0.4619i |
| 0.0000 + 0.5000i | −0.2778 + 0.4157i | −0.4619 + 0.1913i | −0.4904 − 0.0975i | ans(:, :, 15) =
columns 1-4

| | | | |
|---|---|---|---|
| 0.5000 | 0.5000 | 0.5000 | 0.5000 |
| 0.3536 − 0.3536i | 0.4157 − 0.2778i | 0.4619 − 0.1913i | 0.4904 − 0.0975i |
| −0.0000 − 0.5000i | 0.1913 − 0.4619i | 0.3536 − 0.3536i | 0.4619 − 0.1913i |
| −0.3536 − 0.3536i | −0.0975 − 0.4904i | 0.1913 − 0.4619i | 0.4157 − 0.2778i |
| 0 | 0 | 0 | 0 |
| 0 | 0 | 0 | 0 |
| 0 | 0 | 0 | 0 |
| 0 | 0 | 0 | 0 | columns 5-8

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0.5000 | 0.5000 | 0.5000 | 0.5000 |
| 0.3536 − 0.3536i | 0.4157 − 0.2778i | 0.4619 − 0.1913i | 0.4904 − 0.0975i |
| −0.0000 − 0.5000i | 0.1913 − 0.4619i | 0.3536 − 0.3536i | 0.4619 − 0.1913i |
| −0.3536 − 0.3536i | −0.0975 − 0.4904i | 0.1913 − 0.4619i | 0.4157 − 0.2778i |

The subset of the second codebook may include (:,:,n=1) and (:,:,n=3) for rank 1 that are described above.

That is, codewords included in the subset of the second codebook may be expressed as follows:

(:, :, 1) =

0.7071
0
0
0
0.7071
0
0
0

(:, :, 3) =

0.7071
0
0
0
−0.7071
0
0
0

A combination of a first precoding matrix indicator selected from the subset of the first codebook and a second precoding matrix indicator selected from the subset of the second codebook may indicate one of precoding matrix candidates disclosed in the following overall codebook.

ans(:, :, 1, 1) =

0.3536
0.3536
0.3536
0.3536

0.3536
0.3536
0.3536
0.3536 ans(:, :, 3, 1) =

0.3536
0.2500 + 0.2500i
0.0000 + 0.3536i
−0.2500 + 0.2500i
0.3536
0.2500 + 0.2500i
0.0000 + 0.3536i
−0.2500 + 0.2500i ans(:, :, 5, 1) =

0.3536
0.0000 + 0.3536i
−0.3536 + 0.0000i
−0.0000 − 0.3536i
0.3536
0.0000 + 0.3536i
−0.3536 + 0.0000i
−0.0000 − 0.3536i ans(:, :, 7, 1) =

0.3536
−0.2500 + 0.2500i
−0.0000 − 0.3536i
0.2500 + 0.2500i
0.3536
−0.2500 + 0.2500i
−0.0000 − 0.3536i
0.2500 + 0.2500i ans(:, :, 9, 1) =

0.3536
−0.3536 + 0.0000i
0.3536 − 0.0000i
−0.3536 + 0.0000i
0.3536

```
-0.3536 + 0.0000i
 0.3536 - 0.0000i
-0.3536 + 0.0000i
ans(:, :, 11, 1) =
       0.3536
-0.2500 - 0.2500i
 0.0000 + 0.3536i
 0.2500 - 0.2500i
       0.3536
-0.2500 - 0.2500i
 0.0000 + 0.3536i
 0.2500 - 0.2500i
ans(:, :, 13, 1) =
       0.3536
-0.0000 - 0.3536i
-0.3536 + 0.0000i
 0.0000 + 0.3536i
       0.3536
-0.0000 - 0.3536i
-0.3536 + 0.0000i
 0.0000 + 0.3536i
ans(:, :, 15, 1) =
       0.3536
 0.2500 - 0.2500i
-0.0000 - 0.3536i
-0.2500 - 0.2500i
       0.3536
 0.2500 - 0.2500i
-0.0000 - 0.3536i
-0.2500 - 0.2500i
ans(:, :, 1, 3) =
       0.3536
       0.3536
       0.3536
       0.3536
      -0.3536
      -0.3536
      -0.3536
      -0.3536
ans(:, :, 3, 3) =
       0.3536
 0.2500 + 0.2500i
 0.0000 + 0.3536i
-0.2500 + 0.2500i
      -0.3536
-0.2500 - 0.2500i
-0.0000 - 0.3536i
 0.2500 - 0.2500i
ans(:, :, 5, 3) =
       0.3536
 0.0000 + 0.3536i
-0.3536 + 0.0000i
-0.0000 - 0.3536i
      -0.3536
-0.0000 - 0.3536i
 0.3536 - 0.0000i
 0.0000 + 0.3536i
ans(:, :, 7, 3) =
       0.3536
-0.2500 + 0.2500i
-0.0000 - 0.3536i
 0.2500 + 0.2500i
      -0.3536
 0.2500 - 0.2500i
 0.0000 + 0.3536i
-0.2500 - 0.2500i
ans(:, :, 9, 3) =
       0.3536
-0.3536 + 0.0000i
 0.3536 - 0.0000i
-0.3536 + 0.0000i
```

```
-0.3536
 0.3536 - 0.0000i
-0.3536 + 0.0000i
 0.3536 - 0.0000i
ans(:, :, 11, 3) =
       0.3536
-0.2500 - 0.2500i
 0.0000 + 0.3536i
 0.2500 - 0.2500i
      -0.3536
 0.2500 + 0.2500i
-0.0000 - 0.3536i
-0.2500 + 0.2500i
ans(:, :, 13, 3) =
       0.3536
-0.0000 - 0.3536i
-0.3536 + 0.0000i
 0.0000 + 0.3536i
      -0.3536
 0.0000 + 0.3536i
 0.3536 - 0.0000i
-0.0000 - 0.3536i
ans(:, :, 15, 3) =
       0.3536
 0.2500 - 0.2500i
-0.0000 - 0.3536i
-0.2500 - 0.2500i
      -0.3536
-0.2500 + 0.2500i
 0.0000 + 0.3536i
 0.2500 + 0.2500i
```

As described above, in PUCCH 1-1 sub-mode 2, the subset of the first codebook and the subset of the second codebook for rank 1 may be variuosly determined and thus, the overall codebook may also be determined to be different from Table 1.

(2) For Rank 2:

For example, when the subset of the first codebook includes three bits and the subset of the second codebook includes a single bit, the subset of the first codebook may include ans(:,:,n=1), ans(:,:,n=3), ans(:,:,n=5), ans(:,:,n=7), ans(:,:,n=9), ans(:,:,n=11), ans(:,:,n=13), and ans(:,:,n=15) that are described above. Detailed digits of codewords included in the subset of the first codebook are described above. The subset of the second codebook may include (:,:,n=1) and (:,:,n=2) for rank 2 that are described above.

That is, the codewords included in the subset of the second codebook may be expressed as follows:

```
(:, :, 1) =

0.5000        0.5000
0             0
0             0
0             0
0.5000       -0.5000
0             0
0             0
0             0

(:, :, 2) =

0.5000        0.5000
0             0
0             0
0             0
0 + 0.5000i   0 - 0.5000i
0             0
0             0
0             0
```

The combination of the first precoding matrix indicator selected from the subset of the first codebook and the second precoding matrix indicator selected from the subset of the second codebook may indicate one of precoding matrix candidates disclosed in the following overall codebook.

ans(:, :, 1, 1) =

| | |
|---|---|
| 0.2500 | 0.2500 |
| 0.2500 | 0.2500 |
| 0.2500 | 0.2500 |
| 0.2500 | 0.2500 |
| 0.2500 | −0.2500 |
| 0.2500 | −0.2500 |
| 0.2500 | −0.2500 |
| 0.2500 | −0.2500 | ans(:, :, 3, 1) =

| | |
|---|---|
| 0.2500 | 0.2500 |
| 0.1768 + 0.1768i | 0.1768 + 0.1768i |
| 0.0000 + 0.2500i | 0.0000 + 0.2500i |
| −0.1768 + 0.1768i | −0.1768 + 0.1768i |
| 0.2500 | −0.2500 |
| 0.1768 + 0.1768i | −0.1768 − 0.1768i |
| 0.0000 + 0.2500i | −0.0000 − 0.2500i |
| −0.1768 + 0.1768i | 0.1768 − 0.1768i | ans(:, :, 5, 1) =

| | |
|---|---|
| 0.2500 | 0.2500 |
| 0.0000 + 0.2500i | 0.0000 + 0.2500i |
| −0.2500 + 0.0000i | −0.2500 + 0.0000i |
| −0.0000 − 0.2500i | −0.0000 − 0.2500i |
| 0.2500 | −0.2500 |
| 0.0000 + 0.2500i | −0.0000 − 0.2500i |
| −0.2500 + 0.0000i | 0.2500 − 0.0000i |
| −0.0000 − 0.2500i | 0.0000 + 0.2500i | ans(:, :, 7, 1) =

| | |
|---|---|
| 0.2500 | 0.2500 |
| −0.1768 + 0.1768i | −0.1768 + 0.1768i |
| −0.0000 − 0.2500i | −0.0000 − 0.2500i |
| 0.1768 + 0.1768i | 0.1768 + 0.1768i |
| 0.2500 | −0.2500 |
| −0.1768 + 0.1768i | 0.1768 − 0.1768i |
| −0.0000 − 0.2500i | 0.0000 + 0.2500i |
| 0.1768 + 0.1768i | −0.1768 − 0.1768i | ans(:, :, 9, 1) =

| | |
|---|---|
| 0.2500 | 0.2500 |
| −0.2500 + 0.0000i | −0.2500 + 0.0000i |
| 0.2500 − 0.0000i | 0.2500 + 0.0000i |
| −0.2500 + 0.0000i | −0.2500 + 0.0000i |
| 0.2500 | −0.2500 |
| −0.2500 + 0.0000i | 0.2500 − 0.0000i |
| 0.2500 − 0.0000i | −0.2500 − 0.0000i |
| −0.2500 + 0.0000i | 0.2500 − 0.0000i | ans(:, :, 11, 1) =

| | |
|---|---|
| 0.2500 | 0.2500 |
| −0.1768 − 0.1768i | −0.1768 − 0.1768i |
| 0.0000 + 0.2500i | 0.0000 + 0.2500i |
| 0.1768 − 0.1768i | 0.1768 − 0.1768i |
| 0.2500 | −0.2500 |
| −0.1768 − 0.1768i | 0.1768 + 0.1768i |
| 0.0000 + 0.2500i | −0.0000 − 0.2500i |
| 0.1768 − 0.1768i | −0.1768 + 0.1768i | ans(:, :, 13, 1) =

| | |
|---|---|
| 0.2500 | 0.2500 |
| −0.0000 − 0.2500i | −0.0000 − 0.2500i |
| −0.2500 + 0.0000i | −0.2500 + 0.0000i |
| 0.0000 + 0.2500i | 0.0000 + 0.2500i |
| 0.2500 | −0.2500 |
| −0.0000 − 0.2500i | 0.0000 + 0.2500i |
| −0.2500 + 0.0000i | 0.2500 − 0.0000i |
| 0.0000 + 0.2500i | −0.0000 − 0.2500i | ans(:, :, 15, 1) =

| | |
|---|---|
| 0.2500 | 0.2500 |
| 0.1768 − 0.1768i | 0.1768 − 0.1768i |

-continued

| | |
|---|---|
| −0.0000 − 0.2500i | −0.0000 − 0.2500i |
| −0.1768 − 0.1768i | −0.1768 − 0.1768i |
| 0.2500 | −0.2500 |
| 0.1768 − 0.1768i | −0.1768 + 0.1768i |
| −0.0000 − 0.2500i | 0.0000 + 0.2500i |
| −0.1768 − 0.1768i | 0.1768 + 0.1768i | ans(:, :, 1, 2) =

| | |
|---|---|
| 0.2500 | 0.2500 |
| 0.2500 | 0.2500 |
| 0.2500 | 0.2500 |
| 0.2500 | 0.2500 |
| 0 + 0.2500i | 0 − 0.2500i |
| 0 + 0.2500i | 0 − 0.2500i |
| 0 + 0.2500i | 0 − 0.2500i |
| 0 + 0.2500i | 0 − 0.2500i | ans(:, :, 3, 2) =

| | |
|---|---|
| 0.2500 | 0.2500 |
| 0.1768 + 0.1768i | 0.1768 + 0.1768i |
| 0.0000 + 0.2500i | 0.0000 + 0.2500i |
| −0.1768 + 0.1768i | −0.1768 + 0.1768i |
| 0 + 0.2500i | 0 − 0.2500i |
| −0.1768 + 0.1768i | 0.1768 − 0.1768i |
| −0.2500 + 0.0000i | 0.2500 − 0.0000i |
| −0.1768 − 0.1768i | 0.1768 + 0.1768i | ans(:, :, 5, 2) =

| | |
|---|---|
| 0.2500 | 0.2500 |
| 0.0000 + 0.2500i | 0.0000 + 0.2500i |
| −0.2500 + 0.0000i | −0.2500 + 0.0000i |
| −0.0000 − 0.2500i | −0.0000 − 0.2500i |
| 0 + 0.2500i | 0 − 0.2500i |
| −0.2500 + 0.0000i | 0.2500 − 0.0000i |
| −0.0000 − 0.2500i | 0.0000 + 0.2500i |
| 0.2500 − 0.0000i | −0.2500 + 0.0000i | ans(:, :, 7, 2) =

| | |
|---|---|
| 0.2500 | 0.2500 |
| −0.1768 + 0.1768i | −0.1768 + 0.1768i |
| −0.0000 − 0.2500i | −0.0000 − 0.2500i |
| 0.1768 + 0.1768i | 0.1768 + 0.1768i |
| 0 + 0.2500i | 0 − 0.2500i |
| −0.1768 + 0.1768i | 0.1768 − 0.1768i |
| 0.2500 − 0.0000i | −0.2500 + 0.0000i |
| −0.1768 + 0.1768i | 0.1768 − 0.1768i | ans(:, :, 9, 2) =

| | |
|---|---|
| 0.2500 | 0.2500 |
| −0.2500 + 0.0000i | −0.2500 + 0.0000i |
| 0.2500 − 0.0000i | 0.2500 − 0.0000i |
| −0.2500 + 0.0000i | −0.2500 + 0.0000i |
| 0 + 0.2500i | 0 − 0.2500i |
| −0.0000 − 0.2500i | 0.0000 + 0.2500i |
| 0.0000 + 0.2500i | −0.0000 − 0.2500i |
| −0.0000 − 0.2500i | 0.0000 + 0.2500i | ans(:, :, 11, 2) =

| | |
|---|---|
| 0.2500 | 0.2500 |
| −0.1768 − 0.1768i | −0.1768 − 0.1768i |
| 0.0000 + 0.2500i | 0.0000 + 0.2500i |
| 0.1768 − 0.1768i | 0.1768 − 0.1768i |
| 0 + 0.2500i | 0 − 0.2500i |
| 0.1768 − 0.1768i | −0.1768 + 0.1768i |
| −0.2500 + 0.0000i | 0.2500 − 0.0000i |
| 0.1768 + 0.1768i | −0.1768 − 0.1768i | ans(:, :, 13, 2) =

| | |
|---|---|
| 0.2500 | 0.2500 |
| −0.0000 − 0.2500i | −0.0000 − 0.2500i |
| −0.2500 + 0.0000i | −0.2500 + 0.0000i |
| 0.0000 + 0.2500i | 0.0000 + 0.2500i |
| 0 + 0.2500i | 0 − 0.2500i |
| 0.2500 − 0.0000i | −0.2500 + 0.0000i |
| −0.0000 − 0.2500i | 0.0000 + 0.2500i |
| −0.2500 + 0.0000i | 0.2500 − 0.0000i |

251
-continued ans(:, :, 15, 2) =

| | |
|---|---|
| 0.2500 | 0.2500 |
| 0.1768 − 0.1768i | 0.1768 − 0.1768i |
| −0.0000 − 0.2500i | −0.0000 − 0.2500i |
| −0.1768 − 0.1768i | −0.1768 − 0.1768i |
| 0 + 0.2500i | 0 − 0.2500i |
| 0.1768 + 0.1768i | −0.1768 − 0.1768i |
| 0.2500 − 0.0000i | −0.2500 + 0.0000i |
| 0.1768 − 0.1768i | −0.1768 + 0.1768i |

Figure 5:
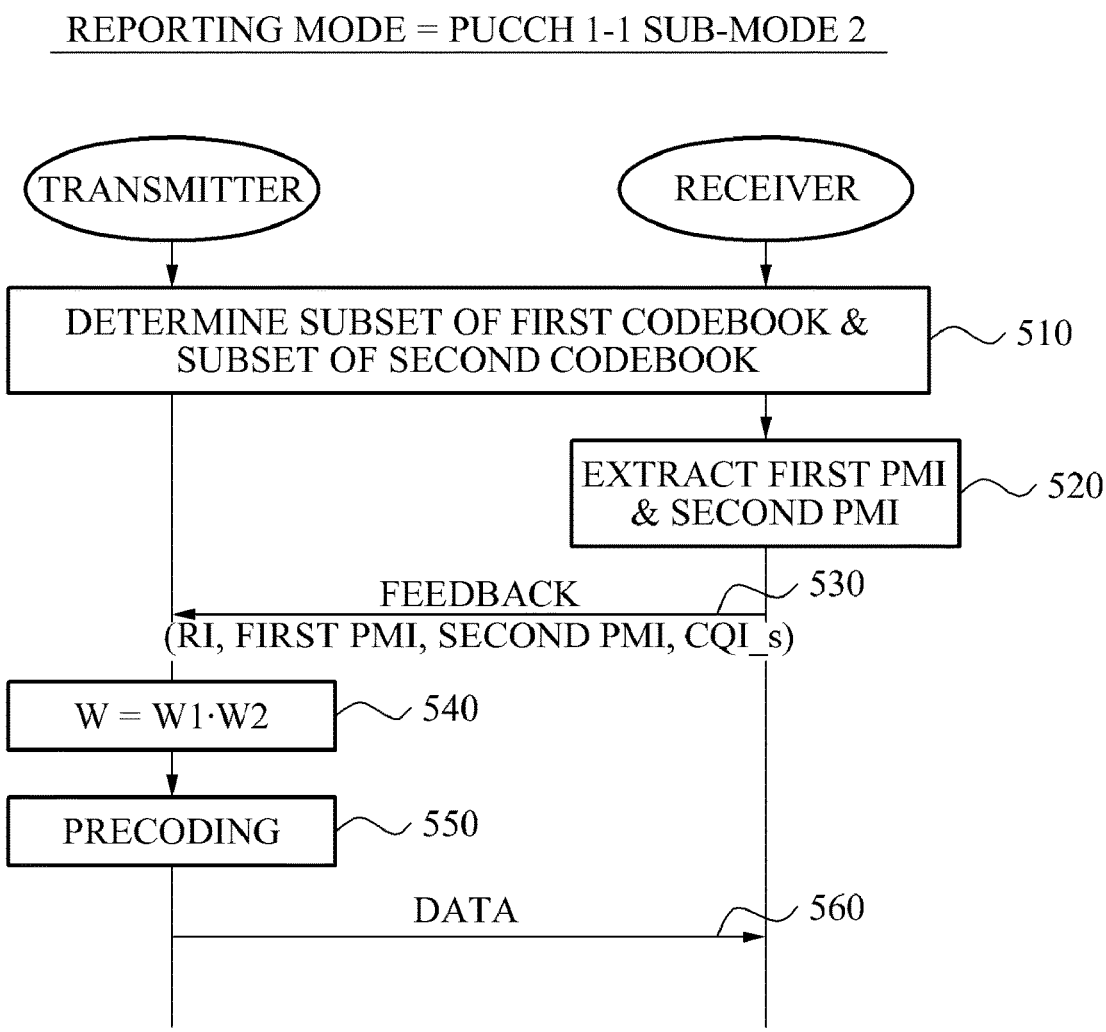
FIG. 5 is a diagram illustrating an example of a communication method of a receiver and a transmitter that operate in a physical uplink control channel (PUCCH) 1-1 sub-mode 2.

FIG. 5 illustrates an example of a communication method of a transmitter and a receiver that operate in PUCCH 1-1 sub-mode 2.

At 510, the transmitter and the receiver may determine a subset of a first codebook and a subset of a second codebook that are described above. The subset of the first codebook and the subset of the second codebook may be individually stored in the transmitter and the receiver. The overall codebook in which the subset of the first codebook and the subset of the second codebook are integrated may be stored in the transmitter and the receiver.

At 520, the receiver may select a single codeword from the subset of the first codebook or the overall codebook and extract the selected codeword as a first precoding matrix indicator, and may select a single codeword from the subset of the second codebook or the overall codebook and extract the selected codeword as the second precoding matrix indicator.

At 530, the receiver may feed back the first precoding matrix indicator and the second precoding matrix indicator to the transmitter. The receiver may further feed back a rank indicator and CQI_s.

At 540, the transmitter may calculate W by performing inner product between $W_1$ and $W_2$. $W_1$ may be present in the subset of the first codebook and be indicated by the first precoding matrix indicator, and $W_2$ may be present in the subset of the second codebook and be indicated by the second precoding matrix indicator.

At 550, the transmitter may precode a data stream based on the precoding matrix W. At 560, the transmitter may transmit data.

2. Subset of First Codebook and Subset of Second Codebook in PUCCH 2-1 Sub-Mode 1, 2:

(1) For Rank 2:

For example, the subset of the first codebook may include ans(:,:,n=1), ans(:,:,n=2), ans(:,:,n=3), . . . , ans(:,:,n=16) for rank 2 that are described above.

The subset of the second codebook may include (:,:, n=1), (:,:, n=3), (:,:, n=5), and (:,:, n=7) for rank 2 that are described above. That is, detailed codewords of the subset of the second codebook may be expressed as follows:

(:, :, 1) =

| | |
|---|---|
| 0.5000 | 0.5000 |
| 0 | 0 |
| 0 | 0 |
| 0 | 0 |
| 0.5000 | −0.5000 |
| 0 | 0 |
| 0 | 0 |
| 0 | 0 |

(:, :, 3) =

| | |
|---|---|
| 0 | 0 |
| 0.5000 | 0.5000 |

252
-continued

| | |
|---|---|
| 0 | 0 |
| 0 | 0 |
| 0 | 0 |
| 0.5000 | −0.5000 |
| 0 | 0 |
| 0 | 0 |

(:, :, 5) =

| | |
|---|---|
| 0 | 0 |
| 0 | 0 |
| 0.5000 | 0.5000 |
| 0 | 0 |
| 0 | 0 |
| 0 | 0 |
| 0.5000 | −0.5000 |
| 0 | 0 |

(:, :, 7) =

| | |
|---|---|
| 0 | 0 |
| 0 | 0 |
| 0 | 0 |
| 0.5000 | 0.5000 |
| 0 | 0 |
| 0 | 0 |
| 0 | 0 |
| 0.5000 | −0.5000 |

The combination of the first precoding matrix indicator selected from the subset of the first codebook and the second precoding matrix indicator selected from the subset of the second codebook may indicate one of precoding matrix candidates disclosed in the following overall codebook.

ans(:, :, 1, 1) =

| | |
|---|---|
| 0.2500 | 0.2500 |
| 0.2500 | 0.2500 |
| 0.2500 | 0.2500 |
| 0.2500 | 0.2500 |
| 0.2500 | −0.2500 |
| 0.2500 | −0.2500 |
| 0.2500 | −0.2500 |
| 0.2500 | −0.2500 | ans(:, :, 2, 1) =

| | |
|---|---|
| 0.2500 | 0.2500 |
| 0.2310 + 0.0957i | 0.2310 + 0.0957i |
| 0.1768 + 0.1768i | 0.1768 + 0.1768i |
| 0.0957 + 0.2310i | 0.0957 + 0.2310i |
| 0.2500 | −0.2500 |
| 0.2310 + 0.0957i | −0.2310 − 0.0957i |
| 0.1768 + 0.1768i | −0.1768 − 0.1768i |
| 0.0957 + 0.2310i | −0.0957 − 0.2310i | ans(:, :, 3, 1) =

| | |
|---|---|
| 0.2500 | 0.2500 |
| 0.1768 + 0.1768i | 0.1768 + 0.1768i |
| 0.0000 + 0.2500i | 0.0000 + 0.2500i |
| −0.1768 + 0.1768i | −0.1768 + 0.1768i |
| 0.2500 | −0.2500 |
| 0.1768 + 0.1768i | −0.1768 − 0.1768i |
| 0.0000 + 0.2500i | −0.0000 − 0.2500i |
| −0.1768 + 0.1768i | 0.1768 − 0.1768i | ans(:, :, 4, 1) =

| | |
|---|---|
| 0.2500 | 0.2500 |
| 0.0957 + 0.2310i | 0.0957 + 0.2310i |
| −0.1768 + 0.1768i | −0.1768 + 0.1768i |
| −0.2310 − 0.0957i | −0.2310 − 0.0957i |
| 0.2500 | −0.2500 |
| 0.0957 + 0.2310i | −0.0957 − 0.2310i |
| −0.1768 + 0.1768i | 0.1768 − 0.1768i |
| −0.2310 − 0.0957i | 0.2310 + 0.0957i |

-continued ans(:, :, 5, 1) =

| 0.2500 | 0.2500 |
| 0.0000 + 0.2500i | 0.0000 + 0.2500i |
| −0.2500 + 0.0000i | −0.2500 + 0.0000i |
| −0.0000 − 0.2500i | −0.0000 − 0.2500i |
| 0.2500 | −0.2500 |
| 0.0000 + 0.2500i | −0.0000 − 0.2500i |
| −0.2500 + 0.0000i | 0.2500 − 0.0000i |
| −0.0000 − 0.2500i | 0.0000 + 0.2500i | ans(:, :, 6, 1) =

| 0.2500 | 0.2500 |
| −0.0957 + 0.2310i | −0.0957 + 0.2310i |
| −0.1768 − 0.1768i | −0.1768 − 0.1768i |
| 0.2310 − 0.0957i | 0.2310 − 0.0957i |
| 0.2500 | −0.2500 |
| −0.0957 + 0.2310i | 0.0957 − 0.2310i |
| −0.1768 − 0.1768i | 0.1768 + 0.1768i |
| 0.2310 − 0.0957i | −0.2310 + 0.0957i | ans(:, :, 7, 1) =

| 0.2500 | 0.2500 |
| −0.1768 + 0.1768i | −0.1768 + 0.1768i |
| −0.0000 − 0.2500i | −0.0000 − 0.2500i |
| 0.1768 + 0.1768i | 0.1768 + 0.1768i |
| 0.2500 | −0.2500 |
| −0.1768 + 0.1768i | 0.1768 − 0.1768i |
| −0.0000 − 0.2500i | 0.0000 + 0.2500i |
| 0.1768 + 0.1768i | −0.1768 − 0.1768i | ans(:, :, 8, 1) =

| 0.2500 | 0.2500 |
| −0.2310 + 0.0957i | −0.2310 + 0.0957i |
| 0.1768 − 0.1768i | 0.1768 − 0.1768i |
| −0.0957 + 0.2310i | −0.0957 + 0.2310i |
| 0.2500 | −0.2500 |
| −0.2310 + 0.0957i | 0.2310 − 0.0957i |
| 0.1768 − 0.1768i | −0.1768 + 0.1768i |
| −0.0957 + 0.2310i | 0.0957 − 0.2310i | ans(:, :, 9, 1) =

| 0.2500 | 0.2500 |
| −0.2500 + 0.0000i | −0.2500 + 0.0000i |
| 0.2500 − 0.0000i | 0.2500 − 0.0000i |
| −0.2500 + 0.0000i | −0.2500 + 0.0000i |
| 0.2500 | −0.2500 |
| −0.2500 + 0.0000i | 0.2500 − 0.0000i |
| 0.2500 − 0.0000i | −0.2500 + 0.0000i |
| −0.2500 + 0.0000i | 0.2500 − 0.0000i | ans(:, :, 10, 1) =

| 0.2500 | 0.2500 |
| −0.2310 − 0.0957i | −0.2310 − 0.0957i |
| 0.1768 + 0.1768i | 0.1768 + 0.1768i |
| −0.0957 − 0.2310i | −0.0957 − 0.2310i |
| 0.2500 | −0.2500 |
| −0.2310 − 0.0957i | 0.2310 + 0.0957i |
| 0.1768 + 0.1768i | −0.1768 − 0.1768i |
| −0.0957 − 0.2310i | 0.0957 + 0.2310i | ans(:, :, 11, 1) =

| 0.2500 | 0.2500 |
| −0.1768 − 0.1768i | −0.1768 − 0.1768i |
| 0.0000 + 0.2500i | 0.0000 + 0.2500i |
| 0.1768 − 0.1768i | 0.1768 − 0.1768i |
| 0.2500 | −0.2500 |
| −0.1768 − 0.1768i | 0.1768 + 0.1768i |
| 0.0000 + 0.2500i | −0.0000 − 0.2500i |
| 0.1768 − 0.1768i | −0.1768 + 0.1768i | ans(:, :, 12, 1) =

| 0.2500 | 0.2500 |
| −0.0957 − 0.2310i | −0.0957 − 0.2310i |
| −0.1768 + 0.1768i | −0.1768 + 0.1768i |
| 0.2310 + 0.0957i | 0.2310 + 0.0957i |
| 0.2500 | −0.2500 |
| −0.0957 − 0.2310i | 0.0957 + 0.2310i |
| −0.1768 + 0.1768i | 0.1768 − 0.1768i |
| 0.2310 + 0.0957i | −0.2310 − 0.0957i | ans(:, :, 13, 1) =

| 0.2500 | 0.2500 |
| −0.0000 − 0.2500i | −0.0000 − 0.2500i |
| −0.2500 + 0.0000i | −0.2500 + 0.0000i |
| 0.0000 + 0.2500i | 0.0000 + 0.2500i |
| 0.2500 | −0.2500 |
| −0.0000 − 0.2500i | 0.0000 + 0.2500i |
| −0.2500 + 0.0000i | 0.2500 − 0.0000i |
| 0.0000 + 0.2500i | −0.0000 − 0.2500i | ans(:, :, 14, 1) =

| 0.2500 | 0.2500 |
| 0.0957 − 0.2310i | 0.0957 − 0.2310i |
| −0.1768 − 0.1768i | −0.1768 − 0.1768i |
| −0.2310 + 0.0957i | −0.2310 + 0.0957i |
| 0.2500 | −0.2500 |
| 0.0957 − 0.2310i | −0.0957 + 0.2310i |
| −0.1768 − 0.1768i | 0.1768 + 0.1768i |
| −0.2310 + 0.0957i | 0.2310 − 0.0957i | ans(:, :, 15, 1) =

| 0.2500 | 0.2500 |
| 0.1768 − 0.1768i | 0.1768 − 0.1768i |
| −0.0000 − 0.2500i | −0.0000 − 0.2500i |
| −0.1768 − 0.1768i | −0.1768 − 0.1768i |
| 0.2500 | −0.2500 |
| 0.1768 − 0.1768i | −0.1768 + 0.1768i |
| −0.0000 − 0.2500i | 0.0000 + 0.2500i |
| −0.1768 − 0.1768i | 0.1768 + 0.1768i | ans(:, :, 16, 1) =

| 0.2500 | 0.2500 |
| 0.2310 − 0.0957i | 0.2310 − 0.0957i |
| 0.1768 − 0.1768i | 0.1768 − 0.1768i |
| 0.0957 − 0.2310i | 0.0957 − 0.2310i |
| 0.2500 | −0.2500 |
| 0.2310 − 0.0957i | −0.2310 + 0.0957i |
| 0.1768 − 0.1768i | −0.1768 + 0.1768i |
| 0.0957 − 0.2310i | −0.0957 + 0.2310i | ans(:, :, 1, 3) =

| 0.2500 | 0.2500 |
| 0.2452 + 0.0488i | 0.2452 + 0.0488i |
| 0.2310 + 0.0957i | 0.2310 + 0.0957i |
| 0.2079 + 0.1389i | 0.2079 + 0.1389i |
| 0.2500 | −0.2500 |
| 0.2452 + 0.0488i | −0.2452 − 0.0488i |
| 0.2310 + 0.0957i | −0.2310 − 0.0957i |
| 0.2079 + 0.1389i | −0.2079 − 0.1389i | ans(:, :, 2, 3) =

| 0.2500 | 0.2500 |
| 0.2079 + 0.1389i | 0.2079 + 0.1389i |
| 0.0957 + 0.2310i | 0.0957 + 0.2310i |
| −0.0488 + 0.2452i | −0.0488 + 0.2452i |
| 0.2500 | −0.2500 |
| 0.2079 + 0.1389i | −0.2079 − 0.1389i |
| 0.0957 + 0.2310i | −0.0957 − 0.2310i |
| −0.0488 + 0.2452i | 0.0488 − 0.2452i | ans(:, :, 3, 3) =

| 0.2500 | 0.2500 |
| 0.1389 + 0.2079i | 0.1389 + 0.2079i |
| −0.0957 + 0.2310i | −0.0957 + 0.2310i |
| −0.2452 + 0.0488i | −0.2452 + 0.0488i |
| 0.2500 | −0.2500 |
| 0.1389 + 0.2079i | −0.1389 − 0.2079i |
| −0.0957 + 0.2310i | 0.0957 − 0.2310i |
| −0.2452 + 0.0488i | 0.2452 − 0.0488i | ans(:, :, 4, 3) =

| 0.2500 | 0.2500 |
| 0.0488 + 0.2452i | 0.0488 + 0.2452i |
| −0.2310 + 0.0957i | −0.2310 + 0.0957i |
| −0.1389 − 0.2079i | −0.1389 − 0.2079i |
| 0.2500 | −0.2500 |

-continued

```
       0.0488 + 0.2452i        -0.0488 - 0.2452i
      -0.2310 + 0.0957i         0.2310 - 0.0957i
      -0.1389 - 0.2079i         0.1389 + 0.2079i
                  ans(:, :, 5, 3) =
            0.2500                     0.2500
      -0.0488 + 0.2452i        -0.0488 + 0.2452i
      -0.2310 - 0.0957i        -0.2310 - 0.0957i
       0.1389 - 0.2079i         0.1389 - 0.2079i
            0.2500                    -0.2500
      -0.0488 + 0.2452i         0.0488 - 0.2452i
      -0.2310 - 0.0957i         0.2310 + 0.0957i
       0.1389 - 0.2079i        -0.1389 + 0.2079i
                  ans(:, :, 6, 3) =
            0.2500                     0.2500
      -0.1389 + 0.2079i        -0.1389 + 0.2079i
      -0.0957 - 0.2310i        -0.0957 - 0.2310i
       0.2452 + 0.0488i         0.2452 + 0.0488i
            0.2500                    -0.2500
      -0.1389 + 0.2079i         0.1389 - 0.2079i
      -0.0957 - 0.2310i         0.0957 + 0.2310i
       0.2452 + 0.0488i        -0.2452 - 0.0488i
                  ans(:, :, 7, 3) =
            0.2500                     0.2500
      -0.2079 + 0.1389i        -0.2079 + 0.1389i
       0.0957 - 0.2310i         0.0957 - 0.2310i
       0.0488 + 0.2452i         0.0488 + 0.2452i
            0.2500                    -0.2500
      -0.2079 + 0.1389i         0.2079 - 0.1389i
       0.0957 - 0.2310i        -0.0957 + 0.2310i
       0.0488 + 0.2452i        -0.0488 - 0.2452i
                  ans(:, :, 8, 3) =
            0.2500                     0.2500
      -0.2452 + 0.0488i        -0.2452 + 0.0488i
       0.2310 - 0.0957i         0.2310 - 0.0957i
      -0.2079 + 0.1389i        -0.2079 + 0.1389i
            0.2500                    -0.2500
      -0.2452 + 0.0488i         0.2452 - 0.0488i
       0.2310 - 0.0957i        -0.2310 + 0.0957i
      -0.2079 + 0.1389i         0.2079 - 0.1389i
                  ans(:, :, 9, 3) =
            0.2500                     0.2500
      -0.2452 - 0.0488i        -0.2452 - 0.0488i
       0.2310 + 0.0957i         0.2310 + 0.0957i
      -0.2079 - 0.1389i        -0.2079 - 0.1389i
            0.2500                    -0.2500
      -0.2452 - 0.0488i         0.2452 + 0.0488i
       0.2310 + 0.0957i        -0.2310 - 0.0957i
      -0.2079 - 0.1389i         0.2079 + 0.1389i
                  ans(:, :, 10, 3) =
            0.2500                     0.2500
      -0.2079 - 0.1389i        -0.2079 - 0.1389i
       0.0957 + 0.2310i         0.0957 + 0.2310i
       0.0488 - 0.2452i         0.0488 - 0.2452i
            0.2500                    -0.2500
      -0.2079 - 0.1389i         0.2079 + 0.1389i
       0.0957 + 0.2310i        -0.0957 - 0.2310i
       0.0488 - 0.2452i        -0.0488 + 0.2452i
                  ans(:, :, 11, 3) =
            0.2500                     0.2500
      -0.1389 - 0.2079i        -0.1389 - 0.2079i
      -0.0957 + 0.2310i        -0.0957 + 0.2310i
       0.2452 - 0.0488i         0.2452 - 0.0488i
            0.2500                    -0.2500
      -0.1389 - 0.2079i         0.1389 + 0.2079i
      -0.0957 + 0.2310i         0.0957 - 0.2310i
       0.2452 - 0.0488i        -0.2452 + 0.0488i
                  ans(:, :, 12, 3) =
            0.2500                     0.2500
      -0.0488 - 0.2452i        -0.0488 - 0.2452i
      -0.2310 + 0.0957i        -0.2310 + 0.0957i
       0.1389 + 0.2079i         0.1389 + 0.2079i
```

-continued

```
            0.2500                    -0.2500
      -0.0488 - 0.2452i         0.0488 + 0.2452i
      -0.2310 + 0.0957i         0.2310 - 0.0957i
       0.1389 + 0.2079i        -0.1389 - 0.2079i
                  ans(:, :, 13, 3) =
            0.2500                     0.2500
       0.0488 - 0.2452i         0.0488 - 0.2452i
      -0.2310 - 0.0957i        -0.2310 - 0.0957i
      -0.1389 - 0.2079i        -0.1389 - 0.2079i
            0.2500                    -0.2500
       0.0488 - 0.2452i        -0.0488 + 0.2452i
      -0.2310 - 0.0957i         0.2310 + 0.0957i
      -0.1389 - 0.2079i         0.1389 + 0.2079i
                  ans(:, :, 14, 3) =
            0.2500                     0.2500
       0.1389 - 0.2079i         0.1389 - 0.2079i
      -0.0957 - 0.2310i        -0.0957 - 0.2310i
      -0.2452 - 0.0488i        -0.2452 - 0.0488i
            0.2500                    -0.2500
       0.1389 - 0.2079i        -0.1389 + 0.2079i
      -0.0957 - 0.2310i         0.0957 + 0.2310i
      -0.2452 - 0.0488i         0.2452 + 0.0488i
                  ans(:, :, 15, 3) =
            0.2500                     0.2500
       0.2079 - 0.1389i         0.2079 - 0.1389i
       0.0957 - 0.2310i         0.0957 - 0.2310i
      -0.0488 - 0.2452i        -0.0488 - 0.2452i
            0.2500                    -0.2500
       0.2079 - 0.1389i        -0.2079 + 0.1389i
       0.0957 - 0.2310i        -0.0957 + 0.2310i
      -0.0488 - 0.2452i         0.0488 + 0.2452i
                  ans(:, :, 16, 3) =
            0.2500                     0.2500
       0.2452 - 0.0488i         0.2452 - 0.0488i
       0.2310 - 0.0957i         0.2310 - 0.0957i
       0.2079 - 0.1389i         0.2079 - 0.1389i
            0.2500                    -0.2500
       0.2452 - 0.0488i        -0.2452 + 0.0488i
       0.2310 - 0.0957i        -0.2310 + 0.0957i
       0.2079 - 0.1389i        -0.2079 + 0.1389i
                  ans(:, :, 1, 5) =
            0.2500                     0.2500
       0.2310 + 0.0957i         0.2310 + 0.0957i
       0.1768 + 0.1768i         0.1768 + 0.1768i
       0.0957 + 0.2310i         0.0957 + 0.2310i
            0.2500                    -0.2500
       0.2310 + 0.0957i        -0.2310 - 0.0957i
       0.1768 + 0.1768i        -0.1768 - 0.1768i
       0.0957 + 0.2310i        -0.0957 - 0.2310i
                  ans(:, :, 2, 5) =
            0.2500                     0.2500
       0.1768 + 0.1768i         0.1768 + 0.1768i
       0.0000 + 0.2500i         0.0000 + 0.2500i
      -0.1768 + 0.1768i        -0.1768 + 0.1768i
            0.2500                    -0.2500
       0.1768 + 0.1768i        -0.1768 - 0.1768i
       0.0000 + 0.2500i        -0.0000 - 0.2500i
      -0.1768 + 0.1768i         0.1768 - 0.1768i
                  ans(:, :, 3, 5) =
            0.2500                     0.2500
       0.0957 + 0.2310i         0.0957 + 0.2310i
      -0.1768 + 0.1768i        -0.1768 + 0.1768i
      -0.2310 - 0.0957i        -0.2310 - 0.0957i
            0.2500                    -0.2500
       0.0957 + 0.2310i        -0.0957 - 0.2310i
      -0.1768 + 0.1768i         0.1768 - 0.1768i
      -0.2310 - 0.0957i         0.2310 + 0.0957i
                  ans(:, :, 4, 5) =
            0.2500                     0.2500
       0.0000 + 0.2500i         0.0000 + 0.2500i
      -0.2500 + 0.0000i        -0.2500 + 0.0000i
```

```
                -0.0000 - 0.2500i            -0.0000 - 0.2500i
                 0.2500                      -0.2500
                 0.0000 + 0.2500i            -0.0000 - 0.2500i
                -0.2500 + 0.0000i             0.2500 - 0.0000i
                -0.0000 - 0.2500i             0.0000 + 0.2500i
                         ans(:, :, 5, 5) =

0.2500                       0.2500
                -0.0957 + 0.2310i            -0.0957 + 0.2310i
                -0.1768 - 0.1768i            -0.1768 - 0.1768i
                 0.2310 - 0.0957i             0.2310 - 0.0957i
                 0.2500                      -0.2500
                -0.0957 + 0.2310i             0.0957 - 0.2310i
                -0.1768 - 0.1768i             0.1768 + 0.1768i
                 0.2310 - 0.0957i            -0.2310 + 0.0957i
                         ans(:, :, 6, 5) =

0.2500                       0.2500
                -0.1768 + 0.1768i            -0.1768 + 0.1768i
                -0.0000 - 0.2500i            -0.0000 - 0.2500i
                 0.1768 + 0.1768i             0.1768 + 0.1768i
                 0.2500                      -0.2500
                -0.1768 + 0.1768i             0.1768 - 0.1768i
                -0.0000 - 0.2500i             0.0000 + 0.2500i
                 0.1768 + 0.1768i            -0.1768 - 0.1768i
                         ans(:, :, 7, 5) =

0.2500                       0.2500
                -0.2310 + 0.0957i            -0.2310 + 0.0957i
                 0.1768 - 0.1768i             0.1768 - 0.1768i
                -0.0957 + 0.2310i            -0.0957 + 0.2310i
                 0.2500                      -0.2500
                -0.2310 + 0.0957i             0.2310 - 0.0957i
                 0.1768 - 0.1768i            -0.1768 + 0.1768i
                -0.0957 + 0.2310i             0.0957 - 0.2310i
                         ans(:, :, 8, 5) =

0.2500                       0.2500
                -0.2500 + 0.0000i            -0.2500 + 0.0000i
                 0.2500 - 0.0000i             0.2500 - 0.0000i
                -0.2500 + 0.0000i            -0.2500 + 0.0000i
                 0.2500                      -0.2500
                -0.2500 + 0.0000i             0.2500 - 0.0000i
                 0.2500 - 0.0000i            -0.2500 + 0.0000i
                -0.2500 + 0.0000i             0.2500 - 0.0000i
                         ans(:, :, 9, 5) =

0.2500                       0.2500
                -0.2310 - 0.0957i            -0.2310 - 0.0957i
                 0.1768 + 0.1768i             0.1768 + 0.1768i
                -0.0957 - 0.2310i            -0.0957 - 0.2310i
                 0.2500                      -0.2500
                -0.2310 - 0.0957i             0.2310 + 0.0957i
                 0.1768 + 0.1768i            -0.1768 - 0.1768i
                -0.0957 - 0.2310i             0.0957 + 0.2310i
                         ans(:, :, 10, 5) =

0.2500                       0.2500
                -0.1768 - 0.1768i            -0.1768 - 0.1768i
                 0.0000 + 0.2500i             0.0000 + 0.2500i
                 0.1768 - 0.1768i             0.1768 - 0.1768i
                 0.2500                      -0.2500
                -0.1768 - 0.1768i             0.1768 + 0.1768i
                 0.0000 + 0.2500i            -0.0000 - 0.2500i
                 0.1768 - 0.1768i            -0.1768 + 0.1768i
                         ans(:, :, 11, 5) =

0.2500                       0.2500
                -0.0957 - 0.2310i            -0.0957 - 0.2310i
                -0.1768 + 0.1768i            -0.1768 + 0.1768i
                 0.2310 + 0.0957i             0.2310 + 0.0957i
                 0.2500                      -0.2500
                -0.0957 - 0.2310i             0.0957 + 0.2310i
                -0.1768 + 0.1768i             0.1768 - 0.1768i
                 0.2310 + 0.0957i            -0.2310 - 0.0957i
                         ans(:, :, 12, 5) =

0.2500                       0.2500
                -0.0000 - 0.2500i            -0.0000 - 0.2500i
                -0.2500 + 0.0000i            -0.2500 + 0.0000i
                 0.0000 + 0.2500i             0.0000 + 0.2500i
                 0.2500                      -0.2500
                -0.0000 - 0.2500i             0.0000 + 0.2500i
                -0.2500 + 0.0000i             0.2500 - 0.0000i
                 0.0000 + 0.2500i            -0.0000 - 0.2500i
                         ans(:, :, 13, 5) =

0.2500                       0.2500
                 0.0957 - 0.2310i             0.0957 - 0.2310i
                -0.1768 - 0.1768i            -0.1768 - 0.1768i
                -0.2310 + 0.0957i            -0.2310 + 0.0957i
                 0.2500                      -0.2500
                 0.0957 - 0.2310i            -0.0957 + 0.2310i
                -0.1768 - 0.1768i             0.1768 + 0.1768i
                -0.2310 + 0.0957i             0.2310 - 0.0957i
                         ans(:, :, 14, 5) =

0.2500                       0.2500
                 0.1768 - 0.1768i             0.1768 - 0.1768i
                -0.0000 - 0.2500i            -0.0000 - 0.2500i
                -0.1768 - 0.1768i            -0.1768 - 0.1768i
                 0.2500                      -0.2500
                 0.1768 - 0.1768i            -0.1768 + 0.1768i
                -0.0000 - 0.2500i             0.0000 + 0.2500i
                -0.1768 - 0.1768i             0.1768 + 0.1768i
                         ans(:, :, 15, 5) =

0.2500                       0.2500
                 0.2310 - 0.0957i             0.2310 - 0.0957i
                 0.1768 - 0.1768i             0.1768 - 0.1768i
                 0.0957 - 0.2310i             0.0957 - 0.2310i
                 0.2500                      -0.2500
                 0.2310 - 0.0957i            -0.2310 + 0.0957i
                 0.1768 - 0.1768i            -0.1768 + 0.1768i
                 0.0957 - 0.2310i            -0.0957 + 0.2310i
                         ans(:, :, 16, 5) =

0.2500                       0.2500
                 0.2500                       0.2500
                 0.2500                       0.2500
                 0.2500                       0.2500
                 0.2500                      -0.2500
                 0.2500                      -0.2500
                 0.2500                      -0.2500
                 0.2500                      -0.2500
                         ans(:, :, 1, 7) =

0.2500                       0.2500
                 0.2079 + 0.1389i             0.2079 + 0.1389i
                 0.0957 + 0.2310i             0.0957 + 0.2310i
                -0.0488 + 0.2452i            -0.0488 + 0.2452i
                 0.2500                      -0.2500
                 0.2079 + 0.1389i            -0.2079 - 0.1389i
                 0.0957 + 0.2310i            -0.0957 - 0.2310i
                -0.0488 + 0.2452i             0.0488 - 0.2452i
                         ans(:, :, 2, 7) =

0.2500                       0.2500
                 0.1389 + 0.2079i             0.1389 + 0.2079i
                -0.0957 + 0.2310i            -0.0957 + 0.2310i
                -0.2452 + 0.0488i            -0.2452 + 0.0488i
                 0.2500                      -0.2500
                 0.1389 + 0.2079i            -0.1389 - 0.2079i
                -0.0957 + 0.2310i             0.0957 - 0.2310i
                -0.2452 + 0.0488i             0.2452 - 0.0488i
                         ans(:, :, 3, 7) =

0.2500                       0.2500
                 0.0488 + 0.2452i             0.0488 + 0.2452i
                -0.2310 + 0.0957i            -0.2310 + 0.0957i
                -0.1389 - 0.2079i            -0.1389 - 0.2079i
                 0.2500                      -0.2500
                 0.0488 + 0.2452i            -0.0488 - 0.2452i
                -0.2310 + 0.0957i             0.2310 - 0.0957i
                -0.1389 - 0.2079i             0.1389 + 0.2079i
``` ans(:, :, 4, 7) =

| 0.2500 | 0.2500 |
| --- | --- |
| −0.0488 + 0.2452i | −0.0488 + 0.2452i |
| −0.2310 − 0.0957i | −0.2310 − 0.0957i |
| 0.1389 − 0.2079i | 0.1389 − 0.2079i |
| 0.2500 | −0.2500 |
| −0.0488 + 0.2452i | 0.0488 − 0.2452i |
| −0.2310 − 0.0957i | 0.2310 + 0.0957i |
| 0.1389 − 0.2079i | −0.1389 + 0.2079i | ans(:, :, 5, 7) =

| 0.2500 | 0.2500 |
| --- | --- |
| −0.1389 + 0.2079i | −0.1389 + 0.2079i |
| −0.0957 − 0.2310i | −0.0957 − 0.2310i |
| 0.2452 + 0.0488i | 0.2452 + 0.0488i |
| 0.2500 | −0.2500 |
| −0.1389 + 0.2079i | 0.1389 − 0.2079i |
| −0.0957 − 0.2310i | 0.0957 + 0.2310i |
| 0.2452 + 0.0488i | −0.2452 − 0.0488i | ans(:, :, 6, 7) =

| 0.2500 | 0.2500 |
| --- | --- |
| −0.2079 + 0.1389i | −0.2079 + 0.1389i |
| 0.0957 − 0.2310i | 0.0957 − 0.2310i |
| 0.0488 + 0.2452i | 0.0488 + 0.2452i |
| 0.2500 | −0.2500 |
| −0.2079 + 0.1389i | 0.2079 − 0.1389i |
| 0.0957 − 0.2310i | −0.0957 + 0.2310i |
| 0.0488 + 0.2452i | −0.0488 − 0.2452i | ans(:, :, 7, 7) =

| 0.2500 | 0.2500 |
| --- | --- |
| −0.2452 + 0.0488i | −0.2452 + 0.0488i |
| 0.2310 − 0.0957i | 0.2310 − 0.0957i |
| −0.2079 + 0.1389i | −0.2079 + 0.1389i |
| 0.2500 | −0.2500 |
| −0.2452 + 0.0488i | 0.2452 − 0.0488i |
| 0.2310 − 0.0957i | −0.2310 + 0.0957i |
| −0.2079 + 0.1389i | 0.2079 − 0.1389i | ans(:, :, 8, 7) =

| 0.2500 | 0.2500 |
| --- | --- |
| −0.2452 − 0.0488i | −0.2452 − 0.0488i |
| 0.2310 + 0.0957i | 0.2310 + 0.0957i |
| −0.2079 − 0.1389i | −0.2079 − 0.1389i |
| 0.2500 | −0.2500 |
| −0.2452 − 0.0488i | 0.2452 + 0.0488i |
| 0.2310 + 0.0957i | −0.2310 − 0.0957i |
| −0.2079 − 0.1389i | 0.2079 + 0.1389i | ans(:, :, 9, 7) =

| 0.2500 | 0.2500 |
| --- | --- |
| −0.2079 − 0.1389i | −0.2079 − 0.1389i |
| 0.0957 + 0.2310i | 0.0957 + 0.2310i |
| 0.0488 − 0.2452i | 0.0488 − 0.2452i |
| 0.2500 | −0.2500 |
| −0.2079 − 0.1389i | 0.2079 + 0.1389i |
| 0.0957 + 0.2310i | −0.0957 − 0.2310i |
| 0.0488 − 0.2452i | −0.0488 + 0.2452i | ans(:, :, 10, 7) =

| 0.2500 | 0.2500 |
| --- | --- |
| −0.1389 − 0.2079i | −0.1389 − 0.2079i |
| −0.0957 + 0.2310i | −0.0957 + 0.2310i |
| 0.2452 − 0.0488i | 0.2452 − 0.0488i |
| 0.2500 | −0.2500 |
| −0.1389 − 0.2079i | 0.1389 + 0.2079i |
| −0.0957 + 0.2310i | 0.0957 − 0.2310i |
| 0.2452 − 0.0488i | −0.2452 + 0.0488i | ans(:, :, 11, 7) =

| 0.2500 | 0.2500 |
| --- | --- |
| −0.0488 − 0.2452i | −0.0488 − 0.2452i |
| −0.2310 + 0.0957i | −0.2310 + 0.0957i |
| 0.1389 + 0.2079i | 0.1389 + 0.2079i |
| 0.2500 | −0.2500 |
| −0.0488 − 0.2452i | 0.0488 + 0.2452i |
| −0.2310 + 0.0957i | 0.2310 − 0.0957i |
| 0.1389 + 0.2079i | −0.1389 − 0.2079i | ans(:, :, 12, 7) =

| 0.2500 | 0.2500 |
| --- | --- |
| 0.0488 − 0.2452i | 0.0488 − 0.2452i |
| −0.2310 − 0.0957i | −0.2310 − 0.0957i |
| −0.1389 + 0.2079i | −0.1389 + 0.2079i |
| 0.2500 | −0.2500 |
| 0.0488 − 0.2452i | −0.0488 + 0.2452i |
| −0.2310 − 0.0957i | 0.2310 + 0.0957i |
| −0.1389 + 0.2079i | 0.1389 − 0.2079i | ans(:, :, 13, 7) =

| 0.2500 | 0.2500 |
| --- | --- |
| 0.1389 − 0.2079i | 0.1389 − 0.2079i |
| −0.0957 − 0.2310i | −0.0957 − 0.2310i |
| −0.2452 − 0.0488i | −0.2452 − 0.0488i |
| 0.2500 | −0.2500 |
| 0.1389 − 0.2079i | −0.1389 + 0.2079i |
| −0.0957 − 0.2310i | 0.0957 + 0.2310i |
| −0.2452 − 0.0488i | 0.2452 + 0.0488i | ans(:, :, 14, 7) =

| 0.2500 | 0.2500 |
| --- | --- |
| 0.2079 − 0.1389i | 0.2079 − 0.1389i |
| 0.0957 − 0.2310i | 0.0957 − 0.2310i |
| −0.0488 − 0.2452i | −0.0488 − 0.2452i |
| 0.2500 | −0.2500 |
| 0.2079 − 0.1389i | −0.2079 + 0.1389i |
| 0.0957 − 0.2310i | −0.0957 + 0.2310i |
| −0.0488 − 0.2452i | 0.0488 + 0.2452i | ans(:, :, 15, 7) =

| 0.2500 | 0.2500 |
| --- | --- |
| 0.2452 − 0.0488i | 0.2452 − 0.0488i |
| 0.2310 − 0.0957i | 0.2310 − 0.0957i |
| 0.2079 − 0.1389i | 0.2079 − 0.1389i |
| 0.2500 | −0.2500 |
| 0.2452 − 0.0488i | −0.2452 + 0.0488i |
| 0.2310 − 0.0957i | −0.2310 + 0.0957i |
| 0.2079 − 0.1389i | −0.2079 + 0.1389i | ans(:, :, 16, 7) =

| 0.2500 | 0.2500 |
| --- | --- |
| 0.2452 + 0.0488i | 0.2452 + 0.0488i |
| 0.2310 + 0.0957i | 0.2310 + 0.0957i |
| 0.2079 + 0.1389i | 0.2079 + 0.1389i |
| 0.2500 | −0.2500 |
| 0.2452 + 0.0488i | −0.2452 − 0.0488i |
| 0.2310 + 0.0957i | −0.2310 − 0.0957i |
| 0.2079 + 0.1389i | −0.2079 − 0.1389i |

(2) For Rank 4:

For example, the subset of the first codebook may include ans(:,:,,n=1), ans(:,:,n=2), ans(:,:,n=3), and ans(:,:,n=4) for rank 4 that are described above.

The subset of the second codebook may include (:,:, n=1), (:,:, n=3), (:,:, n=5), and (:,:, n=7) that are described above.

The combination of the first precoding matrix indicator selected from the subset of the first codebook and the second precoding matrix indicator selected from the subset of the second codebook may indicate one of precoding matrix candidates disclosed in the following overall codebook.

ans(:, :, 1, 1) =

| 0.1768 | 0.1768 | 0.1768 | 0.1768 |
|---|---|---|---|
| 0.1768 | 0.0000 + 0.1768i | 0.1768 | 0.0000 + 0.1768i |
| 0.1768 | −0.1768 + 0.0000i | 0.1768 | −0.1768 + 0.0000i |
| 0.1768 | −0.0000 − 0.1768i | 0.1768 | −0.0000 − 0.1768i |
| 0.1768 | 0.1768 | −0.1768 | −0.1768 |
| 0.1768 | 0.0000 + 0.1768i | −0.1768 | −0.0000 − 0.1768i |
| 0.1768 | −0.1768 + 0.0000i | −0.1768 | 0.1768 − 0.0000i |
| 0.1768 | −0.0000 − 0.1768i | −0.1768 | 0.0000 + 0.1768i | ans(:, :, 2, 1) =

| 0.1768 | 0.1768 | 0.1768 | 0.1768 |
|---|---|---|---|
| 0 + 0.1768i | −0.1768 + 0.0000i | 0 + 0.1768i | −0.1768 + 0.0000i |
| −0.1768 | 0.1768 − 0.0000i | −0.1768 | 0.1768 − 0.0000i |
| 0 − 0.1768i | −0.1768 + 0.0000i | 0 − 0.1768i | −0.1768 + 0.0000i |
| 0.1768 | 0.1768 | −0.1768 | −0.1768 |
| 0 + 0.1768i | −0.1768 + 0.0000i | 0 − 0.1768i | 0.1768 − 0.0000i |
| −0.1768 | 0.1768 − 0.0000i | 0.1768 | −0.1768 + 0.0000i |
| 0 − 0.1768i | −0.1768 + 0.0000i | 0 + 0.1768i | 0.1768 − 0.0000i | ans(:, :, 3, 1) =

| 0.1768 | 0.1768 | 0.1768 | 0.1768 |
|---|---|---|---|
| −0.1768 | −0.0000 − 0.1768i | −0.1768 | −0.0000 − 0.1768i |
| 0.1768 | −0.1768 + 0.0000i | 0.1768 | −0.1768 + 0.0000i |
| −0.1768 | 0.0000 + 0.1768i | −0.1768 | 0.0000 + 0.1768i |
| 0.1768 | 0.1768 | −0.1768 | −0.1768 |
| −0.1768 | −0.0000 − 0.1768i | 0.1768 | 0.0000 + 0.1768i |
| 0.1768 | −0.1768 + 0.0000i | −0.1768 | 0.1768 − 0.0000i |
| −0.1768 | 0.0000 + 0.1768i | 0.1768 | −0.0000 − 0.1768i | ans(:, :, 4, 1) =

| 0.1768 | 0.1768 | 0.1768 | 0.1768 |
|---|---|---|---|
| 0 − 0.1768i | 0.1768 − 0.0000i | 0 − 0.1768i | 0.1768 − 0.0000i |
| −0.1768 | 0.1768 − 0.0000i | −0.1768 | 0.1768 − 0.0000i |
| 0 + 0.1768i | 0.1768 − 0.0000i | 0 + 0.1768i | 0.1768 − 0.0000i |
| 0.1768 | 0.1768 | −0.1768 | −0.1768 |
| 0 − 0.1768i | 0.1768 − 0.0000i | 0 + 0.1768i | −0.1768 + 0.0000i |
| −0.1768 | 0.1768 − 0.0000i | 0.1768 | −0.1768 + 0.0000i |
| 0 + 0.1768i | 0.1768 − 0.0000i | 0 − 0.1768i | −0.1768 + 0.0000i | ans(:, :, 1, 3) =

| 0.1768 | 0.1768 | 0.1768 | 0.1768 |
|---|---|---|---|
| 0.1633 + 0.0676i | −0.0676 + 0.1633i | 0.1633 + 0.0676i | −0.0676 + 0.1633i |
| 0.1250 + 0.1250i | −0.1250 − 0.1250i | 0.1250 + 0.1250i | −0.1250 − 0.1250i |
| 0.0676 + 0.1633i | 0.1633 − 0.0676i | 0.0676 + 0.1633i | 0.1633 − 0.0676i |
| 0.1768 | 0.1768 | −0.1768 | −0.1768 |
| 0.1633 + 0.0676i | −0.0676 + 0.1633i | −0.1633 − 0.0676i | 0.0676 − 0.1633i |
| 0.1250 + 0.1250i | −0.1250 − 0.1250i | −0.1250 − 0.1250i | 0.1250 + 0.1250i |
| 0.0676 + 0.1633i | 0.1633 − 0.0676i | −0.0676 − 0.1633i | −0.1633 + 0.0676i | ans(:, :, 2, 3) =

| 0.1768 | 0.1768 | 0.1768 | 0.1768 |
|---|---|---|---|
| −0.0676 + 0.1633i | −0.1633 − 0.0676i | −0.0676 + 0.1633i | −0.1633 − 0.0676i |
| −0.1250 − 0.1250i | 0.1250 + 0.1250i | −0.1250 − 0.1250i | 0.1250 + 0.1250i |
| 0.1633 − 0.0676i | −0.0676 − 0.1633i | 0.1633 − 0.0676i | −0.0676 − 0.1633i |
| 0.1768 | 0.1768 | −0.1768 | −0.1768 |
| −0.0676 + 0.1633i | −0.1633 − 0.0676i | 0.0676 − 0.1633i | 0.1633 + 0.0676i |
| −0.1250 − 0.1250i | 0.1250 + 0.1250i | 0.1250 + 0.1250i | −0.1250 − 0.1250i |
| 0.1633 − 0.0676i | −0.0676 − 0.1633i | −0.1633 + 0.0676i | 0.0676 + 0.1633i | ans(:, :, 3, 3) =

| 0.1768 | 0.1768 | 0.1768 | 0.1768 |
|---|---|---|---|
| −0.1633 − 0.0676i | 0.0676 − 0.1633i | −0.1633 − 0.0676i | 0.0676 − 0.1633i |
| 0.1250 + 0.1250i | −0.1250 − 0.1250i | 0.1250 + 0.1250i | −0.1250 − 0.1250i |
| −0.0676 − 0.1633i | −0.1633 + 0.0676i | −0.0676 − 0.1633i | −0.1633 + 0.0676i |
| 0.1768 | 0.1768 | −0.1768 | −0.1768 |
| −0.1633 − 0.0676i | 0.0676 − 0.1633i | 0.1633 + 0.0676i | −0.0676 + 0.1633i |
| 0.1250 + 0.1250i | −0.1250 − 0.1250i | −0.1250 − 0.1250i | 0.1250 + 0.1250i |
| −0.0676 − 0.1633i | −0.1633 + 0.0676i | 0.0676 + 0.1633i | 0.1633 − 0.0676i | ans(:, :, 4, 3) =

| 0.1768 | 0.1768 | 0.1768 | 0.1768 |
|---|---|---|---|
| 0.0676 − 0.1633i | 0.1633 + 0.0676i | 0.0676 − 0.1633i | 0.1633 + 0.0676i |
| −0.1250 − 0.1250i | 0.1250 + 0.1250i | −0.1250 − 0.1250i | 0.1250 + 0.1250i |
| −0.1633 + 0.0676i | 0.0676 + 0.1633i | −0.1633 + 0.0676i | 0.0676 + 0.1633i |
| 0.1768 | 0.1768 | −0.1768 | −0.1768 |
| 0.0676 − 0.1633i | 0.1633 + 0.0676i | −0.0676 + 0.1633i | −0.1633 − 0.0676i |
| −0.1250 − 0.1250i | 0.1250 + 0.1250i | 0.1250 + 0.1250i | −0.1250 − 0.1250i |
| −0.1633 + 0.0676i | 0.0676 + 0.1633i | 0.1633 − 0.0676i | −0.0676 − 0.1633i |

-continued ans(:, :, 1, 5) =

| 0.1768 | 0.1768 | 0.1768 | 0.1768 |
|---|---|---|---|
| 0.1250 + 0.1250i | −0.1250 + 0.1250i | 0.1250 + 0.1250i | −0.1250 + 0.1250i |
| 0.0000 + 0.1768i | −0.0000 − 0.1768i | 0.0000 + 0.1768i | −0.0000 − 0.1768i |
| −0.1250 + 0.1250i | 0.1250 + 0.1250i | −0.1250 + 0.1250i | 0.1250 + 0.1250i |
| 0.1768 | 0.1768 | −0.1768 | −0.1768 |
| 0.1250 + 0.1250i | −0.1250 + 0.1250i | −0.1250 − 0.1250i | 0.1250 − 0.1250i |
| 0.0000 + 0.1768i | −0.0000 − 0.1768i | −0.0000 − 0.1768i | 0.0000 + 0.1768i |
| −0.1250 + 0.1250i | 0.1250 + 0.1250i | 0.1250 − 0.1250i | −0.1250 − 0.1250i | ans(:, :, 2, 5) =

| 0.1768 | 0.1768 | 0.1768 | 0.1768 |
|---|---|---|---|
| −0.1250 + 0.1250i | −0.1250 − 0.1250i | −0.1250 + 0.1250i | −0.1250 − 0.1250i |
| −0.0000 − 0.1768i | 0.0000 + 0.1768i | −0.0000 − 0.1768i | 0.0000 + 0.1768i |
| 0.1250 + 0.1250i | 0.1250 − 0.1250i | 0.1250 + 0.1250i | 0.1250 − 0.1250i |
| 0.1768 | 0.1768 | −0.1768 | −0.1768 |
| −0.1250 + 0.1250i | −0.1250 − 0.1250i | 0.1250 − 0.1250i | 0.1250 + 0.1250i |
| −0.0000 − 0.1768i | 0.0000 + 0.1768i | 0.0000 + 0.1768i | −0.0000 − 0.1768i |
| 0.1250 + 0.1250i | 0.1250 − 0.1250i | −0.1250 − 0.1250i | −0.1250 + 0.1250i | ans(:, :, 3, 5) =

| 0.1768 | 0.1768 | 0.1768 | 0.1768 |
|---|---|---|---|
| −0.1250 − 0.1250i | 0.1250 − 0.1250i | −0.1250 − 0.1250i | 0.1250 − 0.1250i |
| 0.0000 + 0.1768i | −0.0000 − 0.1768i | 0.0000 + 0.1768i | −0.0000 − 0.1768i |
| 0.1250 − 0.1250i | −0.1250 − 0.1250i | 0.1250 − 0.1250i | −0.1250 − 0.1250i |
| 0.1768 | 0.1768 | −0.1768 | −0.1768 |
| −0.1250 − 0.1250i | 0.1250 − 0.1250i | 0.1250 + 0.1250i | −0.1250 + 0.1250i |
| 0.0000 + 0.1768i | −0.0000 − 0.1768i | −0.0000 − 0.1768i | 0.0000 + 0.1768i |
| 0.1250 − 0.1250i | −0.1250 − 0.1250i | −0.1250 + 0.1250i | 0.1250 + 0.1250i | ans(:, :, 4, 5) =

| 0.1768 | 0.1768 | 0.1768 | 0.1768 |
|---|---|---|---|
| 0.1250 − 0.1250i | 0.1250 + 0.1250i | 0.1250 − 0.1250i | 0.1250 + 0.1250i |
| −0.0000 − 0.1768i | 0.0000 + 0.1768i | −0.0000 − 0.1768i | 0.0000 + 0.1768i |
| −0.1250 − 0.1250i | −0.1250 + 0.1250i | −0.1250 − 0.1250i | −0.1250 + 0.1250i |
| 0.1768 | 0.1768 | −0.1768 | −0.1768 |
| 0.1250 − 0.1250i | 0.1250 + 0.1250i | −0.1250 + 0.1250i | −0.1250 − 0.1250i |
| −0.0000 − 0.1768i | 0.0000 + 0.1768i | 0.0000 + 0.1768i | −0.0000 − 0.1768i |
| −0.1250 − 0.1250i | −0.1250 + 0.1250i | 0.1250 + 0.1250i | 0.1250 − 0.1250i | ans(:, :, 1, 7) =

| 0.1768 | 0.1768 | 0.1768 | 0.1768 |
|---|---|---|---|
| 0.0676 + 0.1633i | −0.1633 + 0.0676i | 0.0676 + 0.1633i | −0.1633 + 0.0676i |
| −0.1250 + 0.1250i | 0.1250 − 0.1250i | −0.1250 + 0.1250i | 0.1250 − 0.1250i |
| −0.1633 − 0.0676i | −0.0676 + 0.1633i | −0.1633 − 0.0676i | −0.0676 + 0.1633i |
| 0.1768 | 0.1768 | −0.1768 | −0.1768 |
| 0.0676 + 0.1633i | −0.1633 + 0.0676i | −0.0676 − 0.1633i | 0.1633 − 0.0676i |
| −0.1250 + 0.1250i | 0.1250 − 0.1250i | 0.1250 − 0.1250i | −0.1250 + 0.1250i |
| −0.1633 − 0.0676i | −0.0676 + 0.1633i | 0.1633 + 0.0676i | 0.0676 − 0.1633i | ans(:, :, 2, 7) =

| 0.1768 | 0.1768 | 0.1768 | 0.1768 |
|---|---|---|---|
| −0.1633 + 0.0676i | −0.0676 − 0.1633i | −0.1633 + 0.0676i | −0.0676 − 0.1633i |
| 0.1250 − 0.1250i | −0.1250 + 0.1250i | 0.1250 − 0.1250i | −0.1250 + 0.1250i |
| −0.0676 + 0.1633i | 0.1633 + 0.0676i | −0.0676 + 0.1633i | 0.1633 + 0.0676i |
| 0.1768 | 0.1768 | −0.1768 | −0.1768 |
| −0.1633 + 0.0676i | −0.0676 − 0.1633i | 0.1633 − 0.0676i | 0.0676 + 0.1633i |
| 0.1250 − 0.1250i | −0.1250 + 0.1250i | −0.1250 + 0.1250i | 0.1250 − 0.1250i |
| −0.0676 + 0.1633i | 0.1633 + 0.0676i | 0.0676 − 0.1633i | −0.1633 − 0.0676i | ans(:, :, 3, 7) =

| 0.1768 | 0.1768 | 0.1768 | 0.1768 |
|---|---|---|---|
| −0.0676 − 0.1633i | 0.1633 − 0.0676i | −0.0676 − 0.1633i | 0.1633 − 0.0676i |
| −0.1250 + 0.1250i | 0.1250 − 0.1250i | −0.1250 + 0.1250i | 0.1250 − 0.1250i |
| 0.1633 + 0.0676i | 0.0676 − 0.1633i | 0.1633 + 0.0676i | 0.0676 − 0.1633i |
| 0.1768 | 0.1768 | −0.1768 | −0.1768 |
| −0.0676 − 0.1633i | 0.1633 − 0.0676i | 0.0676 + 0.1633i | −0.1633 + 0.0676i |
| −0.1250 + 0.1250i | 0.1250 − 0.1250i | 0.1250 − 0.1250i | −0.1250 − 0.1250i |
| 0.1633 + 0.0676i | 0.0676 − 0.1633i | −0.1633 − 0.0676i | −0.0676 + 0.1633i | ans(:, :, 4, 7) =

| 0.1768 | 0.1768 | 0.1768 | 0.1768 |
|---|---|---|---|
| 0.1633 − 0.0676i | 0.0676 + 0.1633i | 0.1633 − 0.0676i | 0.0676 + 0.1633i |
| 0.1250 − 0.1250i | −0.1250 + 0.1250i | 0.1250 − 0.1250i | −0.1250 + 0.1250i |
| 0.0676 − 0.1633i | −0.1633 − 0.0676i | 0.0676 − 0.1633i | −0.1633 − 0.0676i |
| 0.1768 | 0.1768 | −0.1768 | −0.1768 |
| 0.1633 − 0.0676i | 0.0676 + 0.1633i | −0.1633 + 0.0676i | −0.0676 − 0.1633i |

-continued

| | | | |
|---|---|---|---|
| 0.1250 − 0.1250i | −0.1250 + 0.1250i | −0.1250 + 0.1250i | 0.1250 − 0.1250i |
| 0.0676 − 0.1633i | −0.1633 − 0.0676i | −0.0676 + 0.1633i | 0.1633 + 0.0676i |

Figure 6:
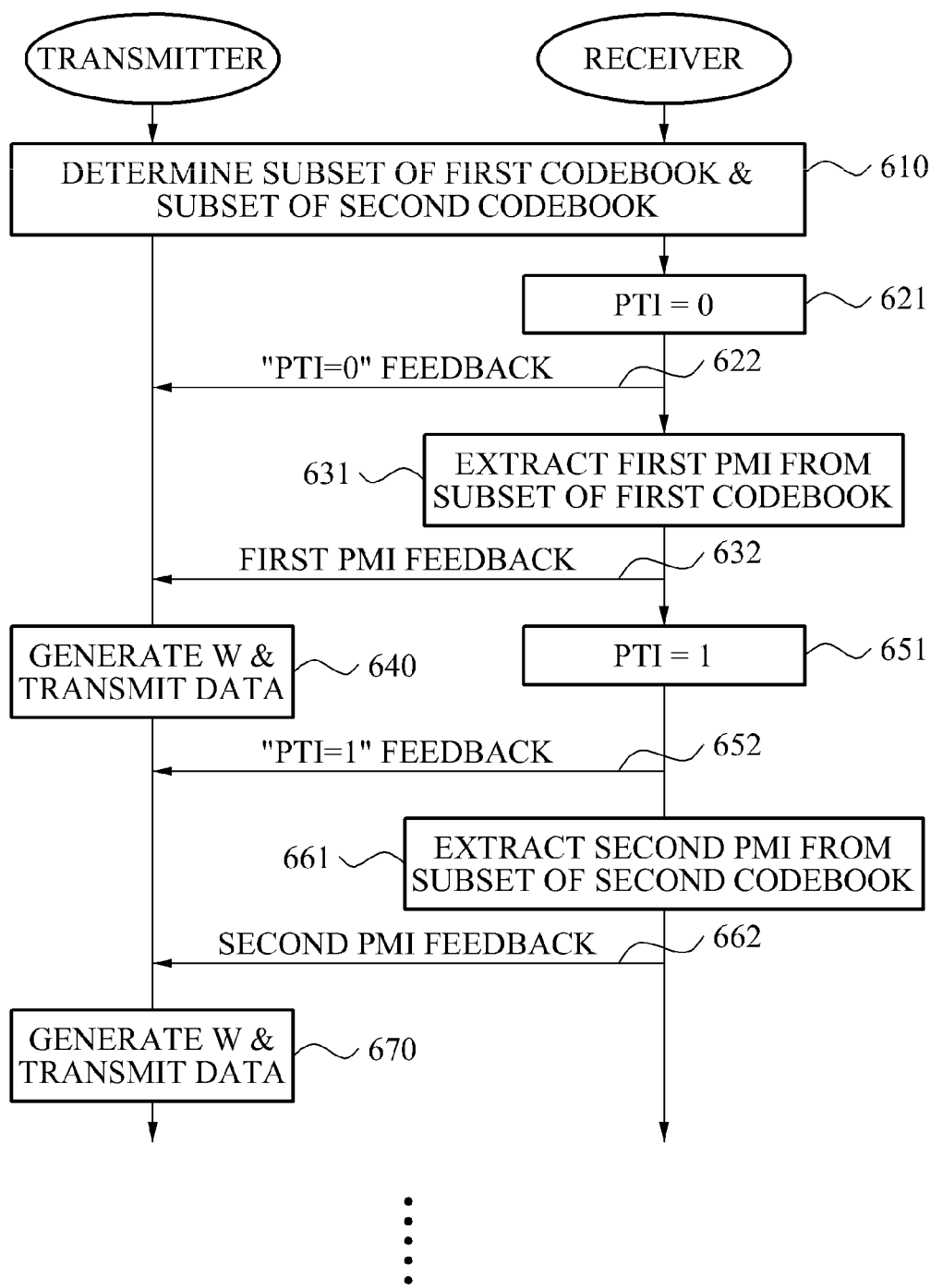
FIG. 6 is a diagram illustrating an example of a communication method of a receiver and a transmitter that operate in PUCCH 2-1 sub-modes 1 and 2.

FIG. 6 illustrates an example of a communication method of a transmitter and a receiver that operate in PUCCH 2-1 sub-modes 1 and 2.

At 610, the transmitter and the receiver may determine a subset of a first codebook and a subset of a second codebook that are described above. The subset of the first codebook and the subset of the second codebook may be individually stored in the transmitter and the receiver. The overall codebook in which the subset of the first codebook and the subset of the second codebook are integrated may be stored in the transmitter and the receiver.

At 621, the receiver may determine PTI as '0'. At 622, the receiver may feed back PTI=0 to the transmitter. At 631, the receiver may extract a first precoding matrix indicator from the subset of the first codebook. When a point in time when the receiver feeds back a precoding matrix indicator is a first reporting point in time in PTI=0, the receiver may feed back the first precoding matrix indicator to the transmitter at the first reporting point in time at 632. CQI, a rank indicator, and the like may be further fed back.

At 640, the transmitter may generate W based on the first precoding matrix indicator, and perform precoding using W and transmit data. While PTI=0, the aforementioned process may be repeated.

When the receiver determines PTI=1 at 651, the receiver may feed back PTI=1 to the transmitter at 652. At 661, the receiver may extract a second precoding matrix indicator from the subset of the second codebook. When a point in time when the receiver feeds back a precoding matrix indicator is a second reporting point in time in PTI=0, the receiver may feed back the second precoding matrix indicator to the transmitter at the second reporting point in time at 662. CQI, a rank indicator, and the like may be further fed back.

At 670, the transmitter may generate W based on the second precoding matrix indicator, and perform precoding using W and transmit data. The transmitter may generate new W by updating the second precoding matrix indicator based on the previously used W. While PTI=0, the aforementioned process may be repeated.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a receiver in a wireless communication system, the communication method comprising:
    obtaining a rank indicator;
    obtaining a first precoding matrix indicator based on the rank indicator;
    obtaining a second precoding matrix indicator associated with the first precoding matrix indicator;
    when the rank indicator is 1,
        transmitting the rank indicator,
        transmitting the first precoding matrix indicator obtained based on a subset {0, 2, 4, 6, 8, 10, 12, 14} of a first codebook, the second precoding matrix indicator and a wideband channel quality index (CQI); and
    when the rank indicator is 2,
        transmitting the rank indicator, and
        transmitting the first precoding matrix indicator obtained based on a subset {0, 2, 4, 6, 8, 10, 12, 14} of the first codebook, the second precoding matrix indicator and a wideband channel quality index (CQI),
    wherein when the rank indicator is 1 or 2, the first precoding matrix indicator is 3 bits, and the second precoding matrix indicator is 1 bit.

2. The communication method of claim 1, wherein a combination of the first precoding matrix indicator and the second precoding matrix indicator indicates a single recommended precoding matrix.

3. The communication method of claim 1, wherein a combination of the first precoding matrix indicator and the second precoding matrix indicator indicates one of recommended precoding matrix candidates disclosed in the following Table 1:

TABLE 1

| | |
|---|---|
| $W^{(1)}_{0,0}$ | $W^{(1)}_{0,2}$ |
| $W^{(1)}_{4,0}$ | $W^{(1)}_{4,2}$ |
| $W^{(1)}_{8,0}$ | $W^{(1)}_{8,2}$ |
| $W^{(1)}_{12,0}$ | $W^{(1)}_{12,2}$ |
| $W^{(1)}_{16,0}$ | $W^{(1)}_{16,2}$ |
| $W^{(1)}_{20,0}$ | $W^{(1)}_{20,2}$ |
| $W^{(1)}_{24,0}$ | $W^{(1)}_{24,2}$ |
| $W^{(1)}_{28,0}$ | $W^{(1)}_{28,2}$ | wherein $$W^{(1)}_{m,n} = \frac{1}{\sqrt{8}} \begin{bmatrix} v_m \\ \varphi_n v_m \end{bmatrix}, \varphi_n = e^{j\pi n/2},$$

and $v_m = [1 \; e^{j2\pi n/32} \; e^{j4\pi n/32} \; e^{j6\pi n/32}]^T$, and
    wherein W denotes a precoding matrix, v denotes a column vector, and m and n are variables.

4. The communication method of claim 1, wherein a combination of the first precoding matrix indicator and the second precoding matrix indicator indicates one of recommended precoding matrix candidates disclosed in the following Table 2:

TABLE 2

| | |
|---|---|
| $W^{(2)}_{0,0,0}$ | $W^{(2)}_{0,0,1}$ |
| $W^{(2)}_{4,4,0}$ | $W^{(2)}_{4,4,1}$ |
| $W^{(2)}_{8,8,0}$ | $W^{(2)}_{8,8,1}$ |
| $W^{(2)}_{12,12,0}$ | $W^{(2)}_{12,12,1}$ |
| $W^{(2)}_{16,16,0}$ | $W^{(2)}_{16,16,1}$ |
| $W^{(2)}_{20,20,0}$ | $W^{(2)}_{20,20,1}$ |
| $W^{(2)}_{24,24,0}$ | $W^{(2)}_{24,24,1}$ |
| $W^{(2)}_{28,28,0}$ | $W^{(2)}_{28,28,1}$ | wherein $$W^{(2)}_{m,m',n} = \frac{1}{4}\begin{bmatrix} v_m & v_{m'} \\ \varphi_n v_m & -\varphi_n v_{m'} \end{bmatrix}, \varphi_n = e^{j\pi n/2},$$

and $v_m = [1\ e^{j2\pi n/32}\ e^{j4\pi n/32}\ e^{j6\pi n/32}]^T$, and wherein W denotes a precoding matrix, v denotes a column vector, and m and n are variables.

5. The communication method of claim 1, wherein a physical uplink control channel (PUCCH) mode is corresponding to 1-1.

6. The communication method of claim 1, further comprising:
when the rank indicator is 3,
transmitting the rank indicator, and
transmitting the first precoding matrix indicator obtained based on a subset {0, 2} of the first codebook, the second precoding matrix indicator and a wideband channel quality index(CQI),
wherein when the rank indicator is 3, the first precoding matrix indicator is 1 bit, and the second precoding matrix indicator is 3 bits.

7. The communication method of claim 1, further comprising:
when the rank indicator is 5 or 6,
transmitting the rank indicator, and
transmitting the first precoding matrix indicator obtained based on a subset {0, 1, 2, 3} of the first codebook, the second precoding matrix indicator and a wideband channel quality index(CQI),
wherein when the rank indicator is 5 or 6, the first precoding matrix indicator is 2 bits, and the second precoding matrix indicator is 0 bit.

8. A communication method of a receiver in a multiple input multiple output (MIMO) communication system, the communication method comprising:
feeding back, to a transmitter, a first precoding matrix indicator corresponding to a first codeword index included in a first codebook in order to indicate a recommended precoding matrix at a first reporting point; and
feeding back, to the transmitter, a second precoding matrix indicator corresponding to a second codeword index included in a second codebook in order to indicate a recommended precoding matrix at a second reporting point,
wherein the second precoding matrix indicator indicates, as the recommended precoding matrix at the second reporting point, one of candidates disclosed in the following Table 3:

TABLE 3

| | |
|---|---|
| $W^{(2)}_{0,0,0}$ | $W^{(2)}_{2,2,0}$ |
| $W^{(2)}_{2,2,0}$ | $W^{(2)}_{4,4,0}$ |
| $W^{(2)}_{4,4,0}$ | $W^{(2)}_{6,6,0}$ |
| $W^{(2)}_{6,6,0}$ | $W^{(2)}_{8,8,0}$ |
| $W^{(2)}_{8,8,0}$ | $W^{(2)}_{10,10,0}$ |
| $W^{(2)}_{10,10,0}$ | $W^{(2)}_{12,12,0}$ |
| $W^{(2)}_{12,12,0}$ | $W^{(2)}_{14,14,0}$ |
| $W^{(2)}_{14,14,0}$ | $W^{(2)}_{16,16,0}$ |
| $W^{(2)}_{16,16,0}$ | $W^{(2)}_{18,18,0}$ |
| $W^{(2)}_{18,18,0}$ | $W^{(2)}_{20,20,0}$ |
| $W^{(2)}_{20,20,0}$ | $W^{(2)}_{22,22,0}$ |
| $W^{(2)}_{22,22,0}$ | $W^{(2)}_{24,24,0}$ |
| $W^{(2)}_{24,24,0}$ | $W^{(2)}_{26,26,0}$ |
| $W^{(2)}_{26,26,0}$ | $W^{(2)}_{28,28,0}$ |

TABLE 3-continued

| | |
|---|---|
| $W^{(2)}_{28,28,0}$ | $W^{(2)}_{30,30,0}$ |
| $W^{(2)}_{30,30,0}$ | $W^{(2)}_{0,0,0}$ |
| $W^{(2)}_{1,1,0}$ | $W^{(2)}_{3,3,0}$ |
| $W^{(2)}_{3,3,0}$ | $W^{(2)}_{5,5,0}$ |
| $W^{(2)}_{5,5,0}$ | $W^{(2)}_{7,7,0}$ |
| $W^{(2)}_{7,7,0}$ | $W^{(2)}_{9,9,0}$ |
| $W^{(2)}_{9,9,0}$ | $W^{(2)}_{11,11,0}$ |
| $W^{(2)}_{11,11,0}$ | $W^{(2)}_{13,13,0}$ |
| $W^{(2)}_{13,13,0}$ | $W^{(2)}_{15,15,0}$ |
| $W^{(2)}_{15,15,0}$ | $W^{(2)}_{17,17,0}$ |
| $W^{(2)}_{17,17,0}$ | $W^{(2)}_{19,19,0}$ |
| $W^{(2)}_{19,19,0}$ | $W^{(2)}_{21,21,0}$ |
| $W^{(2)}_{21,21,0}$ | $W^{(2)}_{23,23,0}$ |
| $W^{(2)}_{23,23,0}$ | $W^{(2)}_{25,25,0}$ |
| $W^{(2)}_{25,25,0}$ | $W^{(2)}_{27,27,0}$ |
| $W^{(2)}_{27,27,0}$ | $W^{(2)}_{29,29,0}$ |
| $W^{(2)}_{29,29,0}$ | $W^{(2)}_{31,31,0}$ |
| $W^{(2)}_{31,31,0}$ | $W^{(2)}_{1,1,0}$ | wherein $$W^{(2)}_{m,m',n} = \frac{1}{4}\begin{bmatrix} v_m & v_{m'} \\ \varphi_n v_m & -\varphi_n v_{m'} \end{bmatrix}, \varphi_n = e^{j\pi n/2},$$

and $v_m = [1\ e^{j2\pi n/32}\ e^{j4\pi n/32}\ e^{j6\pi n/32}]^T$, and wherein W denotes a precoding matrix, v denotes a column vector, and m and n are variables.

9. A communication method of a receiver in a multiple input multiple output (MIMO) communication system, the communication method comprising:
feeding back, to a transmitter, a first precoding matrix indicator corresponding to a first codeword index included in a first codebook in order to indicate a recommended precoding matrix at a first reporting point; and
feeding back, to the transmitter, a second precoding matrix indicator corresponding to a second codeword index included in a second codebook in order to indicate a recommended precoding matrix at a second reporting point,
wherein the second precoding matrix indicator indicates, as the recommended precoding matrix at the second reporting point, one of candidates disclosed in the following Table 4:

TABLE 4

| |
|---|
| $W^{(4)}_{0,8,0}$ |
| $W^{(4)}_{8,16,0}$ |
| $W^{(4)}_{16,24,0}$ |
| $W^{(4)}_{24,32,0}$ |
| $W^{(4)}_{2,10,0}$ |
| $W^{(4)}_{10,18,0}$ |
| $W^{(4)}_{18,26,0}$ |
| $W^{(4)}_{26,34,0}$ |
| $W^{(4)}_{4,12,0}$ |
| $W^{(4)}_{12,20,0}$ |
| $W^{(4)}_{20,28,0}$ |
| $W^{(4)}_{28,36,0}$ |
| $W^{(4)}_{6,14,0}$ |
| $W^{(4)}_{14,22,0}$ |
| $W^{(4)}_{22,30,0}$ |
| $W^{(4)}_{30,38,0}$ | wherein $$W^{(4)}_{m,m',n} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}, \varphi_n = e^{j\pi n/2},$$

and $v_m = [1 \; e^{j2\pi n/32} \; e^{j4\pi n/32} \; e^{j6\pi n/32}]^T$, and wherein W denotes a precoding matrix, v denotes a column vector, and m and n are variables.

10. A communication method of a transmitter in a multiple input multiple output (MIMO) communication system, the communication method comprising:

receiving, from a receiver, a first precoding matrix indicator corresponding to a first codeword index included in a first codebook and a second precoding matrix indicator corresponding to a second codeword index included in a second codebook; and obtaining a precoding matrix based on the first precoding matrix indicator and the second precoding matrix indicator, wherein a combination of the first precoding matrix indicator and the second precoding matrix indicator indicates one of recommended precoding matrix candidates disclosed in one of the following Table 5 and Table 6:

TABLE 5

| | |
|---|---|
| $W^{(1)}_{0,0}$ | $W^{(1)}_{0,2}$ |
| $W^{(1)}_{4,0}$ | $W^{(1)}_{4,2}$ |
| $W^{(1)}_{8,0}$ | $W^{(1)}_{8,2}$ |
| $W^{(1)}_{12,0}$ | $W^{(1)}_{12,2}$ |
| $W^{(1)}_{16,0}$ | $W^{(1)}_{16,2}$ |
| $W^{(1)}_{20,0}$ | $W^{(1)}_{20,2}$ |
| $W^{(1)}_{24,0}$ | $W^{(1)}_{24,2}$ |
| $W^{(1)}_{28,0}$ | $W^{(1)}_{28,2}$ | wherein $$W^{(1)}_{m,n} = \frac{1}{\sqrt{8}} \begin{bmatrix} v_m \\ \varphi_n v_m \end{bmatrix}, \varphi_n = e^{j\pi n/2},$$

and $v_m = [1 \; e^{j2\pi n/32} \; e^{j4\pi n/32} \; e^{j6\pi n/32}]^T$

TABLE 6

| | |
|---|---|
| $W^{(2)}_{0,0,0}$ | $W^{(2)}_{0,0,1}$ |
| $W^{(2)}_{4,4,0}$ | $W^{(2)}_{4,4,1}$ |
| $W^{(2)}_{8,8,0}$ | $W^{(2)}_{8,8,1}$ |
| $W^{(2)}_{12,12,0}$ | $W^{(2)}_{12,12,1}$ |
| $W^{(2)}_{16,16,0}$ | $W^{(2)}_{16,16,1}$ |
| $W^{(2)}_{20,20,0}$ | $W^{(2)}_{20,20,1}$ |
| $W^{(2)}_{24,24,0}$ | $W^{(2)}_{24,24,1}$ |
| $W^{(2)}_{28,28,0}$ | $W^{(2)}_{28,28,1}$ | wherein $$W^{(2)}_{m,m',n} = \frac{1}{4} \begin{bmatrix} v_m & v_{m'} \\ \varphi_n v_m & -\varphi_n v_{m'} \end{bmatrix}, \varphi_n = e^{j\pi n/2},$$

and $v_m = [1 \; e^{j2\pi n/32} \; e^{j4\pi n/32} \; e^{j6\pi n/32}]^T$, and wherein W denotes a precoding matrix, v denotes a column vector, and m and n are variables.

11. A communication method of a transmitter in a multiple input multiple output (MIMO) communication system, the communication method comprising:

receiving, from a receiver, a first precoding matrix indicator corresponding to a first codeword index included in a first codebook, the first precoding matrix indicator indicating a recommended precoding matrix at a first reporting point;

receiving, from the receiver, a second precoding matrix indicator corresponding to a second codeword index included in a second codebook, the second precoding matrix indicator indicating a recommended precoding matrix at a second reporting point; and obtaining the recommended precoding matrix at the second reporting point based on the second precoding matrix indicator received at the second reporting point, wherein the second precoding matrix indicator indicates, as the recommended precoding matrix at the second reporting point, one of recommended precoding matrix candidates disclosed in one of the following Table 3 and Table 4:

TABLE 3

| | |
|---|---|
| $W^{(2)}_{0,0,0}$ | $W^{(2)}_{2,2,0}$ |
| $W^{(2)}_{2,2,0}$ | $W^{(2)}_{4,4,0}$ |
| $W^{(2)}_{4,4,0}$ | $W^{(2)}_{6,6,0}$ |
| $W^{(2)}_{6,6,0}$ | $W^{(2)}_{8,8,0}$ |
| $W^{(2)}_{8,8,0}$ | $W^{(2)}_{10,10,0}$ |
| $W^{(2)}_{10,10,0}$ | $W^{(2)}_{12,12,0}$ |
| $W^{(2)}_{12,12,0}$ | $W^{(2)}_{14,14,0}$ |
| $W^{(2)}_{14,14,0}$ | $W^{(2)}_{16,16,0}$ |
| $W^{(2)}_{16,16,0}$ | $W^{(2)}_{18,18,0}$ |
| $W^{(2)}_{18,18,0}$ | $W^{(2)}_{20,20,0}$ |
| $W^{(2)}_{20,20,0}$ | $W^{(2)}_{22,22,0}$ |
| $W^{(2)}_{22,22,0}$ | $W^{(2)}_{24,24,0}$ |
| $W^{(2)}_{24,24,0}$ | $W^{(2)}_{26,26,0}$ |
| $W^{(2)}_{26,26,0}$ | $W^{(2)}_{28,28,0}$ |
| $W^{(2)}_{28,28,0}$ | $W^{(2)}_{30,30,0}$ |
| $W^{(2)}_{30,30,0}$ | $W^{(2)}_{0,0,0}$ |
| $W^{(2)}_{1,1,0}$ | $W^{(2)}_{3,3,0}$ |
| $W^{(2)}_{3,3,0}$ | $W^{(2)}_{5,5,0}$ |
| $W^{(2)}_{5,5,0}$ | $W^{(2)}_{7,7,0}$ |
| $W^{(2)}_{7,7,0}$ | $W^{(2)}_{9,9,0}$ |
| $W^{(2)}_{9,9,0}$ | $W^{(2)}_{11,11,0}$ |
| $W^{(2)}_{11,11,0}$ | $W^{(2)}_{13,13,0}$ |
| $W^{(2)}_{13,13,0}$ | $W^{(2)}_{15,15,0}$ |
| $W^{(2)}_{15,15,0}$ | $W^{(2)}_{17,17,0}$ |
| $W^{(2)}_{17,17,0}$ | $W^{(2)}_{19,19,0}$ |
| $W^{(2)}_{19,19,0}$ | $W^{(2)}_{21,21,0}$ |
| $W^{(2)}_{21,21,0}$ | $W^{(2)}_{23,23,0}$ |
| $W^{(2)}_{23,23,0}$ | $W^{(2)}_{25,25,0}$ |
| $W^{(2)}_{25,25,0}$ | $W^{(2)}_{27,27,0}$ |
| $W^{(2)}_{27,27,0}$ | $W^{(2)}_{29,29,0}$ |
| $W^{(2)}_{29,29,0}$ | $W^{(2)}_{31,31,0}$ |
| $W^{(2)}_{31,31,0}$ | $W^{(2)}_{1,1,0}$ | wherein $$W^{(2)}_{m,m',n} = \frac{1}{4} \begin{bmatrix} v_m & v_{m'} \\ \varphi_n v_m & -\varphi_n v_{m'} \end{bmatrix}, \varphi_n = e^{j\pi n/2},$$

and $v_m = [1 \; e^{j2\pi n/32} \; e^{j4\pi n/32} \; e^{j6\pi n/32}]^T$

TABLE 4

| |
|---|
| $W^{(4)}_{0,8,0}$ |
| $W^{(4)}_{8,16,0}$ |
| $W^{(4)}_{16,24,0}$ |
| $W^{(4)}_{24,32,0}$ |
| $W^{(4)}_{2,10,0}$ |
| $W^{(4)}_{10,18,0}$ |
| $W^{(4)}_{18,26,0}$ |
| $W^{(4)}_{26,34,0}$ |
| $W^{(4)}_{4,12,0}$ |

TABLE 4-continued $W^{(4)}_{12,20,0}$
$W^{(4)}_{20,28,0}$
$W^{(4)}_{28,36,0}$
$W^{(4)}_{6,14,0}$
$W^{(4)}_{14,22,0}$
$W^{(4)}_{22,30,0}$
$W^{(4)}_{30,38,0}$ wherein $$W^{(4)}_{m,m',n} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}, \varphi_n = e^{j\pi n/2},$$

and $v_m = [1 \; e^{j2\pi n/32} \; e^{j4\pi n/32} \; e^{j6\pi n/32}]^T$, and wherein W denotes a precoding matrix, v denotes a column vector, and m and n are variables.

* * * * *